(12) United States Patent
Owen et al.

(10) Patent No.: US 7,970,722 B1
(45) Date of Patent: Jun. 28, 2011

(54) SYSTEM, METHOD AND COMPUTER PROGRAM PRODUCT FOR A COLLABORATIVE DECISION PLATFORM

(75) Inventors: Daniel L. Owen, Los Altos, CA (US); Michael W. Kusnic, Old Tappan, NJ (US)

(73) Assignee: Aloft Media, LLC, Longview, TX (US)

( * ) Notice: Subject to any disclaimer, the term of this patent is extended or adjusted under 35 U.S.C. 154(b) by 0 days.

(21) Appl. No.: 12/615,250

(22) Filed: Nov. 9, 2009

Related U.S. Application Data

(63) Continuation of application No. 11/828,129, filed on Jul. 25, 2007, now Pat. No. 7,617,169, which is a continuation of application No. 11/045,543, filed on Jan. 28, 2005, now Pat. No. 7,401,059, which is a continuation of application No. 09/708,154, filed on Nov. 7, 2000, now Pat. No. 6,876,991.

(60) Provisional application No. 60/163,984, filed on Nov. 8, 1999.

(51) Int. Cl.
G06F 17/00 (2006.01)
G06N 5/02 (2006.01)
(52) U.S. Cl. .......................................................... 706/46
(58) Field of Classification Search ..................... 706/46
See application file for complete search history.

(56) References Cited

U.S. PATENT DOCUMENTS

| 3,360,874 A | 1/1968 | Myers ........................... 434/198 |
| 3,444,521 A | 5/1969 | Breese .......................... 340/352 |
| 3,573,747 A | 4/1971 | Adams et al. | |
| 3,581,072 A | 5/1971 | Nymeyer ....................... 235/152 |
| 3,601,808 A | 8/1971 | Vlack | |
| 3,611,281 A | 10/1971 | Evanoff .......................... 340/23 |
| 3,611,314 A | 10/1971 | Pritchard, Jr. et al. | |
| 3,616,944 A | 11/1971 | Field .......................... 214/16 B |
| 3,634,669 A | 1/1972 | Soumas et al. ................ 235/184 |
| 3,656,148 A | 4/1972 | Belcher et al. ............ 340/324 A |
| 3,688,276 A | 8/1972 | Quinn | |
| 3,702,007 A | 10/1972 | Davis, II .......................... 444/1 |
| 3,710,948 A | 1/1973 | Sexton et al. ................ 210/484 |
| 3,729,712 A | 4/1973 | Glassman | |
| 3,757,037 A | 9/1973 | Bialek .......................... 178/66 A |
| 3,779,244 A | 12/1973 | Weeks, Jr. et al. | |
| 3,802,429 A | 4/1974 | Bird | |
| 3,818,616 A | 6/1974 | Weber ............................... 35/74 |
| 3,824,375 A | 7/1974 | Gross et al. ................ 235/617 B |

(Continued)

FOREIGN PATENT DOCUMENTS

AU 0768052 11/2003

(Continued)

OTHER PUBLICATIONS

Vincent P. Barabba, Meeting of the Minds: Creating the Market-Based Enterprise (1995) (ISBN 0-87584-577-0).

(Continued)

*Primary Examiner* — Michael Holmes
(74) *Attorney, Agent, or Firm* — The Caldwell Firm, LLC; Patrick E. Caldwell, Esq.

(57) ABSTRACT

A decision making system, method and computer program product are provided. Initially, a plurality of attributes is defined. Thereafter, first information regarding the attributes is received from a receiving business. Second information is then received regarding proposed products or services in terms of the attributes. Such second information is received from a supplying business. In use, a decision process is executed based on the first information and the second information.

760 Claims, 47 Drawing Sheets

U.S. PATENT DOCUMENTS

| | | | |
|---|---|---|---|
| 3,837,331 A | 9/1974 | Ross | 128/1 C |
| 3,848,235 A | 11/1974 | Lewis et al. | |
| 3,850,161 A | 11/1974 | Liss | 128/21 R |
| 3,863,625 A | 2/1975 | Viglione et al. | 128/21 B |
| 3,874,095 A | 4/1975 | DeWaele | 35/31 R |
| 3,906,455 A | 9/1975 | Houston et al. | |
| 3,944,723 A | 3/1976 | Fong | 178/3 |
| 3,946,220 A | 3/1976 | Brobeck et al. | 235/168 |
| 3,967,616 A | 7/1976 | Ross | 128/1 C |
| 3,993,046 A | 11/1976 | Fernandez et al. | 128/21 B |
| 4,007,362 A | 2/1977 | Sindermann | 235/151 |
| 4,016,542 A | 4/1977 | Azure | |
| 4,031,368 A | 6/1977 | Colding et al. | |
| 4,043,562 A | 8/1977 | Shillington | 273/164 |
| 4,081,607 A | 3/1978 | Vitols et al. | 179/1 SB |
| 4,107,467 A | 8/1978 | Johnson et al. | 179/2 DP |
| 4,118,788 A | 10/1978 | Roberts | 364/900 |
| 4,133,034 A | 1/1979 | Etter | 364/464 |
| 4,135,092 A | 1/1979 | Milly | 250/343 |
| 4,149,246 A | 4/1979 | Goldman | 364/200 |
| 4,181,948 A | 1/1980 | Jackson et al. | 364/478 |
| 4,186,438 A | 1/1980 | Benson et al. | 364/200 |
| 4,197,100 A | 4/1980 | Hausheer | 55/382 |
| 4,230,031 A | 10/1980 | Pedroso et al. | 98/115 LH |
| 4,248,389 A | 2/1981 | Thompson et al. | |
| 4,257,272 A | 3/1981 | Sloman | 73/633 |
| 4,295,128 A | 10/1981 | Hashemian et al. | 340/506 |
| 4,298,898 A | 11/1981 | Cardot | 360/67 |
| 4,300,040 A | 11/1981 | Gould et al. | 235/381 |
| 4,305,059 A | 12/1981 | Benton | |
| 4,314,356 A | 2/1982 | Scarbrough | 364/900 |
| 4,336,589 A | 6/1982 | Smith et al. | 364/403 |
| 4,341,951 A | 7/1982 | Benton | 235/379 |
| 4,346,442 A | 8/1982 | Musmanno | 364/408 |
| 4,365,634 A | 12/1982 | Bare et al. | 128/640 |
| 4,376,978 A | 3/1983 | Musmanno | 364/408 |
| 4,377,741 A | 3/1983 | Brekka et al. | 235/472 |
| 4,383,298 A | 5/1983 | Huff et al. | 364/300 |
| 4,385,393 A | 5/1983 | Chaure et al. | 375/30 |
| 4,393,584 A | 7/1983 | Bare et al. | 29/877 |
| 4,396,985 A | 8/1983 | Ohara | 364/405 |
| 4,412,287 A | 10/1983 | Braddock, III | 364/408 |
| 4,429,387 A | 1/1984 | Kaminski | |
| 4,435,769 A | 3/1984 | Nagano et al. | 364/464 |
| 4,438,824 A | 3/1984 | Mueller-Schloer | |
| 4,442,494 A | 4/1984 | Fromson et al. | 364/511 |
| 4,445,171 A | 4/1984 | Neches | 364/200 |
| 4,449,186 A | 5/1984 | Kelly et al. | 364/407 |
| 4,452,358 A | 6/1984 | Simpson | 206/434 |
| 4,454,944 A | 6/1984 | Shillington et al. | 206/366 |
| 4,456,957 A | 6/1984 | Schieltz | 364/200 |
| 4,459,663 A | 7/1984 | Dye | 364/200 |
| 4,460,965 A | 7/1984 | Trehn et al. | 364/464 |
| 4,464,718 A | 8/1984 | Dixon et al. | 364/200 |
| 4,464,719 A | 8/1984 | Spellmann | 364/300 |
| 4,471,348 A | 9/1984 | London et al. | 340/722 |
| 4,478,783 A | 10/1984 | Broadwater | 376/211 |
| 4,490,847 A | 12/1984 | Aleksander et al. | 382/10 |
| 4,490,848 A | 12/1984 | Beall et al. | 382/121 |
| 4,491,725 A | 1/1985 | Pritchard | 235/375 |
| 4,491,947 A | 1/1985 | Frank | 370/94 |
| 4,493,105 A | 1/1985 | Beall et al. | 382/21 |
| 4,502,606 A | 3/1985 | Shillington et al. | 215/274 |
| 4,509,123 A | 4/1985 | Vereen | 364/300 |
| 4,516,016 A | 5/1985 | Kodron | 235/472 |
| 4,522,211 A | 6/1985 | Bare et al. | 128/640 |
| 4,530,067 A | 7/1985 | Dorr | 364/900 |
| 4,537,576 A | 8/1985 | Thorsheim et al. | 434/404 |
| 4,542,808 A | 9/1985 | Lloyd, Jr. et al. | 186/56 |
| 4,547,851 A | 10/1985 | Kurland | 364/401 |
| 4,547,858 A | 10/1985 | Horak | 364/513 |
| 4,549,663 A | 10/1985 | Corbett, Jr. et al. | 211/13 |
| 4,550,436 A | 10/1985 | Freeman et al. | 382/34 |
| 4,551,719 A | 11/1985 | Carlin et al. | |
| 4,553,222 A | 11/1985 | Kurland et al. | 364/900 |
| 4,554,077 A | 11/1985 | Brown et al. | 210/656 |
| 4,558,211 A | 12/1985 | Berstein | 235/380 |
| 4,559,600 A | 12/1985 | Rao | 364/474 |
| 4,566,464 A | 1/1986 | Piccone et al. | 128/732 |
| 4,569,421 A | 2/1986 | Sandstedt | 186/39 |
| 4,578,530 A | 3/1986 | Zeidler | |
| 4,578,768 A | 3/1986 | Racine | 364/560 |
| 4,579,053 A | 4/1986 | Beesley et al. | 100/229 A |
| 4,591,983 A | 5/1986 | Bennett et al. | 364/403 |
| 4,598,376 A | 7/1986 | Burton et al. | 364/470 |
| 4,600,112 A | 7/1986 | Shillington et al. | 215/274 |
| 4,605,124 A | 8/1986 | Sandel et al. | 206/223 |
| 4,614,861 A | 9/1986 | Pavlov et al. | 235/380 |
| 4,635,136 A | 1/1987 | Ciampa et al. | 358/342 |
| 4,635,189 A | 1/1987 | Kendall | 364/200 |
| 4,636,622 A | 1/1987 | Clark | 235/380 |
| 4,636,950 A | 1/1987 | Caswell et al. | 364/403 |
| 4,642,296 A | 2/1987 | Hubner | 436/138 |
| 4,642,767 A | 2/1987 | Lerner | 364/406 |
| 4,642,768 A | 2/1987 | Roberts | 364/408 |
| 4,648,037 A | 3/1987 | Valentino | 364/408 |
| 4,651,279 A | 3/1987 | Suzuki | 364/405 |
| 4,654,482 A | 3/1987 | DeAngelis | 379/95 |
| 4,656,591 A | 4/1987 | Goldberg | 364/478 |
| 4,658,245 A | 4/1987 | Dye et al. | 340/683 |
| 4,658,370 A | 4/1987 | Erman et al. | 364/513 |
| 4,667,292 A | 5/1987 | Mohlenbrock et al. | 364/406 |
| 4,667,821 A | 5/1987 | Shillington | 206/366 |
| 4,670,634 A | 6/1987 | Bridges et al. | |
| 4,674,044 A | 6/1987 | Kalmus et al. | 364/408 |
| 4,674,676 A | 6/1987 | Sandel et al. | 229/142 |
| 4,677,552 A | 6/1987 | Sibley, Jr. | 364/408 |
| 4,677,909 A | 7/1987 | Beesley et al. | 100/229 |
| 4,688,178 A | 8/1987 | Connelly et al. | 364/470 |
| 4,694,397 A | 9/1987 | Grant et al. | 364/408 |
| 4,697,243 A | 9/1987 | Moore et al. | 364/513 |
| 4,700,363 A | 10/1987 | Tomlinson et al. | 375/37 |
| 4,702,254 A | 10/1987 | Zabara | 128/421 |
| 4,702,385 A | 10/1987 | Shillington et al. | 220/18 |
| D292,777 S | 11/1987 | Shillington et al. | D9/446 |
| 4,708,142 A | 11/1987 | DeCote, Jr. | 128/419 PT |
| 4,708,144 A | 11/1987 | Hamilton et al. | 128/419 PG |
| 4,711,994 A | 12/1987 | Greenberg | 235/384 |
| 4,712,555 A | 12/1987 | Thornander et al. | 128/419 PG |
| 4,713,815 A | 12/1987 | Bryan et al. | 371/29 |
| 4,717,042 A | 1/1988 | McLaughlin | 221/3 |
| 4,722,055 A | 1/1988 | Roberts | 364/408 |
| 4,723,214 A | 2/1988 | Frei | 364/434 |
| 4,730,252 A | 3/1988 | Bradshaw | 364/403 |
| 4,734,568 A | 3/1988 | Watanabe | 235/487 |
| 4,734,858 A | 3/1988 | Schlafly | 364/408 |
| 4,735,204 A | 4/1988 | Sussman et al. | 128/419 R |
| 4,736,860 A | 4/1988 | Bemis | 220/1 T |
| 4,750,437 A | 6/1988 | Rouse | 110/346 |
| 4,752,877 A | 6/1988 | Roberts et al. | 364/408 |
| 4,754,410 A | 6/1988 | Leech et al. | 364/513 |
| 4,755,940 A | 7/1988 | Brachtl et al. | 364/408 |
| 4,761,748 A | 8/1988 | Le Rat et al. | 364/551 |
| 4,763,277 A | 8/1988 | Ashford et al. | 364/513 |
| 4,773,011 A | 9/1988 | VanHoose | |
| 4,774,663 A | 9/1988 | Musmanno et al. | 364/408 |
| 4,774,952 A | 10/1988 | Smits | 128/419 D |
| 4,775,935 A | 10/1988 | Yourick | 364/401 |
| 4,779,728 A | 10/1988 | Hanifl et al. | 206/366 |
| 4,783,740 A | 11/1988 | Ishizawa et al. | 364/403 |
| 4,785,969 A | 11/1988 | McLaughlin | 221/2 |
| D298,864 S | 12/1988 | Jefferson | D26/140 |
| 4,789,928 A | 12/1988 | Fujisaki | 364/401 |
| 4,795,890 A | 1/1989 | Goldman | 235/380 |
| 4,796,292 A | 1/1989 | Thomas | 379/91 |
| 4,798,676 A | 1/1989 | Matkovich | 210/767 |
| 4,799,156 A | 1/1989 | Shavit et al. | 364/401 |
| 4,802,423 A | 2/1989 | Pennington | 110/233 |
| 4,804,090 A | 2/1989 | Schuh et al. | 206/366 |
| 4,807,177 A | 2/1989 | Ward | 364/900 |
| 4,809,154 A | 2/1989 | Newton | 364/148 |
| 4,809,697 A | 3/1989 | Causey, III et al. | 128/419 PT |
| 4,809,850 A | 3/1989 | Laible et al. | 206/366 |
| 4,812,628 A | 3/1989 | Boston et al. | 235/380 |
| 4,812,990 A | 3/1989 | Adams et al. | 364/444 |
| 4,812,994 A | 3/1989 | Taylor et al. | |
| 4,817,605 A | 4/1989 | Sholder | 128/419 PT |

| | | | | | | |
|---|---|---|---|---|---|---|
| 4,821,118 A | 4/1989 | Lafreniere ............ 358/108 | | 5,005,532 A | 4/1991 | Shillington ............ 123/52 M |
| 4,821,120 A | 4/1989 | Tomlinson ............ 358/142 | | 5,005,793 A | 4/1991 | Shillington ............ 248/229 |
| 4,823,264 A | 4/1989 | Deming ............ 364/408 | | 5,006,983 A | 4/1991 | Wayne et al. ............ 364/401 |
| 4,823,265 A | 4/1989 | Nelson ............ 364/408 | | 5,006,998 A | 4/1991 | Yasunobu et al. ............ 364/513 |
| 4,823,306 A | 4/1989 | Barbic et al. ............ 364/900 | | 5,008,853 A | 4/1991 | Bly et al. ............ 364/900 |
| 4,826,333 A | 5/1989 | Tanaka ............ 400/76 | | 5,009,833 A | 4/1991 | Takeuchi et al. ............ 376/217 |
| 4,827,508 A | 5/1989 | Shear ............ 380/4 | | 5,014,875 A | 5/1991 | McLaughlin et al. ............ 221/2 |
| 4,829,297 A | 5/1989 | Ilg et al. | | 5,022,548 A | 6/1991 | Stakis |
| 4,831,526 A | 5/1989 | Luchs et al. ............ 364/401 | | 5,023,910 A | 6/1991 | Thomson ............ 381/37 |
| 4,837,693 A | 6/1989 | Schotz ............ 364/408 | | 5,024,326 A | 6/1991 | Sandel et al. ............ 206/366 |
| 4,839,804 A | 6/1989 | Roberts et al. ............ 364/408 | | 5,024,327 A | 6/1991 | Shillington ............ 206/366 |
| 4,839,822 A | 6/1989 | Dormond et al. ............ 364/513 | | 5,025,373 A | 6/1991 | Keyser, Jr. et al. ............ 364/408 |
| 4,839,829 A | 6/1989 | Freedman ............ 364/519 | | 5,025,807 A | 6/1991 | Zabara ............ 128/421 |
| 4,842,138 A | 6/1989 | Sandel et al. ............ 206/370 | | D318,159 S | 7/1991 | Noack ............ D34/5 |
| 4,843,546 A | 6/1989 | Yoshida et al. ............ 364/403 | | 5,032,989 A | 7/1991 | Tornetta ............ 364/401 |
| 4,844,252 A | 7/1989 | Barron et al. ............ 206/223 | | 5,033,004 A | 7/1991 | Vandivier, III ............ 364/468 |
| 4,851,988 A | 7/1989 | Trottier et al. ............ 364/200 | | 5,035,858 A | 7/1991 | Held et al. ............ 422/21 |
| 4,852,794 A | 8/1989 | Bennett et al. ............ 229/73 | | 5,036,866 A | 8/1991 | Eldrige, Jr. et al. ............ 128/849 |
| 4,853,208 A | 8/1989 | Reimers et al. ............ 423/659 | | 5,038,283 A | 8/1991 | Caveney ............ 364/403 |
| 4,860,317 A | 8/1989 | Tomlinson ............ 375/58 | | 5,040,534 A | 8/1991 | Mann et al. ............ 128/419 PG |
| 4,862,376 A | 8/1989 | Ferriter et al. ............ 364/468 | | 5,043,891 A | 8/1991 | Goldstein et al. ............ 364/419 |
| 4,864,507 A | 9/1989 | Ebling et al. ............ 364/468 | | 5,046,002 A | 9/1991 | Takashi et al. ............ 364/200 |
| 4,866,635 A | 9/1989 | Kahn et al. ............ 364/513 | | 5,046,614 A | 9/1991 | Torres et al. ............ 206/366 |
| 4,867,164 A | 9/1989 | Zabara ............ 128/421 | | 5,048,766 A | 9/1991 | Gaylor et al. ............ 241/65 |
| 4,876,648 A | 10/1989 | Lloyd ............ 364/408 | | 5,050,031 A | 9/1991 | Weiley ............ 360/137 |
| 4,886,164 A | 12/1989 | Stein et al. ............ 206/366 | | 5,050,075 A | 9/1991 | Herman et al. ............ 364/200 |
| 4,887,206 A | 12/1989 | Natarajan ............ 364/401 | | 5,053,607 A | 10/1991 | Carlson et al. ............ 235/379 |
| 4,887,208 A | 12/1989 | Schneider et al. ............ 364/403 | | 5,058,033 A | 10/1991 | Bonissone et al. ............ 364/513 |
| 4,897,781 A | 1/1990 | Chang et al. ............ 364/200 | | 5,058,764 A | 10/1991 | Gaba ............ 220/481 |
| 4,897,867 A | 1/1990 | Foster et al. ............ 379/94 | | 5,060,153 A | 10/1991 | Nakagawa ............ 364/405 |
| 4,901,249 A | 2/1990 | Shiota ............ 364/519 | | 5,063,506 A | 11/1991 | Brockwell et al. ............ 364/402 |
| 4,903,201 A | 2/1990 | Wagner ............ 364/408 | | 5,064,124 A | 11/1991 | Chang ............ 241/33 |
| 4,912,671 A | 3/1990 | Ishida ............ 364/900 | | 5,072,832 A | 12/1991 | Valentine et al. ............ 206/570 |
| 4,916,611 A | 4/1990 | Doyle, Jr. et al. ............ 364/200 | | 5,076,429 A | 12/1991 | Patrick et al. ............ 206/370 |
| 4,919,086 A | 4/1990 | Shillington ............ 123/52 MC | | 5,077,607 A | 12/1991 | Johnson et al. ............ 358/86 |
| 4,920,488 A | 4/1990 | Filley ............ 364/403 | | 5,077,665 A | 12/1991 | Silverman et al. ............ 364/408 |
| 4,922,521 A | 5/1990 | Krikke et al. ............ 379/95 | | 5,080,251 A | 1/1992 | Noack ............ 220/335 |
| 4,925,048 A | 5/1990 | Noack ............ 220/70 | | 5,085,338 A | 2/1992 | Inagaki ............ 220/254 |
| 4,935,870 A | 6/1990 | Burk, Jr. et al. ............ 364/200 | | 5,092,480 A | 3/1992 | Waterston ............ 220/234 |
| 4,937,743 A | 6/1990 | Rassman et al. ............ 364/401 | | 5,097,950 A | 3/1992 | Weiss et al. ............ 206/366 |
| 4,937,763 A | 6/1990 | Mott ............ 364/550 | | 5,101,352 A | 3/1992 | Rembert ............ 364/401 |
| 4,939,689 A | 7/1990 | Davis et al. ............ 364/900 | | 5,101,353 A | 3/1992 | Lupien et al. ............ 364/408 |
| 4,940,157 A | 7/1990 | Inagaki ............ 220/254 | | 5,101,424 A | 3/1992 | Clayton et al. ............ 379/10 |
| 4,941,178 A | 7/1990 | Chuang ............ 381/41 | | 5,101,476 A | 3/1992 | Kukla ............ 395/200 |
| 4,944,299 A | 7/1990 | Silvian ............ 128/419 PG | | 5,103,079 A | 4/1992 | Barakai et al. ............ 235/380 |
| 4,945,476 A | 7/1990 | Bodick et al. | | 5,103,820 A | 4/1992 | Markowitz |
| 4,947,028 A | 8/1990 | Gorog ............ 235/381 | | 5,103,822 A | 4/1992 | Duncan ............ 128/419 PG |
| 4,949,248 A | 8/1990 | Caro ............ 364/200 | | 5,103,997 A | 4/1992 | Shillington et al. ............ 220/481 |
| 4,950,105 A | 8/1990 | Meess et al. ............ 405/128 | | 5,104,047 A | 4/1992 | Simmons ............ 241/20 |
| 4,951,196 A | 8/1990 | Jackson ............ 364/401 | | 5,106,594 A | 4/1992 | Held et al. ............ 422/292 |
| 4,953,085 A | 8/1990 | Atkins ............ 364/408 | | 5,107,497 A | 4/1992 | Lirov et al. ............ 371/151 |
| 4,953,159 A | 8/1990 | Hayden et al. ............ 370/62 | | 5,107,990 A | 4/1992 | Wicherski et al. ............ 206/366 |
| 4,953,745 A | 9/1990 | Rowlett, Jr. ............ 221/5 | | 5,109,337 A | 4/1992 | Ferriter et al. ............ 364/401 |
| 4,958,280 A | 9/1990 | Pauly et al. ............ 364/403 | | 5,109,515 A | 4/1992 | Laggis et al. ............ 395/725 |
| 4,958,292 A | 9/1990 | Kaneko et al. ............ 364/468 | | 5,109,519 A | 4/1992 | Zimmet et al. ............ 395/800 |
| 4,961,148 A | 10/1990 | Holda et al. ............ 364/468 | | 5,117,354 A | 5/1992 | Long et al. ............ 364/401 |
| 4,964,043 A | 10/1990 | Galvin ............ 364/401 | | 5,117,355 A | 5/1992 | McCarthy ............ 364/405 |
| 4,964,125 A | 10/1990 | Kim ............ 371/151 | | 5,119,318 A | 6/1992 | Paradies et al. ............ 395/61 |
| 4,969,094 A | 11/1990 | Halley et al. ............ 364/408 | | 5,122,950 A | 6/1992 | Benton et al. ............ 364/408 |
| 4,972,318 A | 11/1990 | Brown et al. ............ 364/403 | | 5,122,952 A | 6/1992 | Minkus ............ 364/419 |
| 4,972,453 A | 11/1990 | Daniel, III et al. ............ 379/10 | | 5,124,125 A | 6/1992 | Brent ............ 422/21 |
| 4,972,504 A | 11/1990 | Daniel, Jr. et al. ............ 455/2 | | 5,124,909 A | 6/1992 | Blakely et al. ............ 395/200 |
| 4,972,950 A | 11/1990 | Shillington ............ 206/366 | | 5,124,911 A | 6/1992 | Sack ............ 364/401 |
| 4,975,840 A | 12/1990 | DeTore et al. ............ 364/401 | | 5,125,995 A | 6/1992 | D'Haese et al. ............ 156/155 |
| 4,975,968 A | 12/1990 | Yukl ............ 382/1 | | 5,127,005 A | 6/1992 | Oda et al. ............ 371/151 |
| 4,977,595 A | 12/1990 | Ohta et al. ............ 380/24 | | 5,128,861 A | 7/1992 | Kagami et al. ............ 364/403 |
| D313,670 S | 1/1991 | Barron et al. ............ D26/113 | | 5,132,968 A | 7/1992 | Cephus ............ 370/941 |
| 4,982,072 A | 1/1991 | Takigami ............ 235/384 | | 5,136,501 A | 8/1992 | Silverman et al. ............ 364/408 |
| 4,982,346 A | 1/1991 | Girouard et al. ............ 364/550 | | 5,136,502 A | 8/1992 | Van Remortel et al. |
| 4,984,155 A | 1/1991 | Geier et al. ............ 364/401 | | 5,136,686 A | 8/1992 | Koza ............ 395/13 |
| 4,984,686 A | 1/1991 | Shillington ............ 206/366 | | 5,138,569 A | 8/1992 | Valenzuela |
| 4,985,857 A | 1/1991 | Bajpai et al. ............ 702/184 | | 5,140,692 A | 8/1992 | Morita ............ 395/600 |
| 4,987,538 A | 1/1991 | Johnson et al. ............ 705/2 | | 5,144,556 A | 9/1992 | Wang et al. ............ 364/419 |
| 4,989,602 A | 2/1991 | Sholder et al. ............ 128/419 D | | 5,145,063 A | 9/1992 | Lee ............ 206/364 |
| 4,992,939 A | 2/1991 | Tyler ............ 364/401 | | 5,146,562 A | 9/1992 | Kukla ............ 395/200 |
| 4,992,940 A | 2/1991 | Dworkin ............ 364/401 | | 5,148,365 A | 9/1992 | Dembo ............ 364/402 |
| 4,995,081 A | 2/1991 | Leighton et al. ............ 380/23 | | 5,148,366 A | 9/1992 | Buchanan et al. ............ 364/419 |
| 4,998,753 A | 3/1991 | Wichael ............ 283/82 | | 5,148,368 A | 9/1992 | Okubo |
| 4,998,975 A | 3/1991 | Cohen et al. ............ 128/419 D | | 5,152,751 A | 10/1992 | Kozlowski ............ 604/192 |

| | | | | | | | |
|---|---|---|---|---|---|---|---|
| 5,154,345 | A | 10/1992 | Shillington ............ 232/44 | 5,257,186 | A | 10/1993 | Ukita et al. |
| 5,159,315 | A | 10/1992 | Schultz et al. ........ 340/539 | 5,257,577 | A | 11/1993 | Clark ............ 100/99 |
| 5,159,685 | A | 10/1992 | Kung ............ 395/575 | 5,263,156 | A | 11/1993 | Bowen et al. ........ 395/600 |
| 5,159,687 | A | 10/1992 | Richburg ............ 395/700 | 5,265,006 | A | 11/1993 | Asthana et al. ........ 364/401 |
| 5,161,211 | A | 11/1992 | Taguchi et al. ........ 395/10 | 5,265,008 | A | 11/1993 | Benton et al. ........ 364/408 |
| 5,161,929 | A | 11/1992 | Lichti, Sr. ........ 414/331 | 5,265,010 | A | 11/1993 | Evans-Paganelli et al. |
| 5,163,000 | A | 11/1992 | Rogers et al. | 5,265,065 | A | 11/1993 | Turtle ............ 395/600 |
| 5,163,131 | A | 11/1992 | Row et al. ............ 395/200 | 5,265,724 | A | 11/1993 | Dondlinger ........ 206/366 |
| 5,164,897 | A | 11/1992 | Clark et al. ........ 364/401 | 5,270,922 | A | 12/1993 | Higgins ............ 364/408 |
| 5,167,193 | A | 12/1992 | Withers et al. ........ 110/346 | 5,271,892 | A | 12/1993 | Hanson et al. ........ 422/25 |
| 5,168,444 | A | 12/1992 | Cukor et al. ........ 364/401 | 5,273,392 | A | 12/1993 | Bernard, II et al. ........ 414/786 |
| 5,168,445 | A | 12/1992 | Kawashima et al. ........ 364/403 | 5,274,572 | A | 12/1993 | O'Neill et al. ........ 364/550 |
| 5,172,313 | A | 12/1992 | Schumacher ........ 364/401 | 5,274,749 | A | 12/1993 | Evans ............ 395/63 |
| 5,175,682 | A | 12/1992 | Higashiyama et al. ........ 364/408 | 5,276,253 | A | 1/1994 | Circeo, Jr. et al. ........ 588/253 |
| D332,680 | S | 1/1993 | Ramirez ............ D34/7 | 5,277,869 | A | 1/1994 | Glazer et al. ........ 422/26 |
| 5,177,342 | A | 1/1993 | Adams ............ 235/379 | 5,278,751 | A | 1/1994 | Adiano et al. ........ 364/402 |
| 5,177,680 | A | 1/1993 | Tsukino et al. ........ 364/401 | 5,281,391 | A | 1/1994 | Hanson et al. ........ 422/25 |
| 5,177,684 | A | 1/1993 | Harker et al. ........ 364/436 | 5,281,816 | A | 1/1994 | Jacobson et al. ........ 250/339 |
| 5,178,322 | A | 1/1993 | Shillington ............ 232/44 | 5,282,265 | A | 1/1994 | Rohra Suda et al. ........ 395/12 |
| 5,179,626 | A | 1/1993 | Thomson ............ 395/2 | 5,283,731 | A | 2/1994 | Lalonde et al. ........ 364/401 |
| 5,182,709 | A | 1/1993 | Makus ............ 364/419 | 5,283,865 | A | 2/1994 | Johnson ............ 395/161 |
| 5,182,793 | A | 1/1993 | Alexander et al. ........ 395/13 | 5,285,383 | A | 2/1994 | Lindsey et al. ........ 364/408 |
| 5,184,502 | A | 2/1993 | Adams et al. | 5,289,371 | A | 2/1994 | Abel et al. ........ 364/401 |
| 5,184,720 | A | 2/1993 | Packer et al. ........ 206/366 | 5,289,787 | A | 3/1994 | Eshleman ............ 110/235 |
| 5,189,606 | A | 2/1993 | Burns et al. ........ 364/401 | 5,291,395 | A | 3/1994 | Abecassis ............ 364/401 |
| D334,449 | S | 3/1993 | Gaba et al. ............ D34/6 | 5,291,396 | A | 3/1994 | Calcerano et al. ........ 364/401 |
| 5,191,410 | A | 3/1993 | McCalley et al. ........ 358/86 | 5,291,398 | A | 3/1994 | Hagan ............ 364/408 |
| 5,191,522 | A | 3/1993 | Bosco et al. ........ 364/401 | 5,291,560 | A | 3/1994 | Daugman ............ 382/2 |
| 5,193,065 | A | 3/1993 | Guerindon et al. ........ 364/468 | 5,293,309 | A | 3/1994 | Sakai et al. ........ 364/401 |
| 5,195,030 | A | 3/1993 | White ............ 364/401 | 5,295,582 | A | 3/1994 | Dan ............ 209/3 |
| 5,195,635 | A | 3/1993 | Cornwell ............ 206/366 | 5,297,031 | A | 3/1994 | Gutterman et al. ........ 364/408 |
| D334,973 | S | 4/1993 | Valentine et al. ........ D24/227 | 5,297,032 | A | 3/1994 | Trojan et al. ........ 364/408 |
| 5,202,825 | A | 4/1993 | Miller et al. ........ 364/405 | 5,297,042 | A | 3/1994 | Morita |
| 5,202,827 | A | 4/1993 | Sober ............ 364/401 | 5,299,305 | A | 3/1994 | Oomae et al. ........ 395/149 |
| 5,202,930 | A | 4/1993 | Livshitz et al. ........ 382/3 | D346,398 | S | 4/1994 | Flanagan ............ D19/26 |
| 5,204,821 | A | 4/1993 | Inui et al. ........ 364/468 | 5,304,206 | A | 4/1994 | Baker, Jr. et al. ........ 607/2 |
| 5,206,803 | A | 4/1993 | Vitagliano et al. ........ 364/408 | 5,305,195 | A | 4/1994 | Murphy ............ 364/401 |
| 5,206,804 | A | 4/1993 | Thies et al. ........ 364/401 | 5,305,197 | A | 4/1994 | Axler et al. ........ 364/401 |
| 5,208,665 | A | 5/1993 | McCalley et al. ........ 358/86 | 5,307,260 | A | 4/1994 | Watanabe et al. ........ 364/401 |
| 5,211,424 | A | 5/1993 | Bliss ............ 281/151 | 5,309,355 | A | 5/1994 | Lockwood ............ 364/401 |
| 5,213,758 | A | 5/1993 | Kawashima et al. ........ 422/21 | 5,310,997 | A | 5/1994 | Roach et al. ........ 235/375 |
| 5,216,593 | A | 6/1993 | Dietrich et al. ........ 364/402 | 5,310,999 | A | 5/1994 | Claus et al. ........ 235/384 |
| 5,216,594 | A | 6/1993 | White et al. ........ 364/403 | 5,311,123 | A | 5/1994 | Webster et al. ........ 324/161 |
| 5,220,501 | A | 6/1993 | Lawlor et al. ........ 364/408 | 5,311,438 | A | 5/1994 | Sellers et al. ........ 364/468 |
| 5,222,211 | A | 6/1993 | Mueller et al. ........ 395/161 | 5,311,594 | A | 5/1994 | Penzias ............ 380/23 |
| 5,223,207 | A | 6/1993 | Gross et al. ........ 376/216 | 5,311,876 | A | 5/1994 | Olsen et al. ........ 128/731 |
| 5,224,034 | A | 6/1993 | Katz et al. ........ 364/401 | 5,312,429 | A | 5/1994 | Noack ............ 606/167 |
| 5,224,206 | A | 6/1993 | Simoudis ............ 395/77 | 5,315,303 | A | 5/1994 | Tsou et al. ........ 342/27 |
| 5,226,065 | A | 7/1993 | Held et al. ........ 378/64 | 5,315,634 | A | 5/1994 | Tanaka et al. ........ 379/57 |
| 5,226,165 | A | 7/1993 | Martin ............ 395/600 | 5,317,503 | A | 5/1994 | Inoue ............ 364/400 |
| 5,230,073 | A | 7/1993 | Gausmann et al. ........ 395/600 | 5,317,646 | A | 5/1994 | Sang, Jr. et al. ........ 382/9 |
| 5,230,496 | A | 7/1993 | Shillington et al. | 5,317,677 | A | 5/1994 | Dolan et al. ........ 395/77 |
| 5,231,566 | A | 7/1993 | Blutinger et al. ........ 364/401 | 5,319,542 | A | 6/1994 | King, Jr. et al. ........ 364/401 |
| 5,231,569 | A | 7/1993 | Myatt et al. ........ 364/408 | 5,319,544 | A | 6/1994 | Schmerer et al. ........ 364/403 |
| 5,231,571 | A | 7/1993 | D'Agostino ............ 364/408 | 5,319,739 | A | 6/1994 | Yoshiura et al. ........ 395/51 |
| 5,231,938 | A | 8/1993 | Gore ............ 110/346 | 5,319,776 | A | 6/1994 | Hile et al. ........ 395/575 |
| 5,235,633 | A | 8/1993 | Dennison et al. ........ 379/60 | 5,321,605 | A | 6/1994 | Chapman et al. ........ 364/402 |
| 5,235,680 | A | 8/1993 | Bijnagte ............ 395/161 | 5,321,751 | A | 6/1994 | Ray et al. ........ 380/23 |
| 5,236,135 | A | 8/1993 | Wilson et al. ........ 241/21 | 5,321,841 | A | 6/1994 | East et al. ........ 395/725 |
| 5,237,496 | A | 8/1993 | Kagami et al. ........ 364/401 | 5,322,603 | A | 6/1994 | Kameda et al. |
| 5,237,497 | A | 8/1993 | Sitarski ............ 364/402 | 5,323,315 | A | 6/1994 | Highbloom ............ 364/408 |
| 5,237,498 | A | 8/1993 | Tenma et al. ........ 364/406 | 5,323,716 | A | 6/1994 | Eshleman ............ 110/255 |
| 5,237,499 | A | 8/1993 | Garback ............ 364/407 | 5,323,994 | A | 6/1994 | Shillington et al. ........ 248/229 |
| 5,239,617 | A | 8/1993 | Gardner et al. ........ 395/12 | 5,325,465 | A | 6/1994 | Hung et al. ........ 395/63 |
| 5,240,108 | A | 8/1993 | Tonna ............ 206/366 | 5,325,484 | A | 6/1994 | Motoyama ............ 395/162 |
| 5,241,464 | A | 8/1993 | Greulich et al. ........ 364/401 | D349,058 | S | 7/1994 | Farce ............ D9/523 |
| 5,241,671 | A | 8/1993 | Reed et al. ........ 395/600 | 5,326,959 | A | 7/1994 | Perazza ............ 235/379 |
| 5,243,655 | A | 9/1993 | Wang ............ 380/51 | 5,327,521 | A | 7/1994 | Savic et al. ........ 395/281 |
| 5,245,535 | A | 9/1993 | Weiss et al. ........ 364/407 | 5,330,448 | A | 7/1994 | Chu ............ 604/280 |
| 5,247,575 | A | 9/1993 | Sprague et al. ........ 380/9 | 5,330,504 | A | 7/1994 | Somerville et al. ........ 607/5 |
| 5,249,120 | A | 9/1993 | Foley ............ 364/401 | 5,331,543 | A | 7/1994 | Yajima et al. ........ 364/401 |
| 5,249,680 | A | 10/1993 | Shillington ............ 206/366 | 5,331,546 | A | 7/1994 | Webber et al. ........ 364/407 |
| 5,251,144 | A | 10/1993 | Ramamurthi ........ 364/474.19 | 5,333,237 | A | 7/1994 | Stefanopoulos et al. ........ 395/12 |
| 5,253,164 | A | 10/1993 | Holloway et al. ........ 364/406 | 5,334,822 | A | 8/1994 | Sanford ............ 235/385 |
| 5,253,165 | A | 10/1993 | Leiseca et al. ........ 364/407 | 5,336,870 | A | 8/1994 | Hughes et al. ........ 235/379 |
| 5,253,166 | A | 10/1993 | Dettelbach et al. ........ 364/407 | 5,338,144 | A | 8/1994 | Eshleman ............ 414/152 |
| 5,255,184 | A | 10/1993 | Hornick et al. ........ 364/407 | 5,339,252 | A | 8/1994 | White et al. ........ 364/468 |
| 5,255,207 | A | 10/1993 | Cornwell ............ 364/512 | 5,339,411 | A | 8/1994 | Heaton, Jr. ........ 395/600 |
| 5,256,861 | A | 10/1993 | Anthony ............ 219/494 | 5,339,955 | A | 8/1994 | Horan et al. ........ 206/370 |

| Patent No. | Kind | Date | Inventor | Class |
|---|---|---|---|---|
| 5,341,429 | A | 8/1994 | Stringer et al. | 380/23 |
| 5,346,297 | A | 9/1994 | Colson, Jr. et al. | 312/215 |
| 5,347,632 | A | 9/1994 | Filepp et al. | 395/200 |
| 5,350,562 | A | 9/1994 | Anthony | 422/1 |
| 5,351,186 | A | 9/1994 | Bullock et al. | 364/401 |
| 5,351,293 | A | 9/1994 | Michener et al. | 380/21 |
| D351,906 | S | 10/1994 | Marsh | D24/131 |
| 5,353,719 | A | 10/1994 | Eshleman et al. | 110/188 |
| 5,354,000 | A | 10/1994 | Wright et al. | 241/33 |
| 5,355,474 | A | 10/1994 | Thuraisngham et al. | 395/600 |
| 5,357,439 | A | 10/1994 | Matsuzaki et al. | 364/468 |
| 5,361,199 | A | 11/1994 | Shoquist et al. | 364/401 |
| 5,361,201 | A | 11/1994 | Jost et al. | 364/401 |
| 5,361,709 | A | 11/1994 | Eshleman | 110/255 |
| 5,363,093 | A | 11/1994 | Williams et al. | 340/605 |
| 5,363,958 | A | 11/1994 | Horan | 206/356 |
| 5,367,452 | A | 11/1994 | Gallery et al. | 364/401 |
| 5,367,627 | A | 11/1994 | Johnson | 395/161 |
| 5,367,664 | A | 11/1994 | Magill et al. | 395/575 |
| 5,369,570 | A | 11/1994 | Parad | 364/401 |
| 5,372,725 | A | 12/1994 | Halff et al. | 210/761 |
| 5,377,098 | A | 12/1994 | Sakai | 364/406 |
| 5,377,116 | A | 12/1994 | Wayne et al. | |
| 5,377,269 | A | 12/1994 | Heptig et al. | 380/25 |
| 5,377,323 | A | 12/1994 | Vasudevan | 395/200 |
| 5,381,140 | A | 1/1995 | Kuroda et al. | 340/961 |
| 5,383,111 | A | 1/1995 | Homma et al. | 364/401 |
| 5,383,113 | A | 1/1995 | Kight et al. | 364/401 |
| 5,384,092 | A | 1/1995 | Sawhill et al. | 422/32 |
| 5,384,892 | A | 1/1995 | Strong | 395/252 |
| 5,385,105 | A | 1/1995 | Withers, Jr. et al. | 110/346 |
| 5,386,103 | A | 1/1995 | DeBan et al. | 235/379 |
| 5,386,104 | A | 1/1995 | Sime | 235/379 |
| 5,388,259 | A | 2/1995 | Fleischman et al. | 395/600 |
| 5,388,535 | A | 2/1995 | Eshleman | 110/255 |
| 5,389,084 | A | 2/1995 | Horan et al. | 604/192 |
| 5,390,262 | A | 2/1995 | Pope | 382/41 |
| 5,392,320 | A | 2/1995 | Chao | 376/215 |
| 5,392,951 | A | 2/1995 | Gardner et al. | 221/2 |
| 5,395,008 | A | 3/1995 | Bemis et al. | 220/481 |
| 5,395,338 | A | 3/1995 | Gaba | 604/110 |
| 5,395,393 | A | 3/1995 | Wickham | 607/5 |
| 5,396,253 | A | 3/1995 | Chia | 342/104 |
| 5,396,416 | A | 3/1995 | Berkowitz et al. | 364/165 |
| 5,397,068 | A | 3/1995 | Solomons et al. | 241/100 |
| 5,397,535 | A | 3/1995 | Kaneko | 422/22 |
| 5,401,444 | A | 3/1995 | Spinello | 264/5 |
| 5,401,944 | A | 3/1995 | Bravman et al. | 235/375 |
| 5,402,336 | A | 3/1995 | Spiegelhoff et al. | 364/401 |
| 5,402,521 | A | 3/1995 | Niida et al. | 395/22 |
| 5,402,524 | A | 3/1995 | Bauman et al. | 395/50 |
| 5,402,887 | A | 3/1995 | Shillington | 206/366 |
| 5,404,292 | A | 4/1995 | Hendrickson | |
| 5,405,048 | A | 4/1995 | Rogers et al. | 221/211 |
| 5,406,265 | A | 4/1995 | Trozzo et al. | 340/632 |
| 5,410,492 | A | 4/1995 | Gross et al. | 364/492 |
| D358,326 | S | 5/1995 | Tomasello | D9/424 |
| D358,327 | S | 5/1995 | Tomasello | D9/424 |
| D358,527 | S | 5/1995 | Danielson et al. | D7/332 |
| 5,412,190 | A | 5/1995 | Josephson et al. | 235/379 |
| 5,412,804 | A | 5/1995 | Krishna | 395/600 |
| 5,413,243 | A | 5/1995 | Bemis et al. | 220/481 |
| 5,414,833 | A | 5/1995 | Hershey et al. | 395/575 |
| 5,415,180 | A | 5/1995 | Horan | 128/846 |
| 5,415,315 | A | 5/1995 | Ramirez | 220/346 |
| 5,417,659 | A | 5/1995 | Gaba | 604/110 |
| 5,418,951 | A | 5/1995 | Damashek | 395/600 |
| 5,419,435 | A | 5/1995 | Perzan et al. | 206/366 |
| 5,421,672 | A | 6/1995 | Ankeny et al. | 405/128 |
| 5,423,033 | A | 6/1995 | Yuen | 395/600 |
| 5,423,450 | A | 6/1995 | Shillington et al. | 220/481 |
| 5,423,492 | A | 6/1995 | Willis | 241/81 |
| 5,424,947 | A | 6/1995 | Nagao et al. | |
| 5,425,458 | A | 6/1995 | Gilcreest et al. | 209/655 |
| 5,427,238 | A | 6/1995 | Weiss | 206/366 |
| 5,427,737 | A | 6/1995 | Glazer et al. | 422/26 |
| 5,429,506 | A | 7/1995 | Brophy et al. | 434/107 |
| 5,430,644 | A | 7/1995 | Deaton et al. | 364/401 |
| 5,432,822 | A | 7/1995 | Kaewell, Jr. | 375/340 |
| 5,432,904 | A | 7/1995 | Wong | 395/161 |
| 5,433,412 | A | 7/1995 | Watt et al. | 206/370 |
| 5,434,394 | A | 7/1995 | Roach et al. | 235/375 |
| 5,440,731 | A | 8/1995 | Nagashima et al. | 395/600 |
| 5,441,622 | A | 8/1995 | Langford | 204/275 |
| 5,442,771 | A | 8/1995 | Filepp et al. | 395/650 |
| 5,444,844 | A | 8/1995 | Inoue et al. | 395/161 |
| 5,445,294 | A | 8/1995 | Gardner et al. | 221/1 |
| 5,446,885 | A | 8/1995 | Moore et al. | 395/600 |
| H1477 | H | 9/1995 | Payne | 405/128 |
| 5,449,068 | A | 9/1995 | Gharibian | 206/355 |
| 5,451,998 | A | 9/1995 | Hamrick | 348/13 |
| 5,453,601 | A | 9/1995 | Rosen | 235/379 |
| 5,453,933 | A | 9/1995 | Wright et al. | |
| 5,455,406 | A | 10/1995 | Terashima et al. | 235/379 |
| 5,455,407 | A | 10/1995 | Rosen | 235/380 |
| 5,455,903 | A | 10/1995 | Jolissaint et al. | 395/155 |
| 5,457,792 | A | 10/1995 | Virgil et al. | 395/600 |
| 5,459,304 | A | 10/1995 | Eisenmann | 235/380 |
| 5,459,675 | A | 10/1995 | Gross et al. | 364/492 |
| 5,460,294 | A | 10/1995 | Williams | 221/2 |
| 5,465,206 | A | 11/1995 | Hilt et al. | 364/406 |
| 5,465,291 | A | 11/1995 | Barrus et al. | 379/67 |
| 5,465,321 | A | 11/1995 | Smyth | 395/22 |
| 5,465,353 | A | 11/1995 | Hull et al. | 395/600 |
| 5,465,461 | A | 11/1995 | Sandel | 16/111 R |
| 5,465,841 | A | 11/1995 | Wilson et al. | 206/366 |
| 5,467,270 | A | 11/1995 | Matsumoto | 364/403 |
| 5,469,498 | A | 11/1995 | Abe et al. | 379/127 |
| 5,469,600 | A | 11/1995 | Sandel | 16/111 R |
| 5,470,022 | A | 11/1995 | Wright et al. | 241/33 |
| 5,470,342 | A | 11/1995 | Mann et al. | 607/5 |
| 5,471,575 | A | 11/1995 | Giansante | 395/144 |
| 5,471,705 | A | 12/1995 | Dao | |
| 5,472,167 | A | 12/1995 | Shillington et al. | 248/552 |
| 5,474,181 | A | 12/1995 | Shillington et al. | 206/370 |
| 5,475,585 | A | 12/1995 | Bush | 364/401 |
| 5,476,634 | A | 12/1995 | Bridges et al. | 422/22 |
| 5,477,465 | A | 12/1995 | Zheng | 364/485 |
| 5,479,344 | A | 12/1995 | Keziah, Jr. | 364/40 B |
| 5,480,062 | A | 1/1996 | Rogers et al. | 221/174 |
| 5,481,647 | A | 1/1996 | Brody et al. | 395/51 |
| 5,483,445 | A | 1/1996 | Pickering | 364/406 |
| 5,483,637 | A | 1/1996 | Winokur et al. | |
| 5,484,988 | A | 1/1996 | Hills et al. | 235/379 |
| 5,485,369 | A | 1/1996 | Nicholls et al. | 364/401 |
| 5,486,410 | A | 1/1996 | Groeger et al. | 428/283 |
| 5,488,725 | A | 1/1996 | Turtle et al. | 395/600 |
| 5,490,217 | A | 2/1996 | Wang et al. | 380/51 |
| 5,493,490 | A | 2/1996 | Johnson | 364/401 |
| 5,493,491 | A | 2/1996 | Calcerano et al. | 364/403 |
| 5,493,689 | A | 2/1996 | Waclawsky et al. | 395/821 |
| 5,493,757 | A | 2/1996 | Horan et al. | 16/114 R |
| 5,494,186 | A | 2/1996 | Marsh | 220/481 |
| 5,495,610 | A | 2/1996 | Shing et al. | 395/600 |
| 5,495,941 | A | 3/1996 | Leonard | 206/366 |
| 5,496,991 | A | 3/1996 | Delfer, III et al. | 235/379 |
| 5,497,488 | A | 3/1996 | Akizawa et al. | 395/600 |
| 5,498,002 | A | 3/1996 | Gechter | 273/434 |
| 5,498,003 | A | 3/1996 | Gechter | 273/434 |
| 5,500,513 | A | 3/1996 | Langhans et al. | 235/380 |
| 5,500,793 | A | 3/1996 | Deming, Jr. et al. | 364/401 |
| 5,502,576 | A | 3/1996 | Ramsay et al. | 358/444 |
| 5,502,636 | A | 3/1996 | Clarke | 364/401 |
| 5,502,764 | A | 3/1996 | Naccache | 380/23 |
| 5,504,321 | A | 4/1996 | Sheldon | 235/492 |
| 5,504,674 | A | 4/1996 | Chen et al. | 364/401 |
| 5,504,675 | A | 4/1996 | Cragun et al. | 364/401 |
| 5,504,893 | A | 4/1996 | Kawashima et al. | 395/600 |
| 5,506,794 | A | 4/1996 | Lange | |
| 5,507,408 | A | 4/1996 | Mosior et al. | 220/346 |
| 5,508,004 | A | 4/1996 | Held et al. | 422/22 |
| 5,508,706 | A | 4/1996 | Tsou et al. | 342/192 |
| 5,508,912 | A | 4/1996 | Schneiderman | 364/401 |
| 5,509,083 | A | 4/1996 | Abtahi et al. | 382/124 |
| 5,511,908 | A | 4/1996 | Van Valkenburgh et al. | 405/128 |
| 5,512,901 | A | 4/1996 | Chen et al. | 342/175 |
| 5,513,343 | A | 4/1996 | Sakano et al. | |
| 5,515,268 | A | 5/1996 | Yoda | 364/401 |

| Patent No. | Kind | Date | Name | Class |
|---|---|---|---|---|
| 5,515,477 | A | 5/1996 | Sutherland | 395/27 |
| 5,517,406 | A | 5/1996 | Harris et al. | 364/408 |
| 5,517,596 | A | 5/1996 | Pechanek et al. | 395/23 |
| 5,519,931 | A | 5/1996 | Reich | |
| 5,520,282 | A | 5/1996 | Williams, Jr. | 206/370 |
| 5,520,450 | A | 5/1996 | Colson, Jr. et al. | 312/215 |
| 5,523,052 | A | 6/1996 | Bridges et al. | 422/22 |
| 5,523,942 | A | 6/1996 | Tyler et al. | 364/401 |
| 5,525,136 | A | 6/1996 | Rosen | 55/486 |
| 5,526,257 | A | 6/1996 | Lerner | 364/401 |
| 5,527,329 | A | 6/1996 | Gharibian | 606/167 |
| 5,528,490 | A | 6/1996 | Hill | 364/403 |
| 5,530,438 | A | 6/1996 | Bickham et al. | |
| 5,532,464 | A | 7/1996 | Josephson et al. | 235/379 |
| 5,533,974 | A | 7/1996 | Gaba | 604/110 |
| 5,536,898 | A | 7/1996 | Conner et al. | 588/252 |
| 5,536,945 | A | 7/1996 | Reich | |
| 5,537,313 | A | 7/1996 | Pirelli | 364/403 |
| 5,537,314 | A | 7/1996 | Kanter | 364/406 |
| 5,537,590 | A | 7/1996 | Amado | 395/600 |
| 5,538,132 | A | 7/1996 | Propp et al. | 206/365 |
| 5,539,677 | A | 7/1996 | Smith | 364/560 |
| 5,539,877 | A | 7/1996 | Winokur et al. | |
| 5,541,832 | A | 7/1996 | Nakajima et al. | 364/148 |
| 5,544,040 | A | 8/1996 | Gerbaulet | 364/401 R |
| 5,544,352 | A | 8/1996 | Egger | 395/600 |
| 5,546,507 | A | 8/1996 | Staub | 395/76 |
| 5,546,578 | A | 8/1996 | Takada | 395/600 |
| 5,548,506 | A | 8/1996 | Srinivasan | 364/401 R |
| 5,548,698 | A | 8/1996 | Smith et al. | 395/139 |
| 5,550,746 | A | 8/1996 | Jacobs | |
| 5,553,094 | A | 9/1996 | Johnson et al. | 375/200 |
| 5,554,175 | A | 9/1996 | Alferness | 607/5 |
| 5,555,191 | A | 9/1996 | Hripcsak | 364/514 R |
| 5,557,518 | A | 9/1996 | Rosen | 364/408 |
| 5,557,780 | A | 9/1996 | Edwards et al. | 395/500 |
| 5,566,327 | A | 10/1996 | Sehr | 395/600 |
| 5,568,028 | A | 10/1996 | Uchiyama et al. | 318/566 |
| 5,568,121 | A | 10/1996 | Lamensdorf | 340/539 |
| 5,568,871 | A | 10/1996 | Shantzis | 209/703 |
| 5,570,291 | A | 10/1996 | Dudle et al. | 364/468.01 |
| 5,570,292 | A | 10/1996 | Abraham et al. | |
| 5,570,783 | A | 11/1996 | Thorne et al. | 206/366 |
| 5,571,957 | A | 11/1996 | Tanaka | 73/104 |
| 5,573,113 | A | 11/1996 | Shillington et al. | 206/366 |
| 5,573,529 | A | 11/1996 | Haak et al. | 606/1 |
| 5,577,040 | A | 11/1996 | Klumpp | 370/73 |
| 5,578,808 | A | 11/1996 | Taylor | 235/380 |
| 5,579,232 | A | 11/1996 | Tong et al. | |
| D376,647 | S | 12/1996 | Marsh et al. | D24/131 |
| 5,581,664 | A | 12/1996 | Allen et al. | 395/51 |
| 5,581,677 | A | 12/1996 | Myers et al. | 395/140 |
| 5,581,749 | A | 12/1996 | Hossain et al. | 395/600 |
| 5,582,793 | A | 12/1996 | Glazer et al. | 422/26 |
| 5,583,758 | A | 12/1996 | McIlroy et al. | 395/202 |
| 5,584,016 | A | 12/1996 | Varghese et al. | |
| 5,584,025 | A | 12/1996 | Keithley et al. | 395/615 |
| 5,584,302 | A | 12/1996 | Sillaway et al. | 128/845 |
| 5,586,033 | A | 12/1996 | Hall | |
| 5,586,066 | A | 12/1996 | White et al. | 364/576 |
| 5,586,218 | A | 12/1996 | Allen | 395/10 |
| 5,587,572 | A | 12/1996 | Kirby | 235/98 R |
| 5,587,925 | A | 12/1996 | Li | 364/508 |
| 5,590,038 | A | 12/1996 | Pitroda | 395/241 |
| 5,590,197 | A | 12/1996 | Chen et al. | 380/24 |
| 5,592,375 | A | 1/1997 | Salomon et al. | 395/207 |
| 5,592,378 | A | 1/1997 | Cameron et al. | 395/227 |
| 5,592,560 | A | 1/1997 | Deaton et al. | 382/100 |
| 5,594,648 | A | 1/1997 | Nakaura | |
| 5,596,642 | A | 1/1997 | Davis et al. | 380/24 |
| 5,596,643 | A | 1/1997 | Davis et al. | 380/24 |
| 5,602,886 | A | 2/1997 | Gross et al. | 376/253 |
| 5,603,013 | A | 2/1997 | Ohara | 395/500 |
| 5,604,802 | A | 2/1997 | Holloway | 380/24 |
| 5,605,245 | A | 2/1997 | Bemis et al. | 220/324 |
| 5,608,622 | A | 3/1997 | Church | 395/753 |
| 5,608,898 | A | 3/1997 | Turpin et al. | 395/619 |
| 5,609,820 | A | 3/1997 | Bridges et al. | 422/23 |
| 5,610,839 | A | 3/1997 | Karolak et al. | 364/514 C |
| 5,611,038 | A | 3/1997 | Shaw et al. | 395/806 |
| 5,611,051 | A | 3/1997 | Pirelli | 395/210 |
| 5,611,270 | A | 3/1997 | Harrington | 100/102 |
| 5,615,269 | A | 3/1997 | Micali | 380/49 |
| 5,616,136 | A | 4/1997 | Shillington et al. | 604/240 |
| 5,620,466 | A | 4/1997 | Haefner et al. | 607/5 |
| 5,621,663 | A | 4/1997 | Skagerling | 364/550 |
| 5,621,797 | A | 4/1997 | Rosen | 380/24 |
| 5,621,812 | A | 4/1997 | Deaton et al. | 382/100 |
| 5,623,547 | A | 4/1997 | Jones et al. | 380/24 |
| 5,623,552 | A | 4/1997 | Lane | 382/124 |
| 5,623,660 | A | 4/1997 | Josephson | 395/609 |
| D379,405 | S | 5/1997 | Shillington | D23/295 |
| 5,626,240 | A | 5/1997 | Friedrichs et al. | 209/702 |
| 5,627,908 | A | 5/1997 | Lee et al. | 382/133 |
| 5,629,872 | A | 5/1997 | Gross et al. | 364/554 |
| 5,629,982 | A | 5/1997 | Micali | 380/30 |
| 5,630,069 | A | 5/1997 | Flores et al. | 395/207 |
| 5,630,070 | A | 5/1997 | Dietrich et al. | 395/208 |
| 5,630,125 | A | 5/1997 | Zellweger | 395/614 |
| 5,630,127 | A | 5/1997 | Moore et al. | 395/615 |
| 5,630,506 | A | 5/1997 | Thorne et al. | 206/366 |
| 5,632,010 | A | 5/1997 | Briechle et al. | 345/1 |
| 5,634,127 | A | 5/1997 | Cloud et al. | 395/680 |
| 5,637,101 | A | 6/1997 | Shillington | 604/242 |
| 5,638,457 | A | 6/1997 | Deaton et al. | 382/100 |
| 5,638,492 | A | 6/1997 | Maeda et al. | 395/50 |
| 5,638,519 | A | 6/1997 | Haluska | 395/228 |
| 5,639,031 | A | 6/1997 | Wright et al. | 241/33 |
| 5,640,569 | A | 6/1997 | Miller et al. | 395/729 |
| 5,640,835 | A | 6/1997 | Muscoplat | 53/569 |
| 5,641,423 | A | 6/1997 | Bridges et al. | 219/770 |
| 5,642,419 | A | 6/1997 | Rosen | 380/23 |
| 5,643,402 | A | 7/1997 | Schmid | 156/509 |
| 5,644,493 | A | 7/1997 | Motai et al. | |
| 5,644,686 | A | 7/1997 | Hekmatpour | 395/50 |
| 5,644,725 | A | 7/1997 | Schmerer | 395/228 |
| 5,644,727 | A | 7/1997 | Atkins | 395/240 |
| 5,644,778 | A | 7/1997 | Burks et al. | 395/800 |
| 5,646,864 | A | 7/1997 | Whitney | 364/514 B |
| 5,647,502 | A | 7/1997 | Marsh | 220/481 |
| 5,649,114 | A | 7/1997 | Deaton et al. | 395/214 |
| 5,649,116 | A | 7/1997 | McCoy et al. | 395/238 |
| 5,649,117 | A | 7/1997 | Landry | 395/240 |
| 5,650,770 | A | 7/1997 | Schlager et al. | 340/573 |
| 5,651,125 | A | 7/1997 | Witt et al. | 395/394 |
| 5,652,786 | A | 7/1997 | Rogers | |
| 5,655,008 | A | 8/1997 | Futch et al. | |
| 5,655,068 | A | 8/1997 | Opoczynski | |
| 5,655,085 | A | 8/1997 | Ryan et al. | 364/401 R |
| 5,655,088 | A | 8/1997 | Midorikawa et al. | 395/237 |
| 5,658,317 | A | 8/1997 | Haefner et al. | 607/5 |
| 5,659,469 | A | 8/1997 | Deaton et al. | 395/214 |
| 5,661,735 | A | 8/1997 | Fischer | 371/491 |
| 5,661,978 | A | 9/1997 | Holmes et al. | 62/36 |
| 5,662,688 | A | 9/1997 | Haefner et al. | 607/5 |
| 5,664,110 | A | 9/1997 | Green et al. | 705/26 |
| 5,664,111 | A | 9/1997 | Nahan et al. | 705/27 |
| 5,664,112 | A | 9/1997 | Sturgeon et al. | 705/28 |
| 5,664,115 | A | 9/1997 | Fraser | 705/37 |
| 5,666,420 | A | 9/1997 | Micali | 380/30 |
| 5,666,493 | A | 9/1997 | Wojcik et al. | 705/26 |
| 5,667,069 | A | 9/1997 | Williams, Jr. | 206/370 |
| 5,668,928 | A | 9/1997 | Groner | 704/243 |
| 5,669,102 | A | 9/1997 | Sandel | 16/114 R |
| 5,672,883 | A | 9/1997 | Reich | |
| 5,675,662 | A | 10/1997 | Deaton et al. | 382/137 |
| 5,676,255 | A | 10/1997 | Flowers | 209/2 |
| 5,677,997 | A | 10/1997 | Talatik | 395/10 |
| 5,678,568 | A | 10/1997 | Uchikubo et al. | 128/897 |
| 5,680,305 | A | 10/1997 | Apgar, IV | 364/401 R |
| 5,680,409 | A | 10/1997 | Qin et al. | 371/48 |
| 5,682,466 | A | 10/1997 | Maeda et al. | 395/50 |
| 5,682,482 | A | 10/1997 | Burt et al. | 395/242 |
| 5,684,965 | A | 11/1997 | Pickering | 395/234 |
| 5,684,984 | A | 11/1997 | Jones et al. | 395/610 |
| 5,684,999 | A | 11/1997 | Okamoto | 395/759 |
| 5,687,322 | A | 11/1997 | Deaton et al. | 395/214 |
| 5,688,399 | A | 11/1997 | Halff et al. | 210/178 |

| Patent No. | Kind | Date | Inventor | Class |
|---|---|---|---|---|
| 5,689,062 | A | 11/1997 | Jawahir et al. | 73/104 |
| 5,689,650 | A | 11/1997 | McClelland et al. | 395/236 |
| 5,689,652 | A | 11/1997 | Lupien et al. | 395/237 |
| 5,690,683 | A | 11/1997 | Haefner et al. | 607/4 |
| 5,691,524 | A | 11/1997 | Josephson | 235/379 |
| 5,692,132 | A | 11/1997 | Hogan | 395/227 |
| 5,693,028 | A | 12/1997 | Shillington | 604/240 |
| 5,694,546 | A | 12/1997 | Reisman | |
| 5,694,551 | A | 12/1997 | Doyle et al. | 395/226 |
| 5,696,907 | A | 12/1997 | Tom | 395/238 |
| 5,696,909 | A | 12/1997 | Wallner | 395/244 |
| 5,699,528 | A | 12/1997 | Hogan | 395/240 |
| 5,701,400 | A | 12/1997 | Amado | 395/76 |
| RE35,715 | E | 1/1998 | Circeo, Jr. et al. | 588/253 |
| 5,706,290 | A | 1/1998 | Shaw et al. | 370/465 |
| 5,706,321 | A | 1/1998 | Chen et al. | 376/463 |
| 5,706,406 | A | 1/1998 | Pollock | 395/55 |
| 5,709,842 | A | 1/1998 | Held et al. | 422/292 |
| 5,710,887 | A | 1/1998 | Chelliah et al. | 395/226 |
| 5,710,889 | A | 1/1998 | Clark et al. | 395/244 |
| 5,712,472 | A | 1/1998 | Lee | 235/486 |
| 5,712,914 | A | 1/1998 | Aucsmith et al. | 380/30 |
| 5,712,989 | A | 1/1998 | Johnson et al. | 395/228 |
| 5,712,990 | A | 1/1998 | Henderson | 395/228 |
| 5,713,923 | A | 2/1998 | Ward et al. | 607/3 |
| 5,715,298 | A | 2/1998 | Rogers | |
| 5,715,314 | A | 2/1998 | Payne et al. | 380/24 |
| 5,715,402 | A | 2/1998 | Popolo | 395/237 |
| 5,715,448 | A | 2/1998 | Suzuki et al. | 395/609 |
| 5,715,468 | A | 2/1998 | Budzinski | 395/759 |
| 5,716,114 | A | 2/1998 | Holmes et al. | 312/215 |
| 5,717,835 | A | 2/1998 | Hellerstein | 395/51 |
| 5,717,868 | A | 2/1998 | James | 395/235 |
| 5,717,989 | A | 2/1998 | Tozzoli et al. | 705/37 |
| 5,718,168 | A | 2/1998 | Harrington | 100/226 |
| 5,719,563 | A | 2/1998 | Thompson, Jr. | |
| 5,721,832 | A | 2/1998 | Westrope et al. | 395/227 |
| 5,721,898 | A | 2/1998 | Beardsley et al. | 395/603 |
| D391,726 | S | 3/1998 | Williams et al. | D34/11 |
| 5,724,262 | A | 3/1998 | Ghahramani | |
| 5,724,424 | A | 3/1998 | Gifford | 380/24 |
| 5,724,522 | A | 3/1998 | Kagami et al. | 395/226 |
| 5,725,993 | A | 3/1998 | Bringley et al. | 430/269 |
| 5,726,884 | A | 3/1998 | Sturgeon et al. | 395/209 |
| 5,726,898 | A | 3/1998 | Jacobs | |
| 5,727,048 | A | 3/1998 | Hiroshima et al. | |
| 5,727,161 | A | 3/1998 | Purcell, Jr. | 395/207 |
| 5,727,164 | A | 3/1998 | Kaye et al. | 395/228 |
| 5,727,165 | A | 3/1998 | Ordish et al. | 395/237 |
| 5,729,735 | A | 3/1998 | Meyering | 395/610 |
| 5,732,148 | A | 3/1998 | Keagy et al. | 382/124 |
| 5,732,397 | A | 3/1998 | DeTore et al. | 705/1 |
| 5,732,398 | A | 3/1998 | Tagawa | 705/5 |
| 5,732,400 | A | 3/1998 | Mandler et al. | 705/26 |
| 5,732,401 | A | 3/1998 | Conway | 705/29 |
| 5,735,639 | A | 4/1998 | Payne et al. | 405/128 |
| 5,735,797 | A | 4/1998 | Muzilla et al. | 600/441 |
| 5,737,215 | A | 4/1998 | Schricker et al. | 364/149 |
| 5,737,626 | A | 4/1998 | Hall et al. | |
| 5,737,726 | A | 4/1998 | Cameron et al. | 705/7 |
| 5,739,508 | A | 4/1998 | Uber, III | 235/375 |
| 5,740,033 | A | 4/1998 | Wassick et al. | 364/149 |
| 5,740,388 | A | 4/1998 | Hunt | 395/328 |
| 5,742,813 | A | 4/1998 | Kavanagh et al. | 395/608 |
| 5,743,860 | A | 4/1998 | Hively et al. | 600/544 |
| 5,745,382 | A | 4/1998 | Vilim et al. | |
| 5,745,654 | A | 4/1998 | Titan | 395/22 |
| 5,745,687 | A | 4/1998 | Randell | |
| 5,745,712 | A | 4/1998 | Turpin et al. | 395/333 |
| 5,745,765 | A | 4/1998 | Paseman | 395/701 |
| 5,745,776 | A | 4/1998 | Sheppard, II | 395/794 |
| 5,745,882 | A | 4/1998 | Bixler et al. | 705/26 |
| 5,747,053 | A | 5/1998 | Nashimoto et al. | 424/405 |
| 5,748,737 | A | 5/1998 | Daggar | 380/24 |
| 5,748,850 | A | 5/1998 | Sakurai | 395/50 |
| 5,749,081 | A | 5/1998 | Whiteis | 707/102 |
| 5,750,972 | A | 5/1998 | Botvin | 235/379 |
| 5,752,234 | A | 5/1998 | Withers | 705/2 |
| 5,752,244 | A | 5/1998 | Rose et al. | 707/5 |
| 5,754,191 | A | 5/1998 | Mills et al. | 345/508 |
| 5,754,738 | A | 5/1998 | Saucedo et al. | 395/12 |
| 5,754,766 | A | 5/1998 | Shaw et al. | 709/200 |
| 5,754,864 | A | 5/1998 | Hill | 395/712 |
| 5,754,939 | A | 5/1998 | Herz et al. | 455/42 |
| 5,755,698 | A | 5/1998 | Kagan et al. | 604/179 |
| 5,757,917 | A | 5/1998 | Rose et al. | 380/25 |
| 5,758,026 | A | 5/1998 | Lobley et al. | 395/12 |
| 5,758,095 | A | 5/1998 | Albaum et al. | 395/202 |
| 5,758,126 | A | 5/1998 | Daniels et al. | 395/500 |
| 5,758,147 | A | 5/1998 | Chen et al. | 395/606 |
| 5,758,327 | A | 5/1998 | Gardner et al. | 705/26 |
| 5,758,328 | A | 5/1998 | Giovannoli | 705/26 |
| 5,758,329 | A | 5/1998 | Wojcik et al. | 705/28 |
| 5,761,090 | A | 6/1998 | Gross et al. | |
| 5,761,432 | A | 6/1998 | Bergholm et al. | |
| 5,761,502 | A | 6/1998 | Jacobs | 395/614 |
| 5,761,649 | A | 6/1998 | Hill | 705/27 |
| 5,761,661 | A | 6/1998 | Coussens et al. | 707/9 |
| 5,764,509 | A | 6/1998 | Gross et al. | 364/149 |
| 5,764,515 | A | 6/1998 | Guerillot et al. | 364/420 |
| 5,764,543 | A | 6/1998 | Kennedy | 364/578 |
| 5,764,856 | A | 6/1998 | Jaenecke | 395/11 |
| 5,765,138 | A | 6/1998 | Aycock et al. | 705/7 |
| 5,768,142 | A | 6/1998 | Jacobs | |
| 5,768,389 | A | 6/1998 | Ishii | 380/30 |
| 5,768,501 | A | 6/1998 | Lewis | |
| 5,772,059 | A | 6/1998 | McCord | 220/254 |
| 5,774,379 | A | 6/1998 | Gross et al. | 364/576 |
| 5,774,569 | A | 6/1998 | Waldenmaier | 382/100 |
| 5,774,668 | A | 6/1998 | Choquier et al. | |
| 5,774,835 | A | 6/1998 | Ozawa | 704/205 |
| 5,774,839 | A | 6/1998 | Shlomot | 704/222 |
| 5,774,866 | A | 6/1998 | Horwitz et al. | 705/7 |
| 5,774,873 | A | 6/1998 | Berent et al. | 705/26 |
| 5,778,155 | A | 7/1998 | Hepner | 395/51 |
| 5,778,356 | A | 7/1998 | Heiny | 707/2 |
| 5,781,632 | A | 7/1998 | Odom | 380/24 |
| 5,781,772 | A | 7/1998 | Wilkinson, III et al. | 395/600 |
| 5,783,808 | A | 7/1998 | Josephson | 235/379 |
| 5,785,573 | A | 7/1998 | Rothbarth et al. | 446/171 |
| 5,785,591 | A | 7/1998 | Payne | 454/118 |
| 5,787,156 | A | 7/1998 | Katz | |
| 5,787,186 | A | 7/1998 | Schroeder | 382/115 |
| 5,787,235 | A | 7/1998 | Smith et al. | 395/50 |
| 5,787,402 | A | 7/1998 | Potter et al. | 705/37 |
| 5,787,438 | A | 7/1998 | Cink et al. | 707/103 |
| 5,787,443 | A | 7/1998 | Palmer | 707/202 |
| H1743 | H | 8/1998 | Graves et al. | |
| 5,790,674 | A | 8/1998 | Houvener et al. | 380/23 |
| 5,790,780 | A | 8/1998 | Brichta et al. | |
| 5,792,188 | A | 8/1998 | Starkweather et al. | 607/5 |
| 5,793,632 | A | 8/1998 | Fad et al. | |
| 5,794,006 | A | 8/1998 | Sanderman | 395/500 |
| 5,794,206 | A | 8/1998 | Wilkinson et al. | 705/1 |
| 5,794,207 | A | 8/1998 | Walker et al. | 705/23 |
| 5,794,210 | A | 8/1998 | Goldhaber et al. | 705/14 |
| 5,794,212 | A | 8/1998 | Mistr, Jr. | 705/26 |
| 5,794,216 | A | 8/1998 | Brown | 705/27 |
| 5,794,219 | A | 8/1998 | Brown | 705/37 |
| 5,794,789 | A | 8/1998 | Payson et al. | 209/549 |
| 5,799,087 | A | 8/1998 | Rosen | 380/24 |
| 5,799,157 | A | 8/1998 | Escallon | 395/227 |
| 5,799,285 | A | 8/1998 | Klingman | 705/26 |
| 5,799,289 | A | 8/1998 | Fukushima et al. | 705/400 |
| 5,799,311 | A | 8/1998 | Agrawal et al. | 707/102 |
| 5,801,366 | A | 9/1998 | Funk et al. | 235/380 |
| 5,801,367 | A | 9/1998 | Asplund et al. | 235/384 |
| 5,802,502 | A | 9/1998 | Gell et al. | 705/37 |
| 5,805,458 | A | 9/1998 | McNamara et al. | 364/483 |
| 5,805,676 | A | 9/1998 | Martino | |
| 5,805,813 | A | 9/1998 | Schweitzer, III | |
| 5,806,048 | A | 9/1998 | Kiron et al. | 705/36 |
| 5,806,519 | A | 9/1998 | Evans, III et al. | 128/654 |
| 5,808,894 | A | 9/1998 | Wiens et al. | |
| 5,809,212 | A | 9/1998 | Shasha | 395/10 |
| 5,809,479 | A | 9/1998 | Martin et al. | 705/11 |
| 5,809,499 | A | 9/1998 | Wong et al. | 707/6 |
| 5,812,668 | A | 9/1998 | Weber | 380/24 |

| | | | | | | |
|---|---|---|---|---|---|---|
| 5,812,670 A | 9/1998 | Micali ............................ 380/25 | | 5,860,917 A | 1/1999 | Comanor et al. ............. 600/300 |
| 5,815,252 A | 9/1998 | Price-Francis ................. 356/71 | | 5,862,223 A | 1/1999 | Walker et al. .................. 380/25 |
| 5,815,657 A | 9/1998 | Williams et al. ............. 395/186 | | 5,862,530 A | 1/1999 | Shillington ...................... 2/439 |
| 5,815,683 A | 9/1998 | Vogler .......................... 395/500 | | 5,864,325 A | 1/1999 | Briechle et al. ................... 345/1 |
| 5,818,914 A | 10/1998 | Fujisaki | | 5,864,483 A | 1/1999 | Brichta |
| 5,819,028 A | 10/1998 | Manghirmalani et al. | | 5,864,662 A | 1/1999 | Brownmiller et al. |
| 5,819,226 A | 10/1998 | Gopinathan et al. .............. 705/1 | | 5,864,738 A | 1/1999 | Kessler et al. |
| 5,819,241 A | 10/1998 | Reiter ........................... 705/408 | | 5,864,773 A | 1/1999 | Barna et al. ..................... 702/85 |
| 5,819,263 A | 10/1998 | Bromley et al. .................. 707/3 | | 5,864,823 A | 1/1999 | Levitan ............................ 105/14 |
| 5,819,267 A | 10/1998 | Uyama ............................. 707/6 | | 5,864,827 A | 1/1999 | Wilson ............................ 705/35 |
| 5,819,273 A | 10/1998 | Vora et al. ...................... 707/10 | | 5,864,837 A | 1/1999 | Maimone ......................... 707/1 |
| 5,819,290 A | 10/1998 | Fujita ............................... 707/2 | | 5,866,888 A | 2/1999 | Bravman et al. ............. 235/375 |
| 5,820,770 A | 10/1998 | Cohen et al. ..................... 216/22 | | 5,867,387 A | 2/1999 | Kavana |
| 5,821,872 A | 10/1998 | Brown et al. | | 5,868,669 A | 2/1999 | Iliff ................................. 600/300 |
| 5,822,737 A | 10/1998 | Ogram ............................ 705/26 | | 5,870,456 A | 2/1999 | Rogers |
| 5,822,743 A | 10/1998 | Gupta et al. .................... 706/50 | | 5,870,473 A | 2/1999 | Boesch et al. ................... 580/21 |
| 5,826,014 A | 10/1998 | Coley et al. | | 5,870,715 A | 2/1999 | Belitz et al. ..................... 705/22 |
| 5,826,242 A | 10/1998 | Montulli ........................ 705/27 | | 5,870,717 A | 2/1999 | Wiecha ............................ 705/26 |
| 5,826,244 A | 10/1998 | Huberman ...................... 705/37 | | 5,870,719 A | 2/1999 | Maritzen et al. ................ 705/26 |
| 5,826,245 A | 10/1998 | Sandberg-Diment ........... 705/44 | | 5,870,721 A | 2/1999 | Norris .............................. 705/38 |
| 5,828,567 A | 10/1998 | Eryurek et al. ............... 364/184 | | 5,870,724 A | 2/1999 | Lawlor et al. ................... 705/42 |
| 5,829,002 A | 10/1998 | Priest ............................. 707/10 | | 5,870,755 A | 2/1999 | Stevens et al. ................ 707/104 |
| 5,829,588 A | 11/1998 | Bloomfield ................... 206/366 | | 5,872,848 A | 2/1999 | Romney et al. ................. 380/25 |
| 5,830,419 A | 11/1998 | Held et al. .................... 422/307 | | 5,873,069 A | 2/1999 | Reuhl et al. ..................... 705/20 |
| 5,832,196 A | 11/1998 | Croslin et al. | | 5,873,071 A | 2/1999 | Ferstenberg et al. ........... 705/37 |
| 5,832,459 A | 11/1998 | Cameron et al. ................ 705/26 | | 5,873,072 A | 2/1999 | Kight et al. ..................... 705/40 |
| 5,832,462 A | 11/1998 | Midorikawa et al. ........... 705/35 | | 5,873,094 A | 2/1999 | Talatik ........................... 707/104 |
| 5,832,463 A | 11/1998 | Funk ............................... 705/35 | | 5,875,110 A | 2/1999 | Jacobs |
| 5,832,465 A | 11/1998 | Tom ................................ 706/51 | | 5,875,236 A | 2/1999 | Jankowitz et al. ............. 379/114 |
| 5,832,497 A | 11/1998 | Taylor ............................ 707/104 | | 5,875,432 A | 2/1999 | Sehr ................................ 705/12 |
| 5,833,683 A | 11/1998 | Fuller et al. ..................... 606/17 | | 5,877,999 A | 3/1999 | Holt et al. ...................... 367/151 |
| 5,833,922 A | 11/1998 | Held et al. ...................... 422/22 | | 5,878,141 A | 3/1999 | Daly et al. ...................... 380/25 |
| 5,835,683 A | 11/1998 | Corella et al. ................... 395/75 | | 5,878,385 A | 3/1999 | Bralich et al. ..................... 704/9 |
| 5,835,896 A | 11/1998 | Fisher et al. .................... 705/37 | | 5,878,401 A | 3/1999 | Joseph ............................ 705/22 |
| 5,835,910 A | 11/1998 | Kavanagh et al. ............ 707/103 | | 5,878,403 A | 3/1999 | DeFrancesco et al. ......... 705/38 |
| 5,835,911 A | 11/1998 | Nakagawa et al. ............ 707/203 | | 5,878,416 A | 3/1999 | Harris et al. .................... 707/10 |
| 5,835,922 A | 11/1998 | Shima et al. .................. 707/522 | | 5,878,419 A | 3/1999 | Carter ............................ 707/10 |
| 5,836,971 A | 11/1998 | Starkweather ..................... 607/4 | | 5,883,806 A | 3/1999 | Meador et al. |
| 5,836,989 A | 11/1998 | Shelton ............................ 607/27 | | 5,883,955 A | 3/1999 | Ronning .......................... 380/4 |
| 5,837,171 A | 11/1998 | Danzik et al. ................. 264/457 | | 5,884,270 A | 3/1999 | Walker et al. ................... 705/1 |
| 5,838,906 A | 11/1998 | Doyle et al. | | 5,884,272 A | 3/1999 | Walker et al. ................... 705/1 |
| 5,838,965 A | 11/1998 | Kavanagh et al. ............ 395/614 | | 5,884,281 A | 3/1999 | Smith et al. .................... 705/26 |
| 5,839,117 A | 11/1998 | Cameron et al. ................ 705/27 | | 5,884,288 A | 3/1999 | Chang et al. .................... 705/40 |
| 5,839,119 A | 11/1998 | Krsul et al. ..................... 705/39 | | 5,884,290 A | 3/1999 | Smorodinsky et al. ......... 705/44 |
| 5,840,026 A | 11/1998 | Uber, III et al. .............. 600/431 | | 5,884,294 A | 3/1999 | Kadar et al. .................... 706/10 |
| 5,842,178 A | 11/1998 | Giovannoli ...................... 705/26 | | 5,884,300 A | 3/1999 | Brockman ........................ 707/2 |
| 5,842,201 A | 11/1998 | Wallack ........................... 707/3 | | 5,889,863 A | 3/1999 | Weber ............................. 380/25 |
| 5,842,221 A | 11/1998 | Schmonsees .................. 707/104 | | 5,890,129 A | 3/1999 | Spurgeon ......................... 705/4 |
| 5,842,652 A | 12/1998 | Warsing et al. ................. 241/81 | | 5,890,137 A | 3/1999 | Koreeda ........................... 705/26 |
| 5,842,976 A | 12/1998 | Williamson .................. 600/300 | | 5,890,138 A | 3/1999 | Godin et al. .................... 705/26 |
| 5,843,037 A | 12/1998 | Uber, III ....................... 604/151 | | 5,890,140 A | 3/1999 | Clark et al. ..................... 705/35 |
| 5,843,130 A | 12/1998 | Jazayeri ............................ 607/5 | | 5,890,145 A | 3/1999 | Kawamura ...................... 706/46 |
| 5,844,329 A | 12/1998 | Hao et al. ...................... 345/329 | | 5,890,175 A | 3/1999 | Wong et al. ................... 707/505 |
| 5,844,554 A | 12/1998 | Geller et al. ................... 345/333 | | 5,891,169 A | 4/1999 | Boheim et al. .................... 607/4 |
| 5,845,255 A | 12/1998 | Mayaud ............................ 705/3 | | 5,892,761 A | 4/1999 | Stracke, Jr. ................... 370/395 |
| 5,845,261 A | 12/1998 | McAbian ........................ 705/26 | | 5,892,900 A | 4/1999 | Ginter et al. .................. 395/186 |
| 5,845,265 A | 12/1998 | Woolston ........................ 705/37 | | 5,893,076 A | 4/1999 | Hafner et al. ................... 705/28 |
| 5,845,266 A | 12/1998 | Lupien et al. ................... 705/37 | | 5,893,077 A | 4/1999 | Griffin ............................ 705/34 |
| 5,845,296 A | 12/1998 | Jasuja et al. ................... 707/205 | | 5,893,080 A | 4/1999 | McGurl et al. .................. 705/40 |
| 5,847,374 A | 12/1998 | Menconi ........................ 235/492 | | 5,893,904 A | 4/1999 | Harris et al. .................... 705/27 |
| 5,847,845 A | 12/1998 | Takahashi et al. ............. 358/475 | | 5,893,905 A | 4/1999 | Main et al. ...................... 705/11 |
| 5,847,971 A | 12/1998 | Ladner et al. ................. 364/471 | | 5,894,558 A | 4/1999 | Falker |
| 5,848,395 A | 12/1998 | Edgar et al. ...................... 705/9 | | 5,895,454 A | 4/1999 | Harrington ..................... 705/26 |
| 5,848,399 A | 12/1998 | Burke ............................. 705/27 | | 5,897,635 A | 4/1999 | Torres et al. .................... 707/10 |
| 5,848,400 A | 12/1998 | Chang ............................ 705/35 | | 5,898,154 A | 4/1999 | Rosen ........................... 235/379 |
| 5,848,427 A | 12/1998 | Hyodo ........................... 707/513 | | 5,898,594 A | 4/1999 | Leason et al. |
| 5,848,593 A | 12/1998 | McGrady et al. ............. 128/897 | | 5,898,762 A | 4/1999 | Katz |
| 5,848,692 A | 12/1998 | Thorne et al. ................. 206/366 | | 5,898,777 A | 4/1999 | Tycksen, Jr. et al. ............ 380/4 |
| 5,850,442 A | 12/1998 | Muftic ............................ 380/21 | | 5,898,830 A | 4/1999 | Wesinger, Jr. et al. |
| 5,850,446 A | 12/1998 | Berger et al. ................... 380/24 | | 5,899,980 A | 5/1999 | Wilf et al. ....................... 705/26 |
| 5,852,809 A | 12/1998 | Abel et al. ...................... 705/26 | | 5,899,985 A | 5/1999 | Tanaka ............................ 706/45 |
| 5,852,810 A | 12/1998 | Sotiroff et al. .................. 705/27 | | 5,903,652 A | 5/1999 | Mital ............................... 380/25 |
| 5,852,812 A | 12/1998 | Reeder ............................ 705/39 | | 5,903,721 A | 5/1999 | Sixtus |
| 5,855,005 A | 12/1998 | Schuler et al. .................... 705/4 | | 5,903,878 A | 5/1999 | Talati et al. ..................... 705/26 |
| 5,855,008 A | 12/1998 | Goldhaber et al. ............. 705/14 | | 5,903,880 A | 5/1999 | Biffar ............................. 705/39 |
| 5,856,931 A | 1/1999 | McCasland ................... 364/550 | | 5,903,901 A | 5/1999 | Kawakura et al. ............ 707/501 |
| 5,857,174 A | 1/1999 | Dugan ............................. 705/1 | | 5,905,736 A | 5/1999 | Ronen et al. .................. 370/546 |
| 5,857,978 A | 1/1999 | Hively et al. ................. 600/544 | | 5,905,973 A | 5/1999 | Yonezawa et al. ............. 705/27 |
| 5,857,993 A | 1/1999 | Atanasoska et al. ............ 604/20 | | 5,905,975 A | 5/1999 | Ausubel .......................... 705/37 |

| Patent Number | Kind | Date | Inventor | Class |
|---|---|---|---|---|
| 5,905,978 | A | 5/1999 | Smith et al. | 706/52 |
| 5,905,989 | A | 5/1999 | Biggs | 707/104 |
| 5,906,677 | A | 5/1999 | Dudley | 96/17 |
| 5,907,490 | A | 5/1999 | Oliver | |
| 5,907,547 | A | 5/1999 | Foladare et al. | 370/352 |
| 5,907,620 | A | 5/1999 | Klemba et al. | 380/25 |
| 5,907,831 | A | 5/1999 | Lotvin et al. | 705/14 |
| 5,908,343 | A | 6/1999 | Rothbarth et al. | 446/171 |
| 5,909,023 | A | 6/1999 | Ono et al. | 235/380 |
| 5,909,492 | A | 6/1999 | Payne et al. | 380/24 |
| 5,909,670 | A | 6/1999 | Trader et al. | 705/14 |
| 5,910,107 | A | 6/1999 | Iliff | 600/300 |
| 5,910,987 | A | 6/1999 | Ginter et al. | 380/24 |
| 5,912,818 | A | 6/1999 | McGrady et al. | |
| 5,912,981 | A | 6/1999 | Hansmire et al. | 382/116 |
| 5,913,211 | A | 6/1999 | Nitta | 707/5 |
| 5,915,019 | A | 6/1999 | Ginter et al. | 380/4 |
| 5,915,038 | A | 6/1999 | Abdel-Mottaleb et al. | 382/209 |
| 5,915,209 | A | 6/1999 | Lawrence | 455/312 |
| 5,915,245 | A | 6/1999 | Patterson, Jr. et al. | 705/35 |
| 5,916,202 | A | 6/1999 | Haswell | 604/356 |
| 5,917,428 | A | 6/1999 | Discenzo et al. | |
| 5,917,893 | A | 6/1999 | Katz | |
| 5,917,912 | A | 6/1999 | Ginter et al. | 380/24 |
| 5,918,213 | A | 6/1999 | Bernard et al. | 705/4 |
| 5,920,053 | A | 7/1999 | DeBrouse | 235/375 |
| 5,920,054 | A | 7/1999 | Uber, III | 235/375 |
| 5,920,629 | A | 7/1999 | Rosen | 380/24 |
| 5,920,847 | A | 7/1999 | Kolling et al. | 705/40 |
| 5,920,848 | A | 7/1999 | Schutzer et al. | 705/42 |
| 5,920,861 | A | 7/1999 | Hall et al. | 707/9 |
| 5,923,001 | A | 7/1999 | Morris et al. | 177/245 |
| 5,923,552 | A | 7/1999 | Brown et al. | |
| 5,924,068 | A | 7/1999 | Richard et al. | 704/260 |
| 5,924,080 | A | 7/1999 | Johnson | 705/26 |
| 5,924,082 | A | 7/1999 | Silverman et al. | 705/37 |
| 5,924,083 | A | 7/1999 | Silverman et al. | 705/37 |
| 5,926,793 | A | 7/1999 | de Rafael et al. | 705/5 |
| 5,926,796 | A | 7/1999 | Walker et al. | 705/16 |
| 5,928,272 | A | 7/1999 | Adkins et al. | 607/45 |
| 5,928,323 | A | 7/1999 | Gosling et al. | 709/203 |
| 5,930,753 | A | 7/1999 | Potamianos et al. | 704/256 |
| 5,930,763 | A | 7/1999 | Kaneko et al. | 705/8 |
| 5,930,764 | A | 7/1999 | Melchione et al. | 705/10 |
| 5,930,767 | A | 7/1999 | Reber et al. | 705/26 |
| 5,930,768 | A | 7/1999 | Hooban | 705/27 |
| 5,930,773 | A | 7/1999 | Crooks et al. | 705/30 |
| 5,930,776 | A | 7/1999 | Dykstra et al. | 705/38 |
| 5,930,777 | A | 7/1999 | Barber | 705/40 |
| 5,931,900 | A | 8/1999 | Notani et al. | 709/201 |
| 5,931,917 | A | 8/1999 | Nguyen et al. | 709/250 |
| 5,932,867 | A | 8/1999 | Speckhart et al. | 235/491 |
| 5,933,599 | A | 8/1999 | Nolan | |
| 5,933,809 | A | 8/1999 | Hunt et al. | 705/3 |
| 5,933,829 | A | 8/1999 | Durst et al. | 707/10 |
| 5,935,060 | A | 8/1999 | Iliff | 600/300 |
| 5,936,219 | A | 8/1999 | Yoshida et al. | 235/379 |
| 5,936,221 | A | 8/1999 | Corder et al. | 235/380 |
| 5,936,860 | A | 8/1999 | Arnold et al. | |
| 5,937,158 | A | 8/1999 | Uranaka | 395/186 |
| 5,937,393 | A | 8/1999 | O'Leary et al. | 705/21 |
| 5,940,082 | A | 8/1999 | Brinegar et al. | 345/442 |
| 5,940,306 | A | 8/1999 | Gardner et al. | |
| 5,940,807 | A | 8/1999 | Purcell | 705/26 |
| 5,940,816 | A | 8/1999 | Fuhrer et al. | 706/13 |
| 5,940,823 | A | 8/1999 | Schreiber et al. | 707/3 |
| 5,941,385 | A | 8/1999 | Barton | 206/366 |
| 5,941,947 | A | 8/1999 | Brown et al. | 709/225 |
| 5,941,996 | A | 8/1999 | Smith et al. | 714/47 |
| 5,943,421 | A | 8/1999 | Grabon | 380/4 |
| 5,943,424 | A | 8/1999 | Berger et al. | 380/25 |
| 5,943,429 | A | 8/1999 | Handel | 381/942 |
| 5,943,656 | A | 8/1999 | Crooks et al. | 705/30 |
| 5,946,659 | A | 8/1999 | Lancelot et al. | 705/3 |
| 5,946,662 | A | 8/1999 | Ettl et al. | 705/8 |
| 5,946,665 | A | 8/1999 | Suzuki et al. | 705/26 |
| 5,946,666 | A | 8/1999 | Nevo et al. | 705/36 |
| 5,946,667 | A | 8/1999 | Tull, Jr. et al. | 705/36 |
| 5,947,285 | A | 9/1999 | Gaba et al. | 206/366 |
| 5,947,950 | A | 9/1999 | Shillington et al. | 604/403 |
| 5,948,054 | A | 9/1999 | Nielsen | 709/200 |
| 5,948,061 | A | 9/1999 | Merriman et al. | 709/219 |
| 5,949,045 | A | 9/1999 | Ezawa et al. | 235/379 |
| 5,949,415 | A | 9/1999 | Lin et al. | 345/335 |
| 5,949,876 | A | 9/1999 | Ginter et al. | 380/4 |
| 5,950,147 | A | 9/1999 | Sarangapani et al. | 702/179 |
| 5,950,169 | A | 9/1999 | Borghesi et al. | 705/4 |
| 5,950,172 | A | 9/1999 | Klingman | 705/26 |
| 5,950,176 | A | 9/1999 | Keiser et al. | 705/37 |
| 5,950,177 | A | 9/1999 | Lupien et al. | 705/37 |
| 5,950,178 | A | 9/1999 | Borgato | 705/37 |
| 5,950,206 | A | 9/1999 | Krause | 707/104 |
| 5,951,694 | A | 9/1999 | Choquier et al. | 714/15 |
| 5,952,890 | A | 9/1999 | Fallisgaard et al. | 331/18 |
| 5,953,423 | A | 9/1999 | Rosen | 380/24 |
| 5,953,704 | A | 9/1999 | McIlroy et al. | 705/2 |
| 5,953,707 | A | 9/1999 | Huang et al. | 705/10 |
| 5,956,483 | A | 9/1999 | Grate et al. | |
| 5,956,489 | A | 9/1999 | San Andres et al. | |
| 5,956,509 | A | 9/1999 | Kevner | 395/684 |
| 5,956,689 | A | 9/1999 | Everhart, III | 705/3 |
| 5,956,700 | A | 9/1999 | Landry | 705/40 |
| 5,958,241 | A | 9/1999 | DeBenedetto et al. | 210/611 |
| 5,960,408 | A | 9/1999 | Martin et al. | 705/11 |
| 5,960,411 | A | 9/1999 | Hartman et al. | 705/26 |
| 5,960,419 | A | 9/1999 | Fagg, III et al. | 706/59 |
| 5,963,648 | A | 10/1999 | Rosen | 380/24 |
| 5,963,910 | A | 10/1999 | Ulwick | 705/7 |
| 5,963,917 | A | 10/1999 | Ogram | 705/26 |
| 5,963,918 | A | 10/1999 | Reagan et al. | 705/28 |
| 5,963,919 | A | 10/1999 | Brinkley et al. | 705/28 |
| 5,963,923 | A | 10/1999 | Garber | 705/37 |
| 5,963,924 | A | 10/1999 | Williams et al. | 705/40 |
| 5,963,925 | A | 10/1999 | Kolling et al. | 705/40 |
| 5,965,858 | A | 10/1999 | Suzuki et al. | 235/375 |
| 5,966,699 | A | 10/1999 | Zandi | 705/38 |
| 5,968,110 | A | 10/1999 | Westrope et al. | 703/27 |
| 5,970,469 | A | 10/1999 | Scroggie et al. | 705/14 |
| 5,970,471 | A | 10/1999 | Hill | 705/26 |
| 5,970,475 | A | 10/1999 | Barnes et al. | 705/27 |
| 5,970,482 | A | 10/1999 | Pham et al. | 706/16 |
| 5,973,731 | A | 10/1999 | Schwab | 348/161 |
| 5,974,388 | A | 10/1999 | Durham | 705/1 |
| 5,974,391 | A | 10/1999 | Hongawa | 705/7 |
| 5,974,395 | A | 10/1999 | Bellini et al. | 705/9 |
| 5,974,400 | A | 10/1999 | Kagami et al. | 705/26 |
| 5,974,403 | A | 10/1999 | Takriti et al. | 705/412 |
| 5,974,406 | A | 10/1999 | Bisdikian et al. | 707/1 |
| 5,974,409 | A | 10/1999 | Sanu et al. | 707/3 |
| 5,977,998 | A | 11/1999 | Briechle et al. | 345/520 |
| 5,978,702 | A | 11/1999 | Ward et al. | 607/3 |
| 5,978,768 | A | 11/1999 | McGovern et al. | 705/1 |
| 5,978,773 | A | 11/1999 | Hudetz et al. | 705/23 |
| 5,978,776 | A | 11/1999 | Seretti et al. | 705/26 |
| 5,978,779 | A | 11/1999 | Stein et al. | 705/37 |
| 5,978,840 | A | 11/1999 | Nguyen et al. | 709/217 |
| 5,982,445 | A | 11/1999 | Eyer et al. | 348/461 |
| 5,982,891 | A | 11/1999 | Ginter et al. | 380/4 |
| 5,982,929 | A | 11/1999 | Ilan et al. | 382/200 |
| 5,983,004 | A | 11/1999 | Shaw et al. | |
| 5,983,138 | A | 11/1999 | Kramer | 607/9 |
| 5,983,194 | A | 11/1999 | Hogge et al. | 705/7 |
| 5,983,199 | A | 11/1999 | Kaneko | 705/26 |
| 5,983,200 | A | 11/1999 | Slotznick | 705/26 |
| 5,983,202 | A | 11/1999 | Yabe et al. | 705/28 |
| 5,983,207 | A | 11/1999 | Turk et al. | 705/39 |
| 5,983,208 | A | 11/1999 | Haller et al. | 705/40 |
| 5,983,243 | A | 11/1999 | Heiney et al. | 707/500 |
| 5,983,273 | A | 11/1999 | White et al. | 709/229 |
| 5,987,103 | A | 11/1999 | Martino | |
| 5,987,132 | A | 11/1999 | Rowney | 380/24 |
| 5,987,140 | A | 11/1999 | Rowney et al. | 380/49 |
| 5,987,180 | A | 11/1999 | Reitmeier | 382/236 |
| 5,987,399 | A | 11/1999 | Wegerich et al. | 702/183 |
| 5,987,423 | A | 11/1999 | Arnold et al. | 705/14 |
| 5,987,425 | A | 11/1999 | Hartman et al. | 705/20 |
| 5,987,426 | A | 11/1999 | Goodwin, III | 705/21 |
| 5,987,434 | A | 11/1999 | Libman | 705/36 R |

| Patent No. | Date | Inventor | Class |
|---|---|---|---|
| 5,987,435 A | 11/1999 | Weiss et al. | 705/36 |
| 5,987,440 A | 11/1999 | O'Neil et al. | 705/44 |
| 5,991,525 A | 11/1999 | Shah et al. | |
| 5,991,728 A | 11/1999 | DeBusk et al. | 705/2 |
| 5,991,738 A | 11/1999 | Ogram | 705/26 |
| 5,991,743 A | 11/1999 | Irving et al. | 705/36 |
| 5,991,750 A | 11/1999 | Watson | 705/44 |
| 5,993,046 A | 11/1999 | McGrady et al. | |
| 5,995,868 A | 11/1999 | Dorfmeister et al. | 600/544 |
| 5,995,937 A | 11/1999 | DeBusk et al. | 705/2 |
| 5,995,939 A | 11/1999 | Berman et al. | 705/3 |
| 5,995,947 A | 11/1999 | Fraser et al. | 705/38 |
| 5,995,951 A | 11/1999 | Ferguson | 706/10 |
| 5,995,975 A | 11/1999 | Malcolm | 707/103 |
| 5,996,076 A | 11/1999 | Rowney et al. | 713/201 |
| 5,999,525 A | 12/1999 | Krishnaswamy et al. | 370/352 |
| 5,999,625 A | 12/1999 | Bellare et al. | 380/24 |
| 5,999,914 A | 12/1999 | Blinn et al. | 705/26 |
| 5,999,915 A | 12/1999 | Nahan et al. | 705/27 |
| 5,999,917 A | 12/1999 | Facciani et al. | 705/36 |
| 5,999,933 A | 12/1999 | Mehta | 707/100 |
| 6,000,049 A | 12/1999 | Karino et al. | 714/724 |
| 6,002,767 A | 12/1999 | Kramer | 380/24 |
| 6,002,855 A | 12/1999 | Ladner et al. | |
| 6,003,006 A | 12/1999 | Colella et al. | 705/2 |
| 6,003,007 A | 12/1999 | DiRienzo | 705/4 |
| 6,003,012 A | 12/1999 | Nick | 705/10 |
| 6,003,020 A | 12/1999 | Hazlehurst et al. | 706/11 |
| 6,004,021 A | 12/1999 | Rothbarth | 364/578 |
| 6,006,016 A | 12/1999 | Faigon et al. | |
| 6,006,191 A | 12/1999 | DiRienzo | 705/2 |
| 6,006,192 A | 12/1999 | Cheng et al. | 705/7 |
| 6,006,196 A | 12/1999 | Feigin et al. | 705/10 |
| 6,006,199 A | 12/1999 | Berlin et al. | 705/26 |
| 6,006,201 A | 12/1999 | Berent et al. | 705/27 |
| 6,006,251 A | 12/1999 | Toyouchi et al. | 709/203 |
| 6,007,459 A | 12/1999 | Burgess | 482/4 |
| 6,009,406 A | 12/1999 | Nick | 705/10 |
| 6,009,408 A | 12/1999 | Buchanan | 705/11 |
| 6,009,412 A | 12/1999 | Storey | 705/14 |
| 6,009,420 A | 12/1999 | Fagg, III et al. | 706/45 |
| 6,010,444 A | 1/2000 | Honeycutt et al. | 588/255 |
| 6,012,041 A | 1/2000 | Brewer et al. | 705/28 |
| 6,012,043 A | 1/2000 | Albright et al. | 705/36 R |
| 6,012,046 A | 1/2000 | Lupien et al. | 705/37 |
| 6,012,051 A | 1/2000 | Sammon, Jr. et al. | 706/52 |
| 6,014,633 A | 1/2000 | DeBusk et al. | 705/7 |
| 6,014,634 A | 1/2000 | Scroggie et al. | 705/14 |
| 6,014,638 A | 1/2000 | Burge et al. | 705/27 |
| 6,014,641 A | 1/2000 | Loeb et al. | 705/34 |
| 6,014,643 A | 1/2000 | Minton | 705/37 |
| 6,014,644 A | 1/2000 | Erickson | 705/37 |
| 6,014,645 A | 1/2000 | Cunningham | 705/38 |
| 6,014,696 A | 1/2000 | Araki et al. | 709/219 |
| 6,016,344 A | 1/2000 | Katz | 379/260 |
| 6,016,449 A | 1/2000 | Fischell et al. | 607/45 |
| 6,016,465 A | 1/2000 | Kelly | 702/116 |
| 6,016,477 A | 1/2000 | Ehnebuske et al. | 705/7 |
| 6,016,479 A | 1/2000 | Taricani, Jr. | 705/19 |
| 6,016,483 A | 1/2000 | Rickard et al. | 705/37 |
| 6,016,484 A | 1/2000 | Williams et al. | 705/39 |
| 6,016,504 A | 1/2000 | Arnold et al. | 709/200 |
| 6,018,338 A | 1/2000 | Greulich et al. | 345/333 |
| 6,018,682 A | 1/2000 | Rise | 607/45 |
| 6,018,718 A | 1/2000 | Walker et al. | 705/14 |
| 6,018,722 A | 1/2000 | Ray et al. | 705/36 |
| 6,018,739 A | 1/2000 | McCoy et al. | 707/102 |
| 6,019,219 A | 2/2000 | Takahashi | |
| 6,019,242 A | 2/2000 | Wysocki et al. | 220/571 |
| 6,020,810 A | 2/2000 | Har-Even | 340/328 |
| 6,021,202 A | 2/2000 | Anderson et al. | 380/25 |
| 6,021,392 A | 2/2000 | Lester et al. | 705/2 |
| 6,021,397 A | 2/2000 | Jones et al. | 705/36 |
| 6,021,398 A | 2/2000 | Ausubel | 705/37 |
| 6,021,920 A | 2/2000 | Aldape | 221/96 |
| 6,022,315 A | 2/2000 | Iliff | 600/300 |
| 6,023,565 A | 2/2000 | Lawman et al. | |
| 6,023,679 A | 2/2000 | Acebo et al. | 705/5 |
| 6,023,683 A | 2/2000 | Johnson et al. | 705/26 |
| 6,023,685 A | 2/2000 | Brett et al. | 705/37 |
| 6,023,686 A | 2/2000 | Brown | 705/37 |
| 6,024,216 A | 2/2000 | Shillington et al. | 206/366 |
| 6,025,877 A | 2/2000 | Chang et al. | 348/395 |
| 6,026,374 A | 2/2000 | Chess | 705/26 |
| 6,026,376 A | 2/2000 | Kenney | 705/27 |
| 6,026,377 A | 2/2000 | Burke | 705/27 |
| 6,026,378 A | 2/2000 | Onozaki | 705/28 |
| 6,026,379 A | 2/2000 | Haller et al. | 705/34 |
| 6,026,383 A | 2/2000 | Ausubel | 705/37 |
| 6,026,393 A | 2/2000 | Gupta et al. | 707/3 |
| 6,027,490 A | 2/2000 | Radford et al. | 604/540 |
| 6,029,138 A | 2/2000 | Khorasani et al. | 705/2 |
| 6,029,140 A | 2/2000 | Martin et al. | 705/11 |
| 6,029,141 A | 2/2000 | Bezos et al. | 705/27 |
| 6,029,142 A | 2/2000 | Hill | 705/27 |
| 6,029,146 A | 2/2000 | Hawkins et al. | 705/35 |
| 6,029,149 A | 2/2000 | Dykstra et al. | 705/38 |
| 6,029,150 A | 2/2000 | Kravitz | 705/39 |
| 6,029,152 A | 2/2000 | Bublitz et al. | 705/40 |
| 6,029,153 A | 2/2000 | Bauchner et al. | 705/42 |
| 6,029,154 A | 2/2000 | Pettitt | 705/44 |
| 6,031,904 A | 2/2000 | An et al. | 379/201 |
| 6,032,121 A | 2/2000 | Dietrich et al. | 705/8 |
| 6,032,129 A | 2/2000 | Greef et al. | 705/27 |
| 6,032,133 A | 2/2000 | Hilt et al. | 705/40 |
| 6,032,145 A | 2/2000 | Beall et al. | 707/5 |
| 6,035,021 A | 3/2000 | Katz | |
| 6,035,284 A | 3/2000 | Straub et al. | 705/28 |
| 6,035,287 A | 3/2000 | Stallaert et al. | 705/37 |
| 6,035,288 A | 3/2000 | Solomon | 705/37 |
| 6,035,289 A | 3/2000 | Chou et al. | 705/37 |
| 6,036,344 A | 3/2000 | Goldenberg | 364/408 |
| 6,036,738 A | 3/2000 | Shanbrom | 55/524 |
| 6,038,540 A | 3/2000 | Krist et al. | 705/8 |
| 6,038,548 A | 3/2000 | Kamil | 705/35 |
| 6,038,597 A | 3/2000 | Van Wyngarden | 709/219 |
| 6,041,308 A | 3/2000 | Walker et al. | 705/14 |
| 6,041,311 A | 3/2000 | Chislenko et al. | 705/27 |
| 6,044,135 A | 3/2000 | Katz | |
| 6,044,361 A | 3/2000 | Kalagnanam et al. | 705/28 |
| 6,044,362 A | 3/2000 | Neely | 705/34 |
| 6,044,363 A | 3/2000 | Mori et al. | 705/37 |
| 6,044,376 A | 3/2000 | Kurtzman, II | 707/102 |
| 6,044,382 A | 3/2000 | Martino | 707/505 |
| 6,047,067 A | 4/2000 | Rosen | 380/24 |
| 6,047,259 A | 4/2000 | Campbell et al. | 705/3 |
| 6,047,265 A | 4/2000 | Sugimori | 705/26 |
| 6,047,268 A | 4/2000 | Bartoli et al. | 705/35 |
| 6,047,269 A | 4/2000 | Biffar | 705/39 |
| 6,047,887 A | 4/2000 | Rosen | 235/379 |
| 6,049,785 A | 4/2000 | Gifford | 705/39 |
| 6,049,793 A | 4/2000 | Tomita | 706/17 |
| 6,052,670 A | 4/2000 | Johnson | 705/27 |
| 6,052,671 A | 4/2000 | Crooks et al. | 705/34 |
| 6,052,675 A | 4/2000 | Checchio | 705/44 |
| 6,055,513 A | 4/2000 | Katz et al. | 705/26 |
| 6,055,514 A | 4/2000 | Wren | 705/27 |
| 6,055,516 A | 4/2000 | Johnson et al. | 705/27 |
| 6,055,519 A | 4/2000 | Kennedy et al. | 705/80 |
| RE36,693 E | 5/2000 | Reich | |
| 6,058,250 A | 5/2000 | Harwood et al. | |
| 6,058,373 A | 5/2000 | Blinn et al. | 705/26 |
| 6,058,378 A | 5/2000 | Clark et al. | 705/37 |
| 6,058,379 A | 5/2000 | Odom et al. | 705/37 |
| 6,058,381 A | 5/2000 | Nelson | 705/40 |
| 6,058,426 A | 5/2000 | Godwin et al. | 709/229 |
| 6,061,506 A | 5/2000 | Wollaston et al. | 395/500 |
| 6,061,593 A | 5/2000 | Fischell et al. | 600/544 |
| 6,061,660 A | 5/2000 | Eggleston et al. | 705/14 |
| 6,061,665 A | 5/2000 | Bahreman | 705/40 |
| 6,061,691 A | 5/2000 | Fox | 707/104 |
| 6,061,792 A | 5/2000 | Simon | 713/176 |
| 6,061,798 A | 5/2000 | Coley et al. | 713/201 |
| 6,063,170 A | 5/2000 | Deibert | 96/224 |
| 6,064,968 A | 5/2000 | Schanz | 705/1 |
| 6,064,971 A | 5/2000 | Hartnett | 705/7 |
| 6,064,982 A | 5/2000 | Puri | 705/27 |
| 6,064,987 A | 5/2000 | Walker et al. | 705/38 |

| | | | | | | |
|---|---|---|---|---|---|---|
| 6,065,819 A | 5/2000 | Holmes et al. ............... 312/215 | | 6,119,105 A | 9/2000 | Williams ...................... 705/39 |
| 6,066,243 A | 5/2000 | Anderson et al. ............. 204/403 | | 6,119,106 A | 9/2000 | Mersky et al. ................. 705/40 |
| 6,067,416 A | 5/2000 | Fraser ........................... 395/712 | | 6,119,149 A | 9/2000 | Notani ......................... 709/205 |
| 6,067,523 A | 5/2000 | Bair et al. ......................... 705/3 | | 6,119,869 A | 9/2000 | Geiman ....................... 209/702 |
| 6,067,525 A | 5/2000 | Johnson et al. ................ 705/10 | | 6,122,625 A | 9/2000 | Rosen ........................... 705/65 |
| 6,067,528 A | 5/2000 | Breed et al. .................... 705/26 | | 6,122,643 A | 9/2000 | Paik et al. .................... 707/104 |
| 6,067,532 A | 5/2000 | Gebb ............................. 705/37 | | 6,122,666 A | 9/2000 | Beurket et al. .............. 709/226 |
| 6,070,145 A | 5/2000 | Pinsley et al. .................. 705/10 | | 6,122,767 A | 9/2000 | Ohara .......................... 714/822 |
| 6,070,150 A | 5/2000 | Remington et al. ............ 705/34 | | 6,125,349 A | 9/2000 | Maher ............................. 705/1 |
| 6,070,250 A | 5/2000 | Yeager et al. ................... 714/11 | | 6,125,352 A | 9/2000 | Franklin et al. ............... 705/26 |
| 6,072,481 A | 6/2000 | Matsushita et al. ........... 345/326 | | 6,125,353 A | 9/2000 | Yagasaki ....................... 705/27 |
| 6,072,870 A | 6/2000 | Nguyen et al. ................. 380/24 | | 6,125,356 A | 9/2000 | Brockman et al. ............ 705/37 |
| 6,073,109 A | 6/2000 | Flores et al. ...................... 705/8 | | 6,125,359 A | 9/2000 | Lautzenheiser et al. ........ 706/60 |
| 6,073,124 A | 6/2000 | Krishnan et al. ............... 705/59 | | 6,125,388 A | 9/2000 | Reisman ....................... 709/218 |
| 6,073,138 A | 6/2000 | de l'Etraz et al. ............. 707/104 | | 6,128,599 A | 10/2000 | Walker et al. ................ 705/14 |
| 6,073,262 A | 6/2000 | Larkin et al. ................... 714/736 | | 6,128,600 A | 10/2000 | Imamura et al. .............. 705/27 |
| 6,074,269 A | 6/2000 | Rothbarth et al. ............. 446/268 | | 6,128,603 A | 10/2000 | Dent et al. .................... 705/40 |
| 6,076,023 A | 6/2000 | Sato ............................... 700/214 | | 6,128,624 A | 10/2000 | Papierniak et al. ........... 707/104 |
| 6,076,066 A | 6/2000 | DiRienzo et al. ................. 705/4 | | 6,131,087 A | 10/2000 | Luke et al. .................... 705/26 |
| 6,076,080 A | 6/2000 | Morscheck et al. ........... 705/400 | | 6,131,088 A | 10/2000 | Hill ............................... 705/27 |
| 6,076,108 A | 6/2000 | Courts et al. .................. 709/227 | | 6,131,099 A | 10/2000 | Johnson et al. ............... 707/104 |
| 6,078,889 A | 6/2000 | Boucher et al. ................... 705/1 | | 6,134,318 A | 10/2000 | O'Neil ........................... 379/266 |
| 6,078,891 A | 6/2000 | Riordan et al. ................. 705/10 | | 6,134,326 A | 10/2000 | Micali ............................. 380/30 |
| 6,078,905 A | 6/2000 | Pich-LeWinter ............... 705/36 | | 6,134,533 A | 10/2000 | Shell ............................. 705/26 |
| 6,078,906 A | 6/2000 | Huberman ....................... 705/37 | | 6,134,534 A | 10/2000 | Walker et al. ................ 705/26 |
| 6,084,581 A | 7/2000 | Hunt ............................... 345/302 | | 6,134,535 A | 10/2000 | Belzberg ........................ 705/37 |
| 6,085,169 A | 7/2000 | Walker et al. .................. 705/26 | | 6,134,663 A | 10/2000 | Nakamura et al. ............ 713/201 |
| 6,085,170 A | 7/2000 | Tsukuda ........................ 705/26 | | 6,137,884 A | 10/2000 | Micali ............................. 380/30 |
| 6,085,176 A | 7/2000 | Woolston ....................... 705/37 | | 6,138,105 A | 10/2000 | Walker et al. ................ 705/10 |
| 6,085,178 A | 7/2000 | Bigus et al. .................... 705/80 | | 6,138,107 A | 10/2000 | Elgamal ........................ 705/39 |
| 6,085,220 A | 7/2000 | Courts et al. .................. 709/201 | | 6,138,119 A | 10/2000 | Hall et al. ........................ 707/9 |
| 6,085,976 A | 7/2000 | Sehr ............................... 235/384 | | 6,138,558 A | 10/2000 | Harrington ................... 100/102 |
| 6,088,626 A | 7/2000 | Lilly et al. ..................... 700/100 | | 6,140,922 A | 10/2000 | Kakou |
| 6,088,683 A | 7/2000 | Jalili ............................... 705/26 | | 6,141,666 A | 10/2000 | Tobin ........................... 707/513 |
| 6,088,688 A | 7/2000 | Crooks et al. ................. 705/412 | | 6,141,750 A | 10/2000 | Micali ........................... 713/168 |
| 6,088,797 A | 7/2000 | Rosen ............................ 713/173 | | 6,144,944 A | 11/2000 | Kurtzman, II ................. 705/14 |
| 6,091,417 A | 7/2000 | Lefkowitz ..................... 345/357 | | 6,144,960 A | 11/2000 | Okada et al. .................. 707/10 |
| 6,091,857 A | 7/2000 | Shaw et al. .................... 382/251 | | 6,144,988 A | 11/2000 | Kappel ......................... 709/202 |
| 6,092,050 A | 7/2000 | Lungren et al. ................ 705/10 | | 6,148,065 A | 11/2000 | Katz ............................. 379/882 |
| 6,092,053 A | 7/2000 | Boesch et al. .................. 705/26 | | 6,148,297 A | 11/2000 | Swor et al. ....................... 707/3 |
| 6,092,056 A | 7/2000 | Tull, Jr. et al. ................. 705/36 | | 6,148,331 A | 11/2000 | Parry ........................... 709/218 |
| 6,097,995 A | 8/2000 | Tipton et al. .................. 700/266 | | 6,149,627 A | 11/2000 | Uber, III ....................... 604/151 |
| 6,098,051 A | 8/2000 | Lupien et al. .................. 705/37 | | 6,151,565 A | 11/2000 | Lobley et al. ................... 703/2 |
| 6,098,106 A | 8/2000 | Philyaw et al. ................ 709/238 | | 6,151,582 A | 11/2000 | Huang et al. .................... 705/8 |
| 6,101,410 A | 8/2000 | Panescu et al. ................ 600/522 | | 6,151,598 A | 11/2000 | Shaw et al. ....................... 707/3 |
| 6,101,480 A | 8/2000 | Conmy et al. .................... 705/9 | | 6,151,600 A | 11/2000 | Dedrick ........................ 707/10 |
| 6,101,485 A | 8/2000 | Fortenberry et al. ........... 705/27 | | 6,151,643 A | 11/2000 | Cheng et al. .................. 710/36 |
| 6,102,958 A | 8/2000 | Meystel et al. ................... 703/2 | | 6,151,707 A | 11/2000 | Hecksel et al. ................ 717/11 |
| 6,104,229 A | 8/2000 | Lien ............................... 327/434 | | 6,154,736 A | 11/2000 | Chickering et al. ........... 706/59 |
| 6,104,868 A | 8/2000 | Peters et al. | | 6,154,879 A | 11/2000 | Pare, Jr. et al. ................... 902/3 |
| 6,105,003 A | 8/2000 | Morohashi et al. ............ 705/26 | | 6,157,721 A | 12/2000 | Shear et al. .................... 380/255 |
| 6,105,005 A | 8/2000 | Fuhrer ............................ 705/35 | | 6,157,915 A | 12/2000 | Bhaskaran et al. .............. 705/7 |
| 6,105,007 A | 8/2000 | Norris ............................. 705/38 | | 6,157,917 A | 12/2000 | Barber ........................... 705/26 |
| 6,105,008 A | 8/2000 | Davis et al. .................... 705/41 | | 6,157,923 A | 12/2000 | Ivler et al. ........................ 707/3 |
| 6,107,768 A | 8/2000 | Ouchi et al. | | 6,157,924 A | 12/2000 | Austin ........................... 707/10 |
| 6,108,635 A | 8/2000 | Herren et al. .................... 705/2 | | 6,157,941 A | 12/2000 | Verkler et al. ................ 709/202 |
| 6,108,639 A | 8/2000 | Walker et al. .................. 705/26 | | 6,160,204 A | 12/2000 | Steffens ........................ 800/284 |
| 6,108,656 A | 8/2000 | Durst et al. .................... 707/10 | | 6,161,098 A | 12/2000 | Wallman ........................ 705/36 |
| 6,108,665 A | 8/2000 | Bair et al. ..................... 707/104 | | 6,161,099 A | 12/2000 | Harrington et al. ............ 705/37 |
| 6,109,774 A | 8/2000 | Holmes et al. | | 6,161,102 A | 12/2000 | Yanagihara et al. ............. 707/3 |
| 6,110,848 A | 8/2000 | Bouchette .................... 442/384 | | 6,163,604 A | 12/2000 | Baulier et al. ................ 379/189 |
| 6,112,181 A | 8/2000 | Shear et al. ....................... 705/1 | | 6,164,537 A | 12/2000 | Mariani et al. ............... 235/383 |
| 6,112,189 A | 8/2000 | Rickard et al. ................. 705/37 | | 6,164,549 A | 12/2000 | Richards ....................... 235/492 |
| 6,112,190 A | 8/2000 | Fletcher et al. ................ 705/38 | | 6,167,378 A | 12/2000 | Webber, et al. .................. 705/8 |
| 6,112,502 A | 9/2000 | Frederick et al. ................ 53/411 | | 6,167,383 A | 12/2000 | Henson ........................ 705/26 |
| 6,113,495 A | 9/2000 | Walker et al. ................... 463/42 | | 6,167,386 A | 12/2000 | Brown ........................... 705/37 |
| 6,113,540 A | 9/2000 | Iliff ............................... 600/300 | | 6,169,488 B1 | 1/2001 | Ketler ........................... 340/632 |
| 6,114,946 A | 9/2000 | Michels | | 6,169,992 B1 | 1/2001 | Beall et al. .................... 707/103 |
| 6,115,690 A | 9/2000 | Wong ............................... 705/7 | | 6,170,002 B1 | 1/2001 | Ouchi ........................... 709/206 |
| 6,115,691 A | 9/2000 | Ulwick ............................. 705/7 | | 6,175,921 B1 | 1/2001 | Rosen ........................... 713/173 |
| 6,115,696 A | 9/2000 | Auger ............................. 705/28 | | 6,178,025 B1 | 1/2001 | Hardcastle et al. ............ 359/177 |
| 6,115,698 A | 9/2000 | Tuck et al. ..................... 705/37 | | 6,178,407 B1 | 1/2001 | Lotvin et al. ................... 705/14 |
| 6,116,461 A | 9/2000 | Broadfield et al. ............. 221/98 | | 6,178,442 B1 | 1/2001 | Yamazaki ..................... 709/206 |
| 6,118,938 A | 9/2000 | Lawman et al. | | 6,178,546 B1 | 1/2001 | McIntyre ........................ 717/3 |
| 6,119,074 A | 9/2000 | Sarangapani ................... 702/185 | | 6,182,053 B1 | 1/2001 | Rauber et al. ................. 705/28 |
| 6,119,099 A | 9/2000 | Walker et al. .................. 705/16 | | 6,182,060 B1 | 1/2001 | Hedgcock et al. .............. 707/1 |
| 6,119,101 A | 9/2000 | Peckover ....................... 705/26 | | 6,182,123 B1 | 1/2001 | Filepp et al. .................. 709/217 |
| 6,119,103 A | 9/2000 | Basch et al. ................... 705/35 | | 6,182,275 B1 | 1/2001 | Beelitz et al. .................. 717/1 |
| 6,119,104 A | 9/2000 | Brumbelow et al. ........... 705/35 | | 6,185,450 B1 | 2/2001 | Seguine et al. ................ 600/509 |

| | | | | | | |
|---|---|---|---|---|---|---|
| 6,185,573 B1 | 2/2001 | Angelucci et al. ............ 707/104 | | 6,256,613 B1 | 7/2001 | Falchuk et al. .................. 705/2 |
| 6,185,665 B1 | 2/2001 | Owada et al. ................. 711/170 | | 6,256,771 B1 | 7/2001 | O'Neil et al. ................... 717/1 |
| 6,185,683 B1 | 2/2001 | Ginter et al. ................. 713/176 | | 6,260,047 B1 | 7/2001 | Fox et al. ..................... 707/104 |
| 6,188,290 B1 | 2/2001 | Fallisgaard et al. ............ 331/18 | | 6,260,427 B1 | 7/2001 | Jones et al. |
| 6,188,988 B1 | 2/2001 | Barry et al. ....................... 705/3 | | 6,263,255 B1 | 7/2001 | Tan et al. ...................... 700/121 |
| 6,188,994 B1 | 2/2001 | Egendorf ......................... 705/40 | | 6,263,313 B1 | 7/2001 | Milsted et al. ................... 705/1 |
| 6,189,008 B1 | 2/2001 | Easty et al. ..................... 707/10 | | 6,266,172 B1 | 7/2001 | Zirngibl ........................ 359/189 |
| 6,192,354 B1 | 2/2001 | Bigus et al. ..................... 706/46 | | 6,266,442 B1 | 7/2001 | Laumeyer et al. ............. 382/190 |
| 6,195,649 B1 | 2/2001 | Gifford ........................... 705/75 | | 6,266,651 B1 | 7/2001 | Woolston ........................ 705/27 |
| 6,199,050 B1 | 3/2001 | Alaia et al. ..................... 705/37 | | 6,266,652 B1 | 7/2001 | Godin et al. .................... 705/37 |
| 6,199,051 B1 | 3/2001 | Gifford ........................... 705/75 | | 6,266,659 B1 | 7/2001 | Nadkarni ......................... 707/3 |
| 6,199,079 B1 | 3/2001 | Gupta et al. ................... 707/507 | | 6,267,670 B1 | 7/2001 | Walker et al. .................... 463/17 |
| 6,199,114 B1 | 3/2001 | White et al. ................... 709/229 | | 6,269,275 B1 | 7/2001 | Slade ............................... 700/90 |
| 6,199,193 B1 | 3/2001 | Oyagi et al. ...................... 717/1 | | 6,269,343 B1 | 7/2001 | Pallakoff ......................... 705/26 |
| 6,199,204 B1 | 3/2001 | Donohue ......................... 717/11 | | 6,269,348 B1 | 7/2001 | Pare, Jr. et al. ................. 705/39 |
| 6,202,038 B1 | 3/2001 | Wegerich et al. ............. 702/183 | | 6,270,456 B1 | 8/2001 | Iliff ................................ 600/300 |
| 6,202,051 B1 | 3/2001 | Woolston ........................ 705/27 | | 6,272,127 B1 | 8/2001 | Golden et al. ................ 370/352 |
| 6,202,054 B1 | 3/2001 | Lawlor et al. ................... 705/42 | | 6,272,482 B1 | 8/2001 | McKee et al. .................. 706/47 |
| 6,204,056 B1 | 3/2001 | Barnes et al. ................. 435/392 | | 6,272,506 B1 | 8/2001 | Bell ............................... 707/507 |
| 6,205,435 B1 | 3/2001 | Biffar .............................. 705/4 | | 6,275,268 B1 | 8/2001 | Ellis et al. ..................... 348/564 |
| 6,205,437 B1 | 3/2001 | Gifford ........................... 705/75 | | 6,275,818 B1 | 8/2001 | Subramanian et al. .......... 707/2 |
| 6,206,282 B1 | 3/2001 | Hayes, Sr. et al. ............ 235/375 | | 6,275,941 B1 | 8/2001 | Saito et al. .................... 713/201 |
| 6,206,829 B1 | 3/2001 | Iliff ................................ 600/300 | | 6,279,042 B1 | 8/2001 | Ouchi ............................ 709/240 |
| 6,209,019 B1 | 3/2001 | Okataku et al. ............... 709/107 | | 6,279,112 B1 | 8/2001 | O'Toole, Jr. et al. ......... 713/201 |
| 6,212,280 B1 | 4/2001 | Howard, Jr. et al. .......... 380/279 | | 6,282,276 B1 | 8/2001 | Felger ............................ 379/144 |
| 6,212,303 B1 | 4/2001 | Doran et al. ................... 382/245 | | 6,282,522 B1 | 8/2001 | Davis et al. ..................... 705/41 |
| 6,212,634 B1 | 4/2001 | Geer, Jr. et al. ............... 713/156 | | 6,282,531 B1 | 8/2001 | Haughton et al. ............... 706/50 |
| 6,212,677 B1 | 4/2001 | Ohkubo et al. ................... 717/7 | | 6,283,366 B1 | 9/2001 | Hills et al. ..................... 235/379 |
| 6,216,108 B1 | 4/2001 | LeVander ......................... 705/7 | | 6,285,722 B1 | 9/2001 | Banwell et al. ............... 375/354 |
| 6,216,114 B1 | 4/2001 | Alaia et al. ..................... 705/37 | | 6,285,987 B1 | 9/2001 | Roth et al. ...................... 705/27 |
| 6,217,525 B1 | 4/2001 | Medema et al. .............. 600/508 | | 6,285,989 B1 | 9/2001 | Shoham ......................... 705/37 |
| 6,219,650 B1 | 4/2001 | Friend et al. ................... 705/36 | | 6,286,002 B1 | 9/2001 | Axaopoulos et al. .......... 707/10 |
| 6,219,652 B1 | 4/2001 | Carter et al. .................... 705/59 | | 6,286,005 B1 | 9/2001 | Cannon ......................... 707/100 |
| 6,219,653 B1 | 4/2001 | O'Neill et al. ................ 705/400 | | 6,286,139 B1 | 9/2001 | Decinque ........................ 725/5 |
| 6,219,736 B1 | 4/2001 | Klingman ...................... 710/129 | | 6,289,252 B1 | 9/2001 | Wilson et al. ................... 700/7 |
| 6,219,930 B1 | 4/2001 | Reid ................................ 33/562 | | 6,289,318 B1 | 9/2001 | Barber ............................. 705/14 |
| 6,220,510 B1 | 4/2001 | Everett et al. ................. 235/380 | | 6,289,390 B1 | 9/2001 | Kavner .......................... 709/310 |
| 6,223,163 B1 | 4/2001 | Van Luchene .................... 705/1 | | 6,289,462 B1 | 9/2001 | McNabb et al. .............. 713/201 |
| 6,223,164 B1 | 4/2001 | Seare et al. ....................... 705/2 | | 6,292,547 B1 | 9/2001 | Katz |
| 6,223,167 B1 | 4/2001 | Alaia et al. ..................... 705/37 | | 6,292,569 B1 | 9/2001 | Shear et al. ................... 380/255 |
| 6,223,215 B1 | 4/2001 | Hunt et al. .................... 709/217 | | 6,292,784 B1 | 9/2001 | Martin et al. ................... 705/11 |
| 6,225,995 B1 | 5/2001 | Jacobs et al. ................. 345/335 | | 6,292,786 B1 | 9/2001 | Deaton et al. ................... 705/14 |
| 6,226,214 B1 | 5/2001 | Choi | | 6,292,787 B1 | 9/2001 | Scott et al. ...................... 705/36 |
| 6,226,617 B1 | 5/2001 | Suzuki et al. ..................... 705/1 | | 6,292,894 B1 | 9/2001 | Chipman et al. ............. 713/168 |
| 6,226,618 B1 | 5/2001 | Downs et al. ..................... 705/1 | | 6,295,513 B1 | 9/2001 | Thackston ........................ 703/1 |
| 6,226,750 B1 | 5/2001 | Trieger ......................... 713/201 | | 6,298,328 B1 | 10/2001 | Healy et al. .................... 705/10 |
| 6,230,142 B1 | 5/2001 | Benigno et al. .................. 705/3 | | 6,298,329 B1 | 10/2001 | Walker et al. ................... 705/14 |
| 6,230,146 B1 | 5/2001 | Alaia et al. ..................... 705/37 | | 6,298,331 B1 | 10/2001 | Walker et al. ................... 705/15 |
| 6,230,147 B1 | 5/2001 | Alaia et al. ..................... 705/37 | | 6,301,574 B1 | 10/2001 | Thomas et al. ................... 707/1 |
| 6,230,148 B1 | 5/2001 | Pare, Jr. et al. .................. 705/40 | | 6,302,461 B1 | 10/2001 | Debras et al. ................. 294/681 |
| 6,230,162 B1 | 5/2001 | Kumar et al. ................. 707/104 | | 6,304,848 B1 | 10/2001 | Singer ............................... 705/3 |
| 6,233,581 B1 | 5/2001 | Rambaud et al. ............. 707/102 | | 6,304,857 B1 | 10/2001 | Heindel et al. ................. 705/34 |
| 6,233,609 B1 | 5/2001 | Mittal ............................ 709/229 | | 6,304,861 B1 | 10/2001 | Ferguson ........................ 706/10 |
| 6,236,975 B1 | 5/2001 | Boe et al. ......................... 705/7 | | 6,304,915 B1 | 10/2001 | Nguyen et al. ................. 709/250 |
| 6,236,980 B1 | 5/2001 | Reese .............................. 705/36 | | 6,306,117 B1 | 10/2001 | Uber, III ........................ 604/151 |
| 6,237,786 B1 | 5/2001 | Ginter et al. ................... 213/153 | | 6,307,958 B1 | 10/2001 | Deaton et al. ................. 382/139 |
| 6,240,185 B1 | 5/2001 | Van Wie et al. .............. 380/232 | | 6,308,138 B1 | 10/2001 | Jones et al. ...................... 702/34 |
| 6,240,396 B1 | 5/2001 | Walker et al. ................... 705/26 | | 6,311,144 B1 | 10/2001 | Abu El Ata ...................... 703/2 |
| H1960 H | 6/2001 | Conrad et al. | | 6,314,451 B1 | 11/2001 | Landsman et al. ............ 709/203 |
| 6,243,691 B1 | 6/2001 | Fisher et al. .................... 705/37 | | 6,314,468 B1 | 11/2001 | Murphy et al. ................ 709/236 |
| 6,246,972 B1 | 6/2001 | Klimasauskas .................. 703/2 | | 6,315,113 B1 | 11/2001 | Britton et al. ................. 206/210 |
| 6,246,996 B1 | 6/2001 | Stein et al. ..................... 705/26 | | 6,317,029 B1 | 11/2001 | Fleeter |
| 6,246,997 B1 | 6/2001 | Cybul et al. .................... 705/27 | | 6,317,723 B1 | 11/2001 | Walker et al. ................... 705/16 |
| 6,247,004 B1 | 6/2001 | Moukheibir ................... 706/46 | | 6,317,727 B1 | 11/2001 | May ............................... 705/37 |
| 6,247,044 B1 | 6/2001 | Gosling et al. ................ 709/203 | | 6,317,728 B1 | 11/2001 | Kane ............................... 705/37 |
| 6,247,592 B1 | 6/2001 | Racicot et al. ................. 206/366 | | 6,317,731 B1 | 11/2001 | Luciano ......................... 706/21 |
| 6,248,985 B1 | 6/2001 | Tomasello .................... 219/679 | | 6,317,761 B1 | 11/2001 | Landsman et al. ............ 707/513 |
| 6,249,772 B1 | 6/2001 | Walker et al. ................... 705/26 | | 6,317,783 B1 | 11/2001 | Freishtat et al. ............... 709/218 |
| 6,249,773 B1 | 6/2001 | Allard et al. .................... 705/26 | | 6,317,900 B1 | 11/2001 | Braxton ............................ 4/483 |
| 6,249,775 B1 | 6/2001 | Freeman et al. ................ 705/36 | | 6,321,224 B1 | 11/2001 | Beall et al. ....................... 707/5 |
| 6,249,912 B1 | 6/2001 | Blandy ............................. 717/9 | | 6,321,231 B1 | 11/2001 | Jebens et al. ................. 707/104 |
| 6,250,465 B1 | 6/2001 | Daniels et al. ................ 206/370 | | 6,321,375 B1 | 11/2001 | Blandy ............................. 717/4 |
| 6,252,510 B1 | 6/2001 | Dungan ........................ 340/632 | | 6,323,894 B1 | 11/2001 | Katz ............................... 348/15 |
| 6,253,186 B1 | 6/2001 | Pendleton, Jr. .................. 705/2 | | 6,324,522 B2 | 11/2001 | Peterson et al. ................ 705/28 |
| 6,253,187 B1 | 6/2001 | Fox ................................ 705/10 | | 6,324,524 B1 | 11/2001 | Lent et al. ....................... 705/38 |
| 6,253,193 B1 | 6/2001 | Ginter et al. ................... 705/57 | | 6,324,525 B1 | 11/2001 | Kramer et al. ................. 705/40 |
| 6,253,205 B1 | 6/2001 | Quarato et al. ................ 707/103 | | 6,324,536 B1 | 11/2001 | Rofrano ........................... 707/5 |
| 6,253,339 B1 | 6/2001 | Tse et al. ......................... 714/47 | | 6,324,538 B1 | 11/2001 | Wesinger, Jr. et al. ......... 707/10 |
| 6,256,536 B1 | 7/2001 | Kramer ............................ 607/9 | | 6,324,541 B1 | 11/2001 | de l'Etraz et al. ............. 707/104 |

| | | | | | |
|---|---|---|---|---|---|
| 6,324,672 B1 | 11/2001 | Lawman et al. ............... 716/1 | 6,389,541 B1 | 5/2002 | Patterson .................. 713/201 |
| 6,327,541 B1 | 12/2001 | Pitchford et al. ............ 702/62 | 6,393,409 B1 | 5/2002 | Young et al. ................ 705/37 |
| 6,327,583 B1 | 12/2001 | Kindo .......................... 706/45 | 6,397,193 B1 | 5/2002 | Walker et al. ............... 705/16 |
| 6,327,619 B1 | 12/2001 | Blumenau ................... 709/224 | 6,397,197 B1 | 5/2002 | Gindlesperger ............. 705/37 |
| 6,328,217 B1 | 12/2001 | Everett et al. ................ 235/492 | 6,397,198 B1 | 5/2002 | Hoffman et al. ............. 705/44 |
| 6,330,525 B1 | 12/2001 | Hays et al. .................. 702/183 | 6,398,245 B1 | 6/2002 | Gruse et al. ................ 280/228 |
| 6,330,546 B1 | 12/2001 | Gopinathan et al. .......... 705/35 | 6,401,078 B1 | 6/2002 | Roberts et al. .............. 705/28 |
| 6,330,548 B1 | 12/2001 | Walker et al. ............... 705/38 | 6,401,080 B1 | 6/2002 | Bigus et al. ................. 705/37 |
| 6,330,551 B1 | 12/2001 | Burchetta et al. ............ 705/80 | 6,401,111 B1 | 6/2002 | Dan et al. ................... 709/204 |
| 6,332,129 B1 | 12/2001 | Walker et al. ............... 705/26 | 6,404,928 B1 | 6/2002 | Shaw et al. ................. 382/232 |
| 6,332,146 B1 | 12/2001 | Jebens et al. ................ 707/104 | 6,405,174 B1 | 6/2002 | Walker et al. ............... 705/14 |
| 6,334,112 B1 | 12/2001 | Walker et al. ............... 705/23 | 6,405,180 B2 | 6/2002 | Tilfors et al. ................ 705/37 |
| 6,334,113 B1 | 12/2001 | Walker et al. ............... 705/23 | 6,405,181 B2 | 6/2002 | Lent et al. ................... 705/38 |
| 6,334,114 B1 | 12/2001 | Jacobs et al. ................ 705/26 | 6,408,215 B1 | 6/2002 | Anderson ................... 700/28 |
| 6,334,192 B1 | 12/2001 | Karpf .......................... 714/1 | 6,408,281 B1 | 6/2002 | Shell et al. .................. 705/26 |
| 6,336,095 B1 | 1/2002 | Rosen ......................... 705/1 | 6,408,283 B1 | 6/2002 | Alaia et al. ................. 705/37 |
| 6,336,104 B1 | 1/2002 | Walker et al. ............... 705/38 | 6,408,284 B1 | 6/2002 | Hilt et al. .................... 705/40 |
| 6,338,007 B1 | 1/2002 | Broadfield et al. .......... 700/231 | 6,411,696 B1 | 6/2002 | Iverson et al. |
| 6,338,045 B1 | 1/2002 | Pappas ......................... 705/29 | 6,415,180 B1 | 7/2002 | Kramer et al. ............... 607/9 |
| 6,338,066 B1 | 1/2002 | Martin et al. ................ 707/10 | 6,415,265 B1 | 7/2002 | Shell et al. .................. 705/26 |
| 6,338,093 B1 | 1/2002 | DiRienzo ..................... 709/238 | 6,415,269 B1 | 7/2002 | Dinwoodie ................. 705/37 |
| 6,339,732 B1 | 1/2002 | Phoon et al. ................. 700/237 | 6,415,271 B1 | 7/2002 | Turk et al. ................... 705/39 |
| 6,341,353 B1 | 1/2002 | Herman et al. .............. 713/201 | 6,415,320 B1 | 7/2002 | Hess et al. ................... 709/219 |
| 6,343,277 B1 | 1/2002 | Gaus et al. ................... 705/37 | 6,418,415 B1 | 7/2002 | Walker et al. ............... 705/26 |
| 6,343,278 B1 | 1/2002 | Jain et al. .................... 705/37 | 6,418,421 B1 | 7/2002 | Hurtado et al. .............. 705/54 |
| 6,343,310 B1 | 1/2002 | DiRienzo ..................... 709/200 | 6,418,470 B2 | 7/2002 | Blumenau ................... 709/224 |
| 6,344,638 B1 | 2/2002 | Tomasello ................... 219/770 | 6,421,652 B2 | 7/2002 | Loeb et al. ................... 705/14 |
| 6,345,090 B1 | 2/2002 | Walker et al. | 6,421,653 B1 | 7/2002 | May ............................ 705/37 |
| 6,345,256 B1 | 2/2002 | Milsted et al. ............... 705/1 | 6,421,667 B1 | 7/2002 | Codd et al. .................. 707/4 |
| 6,349,134 B1 | 2/2002 | Katz | 6,421,781 B1 | 7/2002 | Fox et al. .................... 713/201 |
| 6,349,237 B1 | 2/2002 | Koren et al. ................. 700/96 | 6,424,703 B1 | 7/2002 | Katz |
| 6,349,288 B1 | 2/2002 | Barber ......................... 705/26 | 6,424,949 B1 | 7/2002 | Deaton et al. ................ 705/14 |
| 6,349,324 B1 | 2/2002 | Tokoro ........................ 709/200 | 6,425,006 B1 | 7/2002 | Chari et al. .................. 709/224 |
| 6,351,735 B1 | 2/2002 | Deaton et al. ................ 705/14 | 6,427,140 B1 | 7/2002 | Ginter et al. ................. 705/80 |
| 6,354,490 B1 | 3/2002 | Weiss et al. ................. 235/379 | 6,430,542 B1 | 8/2002 | Moran ......................... 705/36 |
| 6,356,874 B1 | 3/2002 | Øhrn ............................ 705/6 | 6,430,549 B1 | 8/2002 | Gershfield et al. ........... 707/2 |
| 6,356,878 B1 | 3/2002 | Walker et al. ............... 705/26 | 6,430,567 B2 | 8/2002 | Burridge ..................... 707/102 |
| 6,356,921 B1 | 3/2002 | Kumar et al. | 6,430,607 B1 | 8/2002 | Kavner ....................... 709/217 |
| 6,356,945 B1 | 3/2002 | Shaw et al. .................. 709/231 | 6,434,223 B2 | 8/2002 | Katz |
| 6,357,043 B1 | 3/2002 | Ellis et al. .................... 725/61 | 6,434,531 B1 | 8/2002 | Lancelot et al. .............. 705/3 |
| 6,360,249 B1 | 3/2002 | Courts et al. ................ 709/203 | 6,438,527 B1 | 8/2002 | Powar ......................... 705/40 |
| 6,360,273 B1 | 3/2002 | Beurket et al. .............. 709/244 | 6,442,418 B1 | 8/2002 | Evans, III et al. ............ 600/431 |
| 6,363,358 B1 | 3/2002 | Palmer et al. ................ 705/28 | 6,442,513 B1 | 8/2002 | Cheng et al. ................. 703/12 |
| 6,363,393 B1 | 3/2002 | Ribitzky ...................... 707/102 | 6,442,594 B1 | 8/2002 | Ouchi .......................... 709/206 |
| 6,363,411 B1 | 3/2002 | Dugan et al. ................ 709/202 | 6,442,663 B1 | 8/2002 | Sun et al. .................... 711/202 |
| 6,363,488 B1 | 3/2002 | Ginter et al. ................. 713/201 | 6,442,690 B1 | 8/2002 | Howard, Jr. et al. .......... 713/175 |
| 6,366,829 B1 | 4/2002 | Wallace ....................... 700/236 | 6,446,865 B1 | 9/2002 | Holt et al. .................... 235/382 |
| 6,366,890 B1 | 4/2002 | Usrey .......................... 705/10 | 6,448,980 B1 | 9/2002 | Kumar et al. ................ 345/745 |
| 6,366,967 B1 | 4/2002 | Wagner ........................ 710/33 | 6,449,346 B1 | 9/2002 | Katz |
| 6,367,377 B1 | 4/2002 | Gawley et al. ............... 100/49 | 6,449,367 B2 | 9/2002 | Van Wie et al. .............. 380/232 |
| 6,370,510 B1 | 4/2002 | McGovern et al. ........... 705/1 | 6,449,599 B1 | 9/2002 | Payne et al. ................. 705/27 |
| 6,370,567 B1 | 4/2002 | Ouchi .......................... 709/206 | 6,450,356 B1 | 9/2002 | Alexander et al. |
| 6,373,950 B1 | 4/2002 | Rowney ....................... 380/255 | 6,452,924 B1 | 9/2002 | Golden et al. ............... 370/352 |
| 6,374,240 B1 | 4/2002 | Walker et al. ............... 707/5 | 6,453,297 B1 | 9/2002 | Burks et al. .................. 705/3 |
| 6,377,618 B1 | 4/2002 | Prasad et al. ................ 375/225 | 6,453,348 B1 | 9/2002 | Barnier et al. ............... 709/225 |
| 6,377,927 B1 | 4/2002 | Loghmani et al. ............ 704/275 | 6,456,986 B1 | 9/2002 | Boardman et al. ........... 705/400 |
| 6,377,935 B1 | 4/2002 | Deaton et al. ................ 705/14 | 6,457,027 B1 | 9/2002 | Orr .............................. 707/513 |
| 6,377,937 B1 | 4/2002 | Paskowitz .................... 705/26 | 6,457,879 B1 | 10/2002 | Thurlow |
| 6,377,940 B2 | 4/2002 | Tilfors et al. ................ 705/37 | 6,460,020 B1 | 10/2002 | Pool et al. .................... 705/26 |
| 6,377,986 B1 | 4/2002 | Philyaw et al. .............. 709/219 | 6,460,072 B1 | 10/2002 | Arnold et al. ................ 709/203 |
| 6,378,075 B1 | 4/2002 | Goldstein et al. ............ 713/200 | 6,462,761 B1 | 10/2002 | Hasuo ......................... 345/838 |
| 6,381,582 B1 | 4/2002 | Walker et al. ............... 705/26 | 6,463,418 B1 | 10/2002 | Todd ........................... 705/26 |
| 6,381,583 B1 | 4/2002 | Kenney ....................... 705/26 | 6,463,421 B2 | 10/2002 | Junger ......................... 705/28 |
| 6,381,584 B1 | 4/2002 | Ogram ........................ 705/26 | 6,466,663 B1 | 10/2002 | Ravenscroft et al. ......... 379/265 |
| 6,381,587 B1 | 4/2002 | Guzelsu ....................... 705/40 | 6,466,914 B2 | 10/2002 | Mitsuoka et al. ............ 705/9 |
| 6,381,632 B1 | 4/2002 | Lowell ........................ 709/203 | 6,466,915 B1 | 10/2002 | Suzuki et al. ................ 705/14 |
| 6,384,744 B1 | 5/2002 | Philyaw et al. .............. 341/50 | 6,466,919 B1 | 10/2002 | Walker et al. ............... 705/37 |
| 6,385,201 B1 | 5/2002 | Iwata .......................... 370/400 | 6,466,967 B2 | 10/2002 | Landsman et al. ........... 709/203 |
| 6,385,483 B1 | 5/2002 | Uber, III et al. .............. 600/431 | 6,470,303 B2 | 10/2002 | Kidd et al. ................... 703/8 |
| 6,385,595 B1 | 5/2002 | Kolling et al. ............... 705/40 | 6,470,322 B1 | 10/2002 | Walker et al. ............... 705/16 |
| 6,385,596 B1 | 5/2002 | Wiser et al. .................. 705/51 | 6,470,323 B1 | 10/2002 | Suzuki et al. ................ 705/27 |
| 6,385,642 B1 | 5/2002 | Chlan et al. .................. 709/203 | 6,473,744 B1 | 10/2002 | Tuck et al. ................... 705/412 |
| 6,385,646 B1 | 5/2002 | Brown et al. ................ 709/217 | 6,473,748 B1 | 10/2002 | Archer ........................ 706/45 |
| 6,385,723 B1 | 5/2002 | Richards ..................... 713/160 | 6,473,752 B1 | 10/2002 | Fleming, III ................ 707/4 |
| 6,386,386 B1 | 5/2002 | George ........................ 220/526 | 6,477,578 B1 | 11/2002 | Mhoon ........................ 709/229 |
| 6,386,451 B1 | 5/2002 | Sehr ............................. 235/384 | 6,480,894 B1 | 11/2002 | Courts et al. ................ 709/227 |
| 6,389,402 B1 | 5/2002 | Ginter et al. ................. 705/51 | 6,482,156 B2 | 11/2002 | Iliff ............................. 600/300 |
| 6,389,403 B1 | 5/2002 | Dorak, Jr. .................... 705/52 | 6,483,895 B2 | 11/2002 | Bixler et al. ................. 379/671 |
| 6,389,538 B1 | 5/2002 | Gruse et al. ................. 713/194 | 6,484,149 B1 | 11/2002 | Jammes et al. .............. 705/26 |

| Patent | Date | Inventor | Class |
|---|---|---|---|
| 6,484,153 B1 | 11/2002 | Walker et al. | 705/38 |
| 6,484,158 B1 | 11/2002 | Johnson et al. | 707/2 |
| 6,484,165 B1 | 11/2002 | Beall et al. | 707/3 |
| 6,484,189 B1 | 11/2002 | Gerlach, Jr. et al. | |
| 6,486,895 B1 | 11/2002 | Robertson et al. | 345/776 |
| 6,488,211 B1 | 12/2002 | Everett et al. | 235/492 |
| 6,488,675 B1 | 12/2002 | Radford et al. | 604/540 |
| 6,490,350 B2 | 12/2002 | McDuff et al. | |
| 6,490,358 B1 | 12/2002 | Geer, Jr. et al. | 380/286 |
| 6,490,567 B1 | 12/2002 | Gregory | 705/39 |
| 6,490,587 B2 | 12/2002 | Easty et al. | 707/10 |
| 6,493,682 B1 | 12/2002 | Horrigan et al. | 705/36 |
| 6,493,686 B1 | 12/2002 | Francone et al. | 706/12 |
| 6,496,932 B1 | 12/2002 | Trieger | 713/168 |
| 6,499,018 B1 | 12/2002 | Alaia et al. | 705/37 |
| 6,499,270 B2 | 12/2002 | Peroni et al. | 53/53 |
| 6,502,096 B1 | 12/2002 | Siefert | 707/10 |
| 6,505,172 B1 | 1/2003 | Johnson et al. | 705/27 |
| 6,505,174 B1 | 1/2003 | Keiser et al. | 705/37 |
| 6,505,773 B1 | 1/2003 | Palmer et al. | 235/380 |
| 6,507,822 B1 | 1/2003 | Walker et al. | 705/20 |
| 6,507,823 B1 | 1/2003 | Nel | 705/26 |
| 6,510,418 B1 | 1/2003 | Case et al. | 705/26 |
| 6,512,415 B1 | 1/2003 | Katz | |
| 6,513,014 B1 | 1/2003 | Walker et al. | 705/10 |
| 6,516,303 B1 | 2/2003 | Wallman | 705/36 |
| 6,516,318 B2 | 2/2003 | Nakamura et al. | 707/10 |
| 6,516,338 B1 | 2/2003 | Landsman et al. | 709/203 |
| 6,519,572 B1 | 2/2003 | Riordan et al. | 705/16 |
| 6,519,600 B1 | 2/2003 | Siefert | 707/10 |
| 6,526,449 B1 | 2/2003 | Philyaw et al. | 709/238 |
| 6,529,908 B1 | 3/2003 | Piett et al. | 707/10 |
| 6,535,294 B1 | 3/2003 | Arledge, Jr. et al. | 358/115 |
| 6,535,913 B2 | 3/2003 | Mittal et al. | 709/219 |
| 6,539,404 B1 | 3/2003 | Ouchi | 707/500 |
| 6,542,874 B1 | 4/2003 | Walker et al. | 705/23 |
| 6,546,005 B1 | 4/2003 | Berkley et al. | 370/353 |
| 6,546,545 B1 | 4/2003 | Honarvar et al. | 717/100 |
| 6,549,891 B1 | 4/2003 | Rauber et al. | 705/28 |
| 6,552,723 B1 | 4/2003 | Duluk, Jr. et al. | 345/419 |
| 6,553,108 B1 | 4/2003 | Felger | 379/144 |
| 6,553,346 B1 | 4/2003 | Walker et al. | 705/1 |
| 6,553,407 B1 | 4/2003 | Ouchi | 709/206 |
| 6,556,977 B1 | 4/2003 | Lapointe et al. | 706/15 |
| 6,557,054 B2 | 4/2003 | Reisman | 710/33 |
| 6,560,549 B2 | 5/2003 | Fonkalsrud et al. | 702/41 |
| 6,560,569 B1 | 5/2003 | Abu El Ata | 703/2 |
| 6,560,581 B1 | 5/2003 | Fox et al. | 705/51 |
| 6,564,240 B2 | 5/2003 | Waldo et al. | 709/104 |
| 6,565,000 B2 | 5/2003 | Sehr | 235/384 |
| 6,567,783 B1 | 5/2003 | Notani et al. | 705/9 |
| 6,567,791 B2 | 5/2003 | Lent et al. | 705/38 |
| 6,567,820 B1 | 5/2003 | Scheifler et al. | 707/103 |
| 6,567,824 B2 | 5/2003 | Fox | |
| 6,570,967 B2 | 5/2003 | Katz | |
| 6,571,149 B1 | 5/2003 | Hahn-Carlson | 700/216 |
| 6,571,251 B1 | 5/2003 | Koski et al. | 707/102 |
| 6,574,314 B1 | 6/2003 | Martino | |
| 6,574,607 B1 | 6/2003 | Carter et al. | 705/26 |
| 6,574,609 B1 | 6/2003 | Downs et al. | 705/50 |
| 6,575,372 B1 | 6/2003 | Everett et al. | 235/492 |
| 6,578,012 B1 | 6/2003 | Storey | 705/14 |
| 6,578,024 B2 | 6/2003 | Kuypers | 707/1 |
| 6,581,042 B2 | 6/2003 | Pare, Jr. et al. | 705/40 |
| 6,582,304 B2 | 6/2003 | Walker et al. | 463/17 |
| 6,582,310 B1 | 6/2003 | Walker et al. | 463/42 |
| 6,584,445 B2 | 6/2003 | Papageorge | 705/3 |
| 6,584,448 B1 | 6/2003 | Laor | 705/14 |
| 6,587,830 B2 | 7/2003 | Singer | 705/3 |
| 6,587,837 B1 | 7/2003 | Spagna et al. | 705/26 |
| 6,594,643 B1 | 7/2003 | Freeny, Jr. | 705/37 |
| 6,594,644 B1 | 7/2003 | Van Dusen | 705/39 |
| 6,594,692 B1 | 7/2003 | Reisman | 709/219 |
| 6,594,705 B1 | 7/2003 | Philyaw | 709/238 |
| 6,598,024 B1 | 7/2003 | Walker et al. | 705/16 |
| 6,598,029 B1 | 7/2003 | Johnson et al. | 705/37 |
| 6,599,324 B2 | 7/2003 | Saito et al. | 715/513 |
| 6,601,034 B1 | 7/2003 | Honarvar et al. | 705/7 |
| 6,601,036 B1 | 7/2003 | Walker et al. | 705/10 |
| 6,601,037 B1 | 7/2003 | Kolls | 705/14 |
| 6,601,038 B1 | 7/2003 | Kolls | 705/14 |
| 6,601,039 B1 | 7/2003 | Kolls | 705/14 |
| 6,601,040 B1 | 7/2003 | Kolls | 705/14 |
| 6,601,043 B1 | 7/2003 | Purcell | 705/26 |
| 6,601,044 B1 | 7/2003 | Wallman | 705/36 |
| 6,601,761 B1 | 8/2003 | Katis | 235/379 |
| 6,604,085 B1 | 8/2003 | Kolls | 705/14 |
| 6,604,086 B1 | 8/2003 | Kolls | 705/14 |
| 6,604,087 B1 | 8/2003 | Kolls | 705/14 |
| 6,604,088 B1 | 8/2003 | Landom et al. | 705/26 |
| 6,604,090 B1 | 8/2003 | Tackett et al. | 706/11 |
| 6,604,127 B2 | 8/2003 | Murphy et al. | 709/203 |
| 6,606,479 B2 | 8/2003 | Cook et al. | 434/350 |
| 6,606,602 B1 | 8/2003 | Kolls | 705/14 |
| 6,606,603 B1 | 8/2003 | Joseph et al. | 705/26 |
| 6,606,605 B1 | 8/2003 | Kolls | 705/26 |
| 6,608,628 B1 | 8/2003 | Ross et al. | 345/619 |
| 6,609,036 B1 | 8/2003 | Bickford | 700/30 |
| 6,609,102 B2 | 8/2003 | Kolls | 705/14 |
| 6,609,103 B1 | 8/2003 | Kolls | 705/14 |
| 6,609,109 B1 | 8/2003 | Bradley et al. | 705/35 |
| 6,609,120 B1 | 8/2003 | Honarvar et al. | 707/3 |
| 6,609,658 B1 | 8/2003 | Sehr | 235/384 |
| 6,609,659 B2 | 8/2003 | Sehr | 235/384 |
| 6,611,807 B1 | 8/2003 | Bernheim et al. | 705/4 |
| 6,611,810 B1 | 8/2003 | Kolls | 705/14 |
| 6,611,812 B2 | 8/2003 | Hurtado et al. | 705/26 |
| 6,611,818 B1 | 8/2003 | Mersky et al. | 705/40 |
| 6,611,862 B2 | 8/2003 | Reisman | 709/217 |
| 6,615,073 B1 | 9/2003 | Panescu et al. | 600/509 |
| 6,615,183 B1 | 9/2003 | Kolls | 705/26 |
| 6,615,268 B1 | 9/2003 | Philyaw et al. | 709/229 |
| 6,618,484 B1 | 9/2003 | Weber et al. | 380/232 |
| 6,618,707 B1 | 9/2003 | Gary | 705/37 |
| 6,618,746 B2 | 9/2003 | Desai et al. | 709/204 |
| 6,622,124 B1 | 9/2003 | Kolls | 705/14 |
| 6,622,165 B1 | 9/2003 | Philyaw | 709/217 |
| 6,629,079 B1 | 9/2003 | Spiegel et al. | 705/26 |
| 6,629,133 B1 | 9/2003 | Philyaw et al. | 709/217 |
| 6,629,154 B1 | 9/2003 | Jones et al. | 709/330 |
| 6,631,404 B1 | 10/2003 | Philyaw | 709/217 |
| 6,633,795 B1 | 10/2003 | Suzuki et al. | 700/213 |
| 6,636,833 B1 | 10/2003 | Flitcroft et al. | 705/1 |
| 6,636,892 B1 | 10/2003 | Philyaw | 709/217 |
| 6,636,896 B1 | 10/2003 | Philyaw | 709/238 |
| 6,641,532 B2 | 11/2003 | Iliff | 600/300 |
| 6,643,623 B1 | 11/2003 | Kolls | 705/14 |
| 6,643,624 B2 | 11/2003 | Philippe et al. | 705/26 |
| 6,643,692 B1 | 11/2003 | Philyaw et al. | 709/219 |
| 6,647,384 B2 | 11/2003 | Gilmour | 707/5 |
| 6,654,786 B1 | 11/2003 | Fox et al. | 709/203 |
| 6,654,793 B1 | 11/2003 | Wollrath et al. | 709/217 |
| 6,658,106 B1 | 12/2003 | Atkinson et al. | |
| 6,658,464 B2 | 12/2003 | Reisman | 709/219 |
| 6,658,568 B1 | 12/2003 | Ginter et al. | 713/193 |
| 6,659,354 B2 | 12/2003 | Everett et al. | 235/492 |
| 6,662,166 B2 | 12/2003 | Pare, Jr. et al. | 705/39 |
| 6,664,860 B2 | 12/2003 | Fallisgaard et al. | 331/18 |
| 6,669,832 B1 | 12/2003 | Saito et al. | 205/26 |
| 6,678,360 B1 | 1/2004 | Katz | 379/882 |
| 6,678,669 B2 | 1/2004 | Lapointe et al. | 706/15 |
| 6,681,010 B1 | 1/2004 | Anderson et al. | |
| 6,684,197 B1 | 1/2004 | Kolls | 705/41 |
| 6,684,269 B2 | 1/2004 | Wagner | 710/33 |
| RE38,432 E | 2/2004 | Fai et al. | 434/350 |
| 6,687,737 B2 | 2/2004 | Landsman et al. | 709/203 |
| 6,688,522 B1 | 2/2004 | Philyaw et al. | |
| 6,688,888 B1 | 2/2004 | Ho et al. | 434/322 |
| 6,690,794 B1 | 2/2004 | Terao et al. | 380/22 |
| 6,691,147 B1 | 2/2004 | Arunkumar et al. | 709/200 |
| 6,694,300 B1 | 2/2004 | Walker et al. | 705/14 |
| 6,694,356 B1 | 2/2004 | Philyaw | 709/217 |
| 6,694,365 B1 | 2/2004 | Wyngarden | 709/225 |
| 6,694,387 B2 | 2/2004 | Wagner | 710/33 |
| 6,697,783 B1 | 2/2004 | Brinkman et al. | 705/3 |
| 6,697,784 B2 | 2/2004 | Bacon et al. | 705/9 |
| 6,697,861 B2 | 2/2004 | Barnier et al. | 709/225 |
| 6,697,949 B1 | 2/2004 | Philyaw et al. | 713/201 |

| | | | |
|---|---|---|---|
| 6,701,315 B1 | 3/2004 | Austin .......................... 707/10 |
| 6,701,354 B1 | 3/2004 | Philyaw et al. .............. 709/219 |
| 6,701,369 B1 | 3/2004 | Philyaw ..................... 709/229 |
| 6,704,713 B1 | 3/2004 | Brett ............................. 705/37 |
| 6,704,749 B2 | 3/2004 | Palmer et al. |
| 6,704,756 B2 | 3/2004 | Wollrath et al. ............ 707/206 |
| 6,708,208 B1 | 3/2004 | Philyaw ........................ 709/223 |
| 6,710,786 B1 | 3/2004 | Jacobs et al. ............... 345/744 |
| 6,711,256 B1 | 3/2004 | O'Neil |
| 6,714,196 B2 | 3/2004 | McCormack et al. ....... 345/423 |
| 6,714,919 B1 | 3/2004 | Findley ........................ 705/44 |
| 6,725,209 B1 | 4/2004 | Iliff ............................... 706/45 |
| 6,725,260 B1 | 4/2004 | Philyaw ........................ 709/220 |
| 6,725,447 B1 | 4/2004 | Gilman et al. .............. 717/105 |
| 6,727,294 B2 | 4/2004 | Kanayama et al. .......... 523/136 |
| 6,728,737 B2 | 4/2004 | Wollrath et al. ............ 707/206 |
| 6,728,947 B1 | 4/2004 | Bengston ..................... 717/103 |
| 6,731,625 B1 | 5/2004 | Eastep et al. ................ 370/352 |
| 6,731,971 B2 | 5/2004 | Evans, III et al. ............ 600/431 |
| 6,732,161 B1 | 5/2004 | Hess et al. .................... 709/219 |
| 6,735,574 B2 | 5/2004 | Bull .............................. 705/32 |
| 6,735,596 B2 | 5/2004 | Corynen ...................... 707/102 |
| 6,736,325 B1 | 5/2004 | Peacham ..................... 235/492 |
| 6,738,749 B1 | 5/2004 | Chasko ........................ 705/17 |
| 6,739,947 B1 | 5/2004 | Molnar ........................ 451/8 |
| 6,742,120 B1 | 5/2004 | Markakis et al. ........... 713/184 |
| 6,742,127 B2 | 5/2004 | Fox et al. ..................... 713/201 |
| 6,742,715 B2 | 6/2004 | Everett et al. ............... 235/492 |
| 6,744,894 B1 | 6/2004 | Saito ........................... 380/277 |
| 6,745,234 B1 | 6/2004 | Philyaw et al. .............. 709/219 |
| 6,745,259 B2 | 6/2004 | Wagner ....................... 710/33 |
| 6,748,376 B1 | 6/2004 | Beall et al. ................... 707/3 |
| 6,754,636 B1 | 6/2004 | Walker et al. ................ 705/26 |
| 6,754,641 B2 | 6/2004 | Kolls ............................ 705/44 |
| 6,754,698 B1 | 6/2004 | Philyaw et al. .............. 709/217 |
| 6,757,663 B1 | 6/2004 | Rogers et al. ................ 705/24 |
| 6,757,710 B2 | 6/2004 | Reed ............................ 709/203 |
| 6,758,398 B1 | 7/2004 | Philyaw et al. .............. 235/454 |
| 6,760,736 B2 | 7/2004 | Waldo et al. ................ 707/206 |
| 6,761,319 B2 | 7/2004 | Peachman et al. ........... 235/492 |
| 6,763,336 B1 | 7/2004 | Kolls ............................ 705/44 |
| 6,769,009 B1 | 7/2004 | Reisman ...................... 709/201 |
| 6,771,317 B2 | 8/2004 | Ellis et al. ..................... 348/569 |
| 6,772,162 B2 | 8/2004 | Waldo et al. ................ 707/10 |
| 6,782,087 B1 | 8/2004 | Atkinson et al. |
| 6,785,659 B1 | 8/2004 | Landsman et al. .......... 705/14 |
| 6,785,661 B1 | 8/2004 | Dixon et al. ................. 705/39 |
| 6,788,997 B1 | 9/2004 | Frederick .................... 700/236 |
| 6,791,588 B1 | 9/2004 | Philyaw ....................... 345/862 |
| 6,792,452 B1 | 9/2004 | Philyaw ....................... 709/217 |
| 6,796,492 B1 | 9/2004 | Gatto ........................... 235/379 |
| 6,799,174 B2 | 9/2004 | Chipman et al. ............. 707/3 |
| 6,799,725 B1 | 10/2004 | Hess et al. |
| 6,801,820 B1 | 10/2004 | Lilly et al. .................... 700/100 |
| 6,804,783 B1 | 10/2004 | Wesinger, Jr. et al. ....... 713/200 |
| 6,807,532 B1 | 10/2004 | Kolls ............................ 705/10 |
| 6,816,875 B2 | 11/2004 | Wollrath et al. ............ 707/206 |
| 6,816,894 B1 | 11/2004 | Philyaw et al. .............. 709/219 |
| 6,823,388 B1 | 11/2004 | Philyaw et al. .............. 709/227 |
| 6,824,057 B2 | 11/2004 | Rathus et al. |
| 6,826,592 B1 | 11/2004 | Philyaw et al. .............. 709/202 |
| 6,827,267 B2 | 12/2004 | Rathus et al. |
| 6,829,595 B2 | 12/2004 | Justice ......................... 705/64 |
| 6,829,650 B1 | 12/2004 | Philyaw et al. .............. 709/238 |
| 6,830,187 B2 | 12/2004 | Rathus et al. |
| 6,830,188 B2 | 12/2004 | Rathus et al. |
| 6,832,223 B1 | 12/2004 | Scheifler et al. ............. 707/10 |
| 6,834,268 B2 | 12/2004 | Junger .......................... 705/28 |
| 6,834,804 B2 | 12/2004 | Rathus et al. |
| 6,836,799 B1 | 12/2004 | Philyaw et al. .............. 709/224 |
| 6,839,687 B1 | 1/2005 | Dent et al. ................... 705/40 |
| 6,843,411 B2 | 1/2005 | Rathus et al. ................ 235/375 |
| 6,843,417 B1 | 1/2005 | Philyaw et al. |
| 6,843,419 B2 | 1/2005 | Rathus et al. |
| 6,845,364 B1 | 1/2005 | Pool et al. .................... 705/26 |
| 6,845,388 B1 | 1/2005 | Philyaw ....................... 709/204 |
| 6,845,505 B1 | 1/2005 | Adunuthula et al. ........ 718/105 |
| 6,847,854 B2 | 1/2005 | Discenzo ..................... 700/99 |
| 6,847,965 B2 | 1/2005 | Walker et al. ................ 707/5 |
| 6,849,045 B2 | 2/2005 | Iliff .............................. 600/300 |
| 6,850,907 B2 | 2/2005 | Lutnick et al. ............... 705/37 |
| 6,850,918 B1 | 2/2005 | Burchetta et al. ............ 705/80 |
| 6,850,996 B2 | 2/2005 | Wagner ....................... 710/33 |
| 6,859,787 B2 | 2/2005 | Fisher et al. .................. 705/26 |
| 6,859,791 B1 | 2/2005 | Spagna et al. ................ 705/51 |
| 6,860,424 B1 | 3/2005 | Philyaw et al. |
| 6,862,732 B1 | 3/2005 | Schultz et al. ............... 718/102 |
| 6,868,403 B1 | 3/2005 | Wiser et al. .................. 705/51 |
| 6,868,408 B1 | 3/2005 | Rosen .......................... 705/64 |
| 6,868,433 B1 | 3/2005 | Philyaw ....................... 709/203 |
| 6,871,220 B1 | 3/2005 | Rajan et al. .................. 709/218 |
| 6,873,978 B1 | 3/2005 | Boucher et al. .............. 705/401 |
| 6,876,978 B1 | 4/2005 | Walker et al. ................ 705/26 |
| 6,876,991 B1 | 4/2005 | Owen et al. .................. 706/46 |
| 6,877,032 B1 | 4/2005 | Philyaw ....................... 709/217 |
| 6,879,962 B1 | 4/2005 | Smith et al. .................. 705/22 |
| 6,879,966 B1 | 4/2005 | Lapsley et al. ............... 705/78 |
| 6,880,123 B1 | 4/2005 | Landsman et al. |
| 6,882,981 B2 | 4/2005 | Philippe et al. .............. 705/26 |
| 6,885,981 B2 | 4/2005 | Bomar, Jr. et al. ........... 703/8 |
| 6,885,994 B1 | 4/2005 | Scroggie et al. ............. 705/14 |
| 6,886,750 B2 | 5/2005 | Rathus et al. |
| 6,889,074 B2 | 5/2005 | Uber, III et al. ............. 600/431 |
| 6,889,194 B1 | 5/2005 | Kadaba ........................ 705/1 |
| 6,889,198 B2 | 5/2005 | Kawan ......................... 705/14 |
| 6,889,214 B1 | 5/2005 | Pagel et al. ................... 705/410 |
| 6,889,299 B1 | 5/2005 | Brooks ........................ 382/115 |
| 6,898,469 B2 | 5/2005 | Bickford ...................... 700/30 |
| 6,898,581 B1 | 5/2005 | Cordery et al. .............. 705/400 |
| 6,898,591 B1 | 5/2005 | Moon et al. .................. 707/3 |
| 6,901,240 B2 | 5/2005 | Tokoro ........................ 455/303 |
| 6,901,283 B2 | 5/2005 | Evans, III et al. ............ 600/431 |
| 6,901,301 B2 | 5/2005 | Bradshaw .................... 700/48 |
| 6,901,393 B1 | 5/2005 | Owen et al. .................. 706/46 |
| 6,901,433 B2 | 5/2005 | San Andres et al. ......... 709/216 |
| 6,907,315 B1 | 6/2005 | Hartman et al. ............. 700/216 |
| 6,907,399 B1 | 6/2005 | Cordery et al. .............. 705/1 |
| 6,907,405 B2 | 6/2005 | Brett ............................ 705/37 |
| 6,910,047 B1 | 6/2005 | Boucher et al. .............. 707/103 |
| 6,910,628 B1 | 6/2005 | Sehr ............................. 235/384 |
| 6,912,510 B1 | 6/2005 | Shepherd ..................... 705/37 |
| 6,915,169 B2 | 7/2005 | Flynn et al. .................. 607/122 |
| 6,915,271 B1 | 7/2005 | Meyer et al. ................. 705/14 |
| 6,920,433 B1 | 7/2005 | Seretti et al. ................. 705/37 |
| 6,925,444 B1 | 8/2005 | McCollom et al. .......... 705/14 |
| 6,925,644 B2 | 8/2005 | Waldo et al. ................ 718/104 |
| 6,926,203 B1 | 8/2005 | Sehr ............................. 235/492 |
| 6,929,182 B2 | 8/2005 | Rathus et al. |
| 6,938,007 B1 | 8/2005 | Iulianello et al. ............ 705/34 |
| 6,938,021 B2 | 8/2005 | Shear et al. .................. 705/67 |
| 6,938,263 B2 | 8/2005 | Wollrath et al. ............ 719/330 |
| 6,941,273 B1 | 9/2005 | Loghmani et al. ........... 705/26 |
| 6,941,454 B1 | 9/2005 | Spraggs ........................ 713/150 |
| 6,945,457 B1 | 9/2005 | Barcelou ...................... 235/380 |
| 6,951,008 B2 | 9/2005 | Quaile .......................... 706/54 |
| 6,954,741 B1 | 10/2005 | Burchetta et al. ............ 705/80 |
| 6,954,782 B2 | 10/2005 | Thurlow et al. ............. 709/206 |
| 6,954,802 B2 | 10/2005 | Sutherland et al. .......... 710/5 |
| 6,957,202 B2 | 10/2005 | Skaanning et al. ........... 706/20 |
| 6,957,427 B1 | 10/2005 | Wollrath et al. ............ 718/1 |
| 6,959,288 B1 | 10/2005 | Medina et al. ............... 705/51 |
| 6,963,847 B1 | 11/2005 | Kennedy et al. ............. 705/8 |
| 6,963,856 B2 | 11/2005 | Lutnick et al. ............... 705/37 |
| 6,965,272 B2 | 11/2005 | Trefethen et al. ............ 331/44 |
| 6,968,319 B1 | 11/2005 | Remington et al. .......... 705/40 |
| 6,968,375 B1 | 11/2005 | Brown ......................... 709/224 |
| 6,970,914 B1 | 11/2005 | Philyaw et al. .............. 709/217 |
| 6,973,477 B1 | 12/2005 | Martino ....................... 709/203 |
| 6,980,968 B1 | 12/2005 | Walker et al. ................ 705/38 |
| 6,981,059 B1 | 12/2005 | Philyaw et al. .............. 709/245 |
| 6,983,227 B1 | 1/2006 | Thalhammer-Reyero ... 703/2 |
| 6,983,253 B1 | 1/2006 | Maul et al. ................... 705/4 |
| 6,983,257 B2 | 1/2006 | Gatto ........................... 705/36 |
| 6,983,371 B1 | 1/2006 | Hurtado et al. .............. 713/189 |
| 6,985,888 B1 | 1/2006 | Cordery et al. .............. 705/60 |
| 6,985,954 B1 | 1/2006 | Philyaw et al. .............. 709/229 |
| 6,990,630 B2 | 1/2006 | Landsman et al. .......... 715/500 |
| 6,993,572 B2 | 1/2006 | Ross, Jr. et al. ............. 709/218 |

| Patent | Date | Inventor | Class |
|---|---|---|---|
| 6,996,535 B1 | 2/2006 | Ono et al. | 705/26 |
| 6,996,539 B1 | 2/2006 | Wallman | 705/36 |
| 6,996,542 B1 | 2/2006 | Landry | 705/40 |
| 6,999,938 B1 | 2/2006 | Libman | 705/10 |
| 7,006,989 B2 | 2/2006 | Bezos et al. | 705/26 |
| 7,007,166 B1 | 2/2006 | Moskowitz et al. | 713/176 |
| 7,010,577 B1 | 3/2006 | Philyaw et al. | 709/217 |
| 7,016,863 B1 | 3/2006 | Kamakura et al. | 705/26 |
| 7,016,870 B1 | 3/2006 | Jones et al. | 705/35 |
| 7,016,878 B2 | 3/2006 | Yoshioka et al. | 705/51 |
| 7,020,622 B1 | 3/2006 | Messer | 705/26 |
| 7,020,631 B2 | 3/2006 | Freeman et al. | 705/36 R |
| 7,024,377 B1 | 4/2006 | Goldschmidt et al. | 705/26 |
| 7,028,034 B2 | 4/2006 | Wesinger, Jr. et al. | 707/10 |
| 7,028,187 B1 | 4/2006 | Rosen | 713/175 |
| 7,031,901 B2 | 4/2006 | Abu El Ata | 703/21 |
| 7,035,786 B1 | 4/2006 | Abu El Ata et al. | 703/21 |
| 7,035,832 B1 | 4/2006 | Kara | 705/408 |
| 7,039,595 B1 | 5/2006 | Lilly et al. | 705/8 |
| 7,039,597 B1 | 5/2006 | Notani et al. | 705/9 |
| 7,039,599 B2 | 5/2006 | Merriman et al. | 705/14 |
| 7,039,603 B2 | 5/2006 | Walker et al. | 705/26 |
| 7,040,504 B2 | 5/2006 | Broadfield et al. | 221/98 |
| 7,043,441 B1 | 5/2006 | Maher | 705/1 |
| 7,043,536 B1 | 5/2006 | Philyaw et al. | 709/217 |
| 7,044,993 B1 | 5/2006 | Bolduc | 55/524 |
| 7,047,218 B1 | 5/2006 | Wallman | 705/36 R |
| 7,050,873 B1 | 5/2006 | Discenzo | 700/99 |
| 7,050,995 B2 | 5/2006 | Wojcik et al. | 705/28 |
| 7,051,212 B2 | 5/2006 | Ginter et al. | 713/193 |
| 7,054,830 B1 | 5/2006 | Eggleston et al. | 705/14 |
| 7,058,596 B1 | 6/2006 | Wojcik et al. | 705/26 |
| 7,058,954 B1 | 6/2006 | Wollrath et al. | 719/310 |
| 7,062,274 B1 | 6/2006 | Shell et al. | 455/445 |
| 7,062,458 B2 | 6/2006 | Maggioncalda et al. | 705/36 |
| 7,062,500 B1 | 6/2006 | Hall et al. | 707/102 |
| 7,062,757 B2 | 6/2006 | Honarvar et al. | 717/127 |
| 7,069,451 B1 | 6/2006 | Ginter et al. | 713/200 |
| 7,069,576 B1 | 6/2006 | Knudson et al. | 725/110 |
| 7,069,582 B2 | 6/2006 | Philyaw et al. | 726/3 |
| 7,072,850 B1 | 7/2006 | Van Luchene | 705/14 |
| 7,076,453 B2 | 7/2006 | Jammes et al. | 705/26 |
| 7,076,456 B1 | 7/2006 | Rofrano | 705/27 |
| 7,076,458 B2 | 7/2006 | Lawlor et al. | 705/35 |
| 7,076,475 B2 | 7/2006 | Honarvar | 706/47 |
| 7,076,652 B2 | 7/2006 | Ginter et al. | 713/153 |
| 7,080,544 B2 | 7/2006 | Stepanik et al. | 73/31.02 |
| 7,082,426 B2 | 7/2006 | Musgrove et al. | 707/3 |
| 7,085,366 B2 | 8/2006 | O'Neil | |
| 7,085,729 B1 | 8/2006 | Kennedy et al. | 705/10 |
| 7,089,209 B1 | 8/2006 | Kolls | 705/39 |
| 7,089,291 B1 | 8/2006 | Philyaw | 709/217 |
| 7,092,897 B2 | 8/2006 | Wallace | 705/22 |
| 7,092,914 B1 | 8/2006 | Shear et al. | 705/67 |
| 7,095,840 B2 | 8/2006 | Dezonno et al. | |
| 7,095,854 B1 | 8/2006 | Ginter et al. | 380/233 |
| 7,099,832 B2 | 8/2006 | Walker et al. | 705/14 |
| 7,100,199 B2 | 8/2006 | Ginter et al. | 726/4 |
| 7,103,568 B1 | 9/2006 | Fusz et al. | 705/26 |
| 7,103,594 B1 | 9/2006 | Wolfe | 707/5 |
| 7,107,224 B1 | 9/2006 | Weller et al. | 705/10 |
| 7,107,228 B1 | 9/2006 | Walker et al. | 705/26 |
| 7,107,244 B2 | 9/2006 | Kight et al. | 705/40 |
| 7,110,959 B2 | 9/2006 | Hahn-Carlson | 705/8 |
| 7,110,971 B2 | 9/2006 | Wallman | 705/36 |
| 7,110,983 B2 | 9/2006 | Shear et al. | 705/55 |
| 7,110,984 B1 | 9/2006 | Spagna et al. | 705/57 |
| 7,117,162 B1 | 10/2006 | Seal et al. | 705/9 |
| 7,117,165 B1 | 10/2006 | Adams et al. | 705/26 |
| 7,117,176 B2 | 10/2006 | Wallman | 705/36 |
| 7,117,240 B1 | 10/2006 | Philyaw et al. | 709/201 |
| 7,120,800 B2 | 10/2006 | Ginter et al. | 713/193 |
| 7,120,802 B2 | 10/2006 | Shear et al. | 713/194 |
| 7,124,092 B2 | 10/2006 | O'Toole, Jr. et al. | 705/14 |
| 7,124,302 B2 | 10/2006 | Ginter et al. | 713/189 |
| 7,127,464 B2 | 10/2006 | Wesinger, Jr. et al. | 707/10 |
| 7,127,478 B2 | 10/2006 | Schoenwolf et al. | 707/204 |
| 7,127,495 B2 | 10/2006 | Brown et al. | 709/217 |
| 7,130,807 B1 | 10/2006 | Mikurak | 705/7 |
| 7,130,818 B2 | 10/2006 | Fisher et al. | 705/26 |
| 7,130,823 B2 | 10/2006 | Rayner et al. | 705/37 |
| 7,130,828 B2 | 10/2006 | Phillips et al. | 705/41 |
| 7,130,888 B1 | 10/2006 | Hickman et al. | 709/208 |
| 7,131,890 B1 | 11/2006 | Molnar | 451/8 |
| 7,133,835 B1 | 11/2006 | Fusz et al. | 705/26 |
| 7,133,845 B1 | 11/2006 | Ginter et al. | 705/51 |
| 7,133,846 B1 | 11/2006 | Ginter et al. | 705/54 |
| 7,136,835 B1 | 11/2006 | Flitcroft et al. | 705/39 |
| 7,139,726 B2 | 11/2006 | Fisher et al. | 705/26 |
| 7,139,743 B2 | 11/2006 | Indeck et al. | 707/1 |
| 7,143,062 B2 | 11/2006 | Turk et al. | 705/38 |
| 7,143,063 B2 | 11/2006 | Lent et al. | 705/38 |
| 7,143,066 B2 | 11/2006 | Shear et al. | 705/54 |
| 7,143,290 B1 | 11/2006 | Ginter et al. | 713/176 |
| 7,143,337 B2 | 11/2006 | Landsman et al. | 715/500 |
| 7,146,341 B1 | 12/2006 | Light et al. | 705/64 |
| 7,149,303 B1 | 12/2006 | Laurinavichus | 379/265.01 |
| 7,149,716 B2 | 12/2006 | Gatto | 705/36 R |
| 7,149,720 B2 | 12/2006 | Shepherd | 705/37 |
| 7,149,958 B2 | 12/2006 | Landsman et al. | 715/500 |
| 7,152,045 B2 | 12/2006 | Hoffman | 705/43 |
| 7,152,200 B2 | 12/2006 | Albert et al. | 715/500 |
| 7,152,208 B2 | 12/2006 | Ohashi | 715/530 |
| 7,155,663 B2 | 12/2006 | Landsman et al. | 715/500 |
| 7,158,947 B1 | 1/2007 | Findley | 705/26 |
| 7,159,037 B1 | 1/2007 | Philyaw et al. | 709/245 |
| 7,159,043 B2 | 1/2007 | Bateman et al. | 710/6 |
| 7,162,434 B1 | 1/2007 | Walker et al. | 705/14 |
| 7,165,174 B1 | 1/2007 | Ginter et al. | 713/153 |
| 7,167,818 B2 | 1/2007 | Brown | 703/11 |
| 7,167,838 B1 | 1/2007 | Gatto | 705/36 R |
| 7,171,388 B2 | 1/2007 | Phillips et al. | 705/41 |
| 7,171,446 B1 | 1/2007 | Gosling et al. | 709/203 |
| 7,174,314 B2 | 2/2007 | Phillips et al. | 705/41 |
| 7,174,315 B2 | 2/2007 | Phillips et al. | 705/41 |
| 7,174,316 B2 | 2/2007 | Phillips et al. | 705/41 |
| 7,174,317 B2 | 2/2007 | Phillips et al. | 705/41 |
| 7,178,020 B2 | 2/2007 | DiRienzo | 713/153 |
| 7,181,410 B1 | 2/2007 | Jones et al. | 705/6 |
| 7,184,977 B1 | 2/2007 | Crim et al. | 705/34 |
| 7,184,990 B2 | 2/2007 | Walker et al. | 705/400 |
| 7,194,423 B2 | 3/2007 | Walker et al. | 705/14 |
| 7,194,436 B2 | 3/2007 | Tammaro | 705/38 |
| 7,197,444 B2 | 3/2007 | Bomar, Jr. et al. | 703/8 |
| 7,197,481 B1 | 3/2007 | Yamamoto et al. | 705/28 |
| 7,197,543 B2 | 3/2007 | Philyaw et al. | 709/217 |
| 7,201,580 B2 | 4/2007 | Ho et al. | 434/219 |
| 7,203,656 B2 | 4/2007 | Lotvin et al. | 705/13 |
| 7,203,661 B1 | 4/2007 | Graff | 705/36 R |
| 7,203,725 B1 | 4/2007 | Gilmour et al. | 709/206 |
| 7,206,748 B1 | 4/2007 | Gruse et al. | 705/1 |
| 7,206,763 B1 | 4/2007 | Turk | 705/39 |
| 7,210,148 B2 | 4/2007 | Arnold et al. | 719/330 |
| 7,213,003 B1 | 5/2007 | Kight et al. | 705/40 |
| 7,216,084 B2 | 5/2007 | Brinkman et al. | 705/2 |
| 7,222,079 B1 | 5/2007 | Seare et al. | 705/3 |
| 7,222,085 B2 | 5/2007 | Stack | 705/10 |
| 7,222,087 B1 | 5/2007 | Bezos et al. | 705/26 |
| 7,222,111 B1 | 5/2007 | Budike, Jr. | 705/412 |
| 7,222,156 B2 | 5/2007 | Gupta et al. | 709/206 |
| 7,223,235 B2 | 5/2007 | Brown | 600/300 |
| 7,223,236 B2 | 5/2007 | Brown | 600/300 |
| 7,225,142 B1 | 5/2007 | Apte et al. | 705/14 |
| 7,228,199 B2 | 6/2007 | Wallace | 700/236 |
| 7,228,282 B1 | 6/2007 | Philyaw et al. | 705/1 |
| 7,233,912 B2 | 6/2007 | Walker et al. | 705/14 |
| 7,233,913 B2 | 6/2007 | Scroggie et al. | 705/14 |
| 7,233,948 B1 | 6/2007 | Shamoon et al. | 707/9 |
| 7,236,942 B1 | 6/2007 | Walker et al. | 705/14 |
| 7,240,022 B1 | 7/2007 | Bistriceanu et al. | 705/14 |
| 7,240,023 B1 | 7/2007 | Powell | 705/14 |
| 7,240,031 B1 | 7/2007 | Kight et al. | 705/40 |
| 7,241,219 B2 | 7/2007 | Walker et al. | 463/20 |
| 7,243,081 B2 | 7/2007 | Friend et al. | 705/36 |
| 7,246,093 B1 | 7/2007 | Katz | 705/37 |
| 7,248,719 B2 | 7/2007 | Hoffman et al. | 382/115 |
| 7,249,027 B1 | 7/2007 | Ausubel | 705/1 |
| 7,249,114 B2 | 7/2007 | Burchetta et al. | 705/80 |

| Patent No. | Date | Inventor | Class |
|---|---|---|---|
| 7,252,636 B2 | 8/2007 | Brown | 600/300 |
| 7,257,566 B2 | 8/2007 | Danielson et al. | 706/52 |
| 7,257,604 B1 | 8/2007 | Wolfe | |
| 7,257,614 B2 | 8/2007 | Philyaw et al. | 709/202 |
| 7,258,666 B2 | 8/2007 | Brown | 600/300 |
| 7,263,497 B1 | 8/2007 | Wiser et al. | 705/26 |
| 7,264,591 B2 | 9/2007 | Brown | 600/300 |
| 7,265,853 B1 | 9/2007 | Kara et al. | 358/115 |
| 7,269,564 B1 | 9/2007 | Milsted et al. | 705/1 |
| 7,269,591 B2 | 9/2007 | Wesinger, Jr. et al. | 707/10 |
| 7,272,569 B1 | 9/2007 | Walker et al. | 705/16 |
| 7,272,639 B1 | 9/2007 | Levergood et al. | 709/218 |
| 7,277,867 B1 | 10/2007 | Brown et al. | 705/37 |
| 7,280,979 B1 | 10/2007 | Katz et al. | 705/26 |
| 7,281,133 B2 | 10/2007 | Ginter et al. | 713/176 |
| 7,283,973 B1 | 10/2007 | Loghmani et al. | 705/26 |
| 7,283,974 B2 | 10/2007 | Katz et al. | 705/26 |
| 7,284,066 B1 | 10/2007 | Philyaw et al. | 709/238 |
| 7,287,091 B2 | 10/2007 | Philyaw et al. | 709/238 |
| 7,289,971 B1 | 10/2007 | O'Neil et al. | 705/44 |
| 7,297,109 B2 | 11/2007 | Brown | 600/300 |
| 7,297,111 B2 | 11/2007 | Iliff | 600/300 |
| 7,298,851 B1 | 11/2007 | Hendricks et al. | 380/282 |
| 7,299,201 B2 | 11/2007 | Jammes et al. | 705/26 |
| 7,299,501 B2 | 11/2007 | Hendricks | 726/27 |
| 7,300,402 B2 | 11/2007 | Iliff | 600/300 |
| 7,302,415 B1 | 11/2007 | Saito | 705/557 |
| 7,303,081 B2 | 12/2007 | Mallett et al. | 209/702 |
| 7,305,278 B2 | 12/2007 | Enright et al. | 700/115 |
| 7,305,348 B1 | 12/2007 | Brown | 705/1 |
| 7,305,371 B2 | 12/2007 | Brueckner et al. | 706/45 |
| 7,305,451 B2 | 12/2007 | San Andres et al. | 709/216 |
| 7,306,560 B2 | 12/2007 | Iliff | 600/300 |
| 7,308,483 B2 | 12/2007 | Philyaw | 709/217 |
| 7,310,051 B2 | 12/2007 | Lawrence | |
| 7,310,668 B2 | 12/2007 | Brown | 709/224 |
| 7,311,207 B2 | 12/2007 | Mallett et al. | 209/702 |
| 7,313,431 B2 | 12/2007 | Uber, III et al. | 600/431 |
| 7,314,173 B2 | 1/2008 | Philyaw et al. | 235/454 |
| 7,318,106 B2 | 1/2008 | Philyaw | 709/238 |
| 7,318,224 B2 | 1/2008 | Honarvar et al. | 717/170 |
| 7,318,529 B2 | 1/2008 | Mallett et al. | 209/702 |
| 7,319,477 B2 | 1/2008 | Katz | |
| 7,319,886 B2 | 1/2008 | Tokoro | |
| 7,319,976 B1 | 1/2008 | Peckover | 705/14 |
| 7,320,030 B2 | 1/2008 | Brown | 709/224 |
| 7,321,748 B2 | 1/2008 | Tokoro | 455/303 |
| 7,321,876 B2 | 1/2008 | Scott et al. | 705/36 R |
| 7,321,876 B1 | 1/2008 | Wolfston | 705/39 |
| 7,321,883 B1 | 1/2008 | Freedy et al. | 706/45 |
| 7,321,941 B1 | 1/2008 | Philyaw et al. | 709/245 |
| 7,324,972 B1 | 1/2008 | Oliver et al. | 705/40 |
| 7,333,851 B2 | 2/2008 | Echauz et al. | 600/544 |
| 7,333,953 B1 | 2/2008 | Banaugh et al. | 705/40 |
| 7,334,024 B2 | 2/2008 | Martino | 709/217 |
| 7,336,788 B1 | 2/2008 | Hendricks | 380/239 |
| 7,337,133 B1 | 2/2008 | Bezos et al. | 705/27 |
| RE40,186 E | 3/2008 | Walker et al. | 705/14 |
| 7,340,045 B2 | 3/2008 | Felger | |
| 7,343,222 B2 | 3/2008 | Solomon | 700/245 |
| 7,343,492 B2 | 3/2008 | Moskowitz et al. | 713/176 |
| 7,344,496 B2 | 3/2008 | Iliff | 600/300 |
| 7,346,564 B1 | 3/2008 | Kirklin et al. | 705/28 |
| 7,346,768 B2 | 3/2008 | DiRienzo | 713/150 |
| 7,351,142 B2 | 4/2008 | Walker et al. | 463/17 |
| 7,356,502 B1 | 4/2008 | LaBadie et al. | 705/38 |
| 7,360,244 B2 | 4/2008 | Coley et al. | 726/11 |
| 7,362,775 B1 | 4/2008 | Moskowitz | 370/468 |
| 7,363,273 B2 | 4/2008 | Phillips et al. | 705/41 |
| 7,364,068 B1 | 4/2008 | Strubbe et al. | 235/376 |
| 7,370,008 B1 | 5/2008 | Hill | 705/27 |
| 7,370,114 B1 | 5/2008 | Philyaw et al. | 709/203 |
| 7,376,891 B2 | 5/2008 | Hitchcock et al. | 715/221 |
| 7,379,900 B1 | 5/2008 | Wren | 705/26 |
| 7,379,901 B1 | 5/2008 | Philyaw | 705/26 |
| 7,380,273 B2 | 5/2008 | Coley et al. | 726/12 |
| 7,383,200 B1 | 6/2008 | Walker et al. | 705/10 |
| 7,383,220 B1 | 6/2008 | Keith | 705/37 |
| 7,383,222 B2 | 6/2008 | Keith | 705/37 |
| 7,383,226 B2 | 6/2008 | Kight et al. | 705/40 |
| 7,383,333 B2 | 6/2008 | Philyaw et al. | 709/224 |
| 7,383,447 B2 | 6/2008 | Saito | 713/193 |
| 7,383,573 B2 | 6/2008 | Coley et al. | 726/12 |
| 7,386,508 B1 | 6/2008 | Walker et al. | 705/39 |
| 7,386,600 B1 | 6/2008 | Philyaw | 709/217 |
| 7,389,211 B2 | 6/2008 | Abu El Ata et al. | 703/2 |
| 7,389,331 B2 | 6/2008 | Van Wyngarden | 709/219 |
| 7,392,095 B2 | 6/2008 | Flynn et al. | 607/127 |
| 7,392,167 B2 | 6/2008 | Brown | 703/11 |
| 7,392,285 B2 | 6/2008 | Philyaw | 709/204 |
| 7,392,312 B1 | 6/2008 | Philyaw | 709/225 |
| 7,392,395 B2 | 6/2008 | Ginter et al. | 713/176 |
| 7,392,945 B1 | 7/2008 | Philyaw | 235/383 |
| 7,395,226 B2 | 7/2008 | Messer | 705/26 |
| 7,398,244 B1 | 7/2008 | Keith | 705/37 |
| 7,398,541 B2 | 7/2008 | Bennington et al. | 725/40 |
| 7,401,059 B1 | 7/2008 | Owen et al. | 706/46 |
| 7,401,286 B1 | 7/2008 | Hendricks et al. | 715/203 |
| 7,403,922 B1 | 7/2008 | Lewis et al. | 705/38 |
| 7,404,207 B2 | 7/2008 | Perry | 726/15 |
| 7,409,073 B2 | 8/2008 | Moskowitz et al. | 382/100 |
| 7,409,632 B1 | 8/2008 | DiRienzo | 715/226 |
| 7,412,434 B1 | 8/2008 | Klug et al. | 707/1 |
| 7,412,666 B2 | 8/2008 | Philyaw | 715/852 |
| 7,415,511 B2 | 8/2008 | Philyaw et al. | 709/219 |
| 7,415,617 B2 | 8/2008 | Ginter et al. | 713/189 |
| 7,418,397 B2 | 8/2008 | Kojima et al. | 705/1 |
| 7,418,483 B2 | 8/2008 | Hess et al. | 709/219 |
| 7,421,724 B2 | 9/2008 | Klosterman et al. | 725/42 |
| 7,424,521 B1 | 9/2008 | Philyaw et al. | 709/219 |
| 7,424,737 B2 | 9/2008 | Wesinger, Jr. et al. | 726/11 |
| 7,425,978 B2 | 9/2008 | Katz | |
| 7,427,281 B2 | 9/2008 | Uber, III | 604/508 |
| 7,428,511 B2 | 9/2008 | Takahashi et al. | 705/44 |
| 7,433,828 B2 | 10/2008 | Brinkman et al. | 705/3 |
| 7,437,313 B1 | 10/2008 | Mussman | 705/26 |
| 7,437,431 B2 | 10/2008 | San Andres et al. | 709/219 |
| 7,437,475 B2 | 10/2008 | Philyaw | 709/238 |
| 7,440,907 B2 | 10/2008 | Lilly et al. | 705/8 |
| 7,440,993 B1 | 10/2008 | Philyaw et al. | 709/203 |
| RE40,576 E | 11/2008 | Goodwin, III | 709/232 |
| 7,447,914 B1 | 11/2008 | Saito | 713/191 |
| 7,448,040 B2 | 11/2008 | Ellis et al. | 719/310 |
| 7,451,892 B2 | 11/2008 | Walker et al. | 221/237 |
| 7,454,358 B2 | 11/2008 | Mallett et al. | 705/1 |
| 7,454,381 B2 | 11/2008 | Walker et al. | 705/37 |
| 7,457,962 B2 | 11/2008 | Moskowitz | 713/176 |
| 7,463,925 B2 | 12/2008 | Kramer | 607/15 |
| 7,469,339 B2 | 12/2008 | Everett et al. | 713/172 |
| 7,471,981 B2 | 12/2008 | Kramer | 607/9 |
| 7,472,074 B1 | 12/2008 | Walker et al. | 705/26 |
| 7,475,028 B2 | 1/2009 | Loeb et al. | 705/26 |
| 7,475,039 B2 | 1/2009 | Remington et al. | 705/40 |
| 7,475,043 B2 | 1/2009 | Light et al. | 705/64 |
| 7,478,066 B2 | 1/2009 | Remington et al. | 705/40 |
| 7,478,076 B1 | 1/2009 | Owen et al. | 706/46 |
| 7,478,239 B1 | 1/2009 | Rosen | 713/172 |
| 7,479,060 B2 | 1/2009 | Walker et al. | 463/17 |
| 7,480,929 B2 | 1/2009 | Klosterman et al. | 725/44 |
| 7,483,739 B2 | 1/2009 | Kramer | 607/9 |
| 7,483,871 B2 | 1/2009 | Herz | 707/2 |
| 7,487,117 B1 | 2/2009 | Tamura et al. | 705/27 |
| 7,487,128 B2 | 2/2009 | Spagna et al. | 705/51 |
| 7,487,155 B2 | 2/2009 | Jebens et al. | 707/10 |
| 7,490,135 B2 | 2/2009 | Klug et al. | 709/217 |
| 7,493,283 B1 | 2/2009 | Philyaw | 705/39 |
| 7,493,384 B1 | 2/2009 | Philyaw | 709/224 |
| 7,493,641 B2 | 2/2009 | Klosterman et al. | 725/44 |
| 7,494,417 B2 | 2/2009 | Walker et al. | 463/25 |
| 7,496,523 B2 | 2/2009 | Walker et al. | 705/14 |
| 7,496,638 B2 | 2/2009 | Philyaw | 709/217 |
| 7,499,898 B1 | 3/2009 | Owen et al. | 706/46 |
| 7,499,979 B2 | 3/2009 | Hess et al. | 709/213 |
| 7,502,832 B2 | 3/2009 | San Andres et al. | 709/216 |
| 7,505,913 B2 | 3/2009 | Tobin | 705/1 |
| 7,505,915 B2 | 3/2009 | Silverman et al. | 705/1 |
| 7,505,922 B1 | 3/2009 | Philyaw | 705/26 |
| 7,505,939 B2 | 3/2009 | Lent et al. | 705/38 |

| Patent No. | Date | Inventor | Class |
|---|---|---|---|
| 7,506,020 B2 | 3/2009 | Ellis | 709/201 |
| 7,509,268 B2 | 3/2009 | Walker et al. | 705/14 |
| 7,509,270 B1 | 3/2009 | Hendricks et al. | 705/26 |
| 7,509,277 B1 | 3/2009 | Gatto | 705/36 R |
| 7,509,360 B2 | 3/2009 | Wollrath et al. | 707/206 |
| 7,512,548 B1 | 3/2009 | Bezos et al. | 705/26 |
| 7,516,088 B2 | 4/2009 | Johnson et al. | 705/16 |
| 7,516,089 B1 | 4/2009 | Walker et al. | 705/26 |
| 7,516,101 B2 | 4/2009 | Remington et al. | 705/40 |
| 7,516,192 B2 | 4/2009 | Brown | 709/217 |
| 7,519,444 B2 | 4/2009 | Lilly et al. | 700/100 |
| 7,519,549 B1 | 4/2009 | Johnson et al. | 705/28 |
| 7,523,063 B2 | 4/2009 | Harrington et al. | 705/37 |
| 7,523,161 B2 | 4/2009 | Philyaw | 709/204 |
| 7,533,064 B1 | 5/2009 | Boesch | 705/67 |
| 7,533,171 B2 | 5/2009 | Brown | 709/224 |
| 7,533,177 B2 | 5/2009 | Philyaw et al. | 709/227 |
| 7,536,352 B2 | 5/2009 | Lapsley et al. | 705/44 |
| 7,536,478 B2 | 5/2009 | Philyaw et al. | 709/238 |
| 7,539,637 B2 | 5/2009 | Gatto | 705/36 R |
| 7,539,648 B1 | 5/2009 | Cordery et al. | 705/60 |
| 7,542,919 B1 | 6/2009 | Mueller et al. | 705/16 |
| 7,545,816 B1 | 6/2009 | Coutts et al. | 370/400 |
| 7,546,267 B2 | 6/2009 | Wallman | 705/37 |
| 7,546,277 B1 | 6/2009 | Tedesco et al. | 705/400 |
| 7,546,346 B2 | 6/2009 | Ouchi | 709/206 |
| 7,547,251 B2 | 6/2009 | Walker et al. | 463/17 |
| 7,548,988 B2 | 6/2009 | Philyaw et al. | 709/231 |
| 7,552,082 B2 | 6/2009 | Wallman | 705/37 |
| 7,552,090 B1 | 6/2009 | Barber | 705/40 |
| 7,552,190 B1 | 6/2009 | Freishtat et al. | 709/217 |
| 7,555,458 B1 | 6/2009 | Felger | 705/38 |
| 7,558,407 B2 | 7/2009 | Hoffman et al. | 382/115 |
| 7,558,752 B1 | 7/2009 | Ephrati et al. | 705/37 |
| 7,558,838 B2 | 7/2009 | Philyaw | 709/217 |
| 7,562,040 B2 | 7/2009 | Loeper | 705/36 R |
| 7,567,934 B2 | 7/2009 | Flitcroft et al. | 705/37 |
| 7,568,100 B1 | 7/2009 | Moskowitz et al. | 713/176 |
| 7,571,136 B2 | 8/2009 | May | 705/37 |
| 7,571,850 B2 | 8/2009 | Barcelou | 235/379 |
| 7,572,169 B1 | 8/2009 | Molnar | 451/8 |
| 7,575,158 B2 | 8/2009 | Barcelou | 235/379 |
| 7,577,092 B2 | 8/2009 | San Andres et al. | 370/230 |
| 7,577,609 B1 | 8/2009 | Maher | 705/39 |
| 7,580,860 B2 | 8/2009 | Junger | 705/22 |
| 7,581,092 B2 | 8/2009 | Shear et al. | 713/2 |
| RE40,924 E | 9/2009 | Nicholls et al. | 705/28 |
| 7,584,108 B2 | 9/2009 | Brown | 705/2 |
| 7,584,358 B2 | 9/2009 | Everett et al. | 713/172 |
| 7,587,333 B1 | 9/2009 | Walker et al. | 705/15 |
| 7,587,334 B2 | 9/2009 | Walker et al. | 705/16 |
| 7,587,469 B2 | 9/2009 | Brown | 709/217 |
| 7,590,549 B2 | 9/2009 | Brown | 705/2 |
| 7,590,853 B1 | 9/2009 | Shear et al. | 713/176 |
| 7,590,866 B2 | 9/2009 | Hurtado et al. | 713/189 |
| 7,591,420 B2 | 9/2009 | Barcelou | 235/380 |
| 7,593,869 B2 | 9/2009 | Nahan et al. | 705/26 |
| 7,593,870 B2 | 9/2009 | Jalili | 705/26 |
| 7,593,896 B1 | 9/2009 | Flitcroft et al. | 705/39 |
| 7,596,510 B2 | 9/2009 | Fisher et al. | 705/26 |
| 7,596,786 B2 | 9/2009 | Philyaw et al. | 717/174 |
| 7,597,248 B2 | 10/2009 | Barcelou | 235/379 |
| 7,597,251 B2 | 10/2009 | Barcelou | 235/380 |
| 7,600,677 B2 | 10/2009 | Barcelou | 235/380 |
| 7,603,308 B2 | 10/2009 | Gatto | 705/36 R |
| 7,603,690 B2 | 10/2009 | Knudson et al. | 725/105 |
| 7,606,355 B2 | 10/2009 | Hutchison et al. | |
| 7,606,401 B2 | 10/2009 | Hoffman et al. | 382/124 |
| 7,606,729 B1 | 10/2009 | Walker et al. | 705/14 |
| 7,606,737 B2 | 10/2009 | Hutchison et al. | 705/26 |
| 7,606,854 B2 | 10/2009 | Ellis, III | 709/201 |
| 7,610,217 B1 | 10/2009 | Mori et al. | 705/26 |
| 7,610,245 B2 | 10/2009 | Dent et al. | 705/40 |
| 7,613,590 B2 | 11/2009 | Brown | 702/188 |
| 7,613,621 B2 | 11/2009 | Brown | 705/2 |
| 7,613,633 B1 | 11/2009 | Woolston | 705/26 |
| 7,613,652 B2 | 11/2009 | Young et al. | 705/37 |
| 7,613,659 B1 | 11/2009 | Hoffman et al. | 705/44 |
| 7,617,125 B1 | 11/2009 | Light et al. | 705/26 |
| 7,617,973 B2 | 11/2009 | Barcelou | 235/380 |
| 7,620,605 B2 | 11/2009 | Hoffman et al. | 705/52 |
| 7,620,619 B1 | 11/2009 | Walker et al. | 707/3 |
| 7,621,444 B2 | 11/2009 | Barcelou | 235/379 |
| 7,624,028 B1 | 11/2009 | Brown | 705/3 |
| 7,624,044 B2 | 11/2009 | Wren | 705/26 |
| 7,627,499 B2 | 12/2009 | Hahn-Carlson | 705/26 |
| 7,630,919 B1 | 12/2009 | Obrecht | 705/26 |
| 7,631,193 B1 | 12/2009 | Hoffman | 713/186 |
| 7,634,529 B2 | 12/2009 | Ellis, III | 709/201 |
| 7,636,667 B2 | 12/2009 | Brown | 705/2 |
| 7,636,688 B2 | 12/2009 | Kitchen et al. | 705/39 |
| 7,636,689 B2 | 12/2009 | Dent et al. | 705/40 |
| 7,636,788 B2 | 12/2009 | Philyaw et al. | 709/238 |
| 7,643,971 B2 | 1/2010 | Brown | 703/2 |
| 7,647,241 B1 | 1/2010 | Lilly et al. | 705/10 |
| 7,647,243 B2 | 1/2010 | Woolston | 705/26 |
| 7,647,269 B2 | 1/2010 | Brett | 705/37 |
| 7,647,502 B2 | 1/2010 | Moskowitz | 713/176 |
| 7,647,503 B2 | 1/2010 | Moskowitz | 713/176 |
| 7,653,687 B2 | 1/2010 | Reisman | 709/203 |
| 7,657,484 B2 | 2/2010 | Ganesan et al. | 705/40 |
| 7,657,560 B1 | 2/2010 | DiRienzo | |
| 7,657,561 B2 | 2/2010 | Gibbon et al. | |
| 7,660,744 B2 | 2/2010 | Philippe et al. | 705/26 |
| 7,660,874 B1 | 2/2010 | Meltzer et al. | 709/218 |
| 7,661,590 B1 | 2/2010 | Gatto | 235/384 |
| 7,664,263 B2 | 2/2010 | Moskowitz | 380/205 |
| 7,664,672 B1 | 2/2010 | Walker et al. | 705/26 |
| 7,664,958 B2 | 2/2010 | Moskowitz | 713/176 |
| 7,665,109 B2 | 2/2010 | Matthews, III et al. | 725/51 |
| 7,665,656 B2 | 2/2010 | Gatto | 235/379 |
| 7,668,782 B1 | 2/2010 | Reistad et al. | 705/50 |
| 7,668,886 B2 | 2/2010 | Hartman et al. | 707/705 |
| 7,669,055 B2 | 2/2010 | Everett et al. | 713/173 |
| 7,669,762 B2 | 3/2010 | Hutchison et al. | 235/383 |
| 7,672,892 B2 | 3/2010 | Odom et al. | 705/37 |
| 7,684,999 B2 | 3/2010 | Brown | 705/2 |
| 7,685,046 B2 | 3/2010 | Wallman | 705/36 R |
| 7,685,053 B2 | 3/2010 | Graff | 705/37 |
| 7,689,440 B2 | 3/2010 | Brown | 705/2 |
| 7,689,468 B2 | 3/2010 | Walker et al. | 705/26 |
| 7,689,497 B2 | 3/2010 | May | 705/37 |
| 7,689,684 B2 | 3/2010 | Donoho et al. | 709/224 |
| 7,689,826 B2 | 3/2010 | Everett et al. | 713/173 |
| 7,693,748 B1 | 4/2010 | Mesaros | 705/26 |
| 7,693,790 B2 | 4/2010 | Lawlor et al. | 705/40 |
| 7,693,796 B2 | 4/2010 | Light et al. | 705/64 |
| 7,694,129 B2 | 4/2010 | DiRienzo | 713/153 |
| 7,698,173 B1 | 4/2010 | Burge et al. | 705/26 |
| 7,698,210 B2 | 4/2010 | Brett | 705/37 |
| 7,698,567 B2 | 4/2010 | Hoffman | 713/186 |
| 7,699,220 B2 | 4/2010 | Barcelou | 235/380 |
| 7,702,540 B1 | 4/2010 | Woolston | 705/26 |
| 7,702,736 B2 | 4/2010 | Ouchi | 709/206 |
| 7,702,737 B2 | 4/2010 | Ouchi | 709/206 |
| 7,702,752 B2 | 4/2010 | Kirsch et al. | 709/219 |
| 7,702,908 B2 | 4/2010 | Everett et al. | 713/172 |
| 7,703,683 B2 | 4/2010 | Rathus et al. | |
| 7,707,259 B2 | 4/2010 | Ouchi | 709/206 |
| 7,707,270 B2 | 4/2010 | Brown | 709/217 |
| 7,707,408 B2 | 4/2010 | Everett et al. | 713/160 |
| 7,708,199 B2 | 5/2010 | Gatto | 235/381 |
| 7,711,599 B1 | 5/2010 | Libman | |
| 7,711,604 B1 | 5/2010 | Walker et al. | 705/26 |
| 7,711,650 B1 | 5/2010 | Kara | 705/60 |
| 7,711,658 B2 | 5/2010 | Tedesco et al. | 705/400 |
| 7,712,668 B2 | 5/2010 | Rathus et al. | |
| 7,716,088 B2 | 5/2010 | Spiegel et al. | 705/27 |
| 7,716,349 B1 | 5/2010 | Hendricks | 709/229 |
| 7,717,344 B2 | 5/2010 | Rathus et al. | |
| 7,717,784 B2 | 5/2010 | Walker et al. | 463/17 |
| 7,720,746 B2 | 5/2010 | Brett | 705/37 |
| 7,725,375 B2 | 5/2010 | Shepherd | 705/35 |
| 7,730,177 B2 | 6/2010 | Brown | 709/224 |
| 7,730,310 B2 | 6/2010 | Everett et al. | 713/172 |
| 7,730,311 B2 | 6/2010 | Everett et al. | 713/172 |
| 7,730,312 B2 | 6/2010 | Everett et al. | 713/172 |
| 7,730,317 B2 | 6/2010 | Moskowitz et al. | 713/176 |

| Patent No. | Date | Name | Class |
|---|---|---|---|
| 7,730,323 B2 | 6/2010 | Saito | 713/189 |
| 7,730,324 B2 | 6/2010 | Saito | 713/191 |
| 7,734,553 B2 | 6/2010 | Shear et al. | 705/64 |
| 7,734,718 B2 | 6/2010 | Brown | 709/217 |
| 7,734,747 B2 | 6/2010 | Murphy et al. | 709/223 |
| 7,734,923 B2 | 6/2010 | Everett et al. | 713/172 |
| 7,738,659 B2 | 6/2010 | Moskowitz | 380/252 |
| 7,739,353 B2 | 6/2010 | Philyaw | 709/217 |
| 7,747,463 B1 | 6/2010 | Phillips et al. | |
| 7,747,476 B2 | 6/2010 | Messer | 705/27 |
| 7,747,507 B2 | 6/2010 | Brett | 705/37 |
| 7,747,527 B1 | 6/2010 | Korala | 705/43 |
| 7,752,466 B2 | 7/2010 | Ginter et al. | 713/194 |
| 7,756,746 B2 | 7/2010 | Walker et al. | 705/15 |
| 7,756,781 B2 | 7/2010 | Lent et al. | 705/38 |
| 7,757,254 B2 | 7/2010 | Shoff et al. | 725/44 |
| 7,761,308 B2 | 7/2010 | Falchuk et al. | 705/2 |
| 7,761,312 B2 | 7/2010 | Brown | 705/3 |
| 7,761,712 B2 | 7/2010 | Moskowitz et al. | 713/176 |
| 7,761,916 B2 | 7/2010 | Shear et al. | 726/22 |
| 7,765,112 B2 | 7/2010 | Brown | 705/2 |
| 7,765,138 B2 | 7/2010 | Loeper | 705/36 R |
| 7,765,279 B1 | 7/2010 | Kaib et al. | 709/218 |
| 7,769,001 B2 | 8/2010 | Narasimhan et al. | 370/356 |
| 7,769,600 B2 | 8/2010 | Iliff | 705/2 |
| 7,769,605 B2 | 8/2010 | Brown | 705/3 |
| 7,769,644 B2 | 8/2010 | Naghshineh et al. | 705/28 |
| 7,769,673 B2 | 8/2010 | Brett | 705/37 |
| 7,770,017 B2 | 8/2010 | Moskowitz et al. | 713/176 |
| 7,774,230 B2 | 8/2010 | Libman | |
| 7,774,257 B2 | 8/2010 | Maggioncalda et al. | 705/36 R |
| 7,774,264 B1 | 8/2010 | Ausubel | 705/37 |
| 7,774,812 B2 | 8/2010 | Knudson et al. | 725/45 |
| 7,774,934 B2 | 8/2010 | Sundberg et al. | 29/876 |
| 7,778,395 B2 | 8/2010 | Martino | 379/671 |
| 7,778,845 B2 | 8/2010 | Brown | 705/2 |
| 7,778,867 B2 | 8/2010 | Libman | 705/141 |
| 7,778,901 B2 | 8/2010 | Ganesan et al. | 705/35 |
| 7,779,125 B2 | 8/2010 | Wyngarden | 709/223 |
| 7,779,261 B2 | 8/2010 | Moskowitz et al. | 713/176 |
| 7,788,155 B2 | 8/2010 | Jones et al. | 705/36 R |
| 7,788,189 B2 | 8/2010 | Budike, Jr. | 705/400 |
| RE41,657 E | 9/2010 | Saito | 705/51 |
| 7,792,696 B1 | 9/2010 | Philyaw et al. | 705/141 |
| 7,792,702 B1 | 9/2010 | Katz et al. | 705/26 |
| 7,792,705 B2 | 9/2010 | Bezos et al. | 705/26 |
| 7,792,707 B2 | 9/2010 | Alaia et al. | 705/26 |
| 7,792,986 B2 | 9/2010 | Donoho et al. | 709/236 |
| 7,793,830 B2 | 9/2010 | Barcelou | 235/379 |
| 7,797,164 B2 | 9/2010 | Junger et al. | 705/1 |
| 7,801,767 B2 | 9/2010 | Fisher et al. | 705/26 |
| 7,801,817 B2 | 9/2010 | Saito | 705/51 |
| 7,802,718 B2 | 9/2010 | Barcelou | 235/379 |
| 7,805,368 B2 | 9/2010 | Phillips et al. | 705/41 |
| 7,805,756 B2 | 9/2010 | Ellis | 726/11 |
| RE41,903 E | 10/2010 | Wenig et al. | 709/203 |
| 7,809,642 B1 | 10/2010 | Phillips et al. | 705/41 |
| 7,809,643 B2 | 10/2010 | Phillips et al. | 705/41 |
| 7,813,966 B2 | 10/2010 | Alaia et al. | 705/26 |
| 7,813,989 B2 | 10/2010 | Jones et al. | 705/36 R |
| 7,814,143 B2 | 10/2010 | Brown et al. | 709/203 |
| 7,814,233 B2 | 10/2010 | Ellis | 709/250 |
| 7,818,253 B2 | 10/2010 | Phillips et al. | 705/41 |
| 7,818,284 B1 | 10/2010 | Walker et al. | 707/102 |
| 7,818,399 B1 | 10/2010 | Ross, Jr. et al. | 709/218 |
| 7,818,423 B1 | 10/2010 | Philyaw | 709/225 |
| 7,819,316 B2 | 10/2010 | Philyaw | 235/383 |
| 7,822,197 B2 | 10/2010 | Moskowitz | 380/28 |
| 7,822,625 B2 | 10/2010 | Brown | 705/2 |
| 7,822,647 B1 | 10/2010 | Mussman et al. | 705/26 |
| 7,822,657 B2 | 10/2010 | Brown | 705/35 |
| 7,822,676 B2 | 10/2010 | Shepherd | 705/37 |
| 7,822,829 B2 | 10/2010 | Philyaw et al. | 709/219 |
| 7,827,040 B2 | 11/2010 | Brown | 705/2 |
| 7,827,056 B2 | 11/2010 | Walker et al. | |
| 7,827,057 B1 | 11/2010 | Walker et al. | |
| 7,827,062 B2 | 11/2010 | Merriman et al. | |
| 7,827,064 B1 | 11/2010 | Foster | 705/20 |
| 7,827,075 B2 | 11/2010 | Hess et al. | 705/27 |
| 7,827,109 B2 | 11/2010 | Saito | 705/51 |
| 7,830,915 B2 | 11/2010 | Moskowitz | 370/468 |
| 7,830,962 B1 | 11/2010 | Fernandez et al. | |
| 7,831,470 B1 | 11/2010 | Walker et al. | |
| 7,831,477 B2 | 11/2010 | Woolston | 705/26 |
| 7,831,480 B2 | 11/2010 | Burchetta et al. | 705/26 |
| 7,831,523 B2 | 11/2010 | Burchetta et al. | 705/80 |
| 7,831,823 B2 | 11/2010 | Ginter et al. | 713/155 |
| 7,835,508 B1 | 11/2010 | Katz | |
| 7,835,509 B2 | 11/2010 | Katz | |
| 7,835,688 B2 | 11/2010 | Tokoro | 455/303 |
| 7,835,989 B1 | 11/2010 | Hendricks et al. | 705/50 |
| 7,837,101 B2 | 11/2010 | Barcelou | 235/380 |
| 7,839,432 B2 | 11/2010 | Fernandez et al. | 348/143 |
| 7,839,984 B2 | 11/2010 | Katz | |
| 7,840,440 B2 | 11/2010 | Burchetta et al. | 705/26 |
| 7,844,074 B2 | 11/2010 | Moskowitz et al. | 382/100 |
| 7,844,488 B2 | 11/2010 | Merriman et al. | 705/14 |
| 7,844,538 B2 | 11/2010 | Wallman | 705/37 |
| 7,848,496 B2 | 12/2010 | Katz | |
| 7,848,958 B2 | 12/2010 | Brown et al. | 705/26 |
| 7,849,393 B1 | 12/2010 | Hendricks et al. | 715/203 |
| 7,853,455 B2 | 12/2010 | Brown | 705/2 |
| 7,853,488 B1 | 12/2010 | Mussman et al. | 705/26 |
| 7,853,524 B2 | 12/2010 | Kight et al. | 705/40 |
| 7,853,600 B2 | 12/2010 | Herz et al. | 707/749 |
| 7,856,375 B2 | 12/2010 | Libman | |
| 7,856,376 B2 | 12/2010 | Storey | |
| 7,856,379 B2 | 12/2010 | Walker et al. | 705/16 |
| 7,860,744 B2 | 12/2010 | Libman | |
| 7,860,753 B2 | 12/2010 | Walker et al. | 705/26 |
| 7,861,166 B1 | 12/2010 | Hendricks | 715/277 |
| 7,862,506 B2 | 1/2011 | Brown | 600/300 |
| 7,864,356 B2 | 1/2011 | Kara et al. | 358/115 |
| 7,865,395 B2 | 1/2011 | Klug et al. | 705/144 |
| 7,865,404 B2 | 1/2011 | Peckover | 705/26 |
| 7,867,165 B2 | 1/2011 | Brown | 600/300 |
| 7,869,852 B2 | 1/2011 | Brown | 600/347 |
| 7,870,034 B2 | 1/2011 | Rupp et al. | 705/26 |
| 7,870,055 B2 | 1/2011 | Fisher et al. | 705/37 |
| 7,870,080 B2 | 1/2011 | Budike, Jr. | 705/412 |
| 7,870,158 B2 | 1/2011 | DiRienzo | 707/791 |
| 7,870,189 B2 | 1/2011 | Philyaw | 709/203 |
| 7,870,249 B2 | 1/2011 | Brown | 709/224 |
| 7,870,393 B2 | 1/2011 | Moskowitz et al. | 713/176 |
| 7,870,587 B2 | 1/2011 | Ellis et al. | 725/60 |
| 7,871,327 B2 | 1/2011 | Walker et al. | 463/25 |
| 7,871,376 B2 | 1/2011 | Brown | 600/300 |
| 7,877,271 B2 | 1/2011 | Brown | 705/2 |
| 7,877,274 B2 | 1/2011 | Brown | 705/3 |
| 7,877,276 B2 | 1/2011 | Brown | 705/3 |

FOREIGN PATENT DOCUMENTS

| | | |
|---|---|---|
| DE | 4409458 | 9/1995 |
| DE | 19840383 | 3/2000 |
| DE | 19900500 | 1/2009 |
| EP | 0141858 | 10/1984 |
| EP | 0135485 | 3/1985 |
| EP | 0205873 | 12/1986 |
| EP | 0230349 | 7/1987 |
| EP | 0236587 | 9/1987 |
| EP | 0357719 | 3/1990 |
| EP | 0387389 | 9/1990 |
| EP | 0411748 | 2/1991 |
| EP | 0463616 | 1/1992 |
| EP | 0504616 | 2/1992 |
| EP | 0502161 | 9/1992 |
| EP | 0454122 | 8/1995 |
| EP | 0478634 | 8/1995 |
| EP | 0407026 | 11/1995 |
| EP | 0416482 | 11/1995 |
| EP | 0491455 | 12/1995 |
| EP | 0520620 | 6/1996 |
| EP | 0462815 | 9/1996 |
| EP | 0716386 | 1/1997 |
| EP | 0728339 | 5/1997 |
| EP | 0663654 | 9/1997 |
| EP | 0542298 | 4/1998 |
| EP | 0173249 | 7/1998 |

| | | | | | | |
|---|---|---|---|---|---|---|
| EP | 0741348 | 8/1998 | | WO | WO9516971 | 6/1995 |
| EP | 0522231 | 9/1998 | | WO | WO9517733 | 7/1995 |
| EP | 0738446 | 9/1998 | | WO | WO9522800 | 8/1995 |
| EP | 0770967 | 12/1998 | | WO | WO9526535 | 10/1995 |
| EP | 0502164 | 4/1999 | | WO | WO9526536 | 10/1995 |
| EP | 0911738 | 4/1999 | | WO | WO9600949 | 1/1996 |
| EP | 0697271 | 3/2000 | | WO | WO9612242 | 4/1996 |
| EP | 0826184 | 3/2000 | | WO | WO9613013 | 5/1996 |
| EP | 0913057 | 4/2000 | | WO | WO9621192 | 7/1996 |
| EP | 0990962 | 4/2000 | | WO | WO9627155 | 9/1996 |
| EP | 0710125 | 5/2000 | | WO | WO9630059 | 10/1996 |
| EP | 0828223 | 5/2000 | | WO | WO9635184 | 11/1996 |
| EP | 0683466 | 4/2001 | | WO | WO9705589 | 2/1997 |
| EP | 0778535 | 5/2001 | | WO | WO9709666 | 3/1997 |
| EP | 0697669 | 6/2001 | | WO | WO9716897 | 5/1997 |
| EP | 0749606 | 8/2001 | | WO | WO9717663 | 5/1997 |
| EP | 0880088 | 1/2002 | | WO | WO9718519 | 5/1997 |
| EP | 0803105 | 2/2002 | | WO | WO9720592 | 6/1997 |
| EP | 1115095 | 3/2002 | | WO | WO9724691 | 7/1997 |
| EP | 0692766 | 5/2002 | | WO | WO9725684 | 7/1997 |
| EP | 0992952 | 6/2002 | | WO | WO9726612 | 7/1997 |
| EP | 0734556 | 9/2002 | | WO | WO9729445 | 8/1997 |
| EP | 1012773 | 1/2003 | | WO | WO9729447 | 8/1997 |
| EP | 1280091 | 1/2003 | | WO | WO9734246 | 9/1997 |
| EP | 0851358 | 3/2003 | | WO | WO9735268 | 9/1997 |
| EP | 1131754 | 7/2003 | | WO | WO9740463 | 10/1997 |
| EP | 0789884 | 9/2003 | | WO | WO9802836 | 1/1998 |
| EP | 0762306 | 10/2003 | | WO | WO9803925 | 1/1998 |
| EP | 0853287 | 10/2003 | | WO | WO9804083 | 1/1998 |
| EP | 1083939 | 4/2005 | | WO | WO9804086 | 1/1998 |
| EP | 1522947 | 5/2005 | | WO | WO9808177 | 2/1998 |
| EP | 1062582 | 6/2005 | | WO | WO9810361 | 3/1998 |
| EP | 1032920 | 8/2005 | | WO | WO9816893 | 4/1998 |
| EP | 0915422 | 3/2006 | | WO | WO9821679 | 5/1998 |
| EP | 0791202 | 5/2006 | | WO | WO9826337 | 6/1998 |
| EP | 0886954 | 5/2006 | | WO | WO9826364 | 6/1998 |
| EP | 0891590 | 7/2006 | | WO | WO9832088 | 7/1998 |
| EP | 1693795 | 11/2006 | | WO | WO9833134 | 7/1998 |
| EP | 1182597 | 5/2010 | | WO | WO9834167 | 8/1998 |
| FR | 2490371 | 3/1982 | | WO | WO9837675 | 8/1998 |
| FR | 2585153 | 4/1987 | | WO | WO9838558 | 9/1998 |
| FR | 2634570 | 4/1990 | | WO | WO9841942 | 9/1998 |
| FR | 2658635 | 8/1991 | | WO | WO9844442 | 10/1998 |
| FR | 2733846 | 11/1996 | | WO | WO9849639 | 11/1998 |
| FR | 2739951 | 4/1997 | | WO | WO9849641 | 11/1998 |
| FR | 2783619 | 3/2000 | | WO | WO9849642 | 11/1998 |
| GB | 1489572 | 10/1977 | | WO | WO9858338 | 12/1998 |
| GB | 2102606 | 2/1983 | | WO | WO9905501 | 2/1999 |
| GB | 2105075 | 3/1983 | | WO | WO9909503 | 2/1999 |
| GB | 2273593 | 6/1994 | | WO | WO9909506 | 2/1999 |
| GB | 2275550 | 8/1994 | | WO | WO9913425 | 3/1999 |
| GB | 2308210 | 6/1997 | | WO | WO9913427 | 3/1999 |
| GB | 2315579 | 2/1998 | | WO | WO9923573 | 5/1999 |
| GB | 2326001 | 12/1998 | | WO | WO9923592 | 5/1999 |
| GB | 2336211 | 10/1999 | | WO | WO9927492 | 6/1999 |
| SG | 0105592 | 12/1992 | | WO | WO9939290 | 8/1999 |
| SG | 0085593 | 1/2002 | | WO | WO9950995 | 10/1999 |
| WO | WO9010910 | 9/1990 | | WO | WO9952025 | 10/1999 |
| WO | WO9011571 | 10/1990 | | WO | WO9963472 | 12/1999 |
| WO | WO9011572 | 10/1990 | | WO | WO9967712 | 12/1999 |
| WO | WO9105572 | 5/1991 | | WO | WO0011671 | 3/2000 |
| WO | WO9116691 | 10/1991 | | WO | WO0013123 | 3/2000 |
| WO | WO9204920 | 4/1992 | | WO | WO 00/54178 | 9/2000 |
| WO | WO9210901 | 6/1992 | | WO | WO 01/04822 | 1/2001 |
| WO | WO9302422 | 2/1993 | | WO | WO 01/46884 | 6/2001 |
| WO | WO9303446 | 2/1993 | | WO | WO 01/55939 | 8/2001 |
| WO | WO9306931 | 4/1993 | | | | |
| WO | WO9314463 | 7/1993 | | | | |
| WO | WO9324892 | 12/1993 | | | | |

OTHER PUBLICATIONS

ADA Decision Systems, Decision Analysis Software for Microsoft Windows (Student ed. 1995) (ISBN 0-534-24816-0).

Robert T. Clemen, Making Hard Decisions: An Introduction to Decision Analysis (2d ed. 1996).

Understanding PMSIM (Excerpt) (CP 104-01.02 US)(1997).

Teras Production 2000 Suite, Including Drilling 2000 (Release 1998. 1.0), Halliburton.

Defendant's Invalidity Contentions, Case No. 6:08-cv-00051 (ED. Tex. (Tyler Div.))(Jun. 6, 2009).

Sage's Answer (CPN070), Case No. 6:08-cv-00051 (ED. Tex. (Tyler Div.))(Oct. 20, 2008).
Oracle's Answer (CPN072), Case No. 6:08-cv-00051 (ED. Tex. (Tyler Div.))(Oct. 20, 2008).
SAP's Answer (CPN074), Case No. 6:08-cv-00051 (ED. Tex. (Tyler Div.))(Oct. 20, 2008).
Infor's Answer (CPN087), Case No. 6:08-cv-00051 (ED. Tex. (Tyler Div.))(Nov. 26, 2008).
Infor's Answer (CPN114), Case No. 6:08-cv-00051 (ED. Tex. (Tyler Div.))(Mar. 23, 2009).
SAP's Answer (CPN116), Case No. 6:08-cv-00051 (ED. Tex. (Tyler Div.))(Mar. 23, 2009).
Oracle's Answer (CPN117), Case No. 6:08-cv-00051 (ED. Tex. (Tyler Div.))(Mar. 23, 2009).
Sage's Answer (CPN118), Case No. 6:08-cv-00051 (ED. Tex. (Tyler Div.))(Mar. 23, 2009).
Defs' MSJ (CPN136), Case No. 6:08-cv-00051 (ED. Tex. (Tyler Div.))(Apr. 17, 2009).
Infor's Amended Answer (CPN139), Case No. 6:08-cv-00051 (ED. Tex. (Tyler Div.))(May 4, 2009).
SAP's 1st Amended Answer (CPN140), Case No. 6:08-cv-00051 (ED. Tex. (Tyler Div.))(May 4, 2009).
Aloft Opposition to Defs' MFSJ (CPN156), Case No. 6:08-cv-00051 (ED. Tex. (Tyler Div.))(May 22, 2009).
Aloft Surreply to MFSJ (CPN165), Case No. 6:08-cv-00051 (ED. Tex. (Tyler Div.))(Jun. 19, 2009).
Report and Recommendation of Magistrate (CPN175), Case No. 6:08-cv-00051 (ED. Tex. (Tyler Div.))(Aug. 10, 2009).
Defs' Objection to Love's SJM (CPN177), Case No. 6:08-cv-00051 (ED. Tex. (Tyler Div.))(Aug. 21, 2009).
ORDER Adopting Recommendation and Denying MSJ (CPN182), Case No. 6:08-cv-00051 (ED. Tex. (Tyler Div.))(Aug. 28, 2009).
Jnt Claim (CPN196), Case No. 6:08-cv-00051 (ED. Tex. (Tyler Div.))(Sep. 29, 2009).
Aloft's Opening Claim Construction Brief (CPN203), Case No. 6:08-cv-00051 (ED. Tex. (Tyler Div.))(Oct. 13, 2009).
Oracle's MSJ of Invalidity (CPN207), Case No. 6:08-cv-00051 (ED. Tex. (Tyler Div.))(Oct. 27, 2009).
Oracle's Responsive Claim Construction Brief (CPN208), Case No. 6:08-cv-00051 (ED. Tex. (Tyler Div.))(Oct. 27, 2009).
Aloft's Response Re MSJ of Invalidity (CPN212), Case No. 6:08-cv-00051 (ED. Tex. (Tyler Div.))(Nov. 6, 2009).
Aloft's Reply to Defs' Response Claim Construction Brief (CPN213), Case No. 6:08-cv-00051 (ED. Tex. (Tyler Div.))(Nov. 6, 2009).
Defs' Reply (CPN214), Case No. 6:08-cv-00051 (ED. Tex. (Tyler Div.))(Nov. 12, 2009).
Scottrade's Answer (CPN037), Case No. 6:08-cv-00304 (ED. Tex. (Tyler Div.))(Dec. 7, 2009).
Scottrade's Answer (CPN053), Case No. 6:08-cv-00304 (ED. Tex. (Tyler Div.))(Dec. 30, 2009).
Hall's Answer (CPN068), Case No. 6:08-cv-00304 (ED. Tex. (Tyler Div.))(Feb. 5, 2010).
Fair Issac's Answer (CPN081), Case No. 6:08-cv-00304 (ED. Tex. (Tyler Div.))(Mar. 24, 2010).
Defs' First Amended Invalidity Contentions, Case No. 6:08-cv-00051 (ED. Tex. (Tyler Div.))(Sep. 11, 2009).
Infors' Amended Initial Disclosures, Case No. 6:08-cv-00051 (ED. Tex. (Tyler Div.))(Sep. 21, 2009).
Palisade Corp.; Analytical Power Tools Update vol. 3, #2, "Top Rank: Revolutionizing "What If" Analysis!".
Palisade Corp.; "User's Guide, Precision Tree, Decision Analysis Add-In for Microsoft Excel"; Oct. 2004.
Palisade Corp.; "Guide to Using, Top Rank, What-If Analysis Add-In for Microsoft Excel and Lotus 1-2-3"; Jul. 2000.
Clemen, Robert T., "Making Hard Decisions, An Introduction to Decision Analysis", Second Edition; 1996.
Clemen, Robert T., "Making Hard Decisions, An Introduction to Decision Analysis"; 1991.
Hoy, Wayne K., Tarter, C. John, "Administrators Solving the Problem of Practice, Decision-Making Concepts, Cases, and Consequences"; 1995.
ADA Decision Systems, "DPL Standard Version User Guide"; 1995.

Barabba, V., "Meeting of the Minds: Creating the Market-Based Enterprise," Harvard Business School Press: Boston; 1995.
Equis International, "MetaStock For Windows 95 & NT User's Manual Version 6.5"; 1997.
Palisade Corp.; "@RISK: Risk Analysis and Simulation Add-In for Microsoft Excel or Lotus 1-2-3 User's Manual"; 1995.
Palisade Corp.; "TopRank: Revolutionizing "What-if" Analysis!"; Analytical Power Tools Update vol. 3, No. 3; 1995.
Palisade Corp.; "TopRank: Revolutionizing "What-if" Analysis!"; Analytical Power Tools Update vol. 3, No. 4, 1995.
ADA Decision Systems; DPL Advanced Version User Guide; 1995.
Palisade Corporation; "@RISK: Risk Analysis and Simulation Add-In for Microsoft Excel," Windows or Apple Macintosh Version, Release 1.12 User's Guide; Jul. 1, 1993.
Palisade Corporation; @ RISK, The @ RISK Tutorial.
Palisade Corporation; @ RISK Reference Guide.
Palisade Corporation; @ RISK, "Worlds Best Risk Analysis Software".
Palisade Corporation; @ RISK, "Plant Decision Trees Right in Your Spreadsheet".
Palisade Corporation; "@RISK: Risk Analysis and Simulation Add-In for Microsoft Excel," Windows Version User's Guide; Feb. 1, 1995.
Haeckel, Stephan H.; "Adaptive Enterprise, Creating and Leading Sense-and-Respond Organizations"; 1999.
Kirkwood, Craig W.; "An Overview of Methods for Applied Decision Analysis"; Interfaces 22:3; Nov.-Dec. 1992.
Krumm, F.W., Rolle, C.F., "Management and Application of Decision and Risk Analysis in Du Pont"; Interfaces 22:3; Nov.-Dec. 1992.
Bhargava, H. K., et al.; "Beyond Spreadsheets: Tools for Building Decision Support Systems"; IEEE Computer vol. 32, pp. 31-39; Mar. 1999.
Raiffa, Howard; "Decision Analysis, A Personal Account of how it got Started and Evolved"; Operations Research vol. 50, No. 1, pp. 179-185; Jan.-Feb. 2002.
Howard, Ronald A.; "An Assessment of Decision Analysis"; Operations Research vol. 28, No. 1, pp. 4-27; Jan.-Feb. 1980.
Howard, Ronald A.; "Decision Analysis: Practice and Promise"; Management Science vol. 34. No. 6, pp. 679-695; Jun. 1988.
Bodily, Samuel E., Allen, Michael S.; "A Dialogue Process for Choosing Value-Creating Strategies"; Interfaces 29:6, pp. 16-28; Nov.-Dec. 1999.
Henrion, et al.; "Innovations in Integrated Assessment: The Tracking and Analysis Framework (TAF)"; Presented at the Air and Waste Management Conference on Acid Rain and Electric Utilities, Jan. 1997, Scottsdale, Arizona.
Business Wire, "Lumina Decision Systems Powers Up Business Modeling with Analytica 2.0; New Versions of Analytica Feature OLE Linking and ODBC Integration"; Jul. 1999.
Henrion, Max; "Reusable Influence Diagram Modules for Rapid Program Planning and Decision Analysis"; Lumina Decision Systems Phase I SBIR Final Report Apr. 20, 1996.
Younes, Hakan L.; "Current Tools for Assisting Intelligent Agents in Real-Time Decision Making"; Thesis Paper at Royal Institute of Technology School of Electrical Engineering and Information Technology; Dec. 1998.
Sweeney, John; "Product Review: Option Station, Version 1.2 Build 6"; Stocks & Commodities V15:14 (659-662).
Palisade Corp.; "TopRank: Revolutionizing "What-if" Analysis!"; Analytical Power Tools Update vol. 3, No. 2; 1995.
Palisade Corp.; "User's Guide, Precision Tree, Decision Analysis Add-In for Microsoft Excel"; Oct. 2004.
Prevision, Inc.; "Strategist User Manual, Beta Version 1.0.B.14"; Aug. 1997.
Eschenbach, Ted G., "Spiderplots versus Tornado Diagrams for Sensitivity Analysis"; Interfaces 22:6, pp. 40-46; Nov.-Dec. 1992.
Schutzmen, Fred G.; "Product Review: Trade Station v. 3.5"; Stocks & Commodities v13, pp. 586-589.
Sweeney, John; "Product Review: Trade Station version 4, Build 15"; Stocks & Commodities v14.14, pp. 649-654.
Omega Research, Inc.; "Reference Manual: Omega Research Analysis Techniques"; 1997.

Omega Research, Inc.; "TradeStation User's Manual Version 4"; 1997.
Kusnic, et al.; "The Unifying Vision Process: Value Beyond Traditional Decision Analysis in Multiple-Decision-Maker Environments"; Interfaces 22:6, pp. 150-166; Nov.-Dec. 1992.
Hegdal, et al.; "Production Forecasting of an Unstable Compacting Chalk Field Using Uncertainty Analysis"; Society of Professional Engineers, SPE 50644, pp. 149-160; Oct. 1998.
Murtha, J. A.; "Decisions Involving Uncertainty: An @RISK Tutorial for the Petroleum Industry"; 1995.
Landmark Graphics Corp.; "Software Requirements Specification: 3M Sensitivity Analysis"; Nov. 1996.
"Aries for Windows—The Integrated Production, Reserve and Economic Evaluation System".
Screen images of ARIES Program output displays.
Beck, Gary F.; "Examination of MWD Wireline Replacement by Decision Analysis Methods: Two Case Histories"; The Log Analyst, pp. 62-80; May-Jun. 1997.
Megil, Robert E.; "An Introduction to Exploration Economics, Third Edition"; 1988.
Goodson, et al.; "Strategic Planning of the NWS Offshore Expansion Activities"; Society of Petroleum Engineers, SPE 50112, pp. 361-365; 1998.
Skinner, David C.; "Introduction to Decision Analysis, A Practitioner's Guide to Improving Decision Quality, Second Edition"; 1999.
Murtha, J. A.; "Monte Carlo Simulation: Its Status and Future," Society of Petroleum Engineers, SPE 37932, pp. 361-373; Apr. 1997.
Neal, Larry Jr.; "Use of the Decision Quality Process for Strategic Planning in the Duri Field, Indonesia," Society of Petroleum Engineers, SPE 28743, pp. 31-46; Nov. 1994.
Thompson, R. R.; "A Methodology to Quantify Uncertainties and Leveraging Issues in Oil and Gas Project Economics," Society of Petroleum Engineers, SPE 19861, pp. 741-750; Oct. 1989.
GLOBEtrotter Software; "FLEXlm End User Manual," FLEXlm version 6.1; Oct. 1998.
Economic Analysis Systems, Inc.; "TERAS Evaluation Module Tutorial"; 1996.
Economic Analysis Systems, Inc.; "TERAS Evaluation Module User's Manual"; 1997.
General Motors Decision Support Center; "A Coach's Guide to the DDP"; Apr. 1993.
2010_10_08d01 Dfts Invalidity Contentions & Disclosures under PR 3-3 & 3-4.
2010_10_08d02 Dfts Invalidity Contentions-Chart A01.
2010_10_08d03 Dfts Invalidity Contentions-Chart A02.
2010_10_08d04 Dfts Invalidity Contentions-Chart A03.
2010_10_08d05 Dfts Invalidity Contentions-Chart A04.
2010_10_08d06 Dfts Invalidity Contentions-Chart A05.
2010_10_08d07 Dfts Invalidity Contentions-Chart A06.
2010_10_08d08 Dfts Invalidity Contentions-Chart A07.
2010_10_08d09 Dfts Invalidity Contentions-Chart A08.
2010_10_08d10 Dfts Invalidity Contentions-Chart A09.
2010_10_08d11Dfts Invalidity Contentions-Chart A10.
2010_10_08d12Dfts Invalidity Contentions-Chart A11.
2010_10_08d13Dfts Invalidity Contentions-Chart A12.
2010_10_08d14Dfts Invalidity Contentions-Chart A13.
2010_10_08d15Dfts Invalidity Contentions-Chart A14.
2010_10_08d16Dfts Invalidity Contentions-Chart A15.
2010_10_08d17Dfts Invalidity Contentions-Chart A16.
2010_10_08d18Dfts Invalidity Contentions-Chart A17.
2010_10_08d19Dfts Invalidity Contentions-Chart A18.
2010_10_08d20Dfts Invalidity Contentions-Chart A19.
2010_10_08d21Dfts Invalidity Contentions-Chart A20.
2010_10_08d22Dfts Invalidity Contentions-Chart A21.
2010_10_08d23Dfts Invalidity Contentions-Chart A22.
2010_10_08d24Dfts Invalidity Contentions-Chart A23.
2010_10_08d25Dfts Invalidity Contentions-Chart A24.
2010_10_08d26Dfts Invalidity Contentions-Chart A25.
2010_10_08d27Dfts Invalidity Contentions-Chart B01.
2010_10_08d28Dfts Invalidity Contentions-Chart B02.
2010_10_08d29 Dfts Invalidity Contentions-Chart B03.
2010_10_08d30Dfts Invalidity Contentions-Chart B04.
2010_10_08d31Dfts Invalidity Contentions-Chart B05.
2010_10_08d32 Dfts Invalidity Contentions-Chart B06.
2010_10_08d33Dfts Invalidity Contentions-Chart B07.
2010_10_08d34Dfts Invalidity Contentions-Chart B08.
2010_10_08d35 Dfts Invalidity Contentions-Chart B09.
2010_10_08d36Dfts Invalidity Contentions-Chart B10.
2010_10_08d37Dfts Invalidity Contentions-Chart B11.
2010_10_08d38Dfts Invalidity Contentions-Chart B12.
2010_10_08d39Dfts Invalidity Contentions-Chart B13.
2010_10_08d40Dfts Invalidity Contentions-Chart B14.
2010_10_08d41Dfts Invalidity Contentions-Chart B15.
2010_10_08d42Dfts Invalidity Contentions-Chart B16.
2010_10_08d43Dfts Invalidity Contentions-Chart B17.
2010_10_08d44Dfts Invalidity Contentions-Chart B18.
2010_10_08d45Dfts Invalidity Contentions-Chart B19.
2010_10_08d46Dfts Invalidity Contentions-Chart B20.
2010_10_08d47Dfts Invalidity Contentions-Chart B21.
2010_10_08d48Dfts Invalidity Contentions-Chart B22.
2010_10_08d49Dfts Invalidity Contentions-Chart B23.
2010_10_08d50Dfts Invalidity Contentions-Chart B24.
2010_10_08d51Dfts Invalidity Contentions-Chart B25.
TERAS Suite 1998 (Release 1991.1.0 alpha 3).
ARIES for Windows (Release Nov. 1996).
ARIES Help File.
Owen, "The Use of Influence Diagrams In Structuring Complex Decision Problems," 1978, Strategic Decisions Group.
Office Action Summary from U.S. Appl. No. 09/708,154 which was mailed on Jul. 3, 2003.
Office Action Summary from U.S. Appl. No. 09/708,154 which was mailed on Apr. 22, 2004.
Office Action Summary from U.S. Appl. No. 09/708,154 which was mailed on Jun. 9, 2004.
Notice of Allowance from U.S. Appl. No. 09/708,154 which was mailed on Oct. 25, 2004.
Office Action Summary from U.S. Appl. No. 11/045,543 which was mailed on Dec. 1, 2006.
Office Action Summary from U.S. Appl. No. 11/045,543 mailed on Aug. 27, 2007.
Final Office Action Summary from U.S. Appl. No. 11/045,543 mailed on Nov. 27, 2007.
Notice of Allowance from U.S. Appl. No. 11/045,543 which was mailed on Mar. 17, 2008.
Office Action Summary from U.S. Appl. No. 11/768,861 which was mailed on Sep. 10, 2009.
Notice of Allowance from U.S. Appl. No. 11/768,861 which was mailed on Mar. 13, 2009.
Office Action Summary from U.S. Appl. No. 11/768,836 mailed on Sep. 9, 2008.
Notice of Allowance from U.S. Appl. No. 11/768,836 mailed on Jul. 13, 2009.
Office Action Summary from U.S. Appl. No. 11/768,815 which was mailed on Aug. 28, 2008.
Notice of Allowance from U.S. Appl. No. 11/768,815 which was mailed on Nov. 24, 2008.
Office Action Summary from U.S. Appl. No. 11/828,115 which was mailed on Sep. 29, 2008.
Notice of Allowance from U.S. Appl. No. 11/828,115 which was mailed on Dec. 31, 2008.
Office Action Summary from U.S. Appl. No. 11/828,129 which was mailed on Oct. 17, 2008.
Notice of Allowance from U.S. Appl. No. 11/828,129 mailed on May 22, 2009.
Notice of Allowance from U.S. Appl. No. 11/828,129 mailed on Sep. 29, 2009.
Dr. Michael W. Kusnic, "Collaborative Decisionmaking Platform: Value Creation and Organizational Learning through Collaborative Decisionmaking," Strategic Business Processes, inc.
Dr. Michael W. Kusnic, "The Potential for the Knowledge Management Business: Lessons Learned from the Experience at General Motors," Strategic Business Processes, inc.
Michael W. Kusnic and Daniel Owen, "An Achievable Vision for the Strategic Knowledge Management Business," Strategic Business Processes, inc.

Ogescu, C.; Plaisanu, C.; Bistriceanu, D.; "Web Based Platform for Management of Heterogeneous Medical Data." Automation, Quality and Testing, Robotics, 2008. AQTR 2008. IEEE International Conference on vol. 3, May 22-25, 2008 pp. 257-260 Digital Object Identifier 10.1109/AQTR.2008.4588923.

Jingdong Cui, "Consumer Decision Process Model in Multi-channel Retail Banking;" Service Systems and Service Management, 2007 International Conference on Jun. 9-11, 2007 pp. 1-6 Digital Object Identifier 10.1109/ICSSSM.2007.4280113.

Lee, Sang-Chul; Bajcsy, P.; "Understanding Challenges in Preserving and Reconstructing Computer-Assisted Medical Decision Processes." Machine Learning and Applications, 2007. ICMLA 2007. Sixth International Conference on Dec. 13-15, 2007 pp. 524-529 Digital Object Identifier 10.1109/ICMCLA.2007.92.

Miller, L.L.; Nilakanta, S.; "Design of Organizational Decision Support Systems: The Use of a Data Extraction Scheme to Facilitate Model-Database Communication." System Sciences, 1991. Proceedings of the Twenty-Fourth Annual Hawaii International Conference on vol. iv, Jan. 8-11, 1991 pp. 67-72 vol. 4.

Yato, A.; Rodriguez, J.R.; Cangur, G.; Boonbutra, R.; Kumte, R.; Lahagu, R.; "Car Purchase Decisions." Management of Engineering and Technology, 2001. PICMET '01. Portland International Conference on vol. 1, Jul. 29-Aug. 2, 2001 p. 126 vol. 1 Digital Object Identifier 10.1109/PICMET.2001.951835.

Arunkumar, S.; Jain, S.K.; "Multimedia as Value Enabler for Decision Making in Virtual Enterprises." Engineering and Technology Management, 1996. IEMC 96. Proceedings, International Conference on Aug. 18-20, 1996 pp. 34-41 Digital Object Identifier 10.1109/IEMC.1996.547786.

J. Douglas; 011ila, Richard G.; "Analysis of Complex Decisionmaking Processes." Hill Systems, Man and Cybernetics, IEEE Transactions on vol. 8, Issue 3, Mar. 1978 pp. 193-204 Digital Object Identifier 10.1109/TSMC.1978.4309930.

Klein, R.W.; Dame, M.A.; Dittus, R.S.; DeBrota, D.J.; "Using Discrete Event Simulation to Evaluate Housestaff Work Schedules." Simulation Conference, 1990. Proceedings., Winter Dec. 9-12, 1990 pp. 738-742 Digital Object Identifier 10.1109/WSC.1990.129606.

Zhang, N.; Lu, W.F.; "A Framework for Managing Enterprise Knowledge for Collaborative Decision Support." Industrial Informatics, 2007 5$^{th}$ IEEE International Conference on vol. 1, Jun. 23-27, 2007 pp. 517-522.

Zhang, N.; He, W.; Lee, E.W.; "Address Supply Chain Visibility from Knowledge Management Perspective." Industrial Informatics 2008. INDIN 2008. 6$^{th}$ IEEE International Conference on Jul. 13-16, 2008 pp. 865-870 Digital Object Identifier 10.1109/INDIN.2008.4618222.

Indiramma, M.; Anandakumar, K.R.; "Collaborative Decision Making Framework for Multi-agent System." Computer and Communication Engineering, 2008. ICCCE 2008. International Conference on May 13-15, 2008 pp. 1140-1146 Digital Object Identifier 10.1109/ICCCE.2008.4580785.

Groppe, M.; Bui, M.; "Study of Cockpit's Perspective on Human-Human Interactions to Guide Collaborative Decision Making Design in Air Traffic Management." Advances in Computer-Human Interaction, 2008 First International Conference on Feb. 10-15, 2008 pp. 107-113 Digital Object Identifier 10.1109/ACHI.2008.51.

Jiabin Xie; Nerlikar, A.; Glover, J.R.; McKinley, B.A.; "An ICU Protocol Development and Management System." Computer-Based Medical Systems, 2000. CBMS 2000. Proceedings. 13th IEEE Symposium on Jun. 22-24, 2000 pp. 43-47 Digital Object Identifier 10.1109/CBMS.2000.856872.

Aboy, M.; McNames, J.; Tran Thong; Tsunami, D.; Ellenby, M.S.; Goldstein, B.; "An Automatic Beat Detection Algorithm for Pressure Signals." Biomedical Engineering, IEEE Transactions on vol. 52, Issue 10, Oct. 2005 pp. 1662-1670 Digital Object Identifier 10.1109/TBME.2005.855725.

Pham, T.D.; Honghui Wang; Xiaobo Zhou; Dominik Beck; Brandl, M.; Hoehn, G.; Azok, J.; Brennan, M.-L.; Hazen, S.L.; Li, K.; Wong, S.T.C.; "Computational Prediction Models for Early Detection of Risk of Cardiovascular Events Using Mass Spectrometry Data." Information Technology in Biomedicine, IEEE Trans on vol. 12, Issue 5, Sep. 2008 pp. 636-643.

Poulsen, R.S.; Pedron, I.; "Region of Interest Finding in Reduced *Resolution* Colour Imagery. Application to Cancer Cell Cetection in Cell Overlaps and Clusters." Engineering in Medicine and Biology Society, 1995., IEEE 17th Annual Conference vol. 1, Sep. 20-23, 1995 pp. 499-500 vol. 1 Digital Object Identifier 10.1109/IEMBS.1995.575219.

Larsson, M.; "An Adaptive Predictive Approach to Emergency Frequency Control in Electric Power Systems." Decision and Control, 2005 and 2005 European Control Conference. CDC-ECC '05. 44th IEEE Conference on Dec. 12-15, 2005 pp. 4434-4439.

Johnson, Timothy L.; Wright, Stuart C.; Segall, Adrian; "Filtering of Muscle Artifact from the Electroencephalogram." Biomedical Engineering, IEEE Transactions on vol. BME-26, Issue 10, Oct. 1979 pp. 556-563 Digital Object Indentifier 10.1109/TBME.1979.326443.

Benotto, F.; Bressani, T.; Calvo, D.; Iazzi, F.; Lamberti, C.; "The Trigger of the TOFUS Detector." Nuclear Science Symposium and Medical Imaging Conference, 1991., Conference Record of the 1991 IEEE Nov. 2-9, 1991 pp. 584-588 vol. 1 Digital Object Identifier 10.1109/NSSMIC.1991.259004.

DeFranco-Tommarello, J.; Deek, F.P.; "Collaborative Problem Solving and Groupware for Software Development." Engineering Management Review, IEEE vol. 35, Issue 4, Fourth Quarter 2007 pp. 54-54 Digital Object Identifier 10.1109/EMR.2007.4489950.

Sculley et al., "B2B Exchanges: The Killer Application in the Business-to-Business Internet Revolution," ISI Publications, 2000, pp. 195-247.

"CPFR: Collaborative Planning, Forecasting, and Replenishment Voluntary Guidelines," Voluntary Interindustry Commerce Standards, 1998.

Sriram et al., "Computer-Aided Cooperative Product Development: A Case Study," International Journal of Systems Automation: Research and Applications (SARA), 1991, vol. 1, No. 1, pp. 89-112.

Miller et al., "Development of Automated Aids for Decision Analysis," Technical Report, Stanford Research Institute, May 1976.

Sriram et al., "DICE: An Object-Oriented Programming Environment For Cooperative Engineering Design," Artificial Intelligence in Engineering Design, vol. 3, Academic Press Inc., 1992, pp. 303-366.

"Strategic Management of R&D: Overview," Strategic Decisions Group, May 22, 1995.

U.S. Patent File History for U.S. Appl. No. 09/270,007, filed Mar. 16, 1999.

U.S. Patent File History for U.S. Appl. No. 09/311,150, filed May 13, 1999.

Logcher et al., "Ghost: A Project Network Generator," J. of Computing in Civil Engineering, ASCE, vol. 2, No. 3, Jul. 1988, pp. 239-254.

Guttman, "Merchant Differentiation through Integrative Negotiation in Agent-mediated Electronic Commerce," Massachusetts Institute of Technology, 1998.

Holtzman, "Intelligent Decision Systems," Addison-Wesley Publishing Company, Inc., 1989, pp. 56-106.

Kano et al., "International Multi-Company Collaborative Engineering: A Study of Japanese Engineering and Construction Firms," Massachusetts Institute of Technology, 1994.

"MIT Libraries' catalog—Barton—Full Catalog—Full Record," Massachusetts Institute of Technology, http://library.mit.edu/item/000911321, last accessed on Jan. 29, 2008.

Declaration associated with Civil Case No. 2:06-cv-440.

Subpoena associated with Civil Case No. 2:06-cv-440.

Nessralla, "*Letter re Sky Technologies LLC v. SAP AG, SAP Americas, Inc and Oracle Corporation Subpoena for Records of the Massachusetts Institute of Technology*," Jan. 30, 2008.

Sairamesh et al., "NetBazaar: Networked Electronic Markets for Trading Computation and Information Services," Springer-Verlag Berlin Heidelberg, 1998, ECDL'98, LNCS 1513, pp. 839-856.

"The Manual Decision Advisor: vol. 1—Project Analysis," Strategic Decisions Group, 1998.

Sanders, "Automated Creation of Clinical-Practice Guidelines from Decision Models," Gillian D. Sanders, Jun. 1998.

Sriram et al., "The MIT Dice Project," Computer, vol. 26, No. 1, 1993, pp. 64-65.

Sriram et al., "Transaction-Management Issues in Collaborative Engineering," J. of Computing in Civil Engineering, ASCE, vol. 6, No. 1, Jan. 1992, pp. 85-105.

"Decision Analysis Software for Microsoft Windows, Student Edition," ADA Decision Systems, 1992.
Barabba et al., "Communication in Action: GM's Dialogue Decision Process," Strategic Communication Management, Dec./Jan. 1997, pp. 24-28.
McNamee et al., "Decision Analysis with Supertree," $2^{nd}$ Edition, The Scientific Press, pp. 281-304.
"Readings in Electronic Commerce," Addison Wesley Longman, Inc., 1997.
Holtzman, "Intelligent Decision Systems," Stanford University, 1985.
"NetIQ AppManager Suite," NetIQ Corporation, 2005.
Oliver et al. (ed.), "Influence Diagrams, Belief Nets and Decision Analysis," John Wiley & Sons Ltd., 1990.
Buck-Emden et al., "SAP R/3 System: A Client/Server Technology," Addison-Wesley, 1996.
"SunNetManager 2.2.3 User's Guide," Sun Microsystems, Inc., 1995.
"Supertree In Use," SDG Decision Systems, 1986.
"Quick Start: Introduction to Decision Analysis with Supertree, PC Version," SDG Decision Systems, Feb. 1989.
"LO Logisitics Information System."
"MM External Services Management."
"Consignment."
"MM Purchasing Guide."
"Sales."
"R/3 Internet Application Components."
"MM Vendor Evaluation."
Abbas, "The Evolution of Decision Analysis," Department of Management Science and Engineering, Stanford University.
Huang et al., "A Sense-and-Respond Approach to Business Transformation," Proceedings of the IEEE International Conference on E-Commerce Technology for Dynamic Business (CEC-East'04), 2004.
"Dialogue Decision Process: Alternatives."
"A Guide to CPFR Implementation," ECR Europe, Apr. 2001.
"SAP Business-to-Business Procurement."
"System Administration."
"Database Administration."
"EC Enterprise Controlling."
The IDoc Interface Concept.
"FI Financial Accounting."
"IM Investment Management."
"PM Plant Maintenance."
"General Information," EDI (Electronic Data Interchange).
"Configurable Materials in Purchasing."
"ABAP/4 Development Workbench."
"SAP Open Information Warehouse Frontend for Microsoft Excel."
Documentation associated with Civil Action No. 6:08-cv-51.
Owen et al., "Multi-agent trading environment," BT Technol J, vol. 17, No. 3, Jul. 1999, pp. 33-43.
Keeney, Ralph L., Raiffa, Howard, "Decisions With Multiple Objectives-Preferences and Value Tradeoffs" 1975. 588 Pages.
PMSIM Systems, *Understanding PMSIM*, "Volvo, Mekoprint, Hardi International, Kongskilde, Vestas, Ericsson, Müller Print, Bang & Olufsen, Gillette and Tornos Bechler are Just Some of the Many Companies Using PMSIM Today." (1997).
US 7,734,534, 06/2010, Graff (withdrawn)

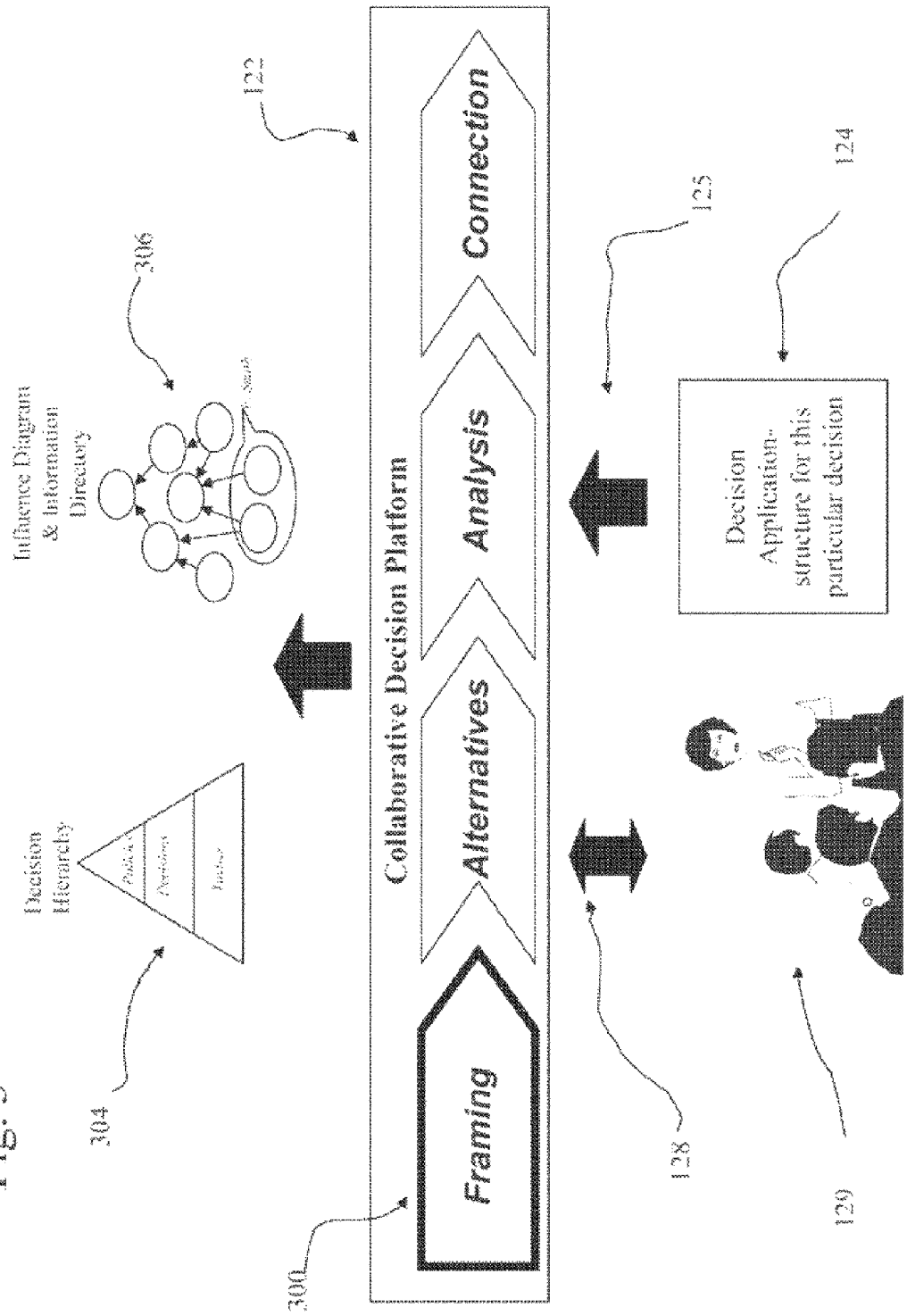

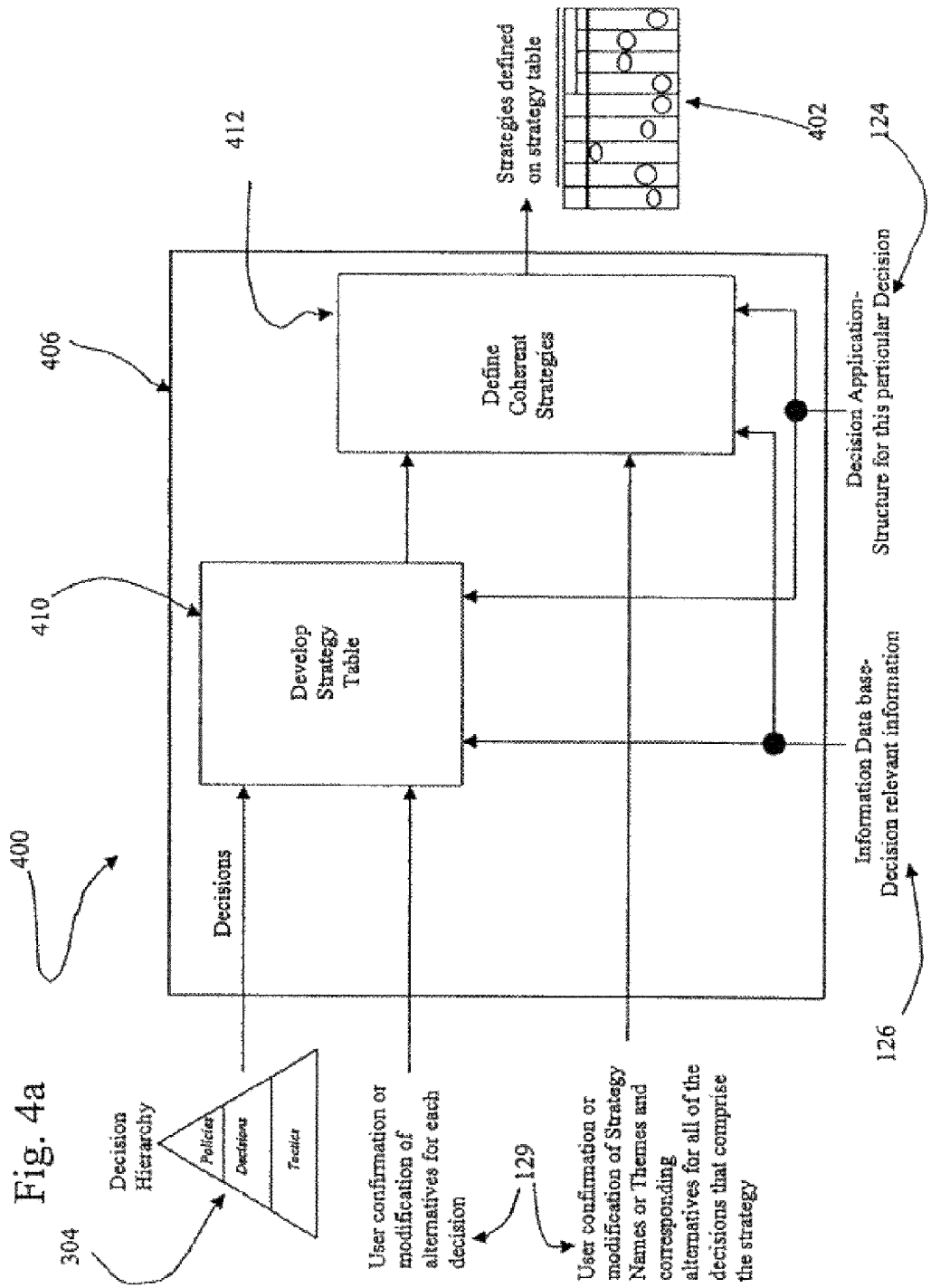

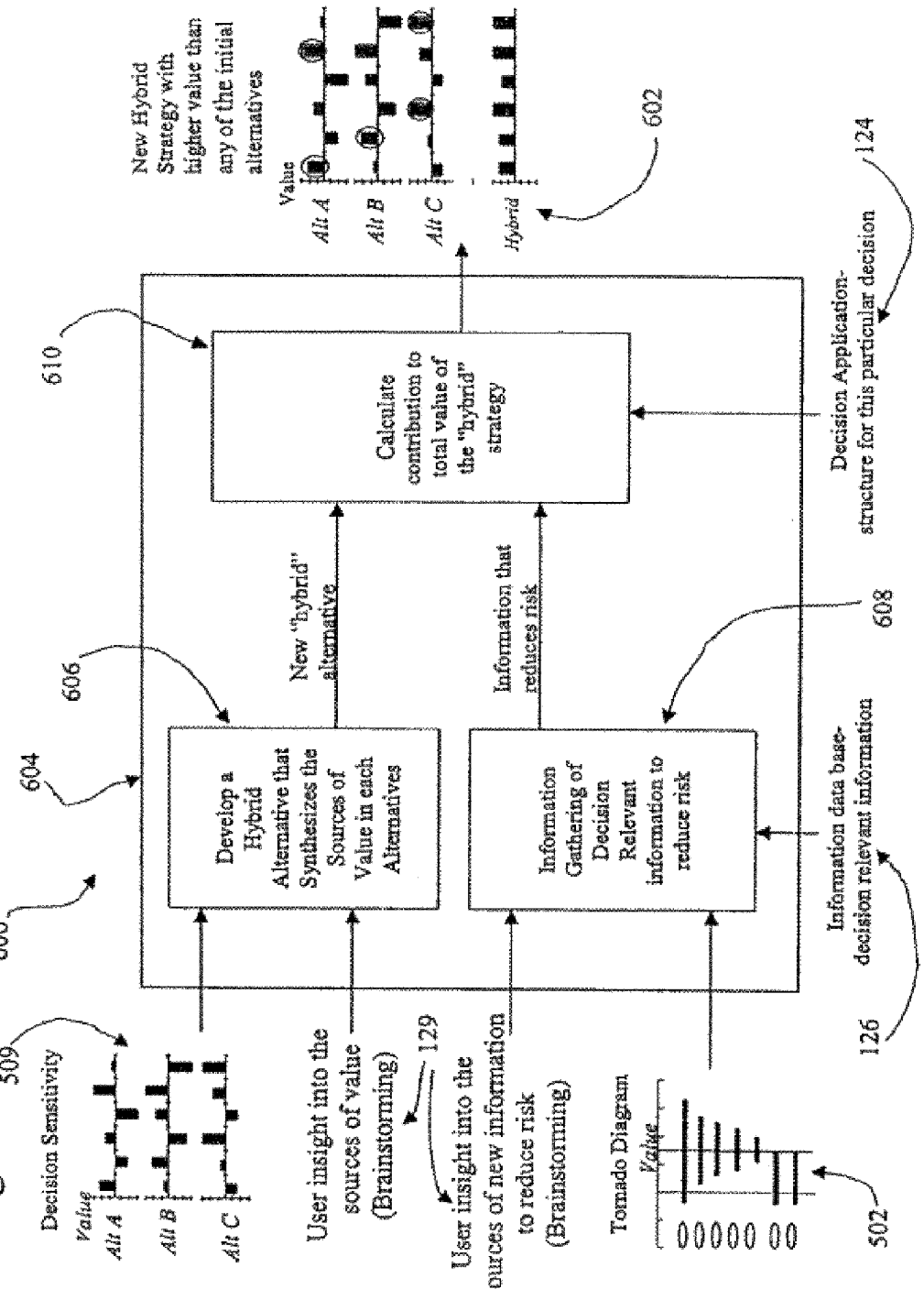

| Strategy Table | | | |
|---|---|---|---|
| Strategy Name | Initial Participation July 1, 2000 | Participation Adjustment Jan 1, 2001 | |
| No Participation | 0% | 0% | |
| In and Out | 5% | 5% | |
| Out and In | 7% | 7% | |
| | 10% | 10% | |

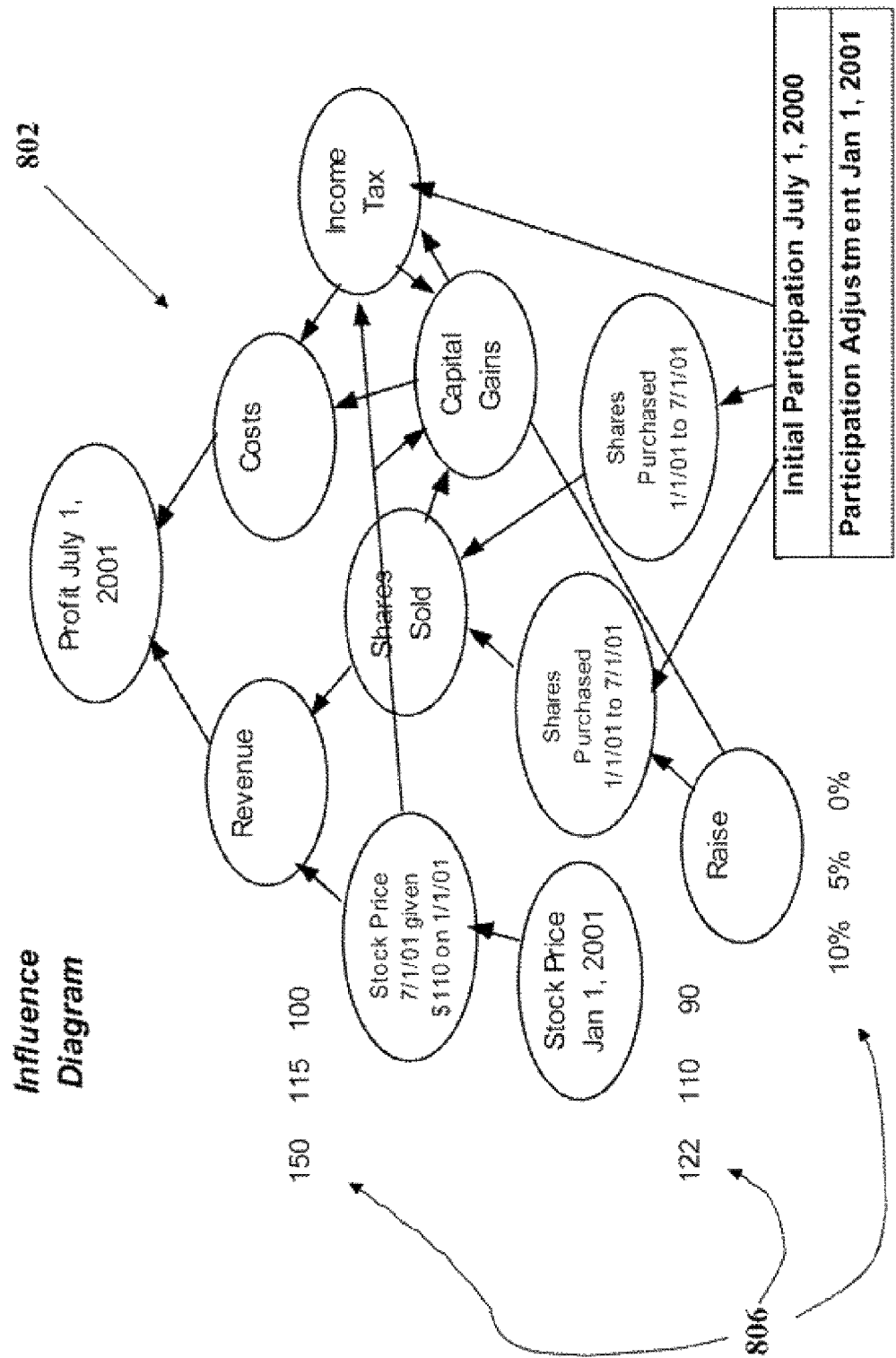

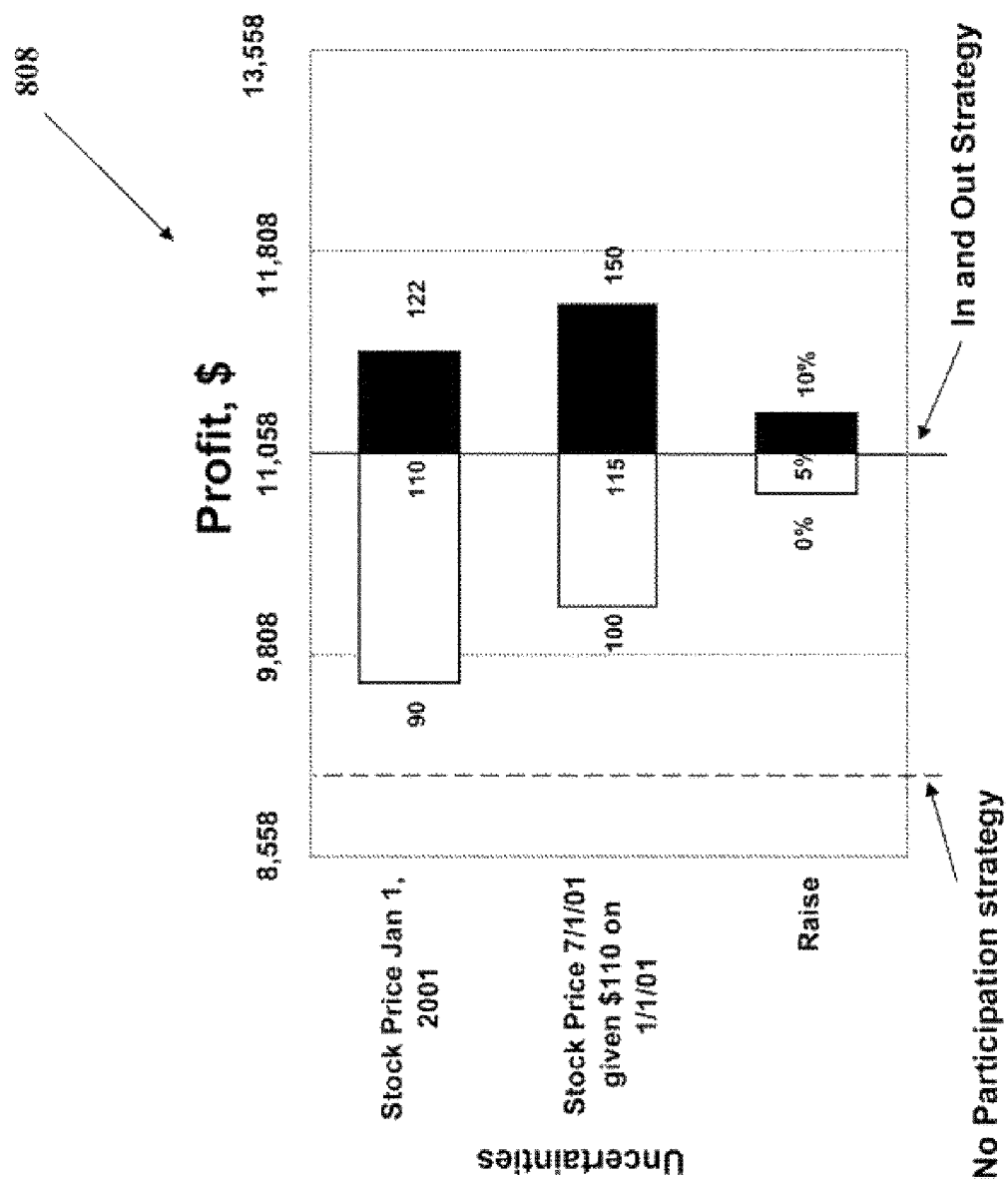

| Strategy Table | | | |
|---|---|---|---|
| Strategy Name | Initial Participation July 1, 2000 | Participation Adjustment Jan 1, 2001 |
| No Participation | 0% | 0% |
| In and Out | 5% | 5% |
| Out and In | 7% | 7% |
| Maximum Contribution | 10% | 10% |

Fig. 8h

Strategy Table

| Strategy Name | Target Customers | Enterprise | Contact Center Personalization | Contact Center Operations | Sales Force Channel | Service Channel | Sales/Service Automation | New |
|---|---|---|---|---|---|---|---|---|
| (Momentum) | Current | Current | One Size Fits All | Outsource | Outsource | Outsource | (None) | |
| Low Cost | Lifetime Value | New Region | (Selected Segments) | (Current) | (Tele Sales) | Tele Sales | Multiple Legacy | |
| Increased Value | (Deselect) | (Global) | All Segments | Consolidate | Indirect | Indirect | Package | |
| | Consolidate Segments | | Every Contact | Improve Efficiency | Direct | Direct | Process Based | |
| | Needs/Wants | | | New | Combined | Combined | | |
| | | | | | Portal | Portal | | |

Add Strategy  Reset Strategy

Strategy Table

| Strategy Name | Target Customers | Enterprise Reach | Contact Center Personalization | Contact Center Operations | Sales Force Channel | Service Channel | Sales/Service Automation |
|---|---|---|---|---|---|---|---|
| Momentum | Current | Current | One Size Fits All | Outsource | Outsource | Outsource | None |
| (Low Cost) | Lifetime Value | New Region | Selected Segments | Current | Tele Sales | Tele Sales | (Multiple Legacy) |
| Increased Value | Deselect | Global | All Segments | (Consolidate) | (Indirect) | Indirect | Package |
| | (Consolidate Segments) | | Every Contact | Improve Efficiency | Direct | Direct | Process Based |
| | Needs/Wants | | | New | Combined | Combined | |
| | | | | | Portal | Portal | |

Add Strategy
Reset Strategy

| C3 Attribute | Value of a one percent increase in the C3 attribute<br>Typical New Vehicle for Automotive manufacturer<br>($ Millions/year) | Value of a one percent increase in the C3 attribute<br>Typical new software product for technology company<br>($ Millions/year) |
|---|---|---|
| Sales Volume (units) | 100 | 40 |
| Variable Margin (%) | 170 | 15 |
| Investment Cost ($) | -20 | -3 |
| Fixed Cost ($) | -10 | -30 |

2500

| C3 Attribute | Value of a one percent increase in the C3 attribute for a typical New Vehicle for Automotive manufacturer ($ Millions/year) | Alternative 3: Best Buy/ Cost-Driven (Percent increase in the C3 attribute) | Total value for C3 attribute increase ($ Millions/year) |
|---|---|---|---|
| Sales Volume (units) | 100 | +2 | 200 |
| Variable Margin (%) | 170 | +1 | 170 |
| Investment Cost ($) | -20 | +2 | -40 |
| Fixed Cost ($) | -10 | +2 | -20 |
| Total | | | 310 |

Strategy Table

| Strategy Name | Target Customers | Enterprise Reach | Contact Center Personalization | Contact Center Operations | Sales Force Channel | Service Channel | Sales/Service Automation | New |
|---|---|---|---|---|---|---|---|---|
| Momentum | Current | Current | One Size Fits All | Outsource | Outsource | Outsource | None | |
| Low Cost | Lifetime Value | New Region | Selected Segments | Current | Tele Sales | Tele Sales | Multiple Legacy | |
| Increased Value | Deselect | Global | All Segments | Consolidate | Indirect | Indirect | Package | |
| Hybrid | Consolidate Segments | | Every Contact | Improve Efficiency | Direct | Direct | Process Based | |
| | Needs/Wants | | | New | Combined | Combined | | |
| | | | | | Portal | Portal | | |

Add Strategy    Reset Strategy

SYSTEM, METHOD AND COMPUTER PROGRAM PRODUCT FOR A COLLABORATIVE DECISION PLATFORM

RELATED APPLICATION(S)

This is a continuation of co-pending prior application Ser. No. 11/828,129 filed on Jul. 25, 2007, which is a continuation of application Ser. No. 11/045,543 filed on Jan. 28, 2005, which has issued under U.S. Pat. No. 7,401,059, which is a continuation of application Ser. No. 09/708,154 filed on Nov. 7, 2000, which has issued under U.S. Pat. No. 6,876,991, and which claims the priority of a previously filed provisional application with the title "Collaborative Decision Platform" filed Nov. 8, 1999 under Ser. No. 60/163,984, which are each incorporated herein by reference in their entirety.

FIELD OF THE INVENTION

The present invention relates to decision making logic, and more particularly to a computer-based platform which supports a decision making process.

BACKGROUND OF THE INVENTION

One of the first recorded decision making processes was proposed in the $18^{th}$ century when. Benjamin Franklin suggested a process by which one of two decision alternatives could be selected through listing advantages of the alternatives side by side and canceling out advantages or groups of advantages judged to be equal on both sides. Subsequently many decision processes have been proposed and are in use today. These include popular ones, such as Kepner-Tregoe where criteria for making the decision are listed and the alternatives are assessed (on a scale from 1 to 10) as to how they perform on each of the criteria. The criteria are also weighted on a similar scale and the best alternative is judged to be the highest dot product of the criteria weights and the respective assessments for the alternative against the criteria. Various modifications to this basic process in order to take into account complexities of having multiple decision makers, refining the assessment process through pair-wise comparison, etc., have resulted in many other such decision processes such as Value Management, Analytic Hierarchy Process, and others. There are also several methodologies (such as decision analyses using decision trees and probability methods) aimed at assisting a decision-maker think, through the options one has in making a decision and potential outcomes of each option. However ninny of these decision processes are in fact not processes, but only individual tools to compare pre-defined alternatives within a pre-specified problem frame.

In order to create a process which enables multiple decision makers to make strategic decisions in organizationally and technically complex circumstances, the Dialogue Decision Process (DDP) was proposed as a sequence of four steps (framing, alternatives, analysis, connection) and is well described, in literature [Barabba, V. P., *Meeting of the Minds*, Harvard Business Press, and other sources].

However to date, a short-coming of the process above as well as other processes, is that there has been no way to ensure that it can be applied to any decision regardless of type, complexity or number of decision makers. Furthermore, there has been no software that supports the complete sequence of these steps since each decision tends to be unique. This has resulted in each instantiation of decision processes being tailored to a particular decision. In the case of DDP, this has resulted in the process being a relatively sophisticated tool only used in certain circumstances and only when facilitated by experienced practitioners.

There is therefore a need for a computer-implemented method which may be utilized for implementing DDP in different environments in a universal manner.

SUMMARY

A decision making system, method and computer program product are provided. Initially, a plurality of attributes is defined. Thereafter, first information regarding the attributes is received from a receiving business. Second information is then received regarding proposed products or services in terms of the attributes. Such second information is received from a supplying business. In use, a decision process is executed based on the first information and the second information.

BRIEF DESCRIPTION OF THE DRAWINGS

FIG. 3 illustrates an example of Framing in accordance with one embodiment of the present invention;

FIG. 4*a* illustrates various logic associated with the Alternatives process of the present invention which is capable of handling its various input for the purpose of generating a strategy table;

FIG. 6*a* illustrates various logic associated with the Connection process of the present invention;

FIGS. 8*a-i* illustrate an example of an application of the various logic components set forth in FIGS. 3-7;

FIGS. 19 through 30 illustrate an exemplary application of the customer centric collaborative protocol.

DETAILED DESCRIPTION

Figure 1:
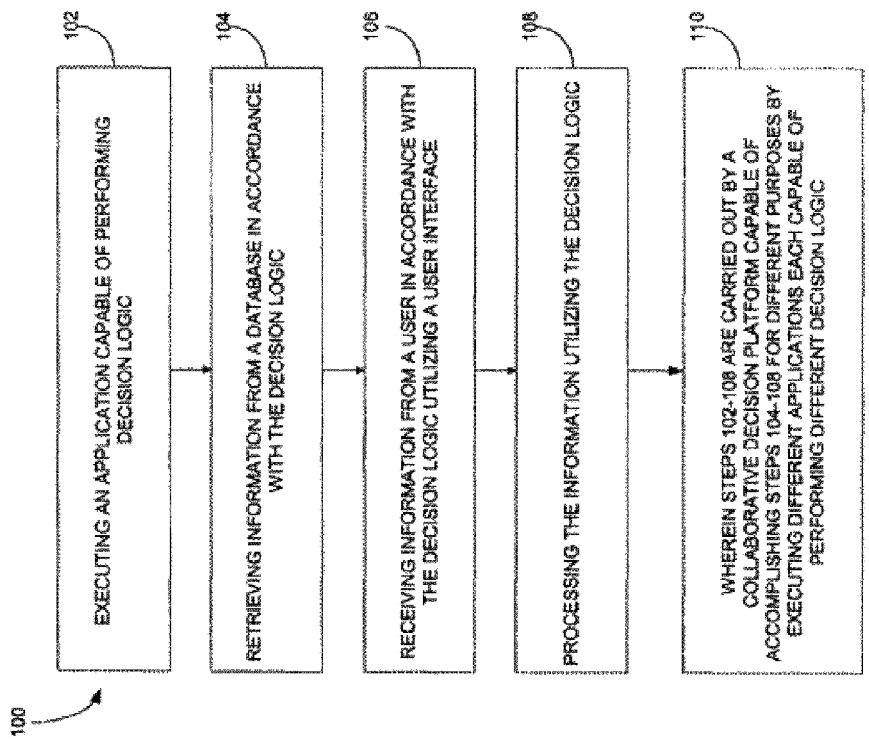
FIG. 1 illustrates a method for providing a collaborative decision platform adapted to run on a computer.

FIG. 1 illustrates a method 100 for providing a collaborative decision platform adapted to run on a computer. Initially, an application capable of performing decision logic is executed. See operation 102.

Information is then retrieved from a database in accordance with the decision logic, as indicated in operation 104. Information is then delivered to and received from a user in accordance with the decision logic utilizing a user interface. Note operation 106. The information is then processed in operation 108 utilizing the decision logic.

In use, the foregoing steps are carried out by a collaborative decision platform capable of retrieving and receiving the information, and processing such information for different purposes by executing different applications each capable of performing different decision logic. Note operation 110. It should be noted that the various steps set forth hereinabove ma be carried out using universal modules capable of interfacing with different applications.

Figure 1A:
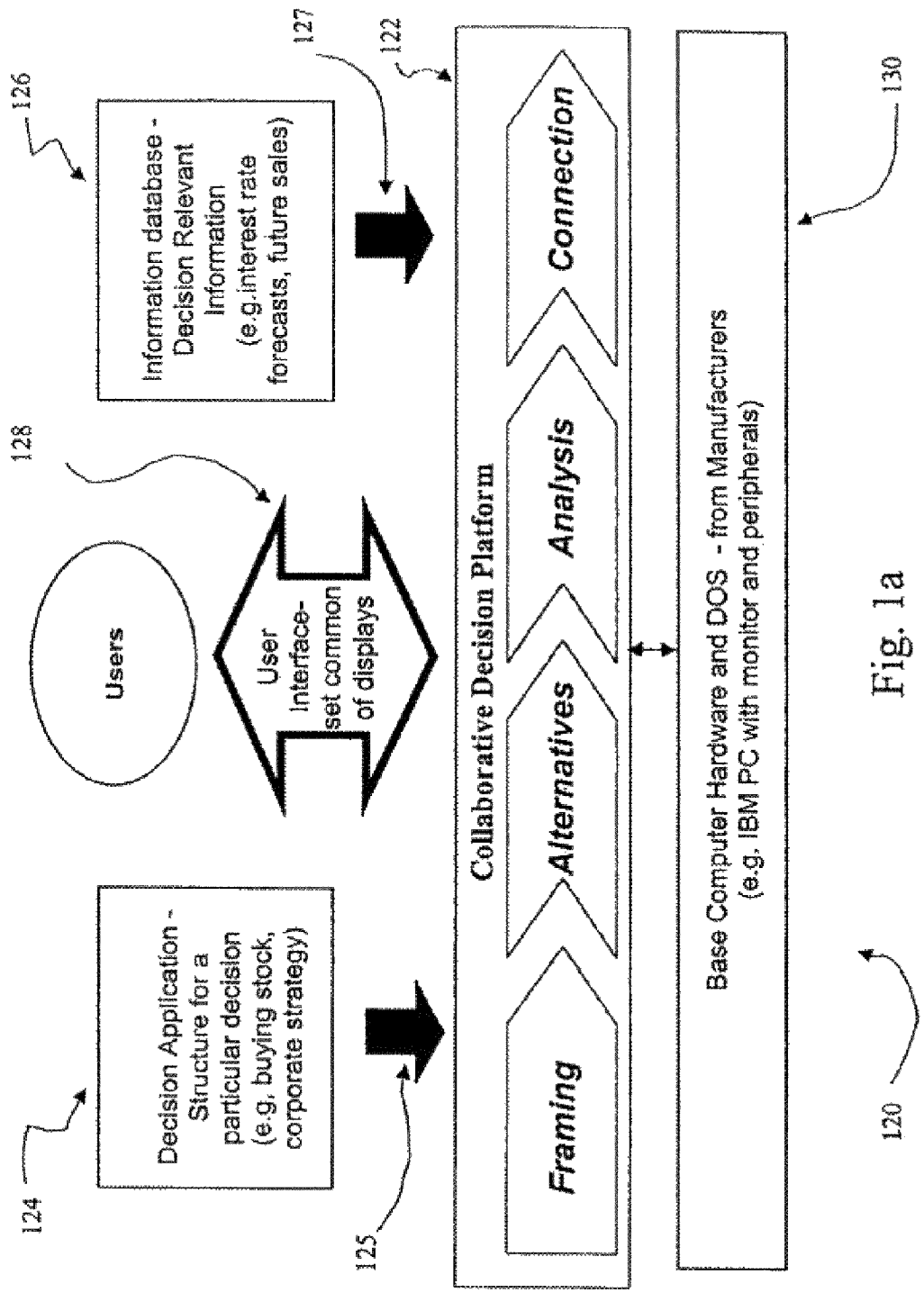
FIG. 1*a* illustrates a system by which the method of FIG. 1 may be carried out.

FIG. 1a illustrates a system 120 by which the foregoing method of FIG. 1 may be carried out. As shown, a collaborative decision platform 122 is provided which has an interface 125 with at least one application 124 for executing the decision logic, as set forth in operation 102 of FIG. 1. Further included, is a database 126, which has an interface 127 with the collaborative decision platform 122 in accordance with operation 104 of FIG. 1. Further, a user interface 128 is provided for receiving information from and providing information to the users. The interfaces 125, 127, and 128 are defined by the collaborative decision platform 122. The users may be an important element of the system 120. Note the two-headed arrow representing the users' interface 128 with the collaborative decision platform 122 to indicate the interaction, while the single arrowhead of the interface 125 and 127 indicates input. Note operation 106 of FIG. 1. The collaborative decision platform 122 may be run on any type of hardware architecture 130.

As set forth earlier, the various steps of FIG. 1 may be carried out using universal modules capable of interfacing with different applications. Such different applications 124 may be capable of performing decision logic relating to any type of decision-making process (e.g. financial, medical, buying a house, selecting a corporate strategy, etc.). In use, the collaborative decision platform 122 enables decision-making processes through the sequence and connectivity of a set of common displays, which describes the decision to be made. The collaborative decision platform 122 further enables asynchronous, remote decision-making processes, i.e. the ability to have different people input data into the set of common displays at different times, and from different places. Further, the database 126 may take the form of any one or a plurality of databases which may or may not be interconnected via a network such as the Internet. To this end, the present embodiment is designed to foster clear and conscientious decision-making.

Figure 1B:
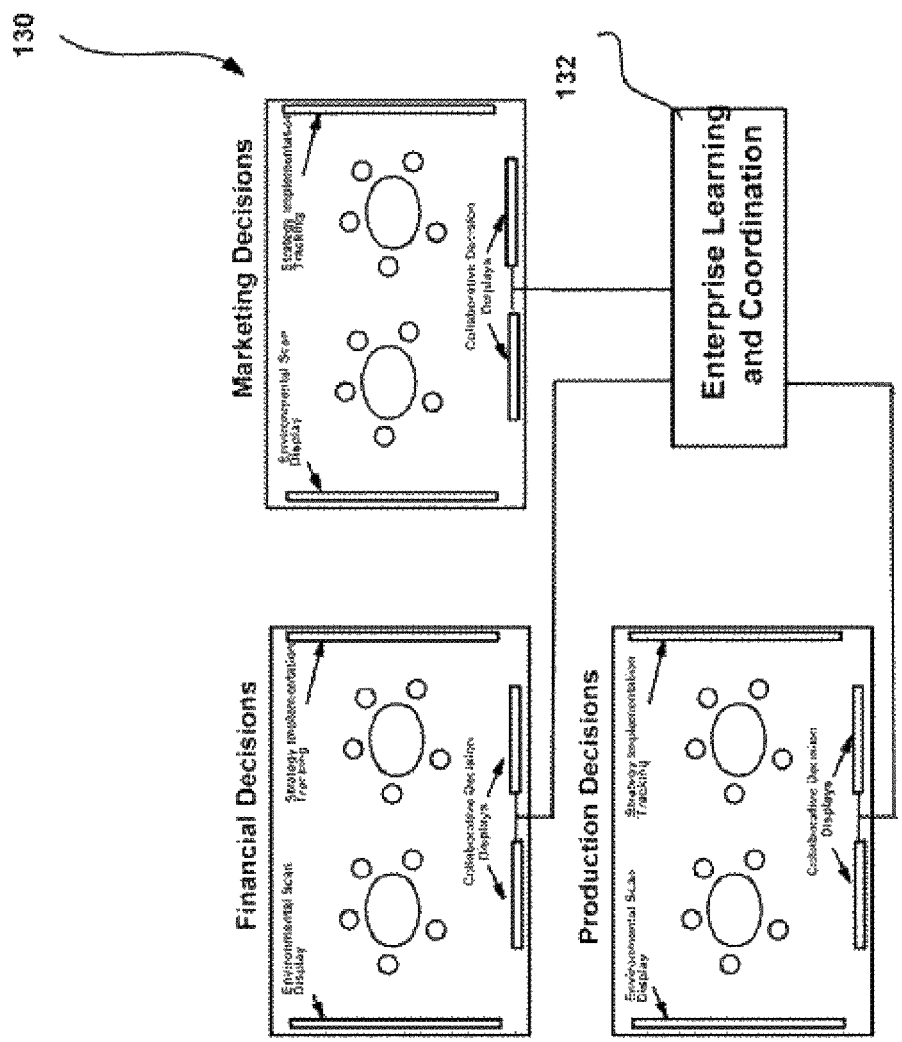
FIG. 1*b* illustrates a networked decision making environment in accordance with one embodiment of the present invention.

FIG. 1b illustrates a plurality of network 130 of decision environments for allowing enterprises to learn more rapidly and coordinate more effectively. Such a network of decision environments each include at least one collaborative user interface which each communicate with an enterprise learning and coordination module 132 that may include one or more collaborative decision platforms 122. Such a network 130 may allow the decision environments to be a physical arrangement optimized for human decision making or a virtual environment consisting of only the computer hardware and the collaborative decision platform 122.

Figure 2:
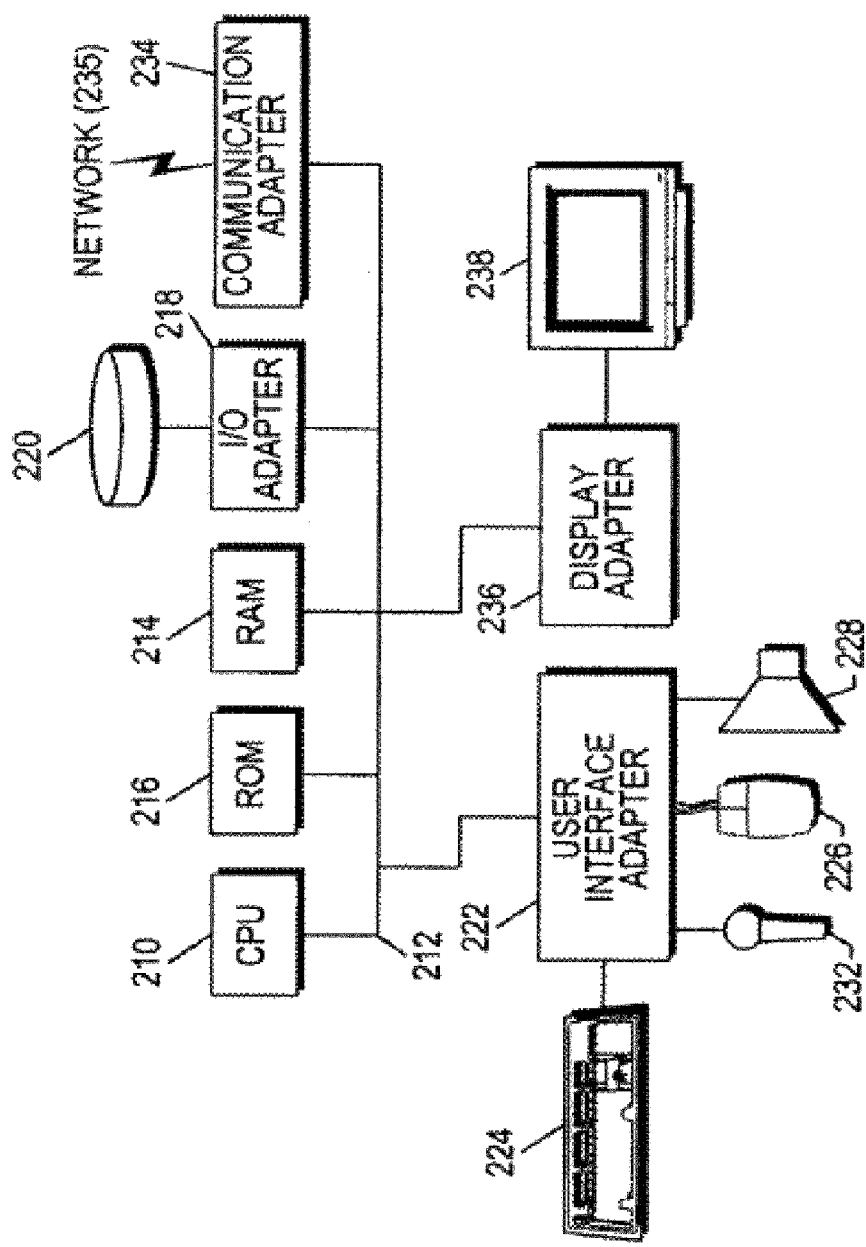
FIG. 2 shows a representative hardware environment on which the collaborative decision platform of FIG. 1*a* ma be implemented.

FIG. 2 shows a representative hardware environment on which the collaborative decision platform 122 of FIG. 1a may be implemented. Such figure illustrates a typical hardware configuration of a workstation in accordance with a preferred embodiment having a central processing unit 210, such as a microprocessor, and a number of other units interconnected via a system bus 212.

The workstation shown in FIG. 2 includes a Random Access Memory (RAM) 214., Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown to the bus 212, communication adapter 234 for connecting the workstation to a communication network 235 (e.g. a data processing network) and a display adapter 236 for connecting the bus 212 to a display device 238.

The workstation typically has resident thereon an operating system such as the Microsoft Windows NT or Windows/95 Operating System (OS), the IBM OS/2 operating system, the MAC OS, or UNIX operating system. Those skilled in the art will appreciate that the present invention may also be implemented on platforms and operating systems other than those mentioned.

A preferred embodiment is written using JAVA, C, and the C++ language and utilizes object oriented programming methodology. Object oriented programming (OOP) has become increasingly used to develop complex applications. As OOP moves toward the mainstream of software design and development, various software solutions require adaptation to make use of the benefits of OOP. A need exists for these principles of OOP to be applied to a messaging interface of an electronic messaging system such that a set of OOP classes and objects for the messaging interface can be provided.

OOP is a process of developing computer software using objects, including the steps of analyzing the problem, designing the system, and constructing the program. An object is a software package that contains both data and a collection of related structures and procedures. Since it contains both data and a collection of structures and procedures, it can be visualized as a self-sufficient component that does not require other additional structures, procedures or data to perform its specific task. OOP, therefore, views a computer program as a collection of largely autonomous components, called objects, each of which is responsible for a specific task. This concept of packaging data, structures, and procedures together in one component or module is called encapsulation.

In general, OOP components are reusable software modules which present an interface that conforms to an object model and which are accessed at run-time through a component integration architecture. A component integration architecture is a set of architecture mechanisms which allow software modules in different process spaces to utilize each other's capabilities or functions. This is generally done by assuming a common component object model on which to build the architecture. It is worthwhile to differentiate between an object and a class of objects at this point. An object is a single instance of the class of objects, which is often just called a class. A class of objects can be viewed, as a blueprint, from which many objects can be formed.

OOP allows the programmer to create an object that is a part of another object. For example, the object representing a piston engine is said to have a composition-relationship with the object representing a piston. In reality, a piston engine comprises a piston, valves and many other components; the fact that a piston is an element of a piston engine can be logically and semantically represented in OOP by two objects.

OOP also allows creation of an object that "depends from" another object. If there are two objects, one representing a piston engine and the other representing a piston engine wherein the piston is made of ceramic, then the relationship between the two objects is not that of composition. A ceramic piston engine does not make up a piston engine. Rather it is merely one kind of piston engine that has one more limitation than the piston engine; its piston is made of ceramic. In this case, the object representing the ceramic piston engine is called a derived object, and it inherits all of the aspects of the object representing, the piston engine and adds further limitation or detail to it. The object representing the ceramic piston engine "depends from" the object representing the piston engine. The relationship between these objects is called inheritance.

When the object or class representing the ceramic piston engine inherits all of the aspects of the objects representing the piston engine, it inherits the thermal characteristics of a standard piston defined in the piston engine class. However, the ceramic piston engine object overrides these ceramic specific thermal characteristics, which are typically different from those associated with a metal piston. It skips over the original and uses new functions related to ceramic pistons. Different kinds of piston engines have different characteristics, but may have the same underlying functions associated with it (e.g., how many pistons in the engine, ignition sequences, lubrication, etc). To access each of these functions in any piston engine object, a programmer would call the same functions with the same names, but each type of piston engine may have different/overriding implementations of functions behind the same name. This ability to hide different implementations of a function behind the same name is called polymorphism and it greatly simplifies communication among objects.

With the concepts of composition-relationship, encapsulation, inheritance and polymorphism, an object can represent just about anything in the real world. In fact, one's logical perception of the reality is the only limit on determining the kinds of things that can become objects in object-oriented software. Some typical categories are as follows:

Objects can represent physical objects, such as automobiles in a traffic-flow simulation, electrical components in a circuit-design program, countries in an economics model, or aircraft in an air-traffic-control system.

Objects can represent elements of the computer-user environment such as windows, menus or graphics objects.

An object can represent an inventory, such as a personnel file or a table of the latitudes and longitudes of cities.

An object can represent user-defined data types such as time, angles, and complex numbers, or points on the plane.

With this enormous capability of an object to represent just about any logically separable matters. OOP allows the software developer to design and implement a computer program that is a model of some aspects of reality, whether that reality is a physical emit, a process, a system, or a composition of matter. Since the object can represent anything, the software developer can create an object which can be used as a component in a larger software project in the future.

If 90% of a new OOP software program consists of proven, existing components made from preexisting reusable objects, then only the remaining 10% of the new software project has to be written and tested from scratch. Since 90% already came from an inventory of extensively tested reusable objects, the potential domain from which an error could originate is 10% of the program. As a result, OOP enables software developers to build objects out of other, previously built objects.

This process closely resembles complex machinery being built out of assemblies and sub-assemblies. OOP technology, therefore, makes software engineering more like hardware engineering in that software is built from existing components, which are available to the developer as objects. All this adds up to an improved quality of the software as well as an increased speed of its development.

Programming languages are beginning to fully support the OOP principles, such as encapsulation, inheritance, polymorphism, and composition-relationship. With the advent of the C++ language, many commercial software developers have embraced OOP. C++ is an OOP language that offers a fast, machine-executable code. Furthermore. C++ is suitable for both commercial-application and systems-programming projects. For now, C++ appears to be the most popular choice among many OOP programmers, but there is a host of other OOP languages, such as Smalltalk, Common Lisp Object System (CLOS), and Eiffel. Additionally, OOP capabilities are being added to more traditional popular computer programming languages such as Pascal.

The benefits of object classes can be summarized, as follows:

Objects and their corresponding classes break down complex programming problems into many smaller, simpler problems.

Encapsulation enforces data abstraction through the organization of data into small, independent objects that can communicate with each other. Encapsulation protects the data in an object from accidental damage, but allows other objects to interact with that data by calling the object's member functions and structures.

Subclassing and inheritance make it possible to extend and modify objects through deriving new kinds of objects from the standard classes available in the system. Thus, new capabilities are created without having to start from scratch.

Polymorphism and multiple inheritance make it possible for different programmers to mix and match characteristics of many different classes and create specialized objects that can still work with related objects in predictable ways.

Class hierarchies and containment hierarchies provide as flexible mechanism for modeling real-world objects and the relationships among them.

Libraries of reusable classes are useful in many situations, but they also have some limitations. For example:

Complexity. In a complex system, the class hierarchies for related classes can become extremely confusing, with many dozens or even hundreds of classes.

Flow of control. A program written with the aid of class libraries is still responsible for the flow of control it must control the interactions among all the objects created from a particular library). The programmer has to decide which functions to call at what times for which kinds of objects.

Duplication of effort. Although class libraries allow programmers to use and reuse many small pieces of code, each programmer puts those pieces together in a different way. Two different programmers can use the same set of class libraries to write two programs that do exactly the same thing but whose internal structure (i.e., design) may be quite different, depending on hundreds of small decisions each programmer makes along the way. Inevitably, similar pieces of code end up doing similar things in slightly different ways and do not work as well together as they should.

Class libraries are very flexible. As programs grow more complex, more programmers are forced to reinvent basic solutions to basic problems over and over again. A relatively new extension of the class library concept is to have a framework of class libraries. This framework is more complex and consists of significant collections of collaborating classes that capture both the small scale patterns and major mechanisms that implement the common requirements and design in a specific application domain. They were first developed to free application programmers from the chores involved in displaying menus, windows, dialog boxes, and other standard user interface elements for personal computers.

Frameworks also represent a change in the way programmers think about the interaction between the code they write and code written by others. In the early days of procedural programming, the programmer called libraries provided by the operating system to perform certain tasks, but basically the program executed down the page from start to finish, and the programmer was solely responsible for the flow of control. This was appropriate for printing out paychecks, calculating a mathematical table, or solving other problems with a program that executed in just one way.

The development of graphical user interfaces began to turn this procedural programming arrangement inside out. These interfaces allow the user, rather than program logic, to drive the program and decide when certain actions should be performed. Today, most personal computer software accomplishes this by means of an event loop which monitors the mouse, keyboard, and other sources of external events and calls the appropriate parts of the programmer's code according to actions that the user performs. The programmer no longer determines the order in which events occur. Instead, a program is divided into separate pieces that are called at unpredictable times and in an unpredictable order. By relinquishing control in this way to users, the developer creates a program that is much easier to use. Nevertheless, individual pieces of the program written by the developer still call libraries provided by the operating system to accomplish certain tasks, and the programmer must still determine the flow of control within each piece after it's called by the event loop. Application code still "sits on top of" the system.

Even event loop programs require programmers to write a lot of code that should not need to be written separately for every application. The concept of an application framework carries the event loop concept further. Instead of dealing with all the nuts and bolts of constructing basic menus, windows, and dialog boxes and then making these things all work together, programmers using application frameworks start with working application code and basic user interface elements in place. Subsequently, they build from there by replacing some of the generic capabilities of the framework with the specific capabilities of the intended application.

Application frameworks reduce the total amount of code that a programmer has to write from scratch. However, because the framework is really a generic application that displays windows, supports copy and paste, and so on, the programmer can also relinquish control to a greater degree than event loop programs permit. The framework code takes care of almost all event handling and flow of control, and the programmer's code is called only when the framework needs it (e.g., to create or manipulate a proprietary data structure).

A programmer writing a framework program not only relinquishes control to the user (as is also true for event loop programs), but also relinquishes the detailed flow of control within the program to the framework. This approach allows the creation of more complex systems that work together in interesting ways, as opposed to isolated programs, having custom code, being created over and over again for similar problems.

Thus, as is explained above, a framework basically is a collection of cooperating classes that make up a reusable design solution for a given problem domain. It typically includes objects that provide default behavior (e.g., for menus and windows), and programmers use it by inheriting some of that default behavior and overriding other behavior so that the framework calls application code at the appropriate times.

There are three main differences between frameworks and class libraries:

Behavior versus protocol. Class libraries are essentially collections of behaviors that you can call when You want those individual behaviors in your program. A framework, on the other hand, provides not only behavior but also the protocol or set of rules that govern the ways in which behaviors can be combined, including rules for what a programmer is supposed to provide versus what the framework provides.

Call versus override. With a class library, the code the programmer instantiates objects and calls their member functions. It's possible to instantiate and call objects in the same way with a framework (i.e., to treat the framework as a class library), but to take full advantage of a framework's reusable design, a programmer typically writes code that overrides and is called by the framework. The framework manages the flow of control among its objects. Writing a program involves dividing responsibilities among the various pieces of software that are called by the framework rather than specifying how the different pieces should work together.

Implementation versus design. With class libraries, programmers reuse only implementations, whereas with frameworks, they reuse design. A framework embodies the way a family of related programs or pieces of software work. It represents a generic design solution that can be adapted to a variety of specific problems in a given domain. For example, a single framework can embody the way a user interface works, even though two different user interfaces created with the same framework might solve quite different interface problems.

Thus, through the development of frameworks for solutions to various problems and programming tasks, significant reductions in the design and development effort for software can be achieved. A preferred embodiment of the invention utilizes HyperText Markup Language (HTML) to implement documents on the Internet together with a general-purpose secure communication protocol for a transport medium between the client and the Newco. HTTP or other protocols could be readily substituted for HTML without undue experimentation. Information on these products is available in T. Berners-Lee, D. Connoly, "RFC 1866: Hypertext Markup Language—2.0" (November 1995); and R. Fielding. H. Frystyk, T. Berners-Lee, J. Gettys and J. C. Mogul, "Hypertext Transfer Protocol—HTTP/1.1: HTTP Working Group Internet Draft" May 2, 1996). HTML is a simple data format used to create hypertext documents that are portable from one platform to another. HTML documents are SGML documents with generic semantics that are appropriate for representing information from a wide range of domains. HTML has been in use by the World-Wide Web global information initiative since 1990. HTML is an application of ISO Standard 8879; 1986 Information Processing Text and Office Systems; Standard Generalized Markup Language (SGML).

To date, Web development tools have been limited in their ability to create dynamic Web applications which span from client to server and intemperate with existing computing resources. Until recently, HTML has been the dominant technology used in development of Web-based solutions. However, HTML has proven to be inadequate in the following areas:

Poor performance;
Restricted user interface capabilities;
can only produce static Web pages;
Lack of interoperability with existing applications and data; and
Inability to scale.

Sun Microsystem's Java language solves many of the client-side problems by:

Improving performance on the client side;
Enabling the creation of dynamic, real-time Web applications; and
Providing the ability to create a wide variety of user interface components.

With Java, developers can create robust User Interface (UI) components. Custom "widgets" (e.g., real-time stock tickers, animated icons, etc.) can be created, and client-side performance is improved. Unlike HTML, Java supports the notion of client-side validation, offloading appropriate processing onto the client for improved performance. Dynamic, real-time Web pages can be created. Using the above-mentioned custom UI components, dynamic Web pages can also be created.

Suns Java language has emerged as an industry-recognized language for "programming the Internet." Sun defines Java as "a simple, object-oriented, distributed, interpreted, robust, secure, architecture-neutral, portable, high-performance, multithreaded, dynamic, buzzword-compliant, general-purpose programming language. Java supports programming for the Internet in the form of platform-independent Java applets." Java applets are small, specialized applications that comply with Sun's Java Application Programming Interface (API) allowing developers to add "interactive content" to Web documents (e.g., simple animations, page adornments, basic games, etc.). Applets execute within a Java-compatible browser (e.g., Netscape Navigator) by copying code from the server to client. From a language standpoint, Java's core feature set is based on C++. Sun's Java literature states that Java is basically. "C++ with extensions from Objective C for more dynamic method resolution."

Another technology that provides similar function to JAVA is provided by Microsoft and ActiveX Technologies, to give developers and Web designers wherewithal to build dynamic content for the Internet and personal computers. ActiveX includes tools for developing animation, 3-D virtual reality, video and other multimedia content. The tools use Internet standards, work on multiple platforms, and are being supported by over 100 companies, The group's building blocks are called ActiveX Controls, small, fast components that enable developers to embed parts of software in hypertext markup language (HTML) pages. ActiveX Controls work with a variety of programming languages including Microsoft Visual C++, Borland Delphi, Microsoft Visual Basic programming system and, in the future, Microsoft's development tool for Java, code named "Jakarta," ActiveX Technologies also includes ActiveX Server Framework, allowing developers to create server applications. One of ordinary skill in the art readily recognizes that ActiveX could be substituted for JAVA without undue experimentation to practice the invention.

It should be noted that, in one embodiment, the information database and the common displays may all be treated as objects by the platform. As such, the foregoing technology may be utilized in the implementation of the overall system, as embodied in FIG. 1a.

Preferred Embodiment

The platform of the present embodiment acts as a "decision engine" which drives the decision process through a sequence of logical steps to a conclusion. The users interface during these steps is the set of common displays exhibited by the platform. The users receive and provide specific decision information to the platform by entering or modifying the structure of the decision and the decision-relevant information in the display areas where appropriate. In order to start the process, the platform hosts a decision application which provides the structure for the type of decision that the user wants to make. The application and platform communicate through a standard interlace protocol. The platform guides the user through four steps (framing, alternatives, analysis and connection), but these are tailored to the decision at hand through the decision application.

FIG. 3 illustrates an example of Framing 300 in accordance with one embodiment of the present invention. The purpose of Framing is to clearly communicate to the users the capabilities of the chosen decision application 124 and to allow the users to modify the problem definition to the extent that the capability for modification has been incorporated by the authors of the application. During Framing, the specific decision application provides certain key pieces of information about the decision at hand as input in a specific format or protocol 125 specified by the collaborative decision platform 122 that describe the capabilities of that application. Such input may include the policies that form boundary conditions for the decision, the strategic decisions that can be made, the values that are important to the decision makers, the uncertainties that may impact the values desired, and the relationship of the above elements.

The Framing process, using this key input from the decision application 1124 in the specific format 125, generates visual displays of a decision hierarchy 304 and an influence diagram 306, to be confirmed or modified by the users. The users' information 129 is seen as an input to the framing process 300, because the users interact with the platform 122 to produce a resultant decision hierarchy 304 and the influence diagram 306 that capture their collective view of the decision problem. Note the two-headed arrow representing the users' interface 128 with the collaborative decision platform 122 to indicate the interaction, while the single arrow head of the interface 125 indicates input. In the event that the users are unable to successfully represent the decision problem as they see it with the initial decision application, they will select another application 124 and repeat the Framing process 300.

Figure 3A:
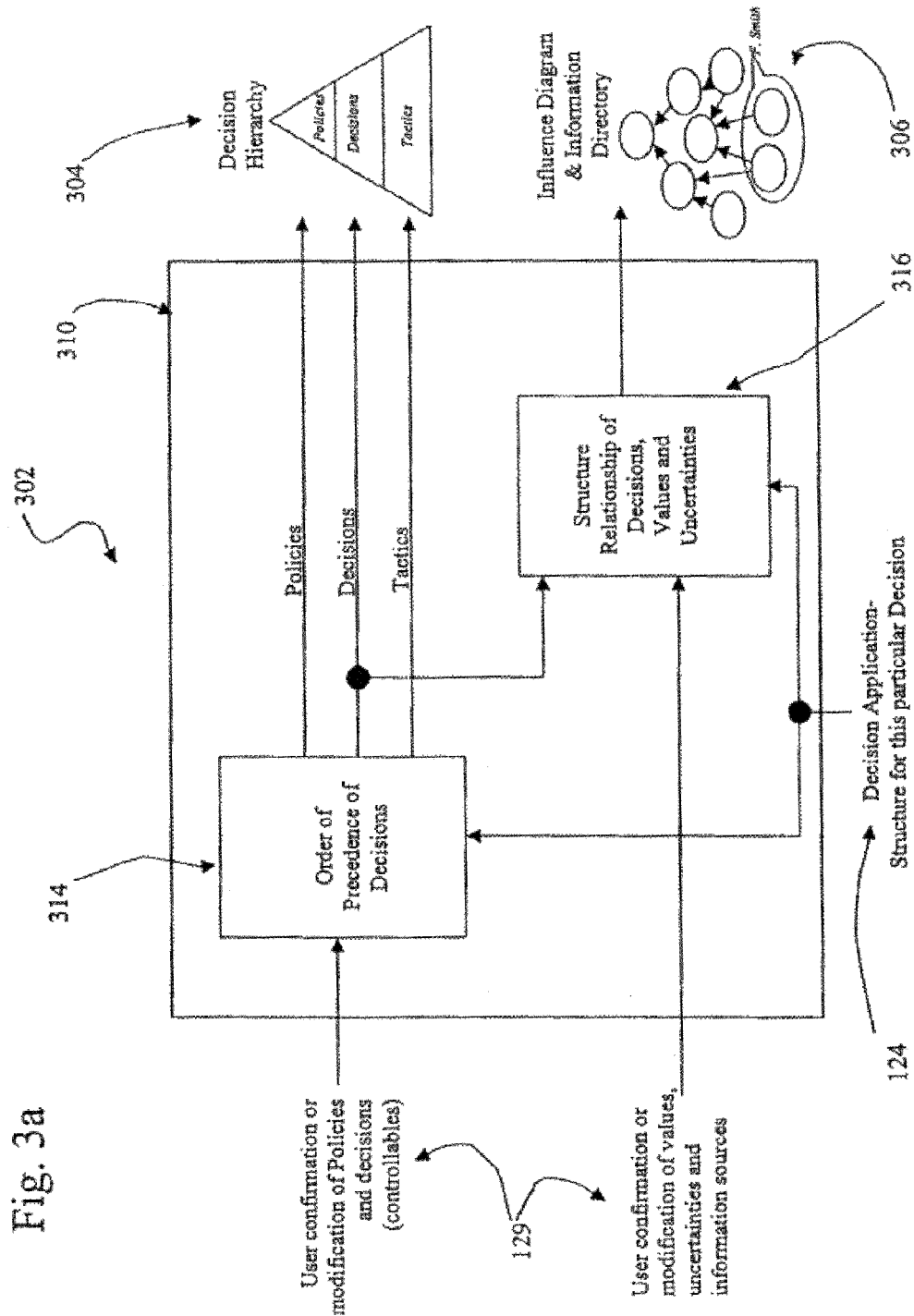
FIG. 3*a* illustrates various logic associated with the Framing process of the present invention.

FIG. 3a illustrates various logic 310 associated, with the Framing process of the present invention. As shown, a first Framing module 314 receives information from the decision application 124, such as the specific policies, decisions (controllables) and tactics that it can accommodate with a logical structure. The first framing module 314 orders the precedence of decisions to output the decision hierarchy 304. Decisions that have already been made are referred to as "policy," as set of one or more decisions of immediate interest are referred to as "strategy" or "strategic decisions" or just "decisions," and decisions that can be deferred until later are referred to as "tactics." The users confirm or modify 129 the policies, decisions and tactics. For example, the users may not want to address a particular decision at this time, in which case it would become a tactic.

Working in parallel with the first Framing module 314 is a second Framing module 316. Such second Framing module 316 receives as input pertinent uncertainties or risks (uncontrollables), information sources and values that further describe the capabilities of the decision application 124. The second Framing module 316 also receives as input the decisions identified by the first Framing module 314 and users' confirmation or modification 129 of the values, information sources and uncertainties. With such, the second Framing module 316 structures a relationship of decisions, values and uncertainties in form of the influence diagram and a corresponding directory to sources of information 306.

Figure 4:
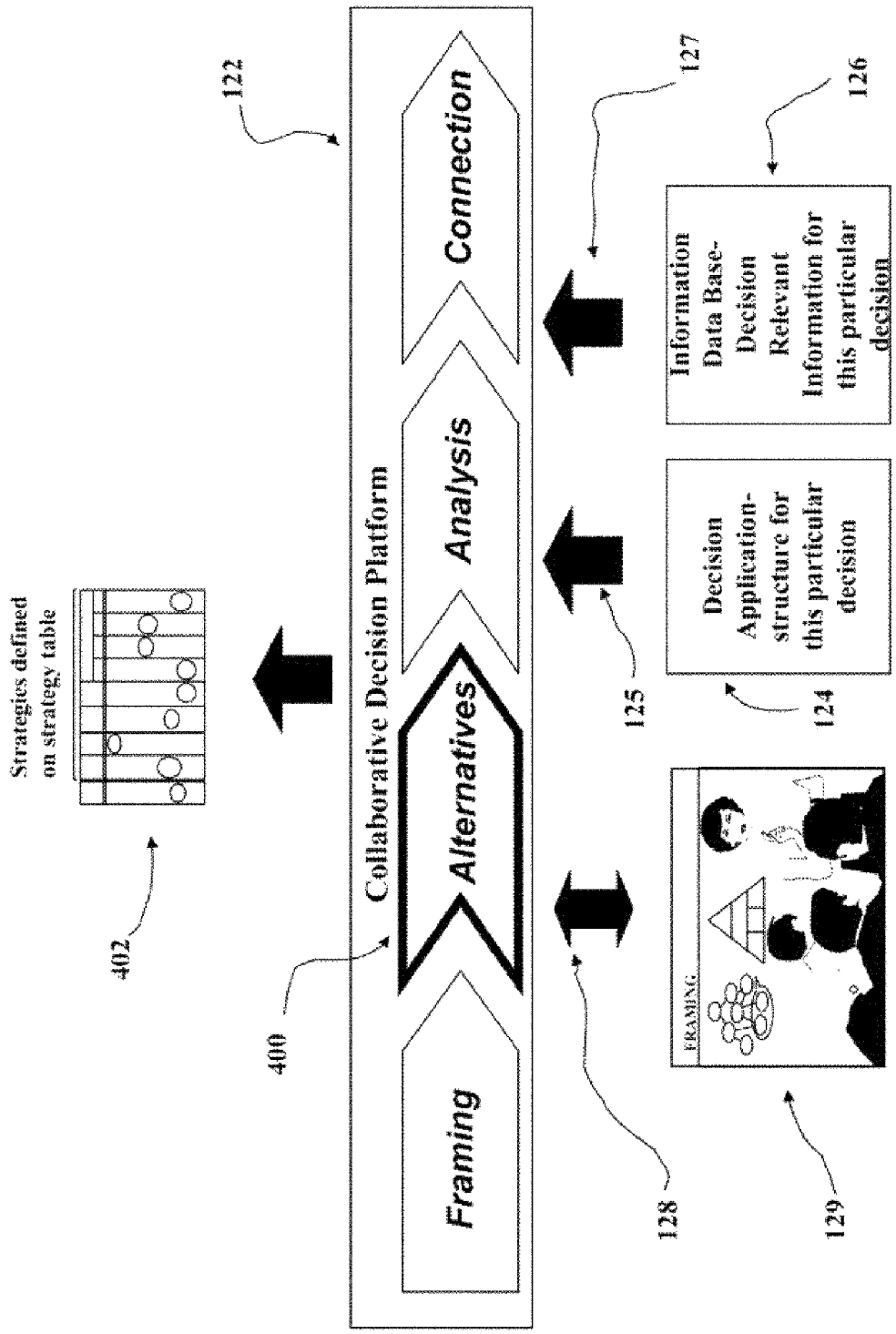
FIG. 4 illustrates an example of Alternatives in accordance with one embodiment of the present invention.

FIG. 4 illustrates an example of Alternatives 400 in accordance with one embodiment of the present invention. The purpose of the Alternatives process is to develop a set of strategic alternatives that capture the range of possibilities envisioned by the users. After Framing, the platform moves to Alternatives, and receives from the decision application 124 and the information data base 126 alternative strategies each comprised of a set of coherent choices for each of the strategic decision. The users confirm or modify 129 the alternative strategies. The platform generates the visual display of the strategies defined on a strategy table 402.

FIG. 4a illustrates various logic 406 associated with the Alternatives process of the present invention which is capable of generating several strategies defined on a strategy table 402. Included with the Alternatives logic 406 is a first Alternatives module 410 that receives the decision hierarchy 304 generated by the Framing logic 310. The first Alternatives module 410 obtains decision alternatives in each of the decision areas from the decision application 124 and from an information database 126 for the purpose of developing a strategy table. Each (strategic) decision from the decision hierarchy 304 becomes a column heading in the strategy table 402 with the alternatives for that decision arranged in a column beneath it. The first Alternatives module 410 also takes as input the users confirmation or modification 129 of the decision alternatives.

A second Alternatives module 412 combines the strategy table output of the first Alternatives module 410 with strategy descriptions from the decision application 124. The strategy descriptions include a strategy, name and the selection of one alternative for each of the decisions that comprise the column headings in the strategy table 402. The second Alternatives module 412 can then display the strategies on a strategy table and incorporate the users' confirmation or modifications 129. For example, the users may want to define their own strategy, which they would do by providing the second Alternatives module 412 with a strategy name and the selection of and alternative in each column of the strategy table 402.

Figure 5:
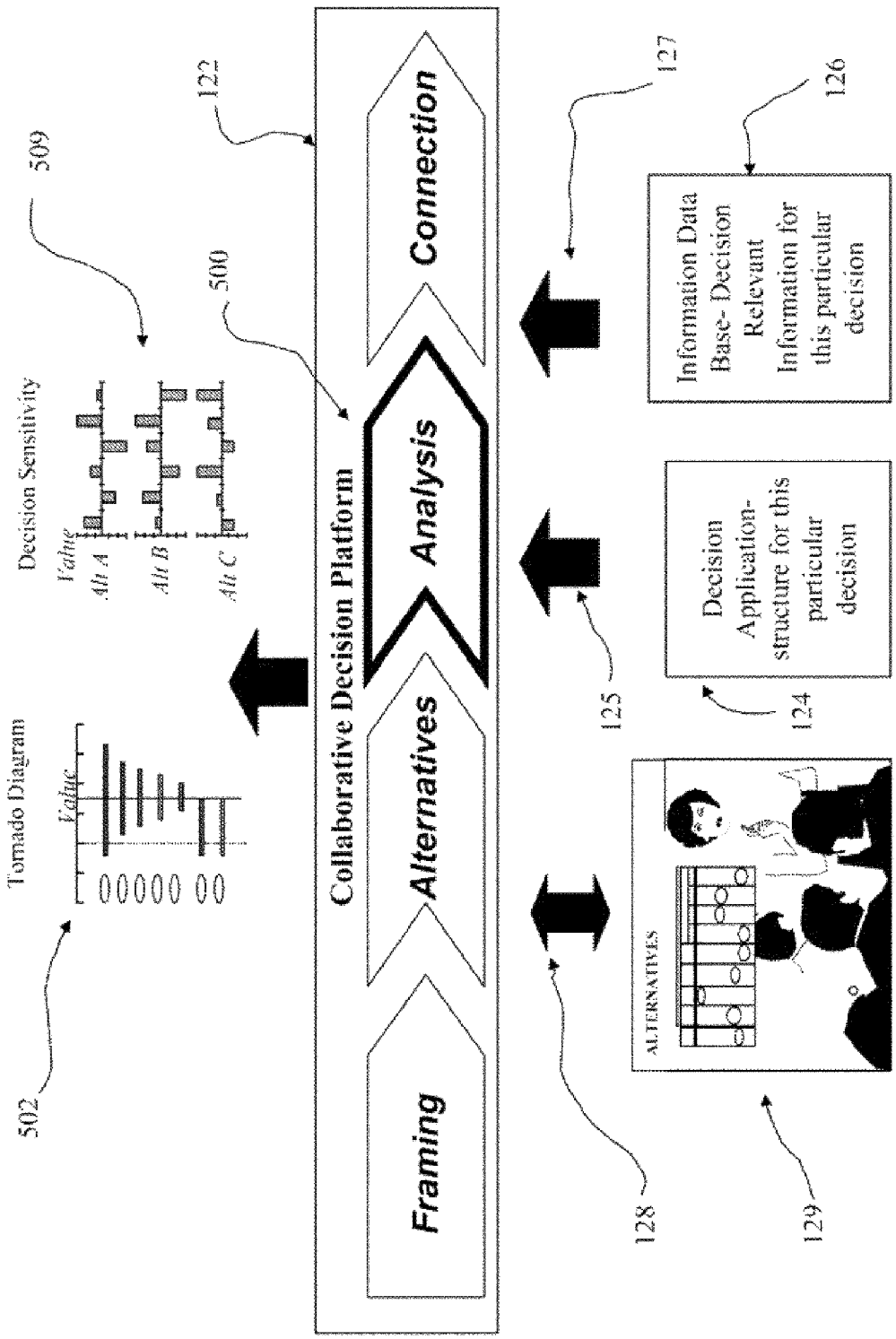
FIG. 5 illustrates an example of Analysis in accordance with one embodiment of the present invention.

FIG. 5 illustrates an example of Analysis 500 in accordance with one embodiment of the present invention. The purpose of the Analysis process is to enable the users to have a shared understanding of the significant sources of risk and value in each of the initially defined alternative strategies. During Analysis, the platform prompts the information database 126 for assessments on each of the uncertainties set forth in a format 127 specified as low estimate, nominal estimate, and high estimate. These assessments are made for uncertainties influenced by the choice of decision, as well as independent uncertainties.

Using the information generated previously and the model structure of the decision application 124, the platform makes the necessary calculations to output tornado diagrams 502 and decision sensitivity output displays for each of the alternative strategies 509. The users confirm or modify the input information 129 and structure from the decision application 124. The tornado diagrams identify the sources of significant risk in each alternative strategy and the decision sensitivity identifies the sources of significant value in each alternative strategy.

Figure 5A:
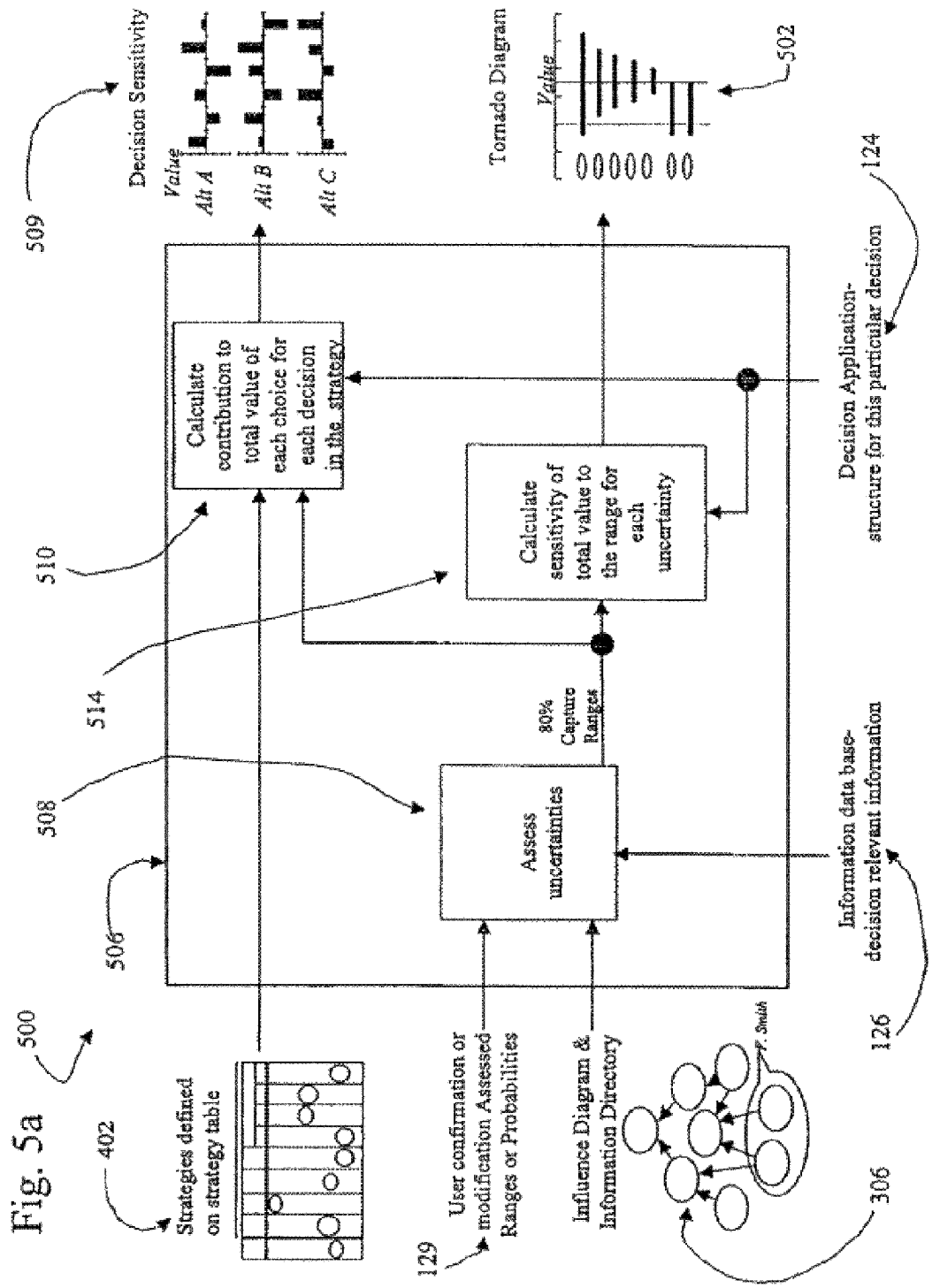
FIG. 5*a* illustrates various logic associated with the Analysis process of the present invention.

FIG. 5a illustrates various logic 506 associated with the Analysis process of the present invention. As shown, a first Analysis module 508 receives as input the influence diagram 306, identifying uncertainties and their relationship to the value and the decisions. The influence diagram also includes an information directory, which specifies the information database(s) 126 that will provide the decision-relevant information. This first Analysis module 508 also receives as input from the information data base(s) 126 assessed ranges or probabilities for each of the uncertainties identified by the influence diagram 306 generated using the Framing logic 310. These data ranges are confirmed or modified by the users 129.

The output of the first Analysis module 508 is further used by a second Analysis module 514. The second Analysis module 514 takes as input the structural relationship of decisions, values and uncertainties from the decision application 124. An example of such a structural relationship is a spreadsheet comprised of equations relating decisions, values and uncertainties. This output is, in turn, used to generate the tornado diagram 502 by varying each of the uncertainties over its range and recording the effect on value.

In parallel with the first and second Analysis modules is a third Analysis module 510 that takes as input the strategies defined on the strategy table 402, the output of the first Analysis module 508 and the structural relationship of decisions, values and uncertainties from the decision application 124. With such input, the third Analysis module 510 identifies a contribution to the total value of each alternative for each decision that comprises each strategy. Given this information, a decision sensitivity table 509 may be constructed.

Figure 6:
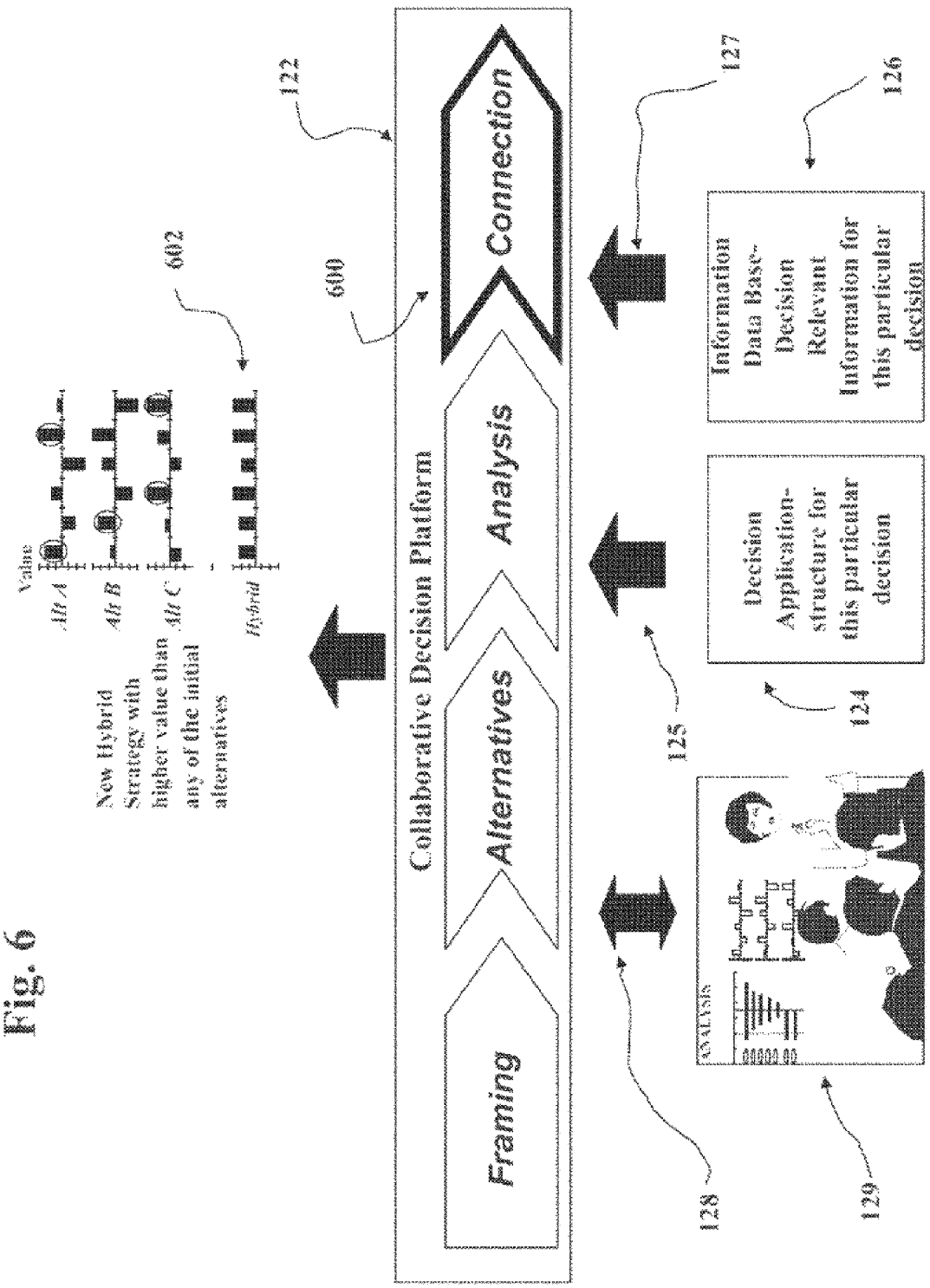
FIG. 6 illustrates an example of Connection in accordance with one embodiment of the present invention.

FIG. 6 illustrates an example of Connection 600 in accordance with one embodiment of the present invention. The purpose of Connection is for the users to develop a new, more valuable "hybrid" strategy 602 combining the most valuable decisions in each of the initially, defined alternative strategies. During Connection, the users' insight into the sources of risk and value 129 interacts with new decision relevant information from the database 126 and the decision structure provided by the decision application 124 to output an evaluation of the hybrid strategy 602.

FIG. 6a illustrates various logic 604 associated with the Connection process of the present invention. As shown, the logic 604 includes a first Connection module 606 which receives as input a value contribution of each alternative for each decision that comprise each strategy, the decision sensitivity 509 generated by the Analysis logic 506. The first connection module 606 also receives as input user insight 129 regarding how to combine the sources of value into a new, more valuable hybrid strategy. A second logic module 608 of the connection logic 604 takes as input the users' insight 129 about additional information sources that could reduce the significant uncertainties or risks identified in the tornado diagram 502. This second Connection module 608 then selects that new information from an appropriate decision relevant database (perhaps one not previously used for this decision problem) 126. The description of the new hybrid alternative from the first Connection module 606 and the new risk reducing information from the second Connection module 608 are input to a third module 610. This third module 610 uses the structural relationship of decisions, values and uncertainties (e.g., spreadsheet) from the decision application 124 to output the value of the hybrid strategy 602.

Figure 7:
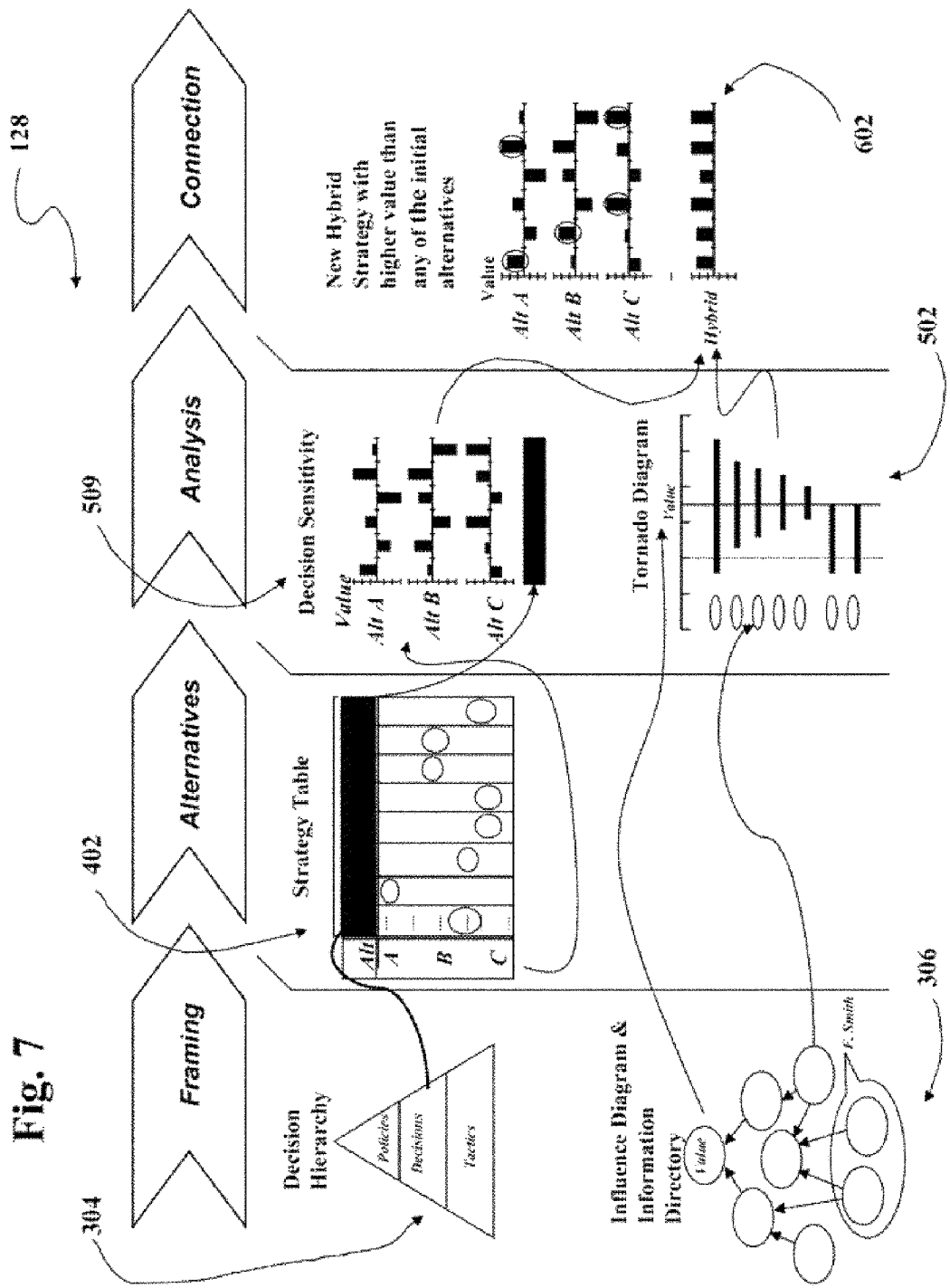
FIG. 7 illustrates the various connectivity between the various inputs and outputs of the Framing, Alternatives, Analysis, and Connection logic that comprises the users' interface.

FIG. 7 illustrates the various logical connectivity among the various common displays of the Framing, Alternatives, Analysis, and Connection that comprise the users' interface 128.

FIGS. 8*a-i* illustrate an example of an application of the various logic components set forth in FIGS. 3-7. As shown, such illustrative application of the collaborative decision platform relates to an individual and his/her spouse, the users, selecting a strategy for participation an employer's stock purchase program. Initially, the collaborative decision platform executes a decision application selected by the users for developing stock purchase strategies.

In the Framing process, the collaborative decision platform uses input from the decision application to present the users with an initial decision hierarchy, which the users confirm or modify. The collaborative decision platform produces the resulting decision hierarchy 800, shown in FIG. 8*a*, as an output, which identifies the decisions that are within the scope of the current decision making process.

The collaborative decision platform also uses input from the decision application to present the users with an initial influence diagram, which the users confirm or modify. The influence diagram identifies the critical uncertainties or risks, the decisions and the values that are important to the users, and it displays the relationships among them. The users confirm or modify the influence diagram. The collaborative decision platform produces the resulting influence diagram 802, shown in FIG. 8*b*, as another output. Note that a directory of information sources 803 is included with the influence diagram.

The users are allowed to modify the influence diagram and the decision hierarchy only to the extent that the modifications were anticipated by the author of the application. This restriction assures that the alternative strategies that are defined in the Alternatives process can be analyzed with the spreadsheet provided by the decision application.

In the Alternatives process, the collaborative decision platform uses input from the decision application to present the users with an initial strategy table that is consistent with the decision hierarchy, which the users confirm or modify. One or more strategy names and their corresponding definitions on the strategy table are also presented to the users. The users may confirm or modify the strategies, including developing new strategies. The resulting strategy alternatives are displayed on strategy tables 804, as shown in FIGS. 8*c* and 8*d*.

Figure 8A:
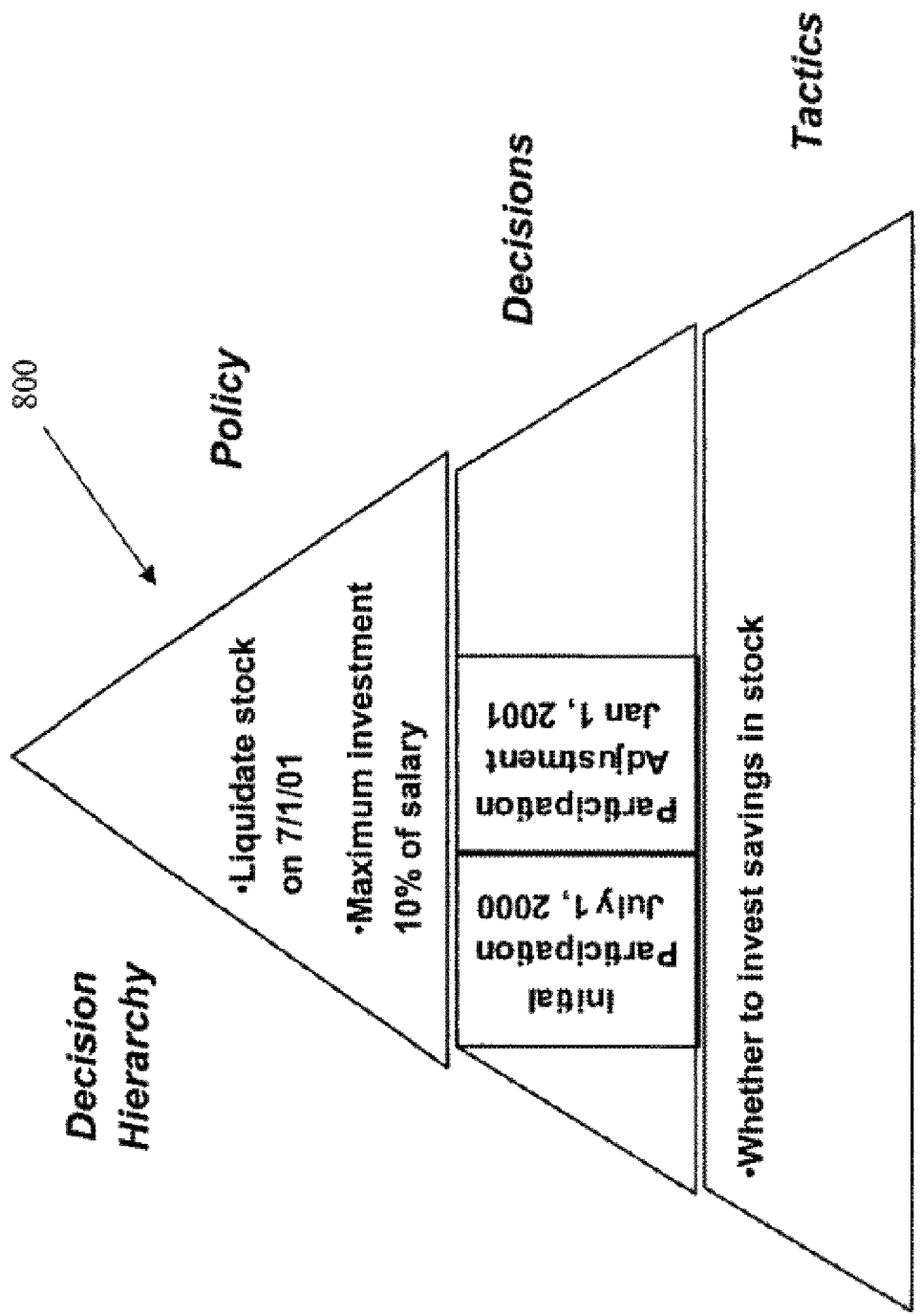
Figure 8B:
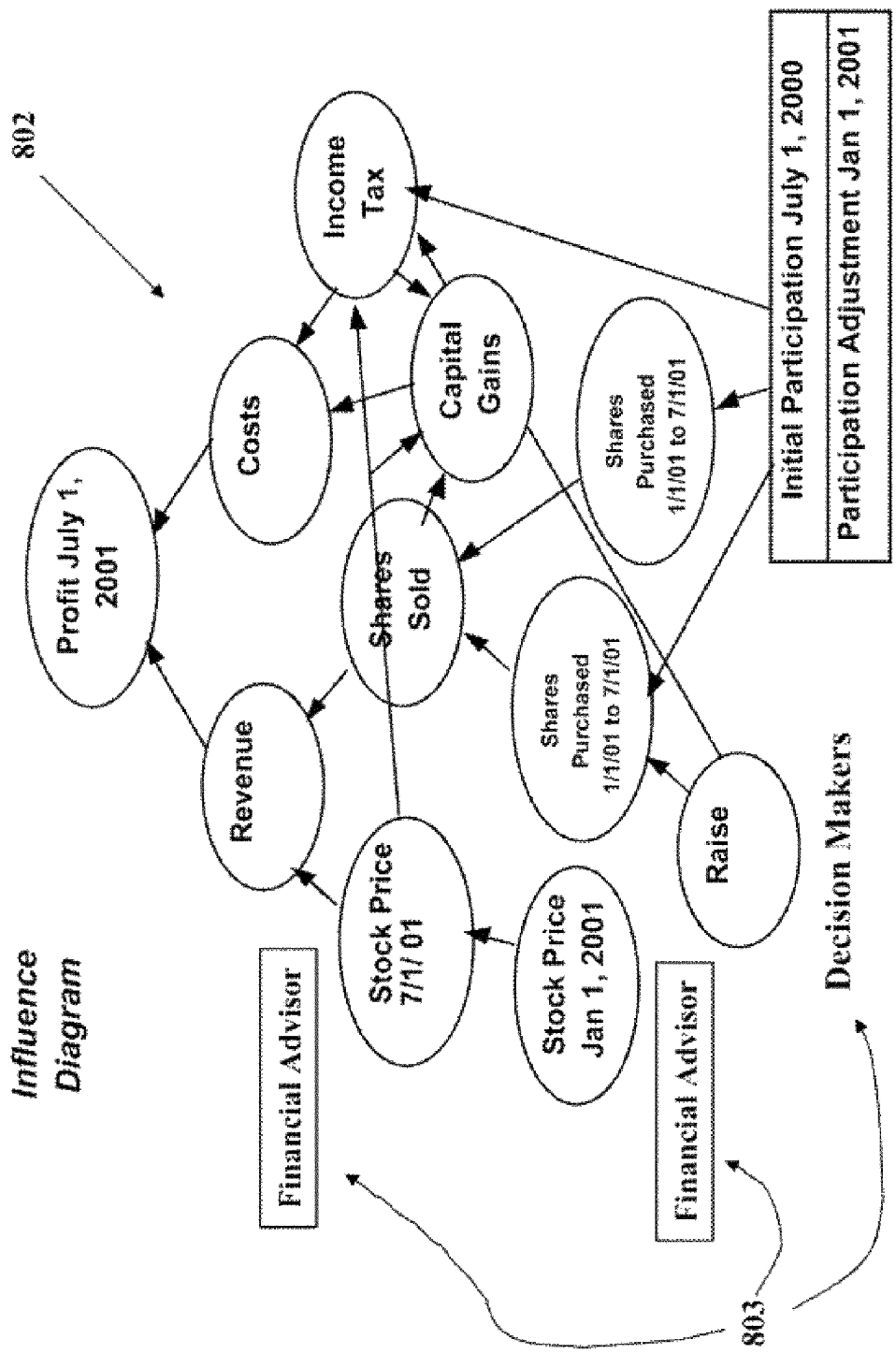
Figure 8C:
Figure 8D:
Figure 8G:
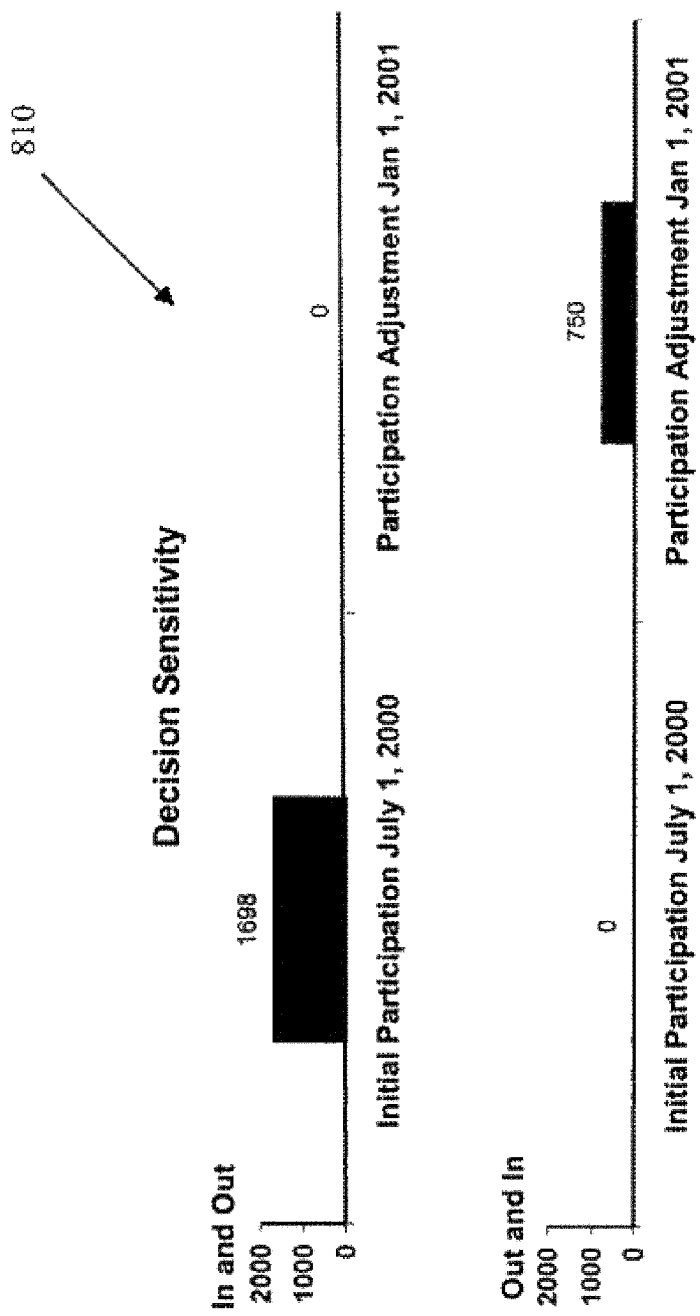
Figure 8I:
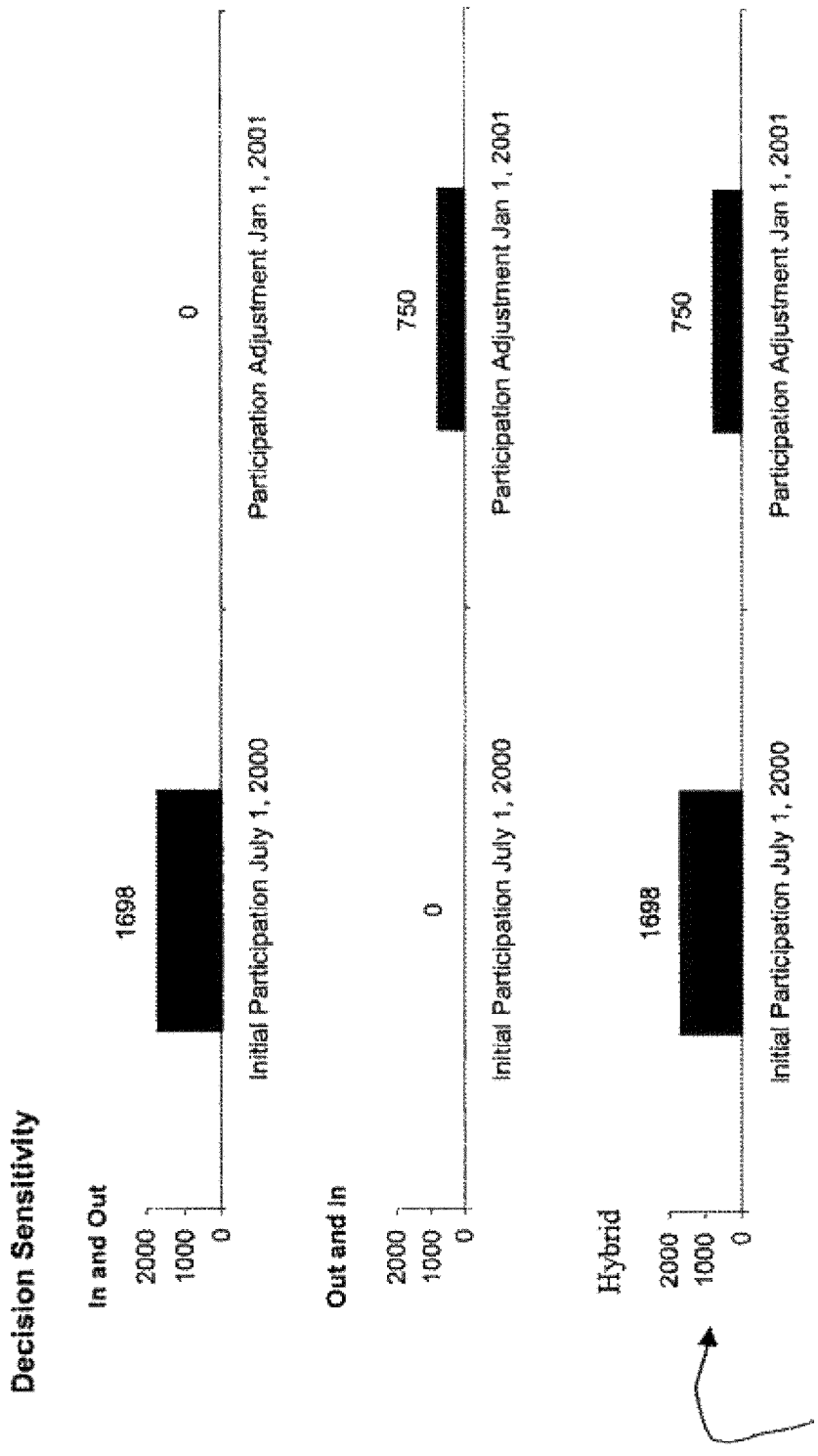

In the Analysis process, ranges on each uncertainty or risk 806, as shown in FIG. 8*e*, are input from the specified decision-relevant databases 803 of FIG. 8*b*. The users may confirm or modify the ranges. The collaborative decision platform takes as input the spreadsheet residing in the decision application that includes equations and data relating the decisions and uncertainties to the value, which in this case is profit. The collaborative decision platform uses the spreadsheet, strategies and uncertainty ranges to produce the tornado diagram 808 and decision sensitivity 810 shown in FIGS. 8*f* and 8*g*.

In the connection process, the users define on the strategy table 804 a new, more valuable "hybrid" strategy 811 that combines the most valuable alternatives from each of the initially defined alternative strategies, as shown in FIG. 8*h*. In defining this hybrid strategy, the users are relying heavily on the shared insight and understanding from the tornado diagram and decision sensitivity. The collaborative decision platform uses the spreadsheet from the decision application to calculate the value of the hybrid 812, as shown on FIG. 8*i*.

Figure 9:
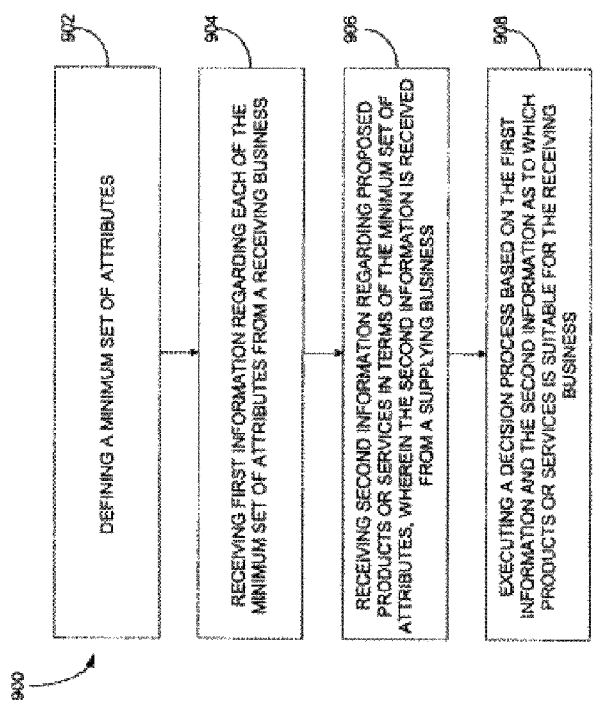
FIG. 9 illustrates a method for affording customer-centric collaborative decision making in a business-to-business framework.

FIG. 9 illustrates a method 900 for affording customer-centric collaborative decision-making in a business-to-business framework. In one embodiment, the method 900 may be carried using the collaborative decision platform set forth hereinabove. In the alternative, the present method may be executed using any other desired architecture.

Initially, in operation 902, a minimum set of attributes is defined. Thereafter, first information regarding each of the minimum set of attributes is received from a receiving business. Note operation 904. Second information is then received regarding proposed products or services in terms of the minimum set of attributes, as indicated in operation 906. Such second information is received from a supplying business.

In use, a decision process is executed based on the first information and the second information as to which products or services is suitable for the receiving business. Note operation 908. The present embodiment thus provides a customer-centric collaborative protocol that defines the minimum informational requirement for collaborative decision-making between enterprises (B2B).

The customer-centric collaborative protocol exploits a commonality in the attributes of the value structure of many enterprises that is sufficient to assess the implications of many decisions. An illustrative minimum set of attributes could include: price, sales, variable cost, fixed cost and investment. For many strateuic decisions, knowing the affect of the decision on these attributes enables the enterprise to make an informed decision.

Figure 9A:
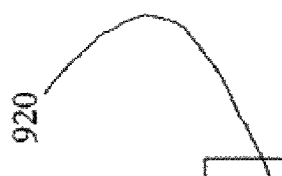
FIGS. 9*a* and 10 illustrates tables associated with the method of FIG. 9.

There are well-defined algorithms for the hierarchical expansion of each of the attributes in the minimum set in the event additional detail is required. When more detail is required, it may be nested within the higher level attributes. An expanded set of attributes could include: price, market share, market size, labor cost, material cost, administrative cost, annual expenses, working capital, plant and equipment, etc. The protocol or structure of the informational requirement is identical for a wide range of enterprises and many decisions within those enterprises, but the relative value of each attribute will be different. FIG. 9*a* illustrates a table 920 showing various customer-centric collaborative ($C^3$) attributes, and the value of a one-percent increases of such attributes in two different industries.

Figure 10:
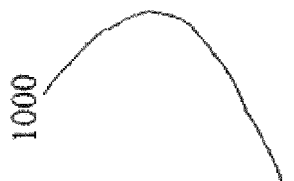

In accordance with the present invention, the supplying enterprise is required to describe its alternatives in terms of their effect on the value attributes that matter to the receiving enterprise. FIG. 10 illustrates a table 1000 showing such an effect on the value attributes.

Figure 11:
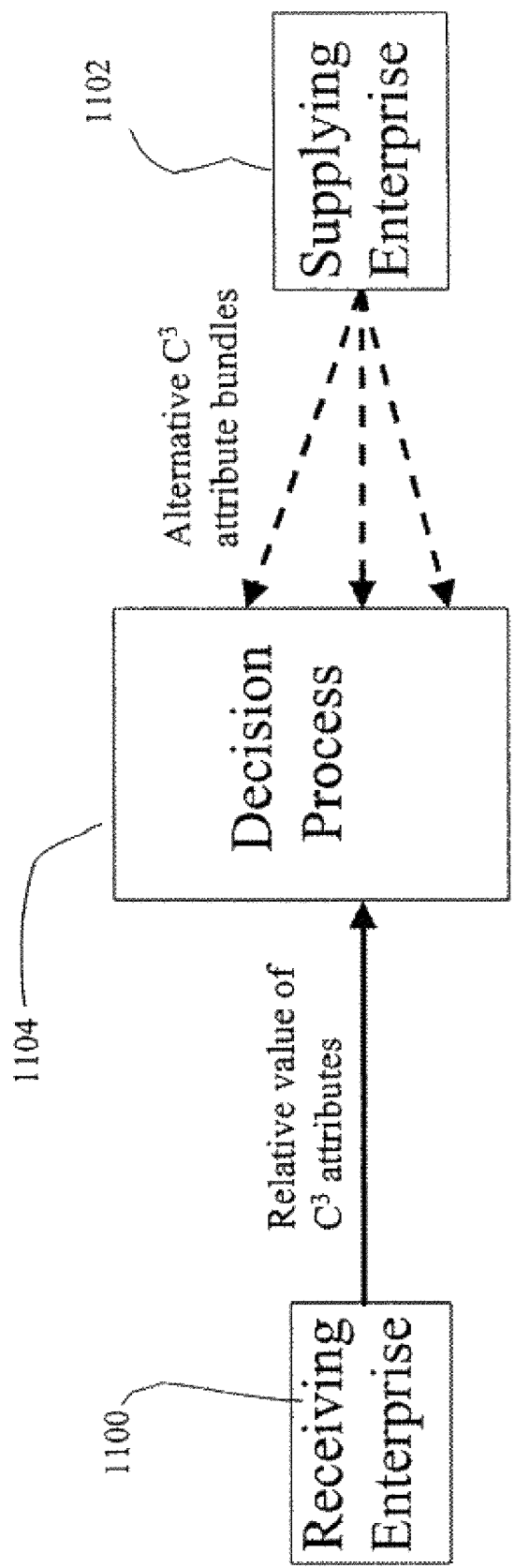
FIG. 11 is a schematic diagram showing the customer-centric collaborative protocol.
Figure 12:
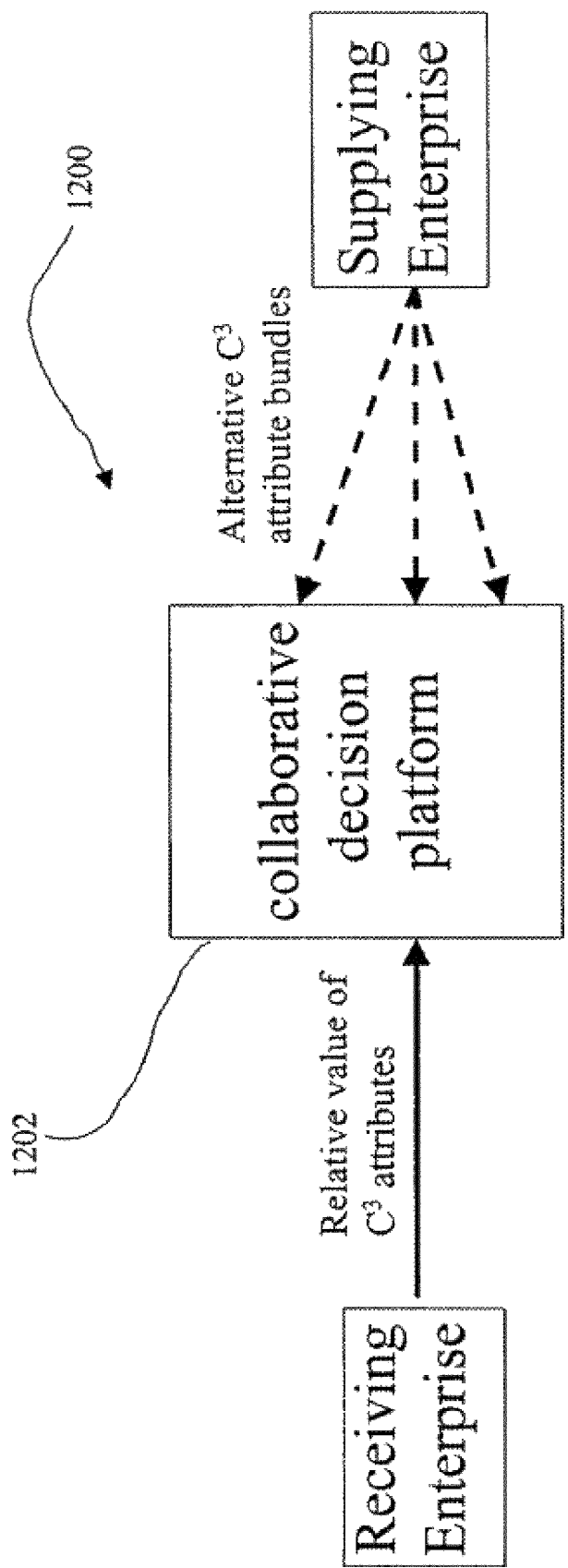
FIG. 12 illustrates a first example of the embodiment set forth in FIG. 11.

FIG. 11 is a schematic diagram showing the customer-centric collaborative ($C^3$) protocol. As set forth hereinabove, the protocol defines the minimum informational requirement for decision making between enterprises (B2B). The value of improvements of each of the attributes is specified for a receiving enterprise 1100. It should be noted that attributes are easily calculable for enterprises that focus on profit. However, even for enterprises that are not focused on profit, these same attributes are of critical importance. A supplying enterprise 1102 provides one or more alternative "attribute bundles" that describe products and services it is willing to deliver in terms of the attributes that matter to the receiving enterprise. An attribute bundle specifies how much of each attribute will be provided. It should be understood that the attribute levels can be assessed with little difficulty using for example an influence diagram. A decision module 1104 may then execute the method 900 of FIG. 9. FIG. 1.2 illustrates a first example 1200 of the embodiment set forth in FIG. 11. As shown, an industry independent, open and scalable platform may be provided that uses the customer-centric collaborative protocol for real-time, remote collaborative decision making among enterprises. The customer-centric collaborative protocol can be used with an architecture or process that supports collaborative decision-making, such as a collaborative decision platform 1202 which is similar to that set forth hereinabove.

Figure 13:
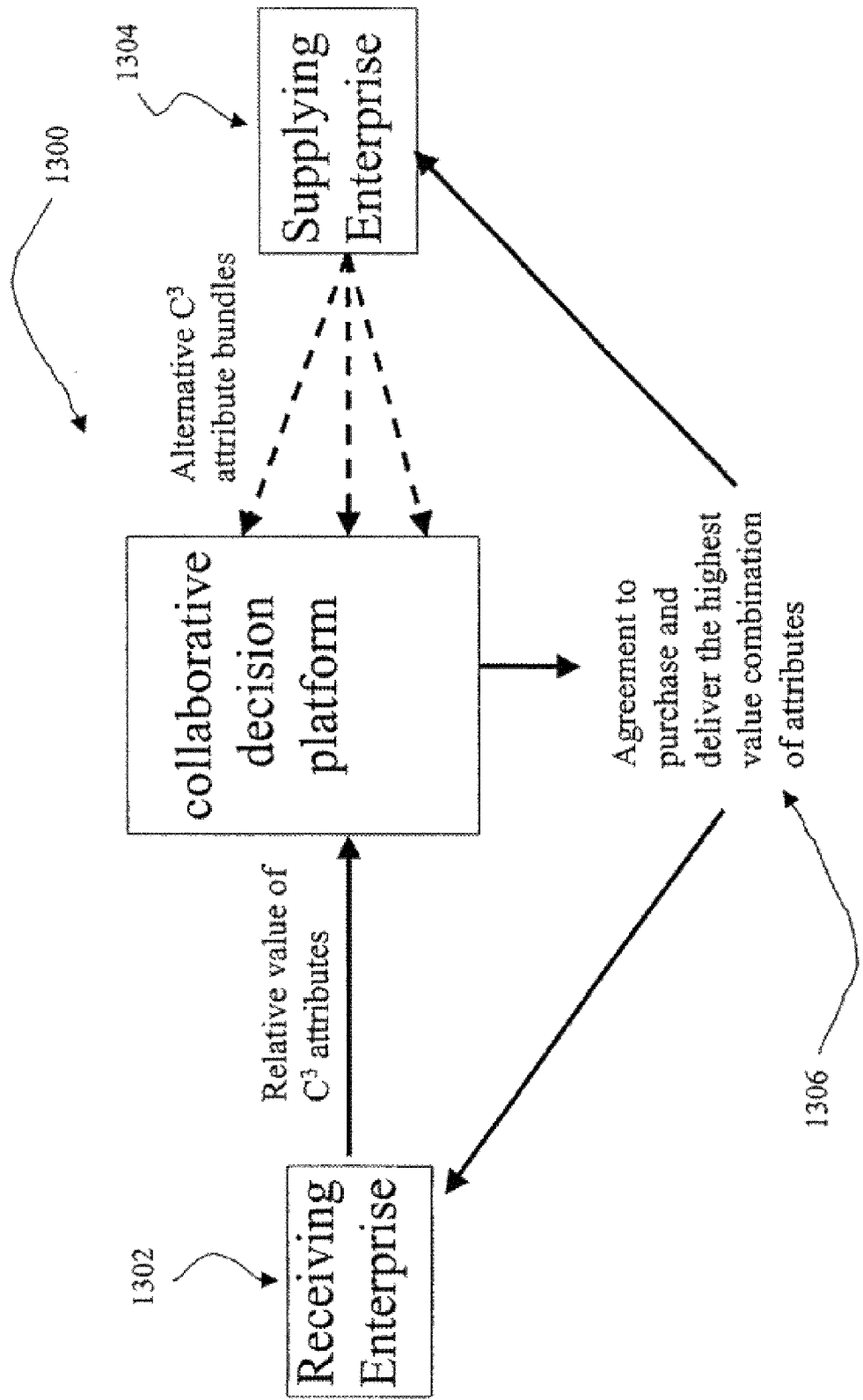
FIG. 13 illustrates a second example of the embodiment set forth in FIG. 11.
Figure 14:
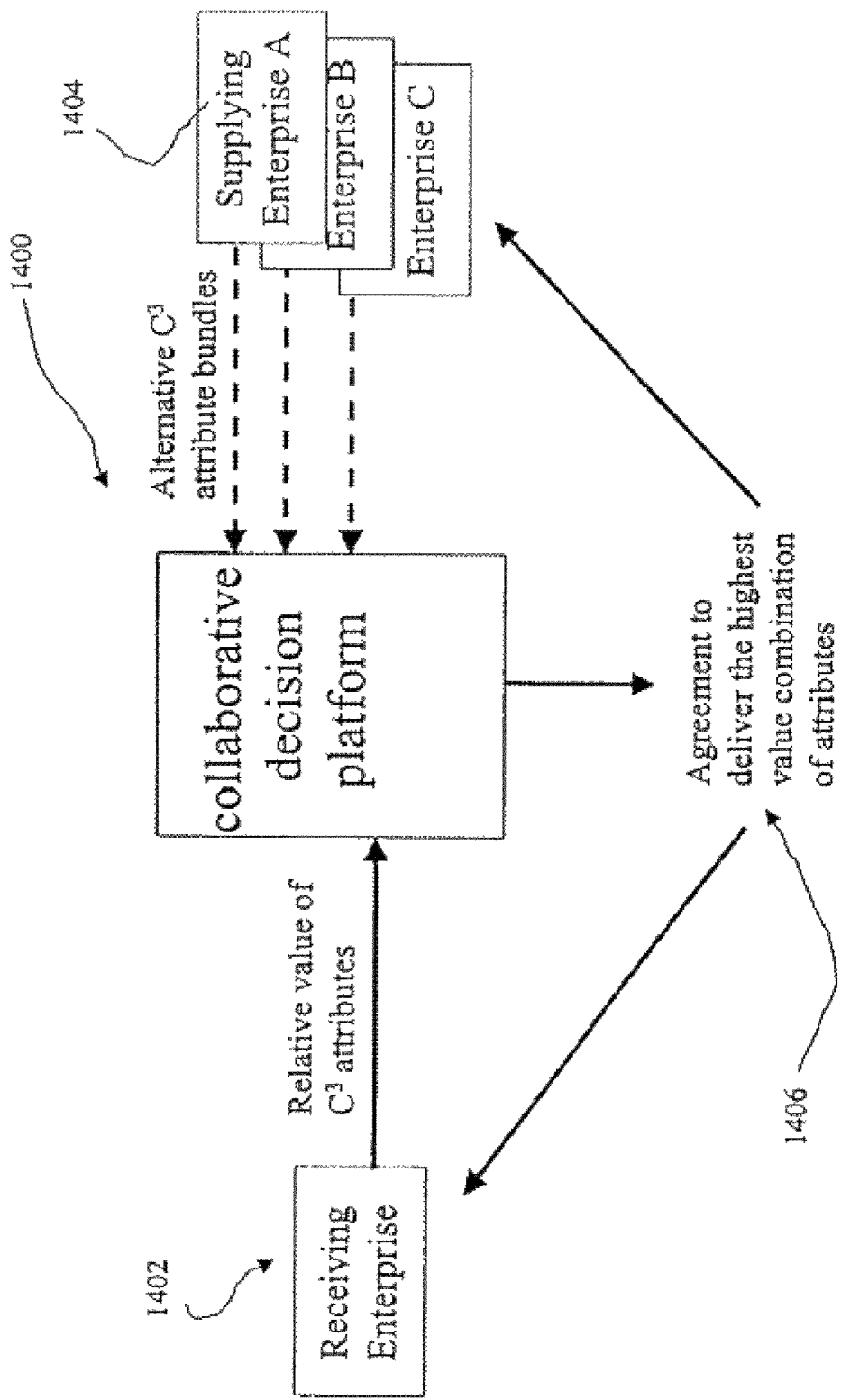
FIGS. 14 and 15 illustrate third and fourth examples, respectively, of the embodiment set forth in FIG. 11, where an industry independent, open and scalable platform is provided for business-to business exchange of existing goods and services that are not commodities.
Figure 15:
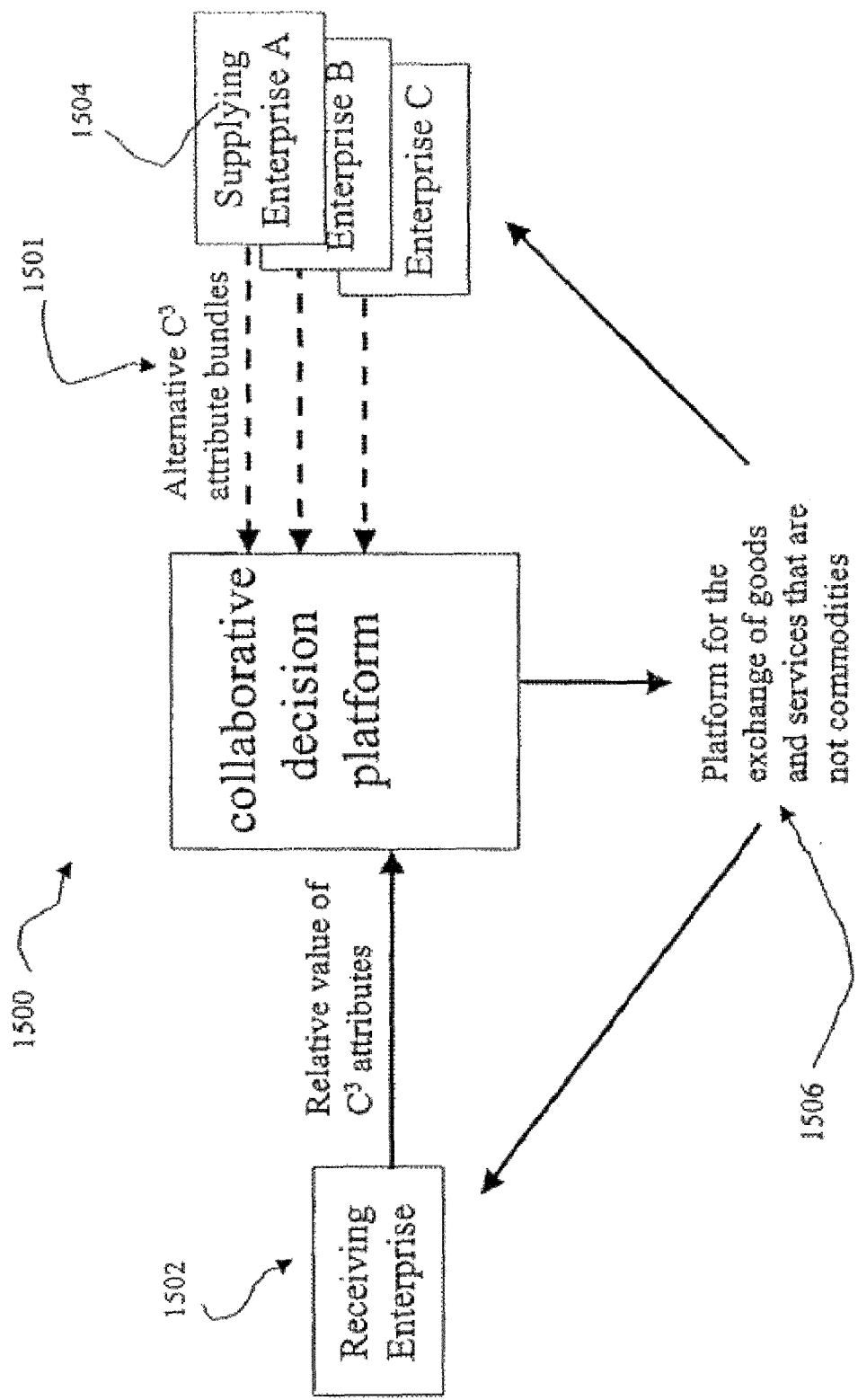

FIGS. 13 and 14 illustrate a second and third example 1300 and 1400 of the embodiment set forth in FIG. 11. In the embodiment of FIG. 13, the customer-centric collaborative protocol and an architecture or process that supports collaborative decision making, such as the collaborative decision platform, may together enable an open, scalable, industry independent process for real-time, remote decision-making between a receiving enterprise 1302 and a supplying enterprise 1304. As shown, the present embodiment may serve to negotiate an agreement 1306 to purchase and deliver the highest value combination of attributes. In a third embodiment shown in FIG. 14, the customer-centric collaborative protocol and an architecture or process that supports collaborative decision making, such as the collaborative decision platform, may together enable an open, scalable, industry independent process for real-time, remote decision-making among a receiving enterprise 1402 and supplying enterprises 1404. As shown, the present embodiment may serve to negotiate an agreement 1406 to purchase and deliver the highest value combination of attributes FIG. 15 illustrates a fourth examples 1501) of the embodiment set forth in FIG. 11, where an industry independent, open and scalable platform is provided for B2B exchange of existing goods and services that are not commodities. In other words, an effective platform for a non-commodity exchange is afforded.

As shown in FIG. 15, the alternative, attribute bundles 1501 can be offered by different enterprises 1504 and need not be commodities, but rather may differ on the level offered of every attribute. It should be understood that commodities are goods and services that can be defined without the information about or the interaction of the customer. As shown in FIG. 15, the customer-centric collaborative protocol and an architecture or process that supports collaborative decision making, such as the collaborative decision platform, together enable an industry-independent, open and scalable platform for the real-time B2B exchange of existing goods and services 1506 that are not commodities.

Figure 16:
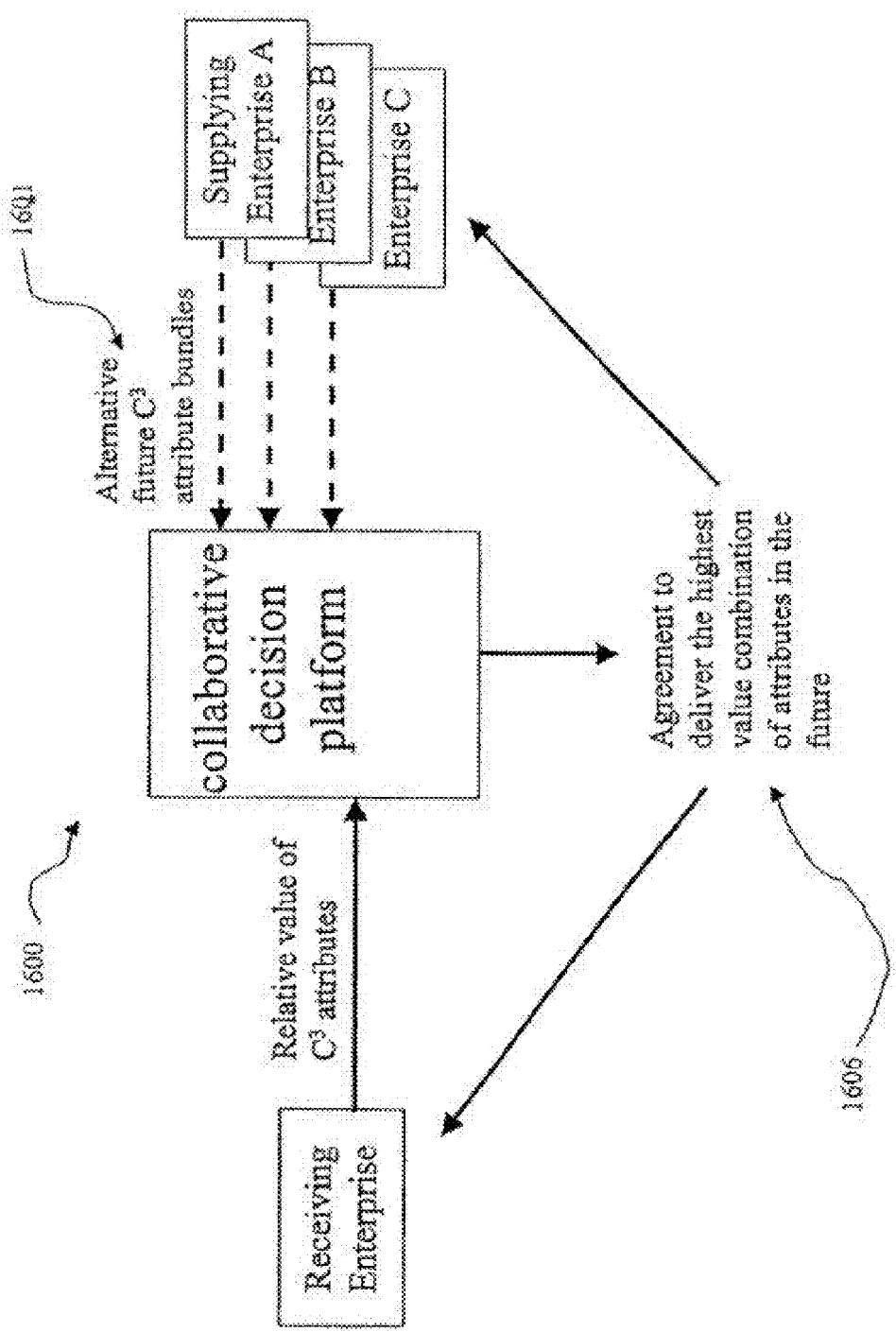
FIG. 16 illustrates a fifth example of the embodiment set forth in FIG. 11, where an industry independent, open and scalable platform is provided for B2B real-time collaboration in the definition of future, non-existent goods and services.
Figure 17:
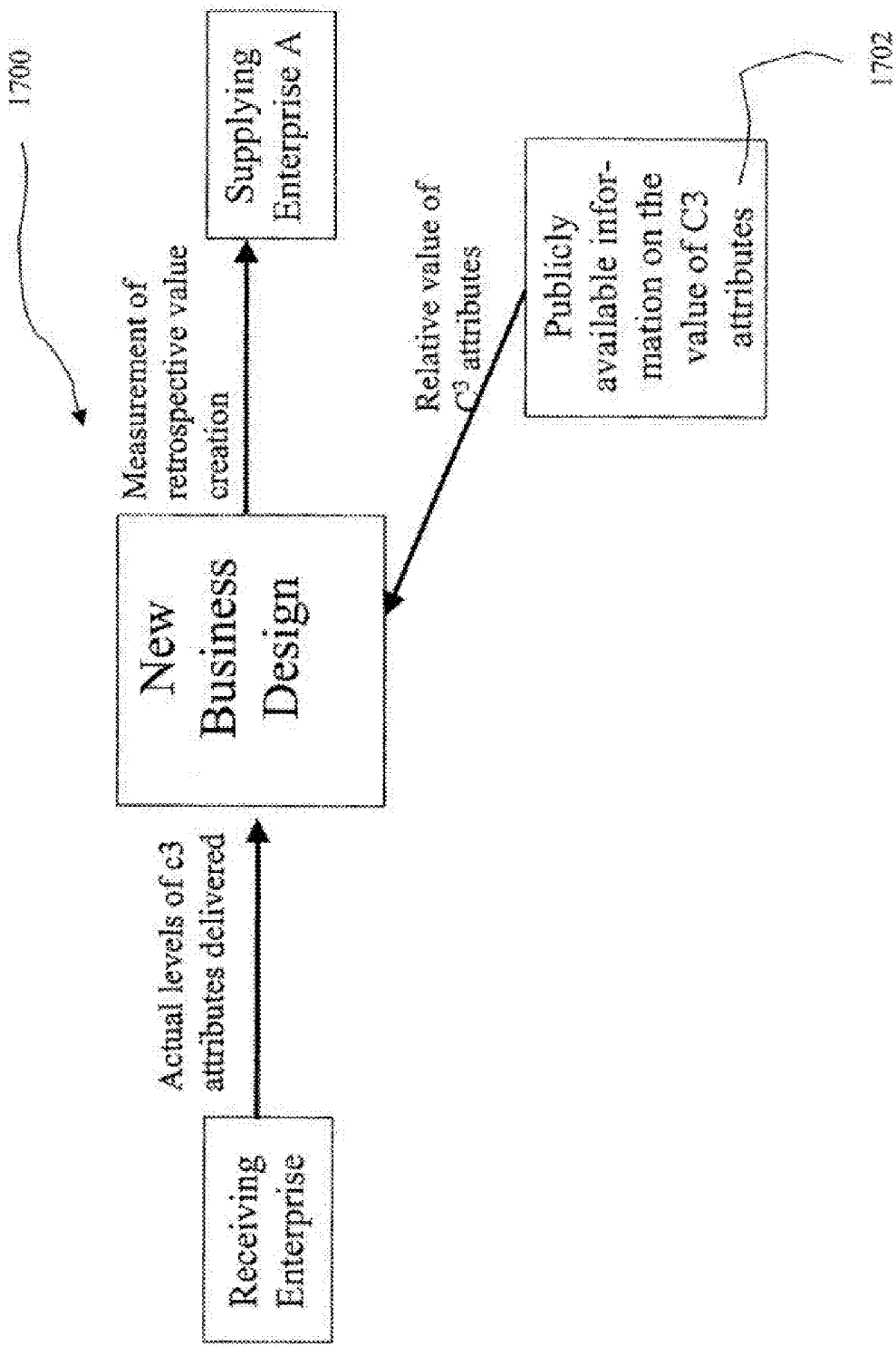
FIGS. 17 and 18 illustrate sixth and seventh examples, respectively, of the embodiment set forth in FIG. 11, where a new business design is provided that assists business-to-business enterprises in measuring the value creation for its customers.
Figure 18:
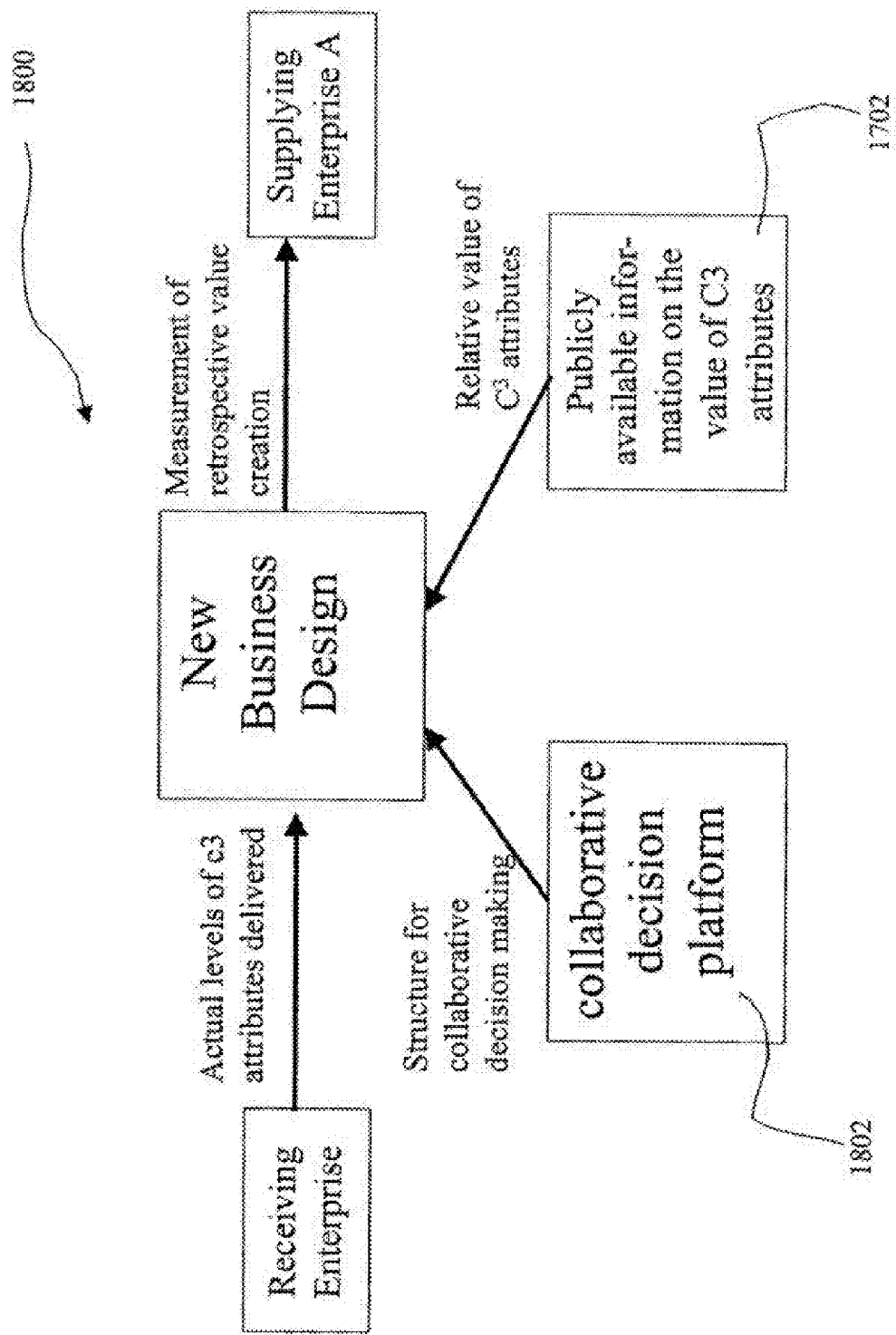

FIG. 16 illustrates a fifth example 1600 of the embodiment set forth in FIG. 11, where an industry independent, open and scalable platform is provided for B2B real-time collaboration in the definition of future, non-existent goods and services. As shown in FIG. 16, the alternative attribute bundles 1601 can be offered by different enterprises and need not exist. Rather, they may represent proposals to deliver goods and services that could be developed in the future. As shown, an agreement 1606 may be negotiated to deliver the highest value combination of attributes in the future. FIGS. 17 and 18 illustrate sixth and seventh examples 1700 and 1800, respectively, of the embodiment set forth in FIG. 11, where a new business design is provided that assists B2B enterprises in measuring the value creation for its customers.

As shown in FIG. 17, the customer-centric collaborative protocol and publicly available information 1702 may together enable a new business design that assists B2B enterprises in measuring the prospective value creation for its customers. With reference to FIG. 18, a particular embodiment of that business design could include the customer-centric collaborative protocol, publicly available information 1702 and a collaborative decision platform 1802, which together enable a new business design that assists B2B enterprises in measuring the retrospective value creation for its customers.

An exemplary application of a customer-centric collaborative protocol utilizing, the collaborative decision platform for the selection of a strategy for "Customer Relationship Management (CRM)" will now be set forth. In particular, the present B2B example relates to a receiving enterprise desirous of an improved CRM strategy and a supplying enterprise capable of delivering alternative CRM strategies.

Figure 19:
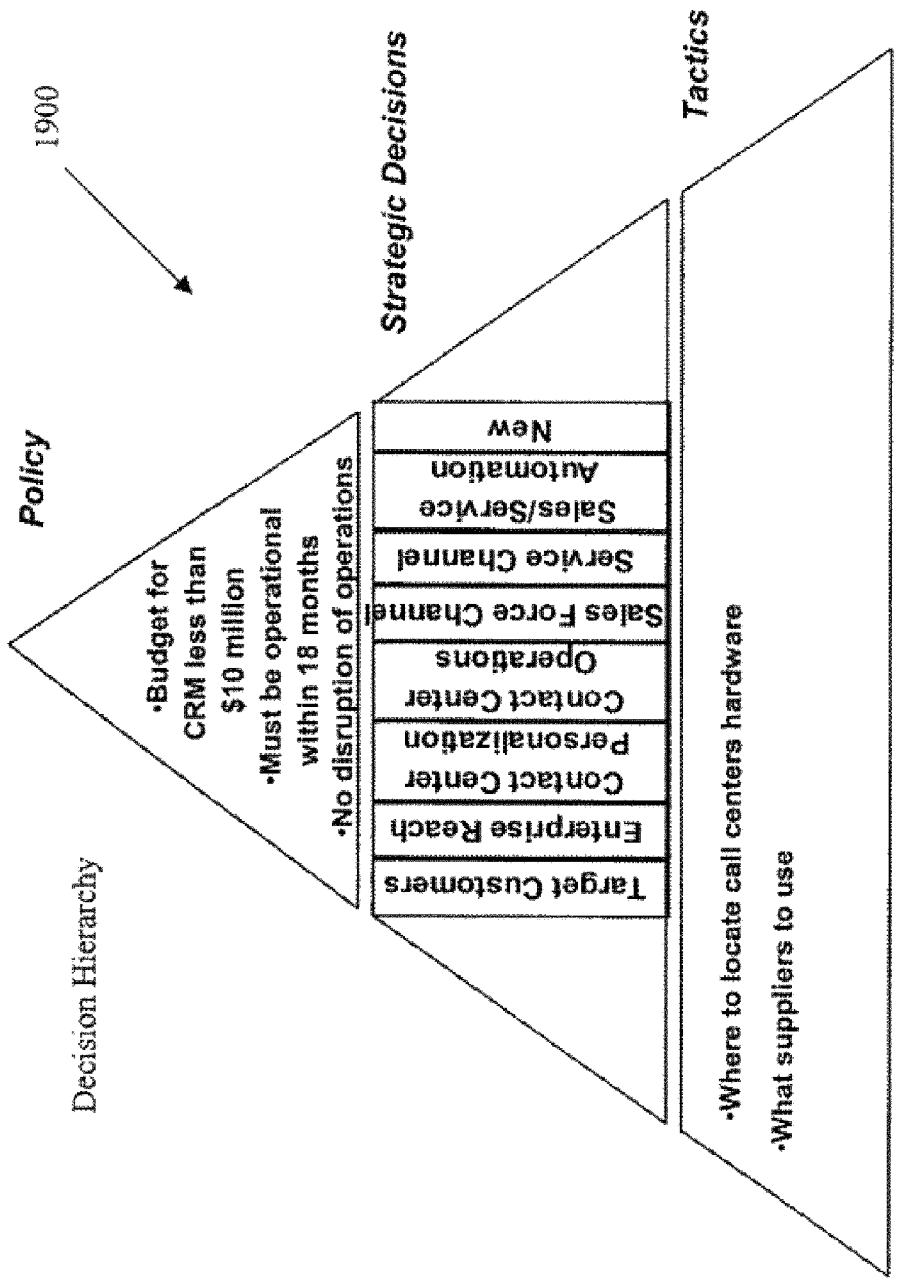
Figure 20:
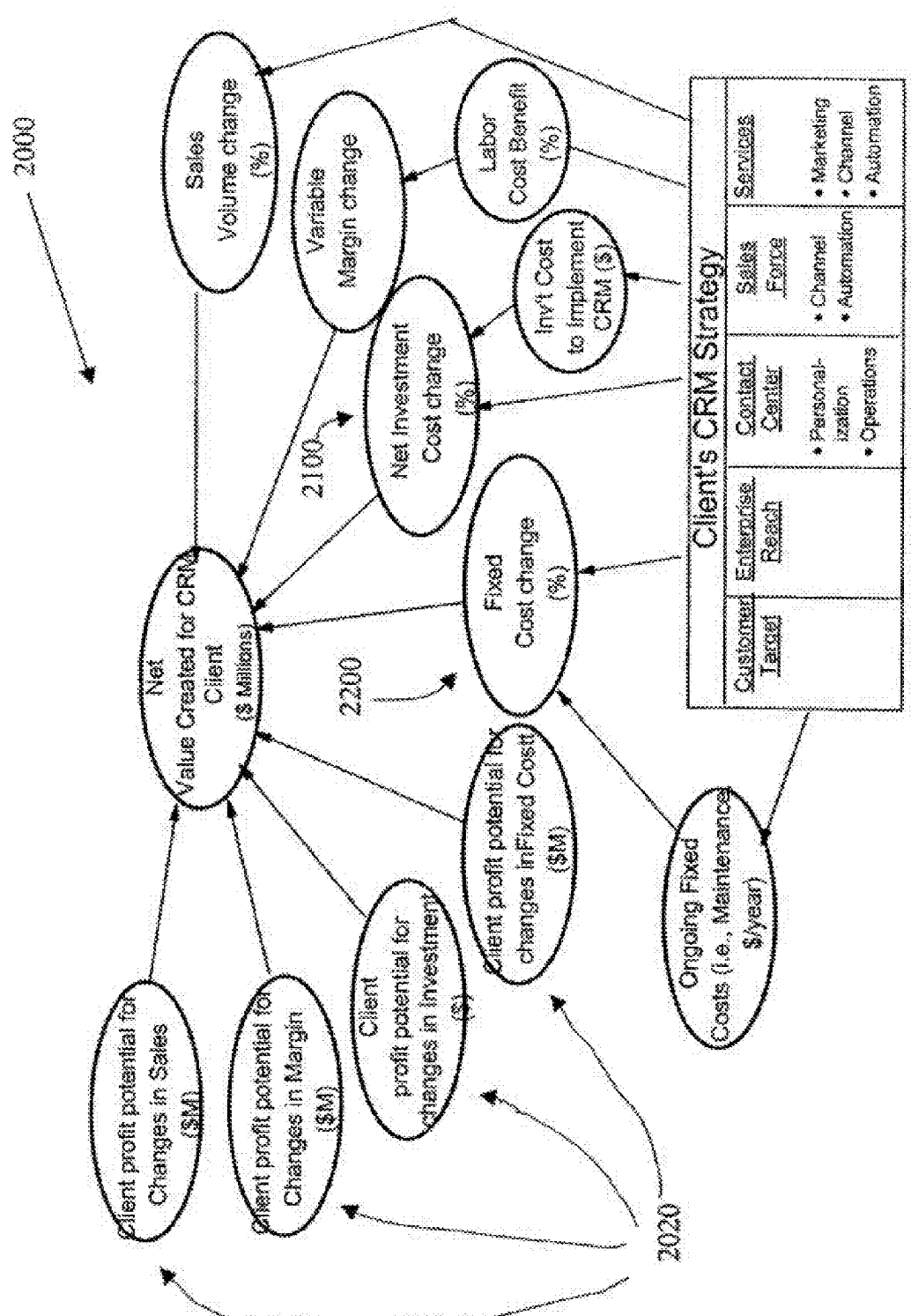
Figure 21:
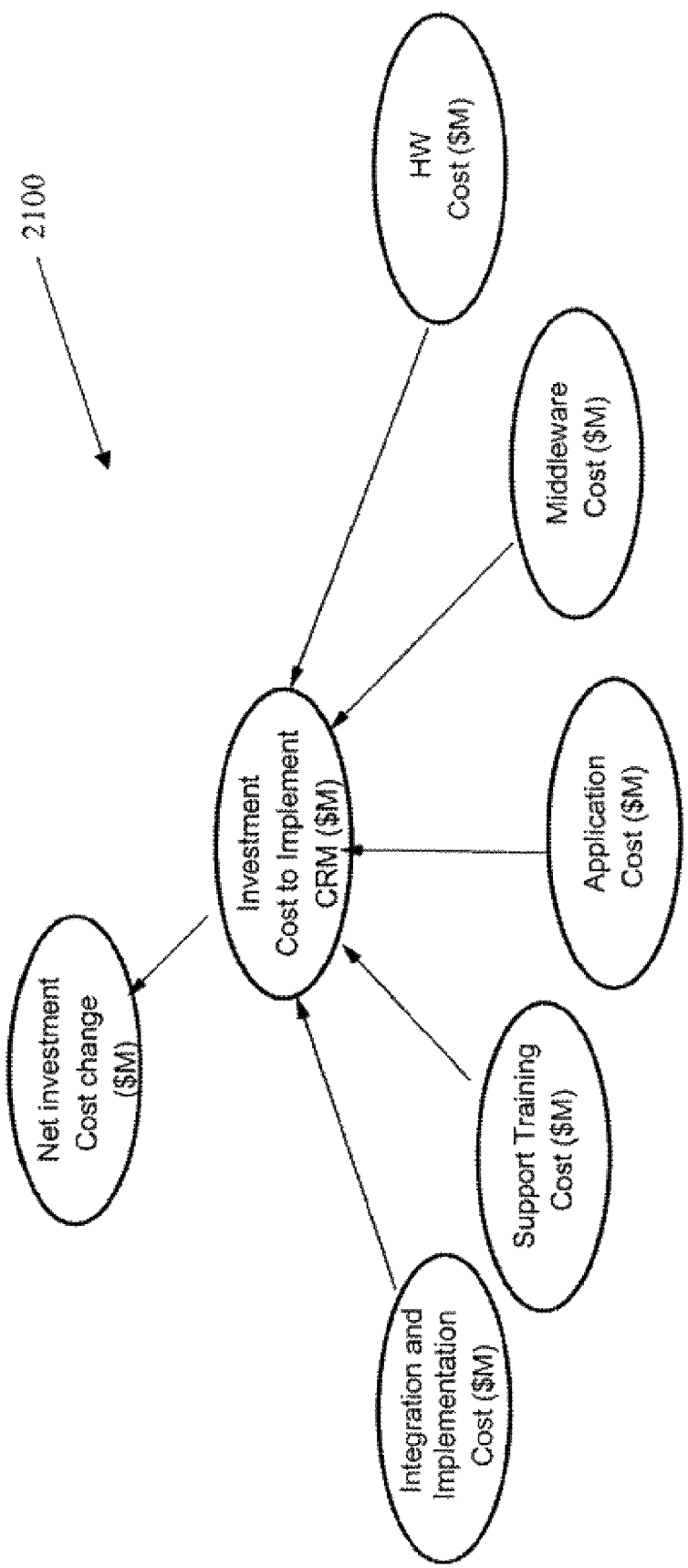
Figure 22:
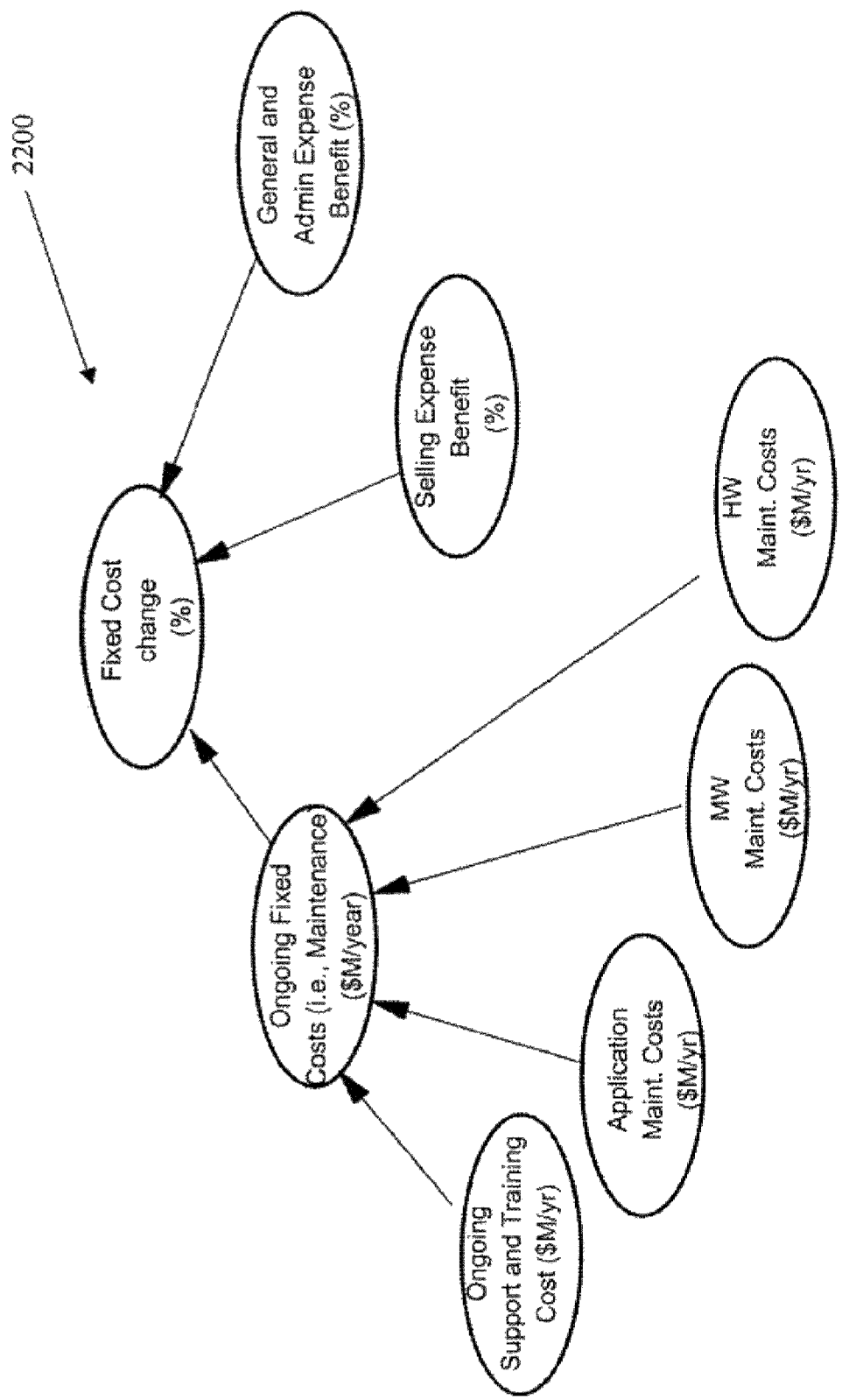

In this case during the Framing process, the receiving enterprise provides the policies, which constrain the strategic alternatives. The supplying enterprise demonstrates its experience by offering a list of strategic decisions. The receiving enterprise believes that two of the decisions are tactical, i.e. can be made later. FIG. 19 illustrates the resulting decision hierarchy 1900 developed collaboratively and asynchronously. FIG. 20 shows the influence diagram 2000, which identifies the critical uncertainties, the strategic decisions and the attributes 2020 that are of value to the receiving enterprise and which display the relationship among them. For two of the attributes, more detail is required and the higher level attributes are expanded hierarchically in those areas 2100 and 2200, as shown in FIGS. 21 and 22, respectively.

Figure 23C:

During the Alternatives process, three alternative strategies 2300, 2302, and 2304 are defined collaboratively on a strategy table in terms of the strategic decisions, as shown in FIGS. 23*a*, 23*b* and 23*c*, respectively. The strategy table developed remotely and asynchronously. The strategies are developed in the physical presence of both enterprises.

Figure 24:
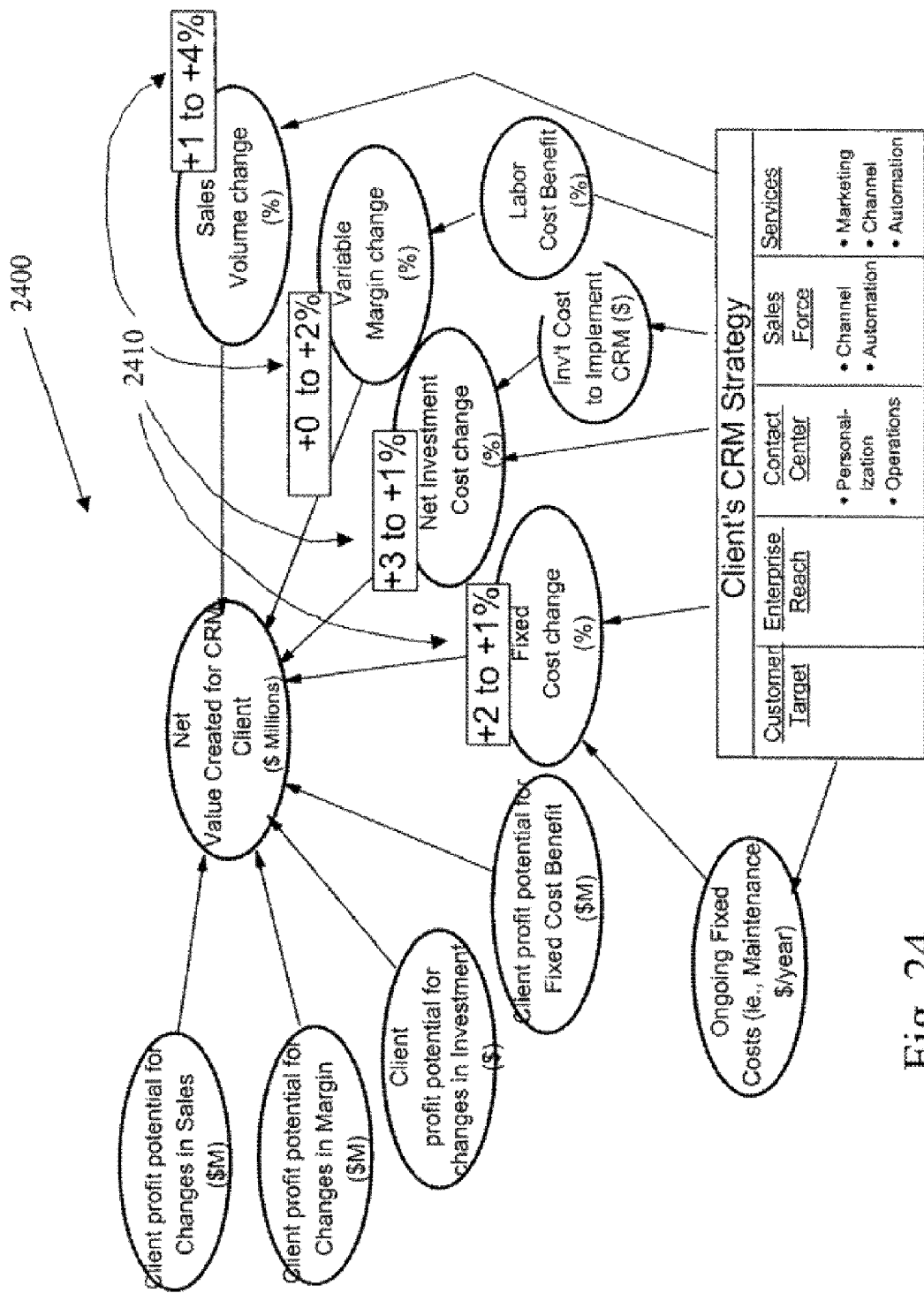
Figure 25:
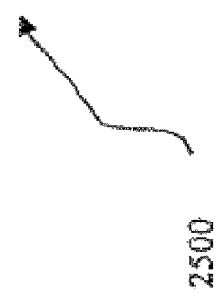

In the Analysis process, the supplying enterprise uses information from its database to assess the range of effect that the "Revenue Growth" strategy will have on each of the attributes 2410. Note 2400 in FIG. 24. Similar assessments are made for each of the other strategies. The receiving enterprise may establish its value for changes in each of the attributes as shown in the table 2500 of FIG. 25.

The table 2600 in FIG. 26 shows the calculations performed inside the collaborative decision platform when the customer-centric collaborative protocol is used. As shown, the value of an alternative to the client can be estimated by multiplying the improvement in each attribute by the customer's value for changes in that attribute.

Figure 27:
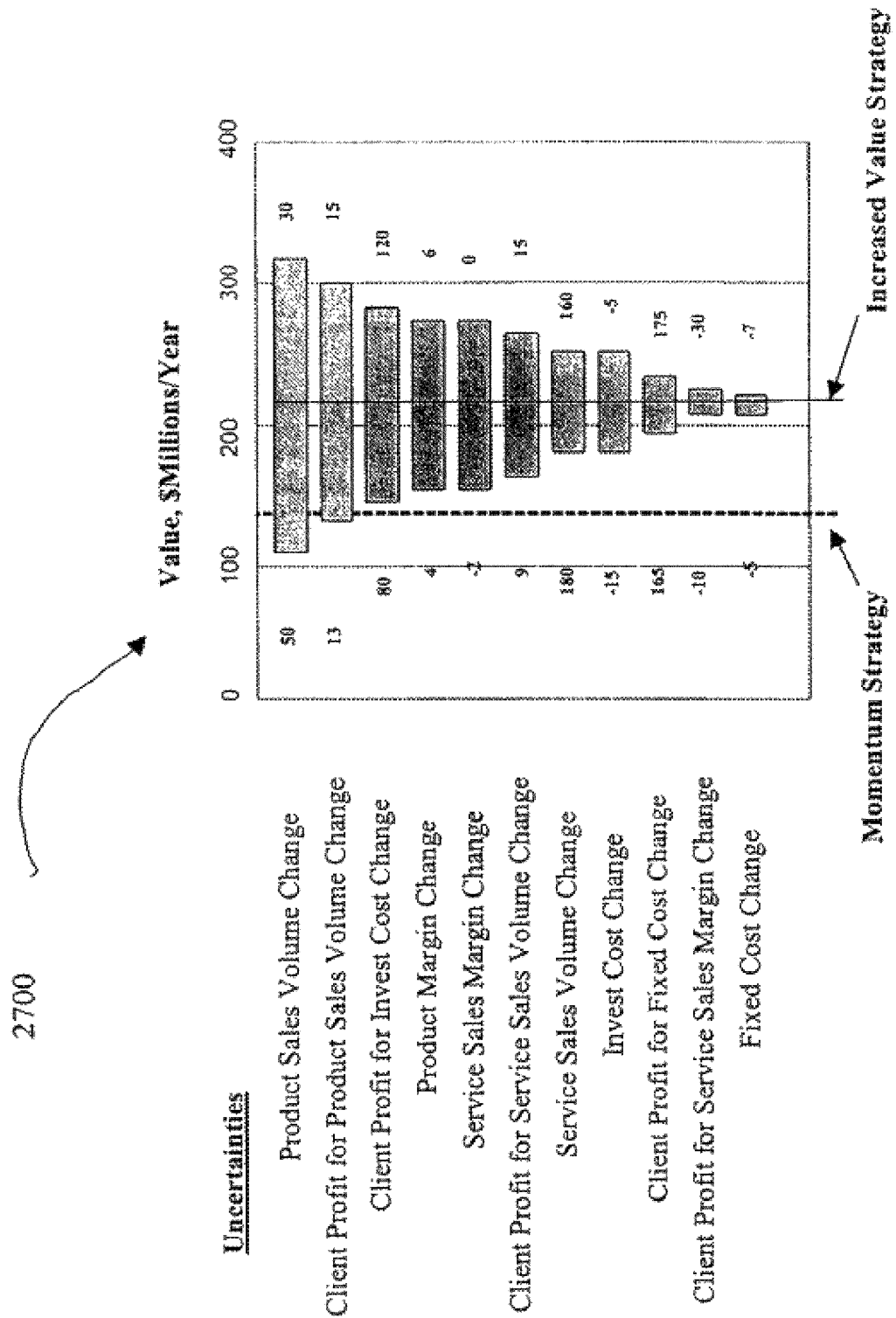
Figure 28:
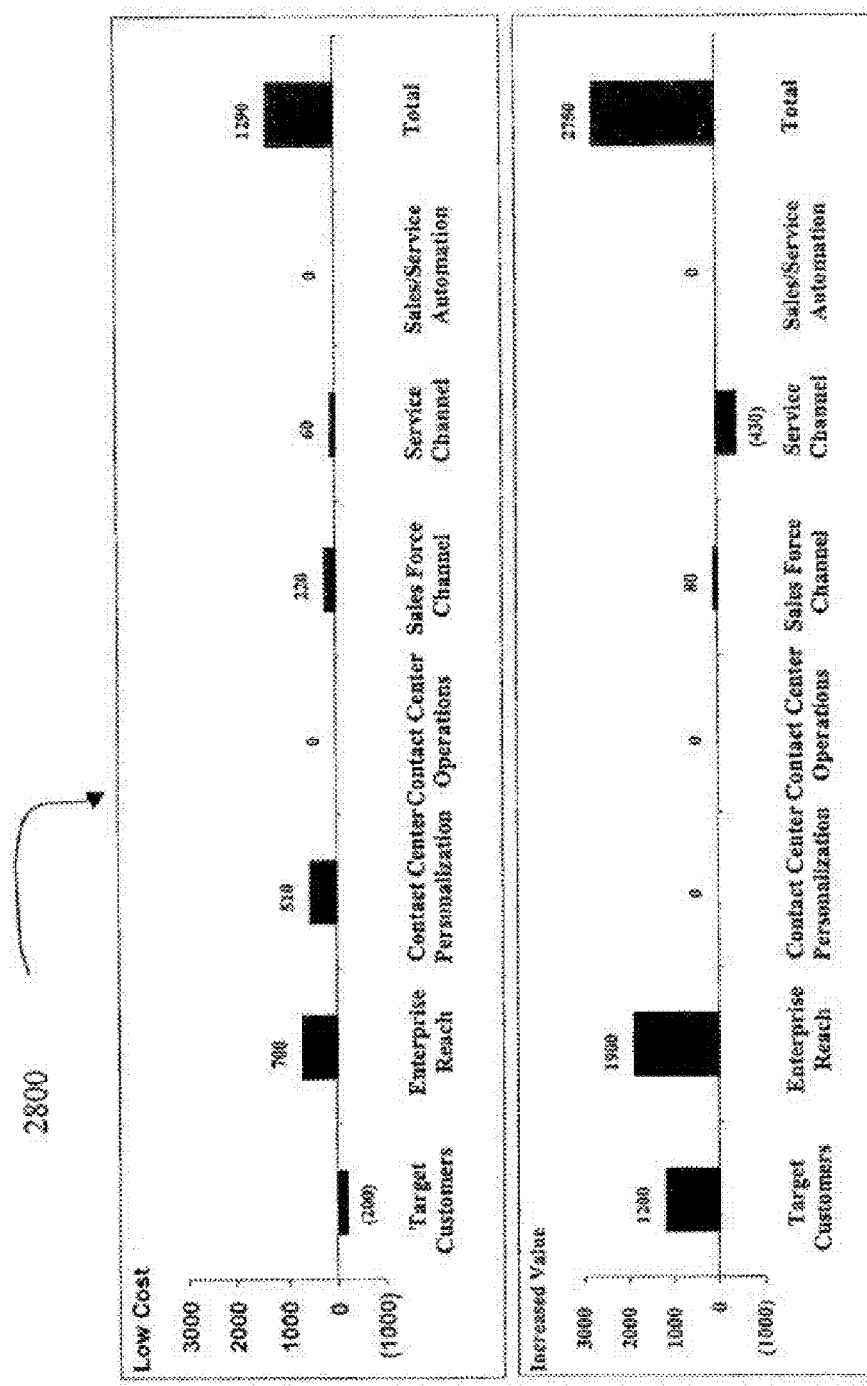

The remarkable simplicity of these calculations enables shared insight into the sources of risk and sources of value, which is displayed in the tornado diagram 2700 and decision sensitivity 2800 for each of the alternative strategies, as shown in FIGS. 27 and 28, respectively. It should be noted that different solutions might be appropriate for clients in different industries because of different client values for the $C^3$ attributes.

Figure 30:
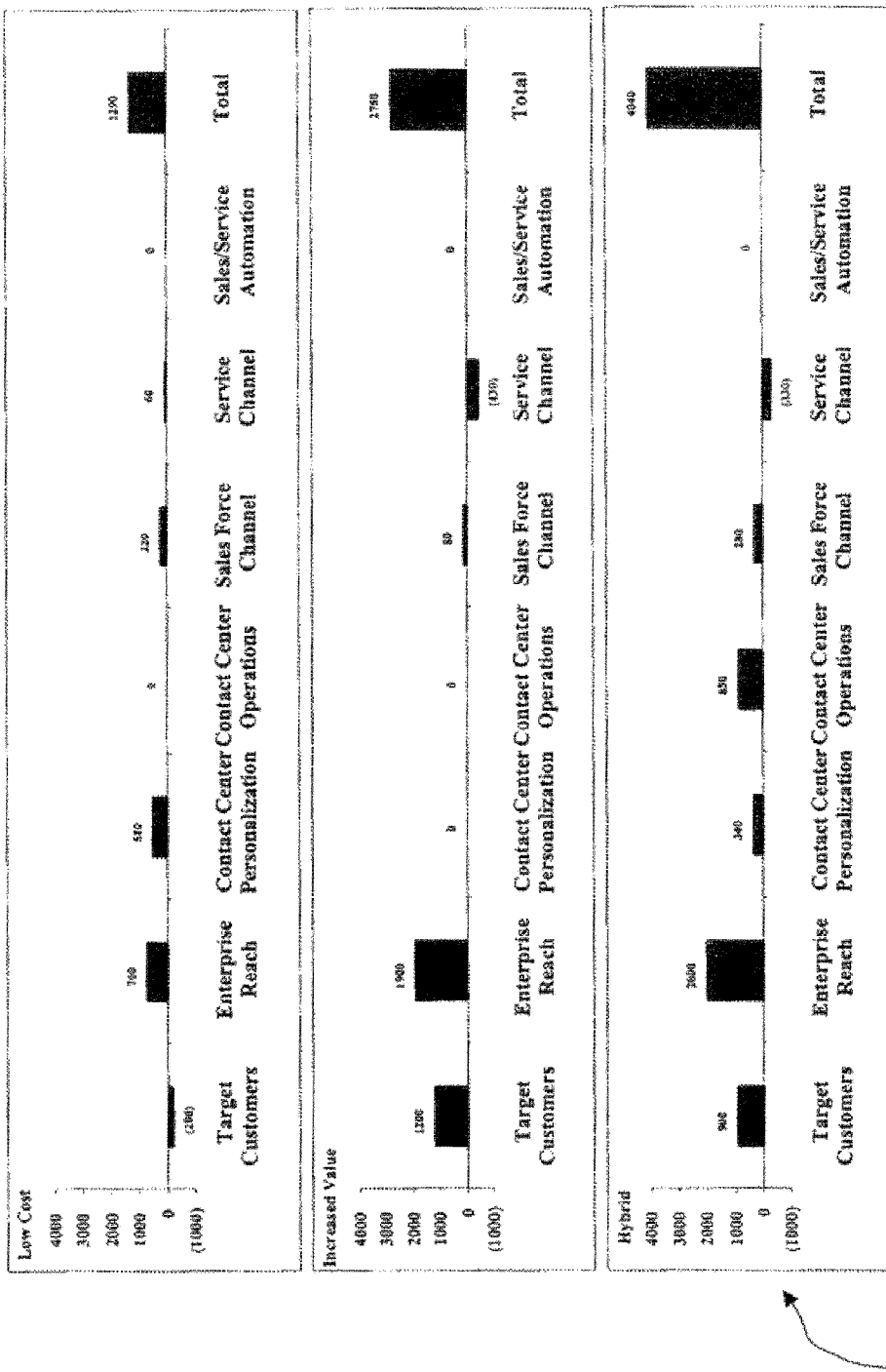

Using the shared understanding of the sources of risk and value in the initially defined alternative strategies, the supplying and receiving enterprise collaborate in developing a new, more valuable "hybrid" strategy 2900, as shown in FIG. 29. Its corresponding decision sensitivity 3000 of FIG. 30 compares the total value of the hybrid strategy with the initially defined alternatives and identifies its sources of value.

While various embodiments have been described above, it should be understood that they have been presented by way of example only, and not limitation. Thus, the breadth and scope of to preferred embodiment should not be limited by any of the above-described exemplary embodiments, but should be defined only in accordance with the following claims and their equivalents.

What is claimed is:

1. A method, comprising:
   (a) defining a plurality of attributes to support a process that is related to decision-making and utilizes an application including at least one application that is a real estate-related application, a medical-related application, a corporate-related application, a product supply-related application, a service supply-related application, or a financial-related application;
   (b) receiving first information regarding the attributes from a receiving business;
   (c) receiving second information regarding proposed products or services in terms of the attributes, wherein the second information is received from a supplying business; and
   (d) executing a decision process based on the first information and the second information;
   wherein the process is capable of being executed using a system capable of: (i) retrieving stored information from a storage; (ii) receiving user information from a user utilizing a user interface; and (iii) processing the stored information and the user information for generating output of the processing; where one or more of (i)-(iii) are carried out utilizing, at least in part, one or more modules capable of accomplishing the one or more of (i)-(iii) for one or more purposes.

2. The method as recited in claim 1, wherein the attributes include price, sales, variable costs, fixed cost and investment.

3. The method as recited in claim 2, wherein the attributes further include market share, market size, labor cost, material cost, administrative cost, annual expenses, working capital, planning and equipment.

4. The method as recited in claim 1, wherein the first information and second information are received utilizing a network.

5. The method as recited in claim 4, wherein the network is the Internet.

6. A computer program product embodied on a computer readable medium, comprising:
   computer code for causing execution of an application capable of being utilized in association with one or more attributes to support decision-making, the application including at least one application that is a real estate-related application, a medical-related application, a corporate-related application, a product supply-related application, a service supply-related application, or a financial-related application;
   computer code for receiving first information regarding the one or more attributes in association with a receiving entity;
   computer code for receiving second information regarding one or more products or services in terms of the one or more attributes; and
   computer code for causing execution of a process that is related to the decision-making, based on the first information and the second information;
   wherein the application is capable of being executed using a system capable of: (i) retrieving stored information from a storage; (ii) receiving user information from a user utilizing a user interface; and (iii) processing the stored information and the user information for generating output of the processing; where one or more of (i)-(iii) is carried out utilizing, at least in part, logic capable of accomplishing the one or more of (i)-(iii) for one or more purposes.

7. The computer program product as recited in claim 6, wherein the attributes include price, sales, variable costs, fixed cost, and investment.

8. The computer program product as recited in claim 7, wherein the attributes further include market share, market size, labor cost, material cost, administrative cost, annual expenses, working capital, planning and equipment.

9. The computer program product as recited in claim 6, wherein the first information and second information are received utilizing a network.

10. The computer program product as recited in claim 9, wherein the network is the Internet.

11. A system, comprising:
    logic for executing an application capable being utilized in association with one or more attributes to support decision-making, the application including at least one application that is a real estate-related application, a medical-related application, a corporate-related application, a product supply-related application, a service supply-related application, or a financial-related application;
    logic for receiving first information regarding the attributes from a receiving entity;
    logic for receiving second information regarding proposed products or services in terms of the attributes, wherein the second information is associated with a supplying business; and
    logic for executing a process that is related to decision-making, based on the first information and the second information;
    wherein the application is capable of being executed in association with an entity capable of: (i) retrieving stored information from a storage; (ii) receiving user information from a user utilizing a user interface; and (iii) processing the stored information and the user information for generating output of the processing; where one or more of (i)-(iii) are carried out utilizing, at least in part, one or more modules capable of applying the one or more of (i)-(iii) differently.

12. The system as recited in claim 11, wherein the attributes include price, sales, variable costs, fixed cost and investment.

13. The system as recited in claim 12, wherein the attributes further include market share, market size, labor cost, material cost, administrative cost, annual expenses, working capital, planning and equipment.

14. The system as recited in claim 11, wherein the first information and second information are received utilizing a network.

15. The system as recited in claim 14, wherein the network is the Internet.

16. The computer program product as recited in claim 6, wherein the one or more attributes includes a plurality of the attributes.

17. The computer program product as recited in claim 16, wherein the plurality of the attributes are bundled.

18. The computer program product as recited in claim 16, further comprising computer code for hierarchical expansion of each of the attributes.

19. The computer program product as recited in claim 16, wherein the computer program product is operable such that a minimum set of the plurality of the attributes is required.

20. The computer program product as recited in claim 6, wherein the one or more attributes includes price.

21. The computer program product as recited in claim 6, wherein the one or more attributes relates to equipment.

22. The computer program product as recited in claim 6, wherein the one or more attributes includes price and relates to equipment.

23. The computer program product as recited in claim 6, wherein the one or more attributes includes an administrative cost.

24. The computer program product as recited in claim 6, wherein the one or more attributes includes at least one variable.

25. The computer program product as recited in claim 6, wherein the process includes a dialogue decision process.

26. The computer program product as recited in claim 6, wherein the logic includes decision logic.

27. The computer program product as recited in claim 6, wherein the logic is a component of the application.

28. The computer program product as recited in claim 6, wherein the logic is a component of a platform.

29. The computer program product as recited in claim 28, wherein the at least one application is separate from the platform.

30. The computer program product as recited in claim 28, wherein the platform is a decision platform.

31. The computer program product as recited in claim 28, wherein the platform is a collaborative decision platform.

32. The computer program product as recited in claim 6, wherein the logic is associated with a plurality of modules.

33. The computer program product as recited in claim 32, wherein the plurality of modules includes universal modules.

34. The computer program product as recited in claim 32, wherein the plurality of modules includes at least one of a framing module, an alternatives module, an analysis module, and a connection module.

35. The computer program product as recited in claim 32, wherein the plurality of modules includes a framing module.

36. The computer program product as recited in claim 32, wherein the plurality of modules includes an alternatives module.

37. The computer program product as recited in claim 32, wherein the plurality of modules includes an analysis module.

38. The computer program product as recited in claim 32, wherein the plurality of modules includes a connection module.

39. The computer program product as recited in claim 32, wherein the plurality of modules includes a framing module, an alternatives module, an analysis module, and a connection module.

40. The computer program product as recited in claim 6, wherein the logic is implemented utilizing software components including a software component that is capable of being used to initialize the process.

41. The computer program product as recited in claim 6, wherein the logic is implemented utilizing software components including a software component that is capable of being used to develop decision related alternatives in the process.

42. The computer program product as recited in claim 6, wherein the logic is implemented utilizing software components including a software component that is capable of being used to analyze alternatives in the process.

43. The computer program product as recited in claim 6, wherein the logic is implemented utilizing software components including a software component that is capable of being used to process decision-related alternatives to develop a solution.

44. The computer program product as recited in claim 6, wherein the logic is implemented utilizing software components including:
 a first software component that is capable of being used to initialize the process,
 a second software component that is capable of being used to develop decision-related alternatives in the process,
 a third software component that is capable of being used to analyze the decision-related alternatives in the process, and
 a fourth software component that is capable of being used to process the decision-related alternatives to develop a solution.

45. The computer program product as recited in claim 6, wherein the logic is implemented with hardware.

46. The computer program product as recited in claim 6, wherein the logic is implemented with software.

47. The computer program product as recited in claim 6, wherein at least a portion of the computer code is carried out using modules capable of interfacing with different applications adapted for applying the universal modules differently.

48. The computer program product as recited in claim 6, wherein the process is performed in real-time.

49. The computer program product as recited in claim 6, wherein input associated with the first information is received via a network.

50. The computer program product as recited in claim 49, wherein the network is the Internet.

51. The computer program product as recited in claim 6, wherein the second information is received via a network.

52. The computer program product as recited in claim 6, wherein the logic is industry-independent.

53. The computer program product as recited in claim 6, wherein the logic is performed by a collaborative decision platform.

54. The computer program product as recited in claim 6, wherein at least a portion of the computer program product is implemented using modules capable of interfacing with different applications adapted for applying the modules to different sectors.

55. The computer program product as recited in claim 54, wherein the sectors include different business sectors that include at least one of a real estate-related business sector, medical-related business sector, corporate-related business sector, or financial-related business sector.

56. The computer program product as recited in claim 54, wherein an interface protocol is utilized to interface the different applications with the modules.

57. The computer program product as recited in claim 56, wherein the interface protocol includes a standard interface protocol.

58. The computer program product as recited in claim 6, wherein the process relates to a determination as to which of the products or services is suitable for the receiving entity.

59. The computer program product as recited in claim 6, wherein the products or services include products.

60. The computer program product as recited in claim 59, wherein the products include non-existent products.

61. The computer program product as recited in claim 59, wherein the products include existent products.

62. The computer program product as recited in claim 6, wherein the products or services include services.

63. The computer program product as recited in claim 6, wherein the first information regarding the one or more attributes is entered by the receiving entity.

64. The computer program product as recited in claim 6, further comprising computer code for providing at least one first interface that allows the user to form at least one boundary condition associated with the decision-making.

65. The computer program product as recited in claim 64, wherein the at least one first interface that allows the user to form at least one boundary condition associated with the decision-making allows the user to form a plurality of boundary conditions.

66. The computer program product as recited in claim 6, further comprising computer code for providing at least one first interface that allows the user to input at least one tactic associated with the decision-making.

67. The computer program product as recited in claim 6, further comprising computer code for providing at least one first interface that allows the user to input at least one policy associated with the decision-making.

68. The computer program product as recited in claim 67, wherein the at least one first interface allows the user to enter at least one decision relating to the process.

69. The computer program product as recited in claim 67, wherein the at least one first interface allows the user to enter at least one decision relating to the process.

70. The computer program product as recited in claim 67, wherein the at least one first interface allows the user to enter at least one tactic relating to the process.

71. The computer program product as recited in claim 6, further comprising computer code for providing at least one first interface that allows the user to form at least one boundary condition associated with the decision-making utilizing a menu.

72. The computer program product as recited in claim 64, further comprising computer code for providing at least one additional first interface that allows the user to form at least one additional boundary condition associated with the decision-making.

73. The computer program product as recited in claim 6, further comprising computer code for providing at least one first interface that allows the user to input important values associated with the decision-making.

74. The computer program product as recited in claim 73, further comprising computer code for providing at least one additional first interface that allows the user to input additional important values associated with the decision-making.

75. The computer program product as recited in claim 74, wherein the computer program product is operable such that the at least one first interface and the at least one additional first interface work in parallel in connection with at least one common display.

76. The computer program product as recited in claim 74, wherein the computer program product is operable such that the important values and the additional important values are capable of being modified.

77. The computer program product as recited in claim 6, further comprising computer code for providing at least one first interface that allows the user to form at least one boundary condition associated with the decision-making, and allows the user to provide input associated with important aspects associated with the decision-making.

78. The computer program product as recited in claim 77, wherein the computer program product is operable such that the at least one boundary condition and the important aspects are capable of being modified.

79. The computer program product as recited in claim 77, wherein the at least one first interface is an element of a framing interface.

80. The computer program product as recited in claim 77, further comprising computer code for providing at least one additional first interface a content of which is a function of input provided using the at least one first interface.

81. The computer program product as recited in claim 77, further comprising computer code for providing at least one additional first interface that allows the user to form at least one additional boundary condition associated with the decision-making, and allows the user to provide input associated with additional important aspects associated with the decision-making.

82. The computer program product as recited in claim 77, further comprising computer code for providing at least one second interface that displays a plurality of alternatives.

83. The computer program product as recited in claim 82, wherein the alternatives include alternate choices.

84. The computer program product as recited in claim 83, wherein the alternatives are displayed in a table.

85. The computer program product as recited in claim 84, wherein at least one aspect of input received from the user via the least one first interface drives a column heading in the table with the alternatives for the column heading arranged therebeneath.

86. The computer program product as recited in claim 83, further comprising computer code for confirming at least one of the alternatives.

87. The computer program product as recited in claim 83, further comprising computer code for modifying the alternatives.

88. The computer program product as recited in claim 83, further comprising computer code for providing at least one additional second interface that displays the plurality of alternatives, as modified by user input.

89. The computer program product as recited in claim 83, further comprising computer code for providing at least one additional second interface a content of which is a function of input provided using the at least one second interface.

90. The computer program product as recited in claim 83, further comprising computer code for providing at least one third interface that displays sources of value in each of the alternatives.

91. The computer program product as recited in claim 83, further comprising computer code for providing at least one third interface that allows the user to modify input information.

92. The computer program product as recited in claim 90, wherein the at least one third interface is an element of an analysis interface.

93. The computer program product as recited in claim 90, wherein the at least one third interface allows the user to modify a range of data.

94. The computer program product as recited in claim 90, further comprising computer code for providing at least one additional third interface that provides a decision sensitivity display.

95. The computer program product as recited in claim 90, further comprising computer code for providing at least one additional third interface a content of which is a function of input provided using the at least one third interface.

96. The computer program product as recited in claim 6, further comprising computer code for receiving third information that includes public information.

97. The computer program product as recited in claim 96, wherein the computer program product is operable such that the third information is received from a source separate from the receiving entity and the supplying business.

98. The computer program product as recited in claim 96, wherein the computer program product is operable such that the third information is utilized as a function of user input.

99. The computer program product as recited in claim 96, wherein the computer program product is operable such that the third information is received from the receiving entity.

100. The computer program product as recited in claim 96, wherein the third information relates to the one or more products or services.

101. The computer program product as recited in claim 96, wherein the third information relates to a value of at least one aspect of the one or more products or services.

102. The computer program product as recited in claim 101, wherein the at least one aspect of the one or more products or services includes the one or more attributes.

103. The computer program product as recited in claim 96, wherein the third information relates to the one or more attributes.

104. The computer program product as recited in claim 96, wherein the third information relates to a value of the one or more attributes.

105. The computer program product as recited in claim 96, wherein the computer program product is operable such that the third information measures the retrospective value creation for customers of the supplying business.

106. The computer program product as recited in claim 96, wherein the computer program product is operable such that the third information is utilized in association with a collaborative decision platform.

107. The computer program product as recited in claim 97, further comprising computer code for allowing the receiving entity to provide insight in association with the source.

108. The computer program product as recited in claim 97, further comprising computer code for allowing the receiving entity to provide insight in association with the source, in order to reduce risk associated with the decision-making.

109. The computer program product as recited in claim 97, further comprising computer code for allowing the receiving entity to effect a modification in association with the third information of the source.

110. The computer program product as recited in claim 97, further comprising computer code for allowing the receiving entity to provide a confirmation in association with the source.

111. The computer program product as recited in claim 97, further comprising computer code for allowing the user to provide insight in association with the source.

112. The computer program product as recited in claim 97, further comprising computer code for allowing the user to provide insight in association with the source, in order to reduce risk associated with the decision-making.

113. The computer program product as recited in claim 97, further comprising computer code for allowing the user to modify the third information of the source.

114. The computer program product as recited in claim 97, further comprising computer code for allowing the user to provide a confirmation in association with the source.

115. The computer program product as recited in claim 97, further comprising computer code for providing source information that specifies the source.

116. The computer program product as recited in claim 115, wherein the source information includes a directory.

117. The computer program product as recited in claim 115, wherein the source information includes at least one person's name.

118. The computer program product as recited in claim 115, wherein the source information specifies a plurality of sources of the third information.

119. The computer program product as recited in claim 6, wherein the at least one application is the corporate-related application.

120. The computer program product as recited in claim 6, wherein the at least one application is the product supply-related application.

121. The computer program product as recited in claim 6, wherein the at least one application is the service supply-related application.

122. The computer program product as recited in claim 6, wherein the at least one application is the financial-related application.

123. The computer program product as recited in claim 6, wherein the at least one application is the real estate-related application.

124. The computer program product as recited in claim 6, wherein the computer program product is operable such that real-time collaborative decision-making is provided between the receiving entity and the supplying business.

125. The computer program product as recited in claim 6, wherein the computer program product is operable such that alternatives of the supplying business are provided in terms of an associated effect on the first information.

126. The computer program product as recited in claim 6, and further comprising computer code for assessing uncertainties for analysis purposes.

127. The computer program product as recited in claim 6, wherein the at least one application is the product supply-related application and the product supply-related application relates to marketing at least one product.

128. The computer program product as recited in claim 6, wherein the at least one application is the service supply-related application and the service supply-related application relates to marketing at least one service.

129. The computer program product as recited in claim 6, wherein the at least one application is the corporate-related application and the corporate-related application relates to marketing.

130. The computer program product as recited in claim 6, wherein the process is related to a business-to-business transaction.

131. The computer program product as recited in claim 6, wherein the computer code for receiving the first information, receiving the second information, and causing execution of the process are executed using the system.

132. The computer program product as recited in claim 6, wherein the second information includes information relating to controllables.

133. The computer program product as recited in claim 6, wherein the second information includes information relating to uncertainties.

134. The computer program product as recited in claim 133, wherein the uncertainties include independent uncertainties.

135. The computer program product as recited in claim 133, wherein the uncertainties include uncertainties dependent on decisions.

136. The computer program product as recited in claim 133, wherein the uncertainties include at least one of a product sales volume change, a margin change, a cost change, or a margin change.

137. The computer program product as recited in claim 133, wherein the uncertainties include at least two of a product sales volume change, a margin change, a cost change, and a margin change.

138. The computer program product as recited in claim 133, wherein the uncertainties include at least three of a product sales volume change, a margin change, a cost change, and a margin change.

139. The computer program product as recited in claim 6, wherein the second information includes information relating to information sources.

140. The computer program product as recited in claim 6, wherein the second information includes information relating to decision alternatives.

141. The computer program product as recited in claim 6, wherein the second information includes information relating to sources of value.

142. The computer program product as recited in claim 6, wherein the computer program product utilizes a structural relationship of decisions.

143. The computer program product as recited in claim 6, wherein the computer program product utilizes input from a spreadsheet.

144. The computer program product as recited in claim 6, wherein the computer program product utilizes at least one equation relating to at least one decision.

145. The computer program product as recited in claim 6, wherein the computer program product utilizes a plurality of equations relating to a plurality of decisions.

146. The computer program product as recited in claim 6, wherein the computer program product utilizes structural relationship of decisions, values, and uncertainties.

147. The computer program product as recited in claim 6, wherein the computer program product is capable of supporting an asynchronous decision-making process.

148. The computer program product as recited in claim 6, wherein the computer program product utilizes policies that form boundary conditions for a decision.

149. The computer program product as recited in claim 6, wherein the computer program product utilizes values that are important to a decision and uncertainties that potentially impact the values.

150. The computer program product as recited in claim 6, wherein the storage includes a database.

151. The computer program product as recited in claim 150, wherein the database includes at least one decision-relevant database.

152. The computer program product as recited in claim 150, wherein the database is one of a plurality of databases that are included.

153. The computer program product as recited in claim 152, wherein the plurality of databases are coupled via at least one network.

154. The computer program product as recited in claim 6, wherein the system includes a decision platform.

155. The computer program product as recited in claim 154, wherein the decision platform includes a platform that supports decision-making.

156. The computer program product as recited in claim 6, wherein the system includes the application.

157. The computer program product as recited in claim 6, wherein the products or services include products.

158. The computer program product as recited in claim 6, wherein the process includes an asynchronous remote decision-making process.

159. The computer program product as recited in claim 6, wherein the one or more attributes includes a plurality of the attributes, and the computer program product further comprising:
    computer code for providing at least one first interface that allows the receiving entity to enter a boundary condition associated with the decision-making, wherein the boundary condition is capable of being modified and involves price;
    computer code for providing at least one additional first interface that allows the user to provide input indicative of aspects associated with the decision-making, wherein the aspects are capable of being modified;
    computer code for providing at least one second interface that displays a plurality of alternatives that include alternate choices, based, at least in part, on the boundary condition and the aspects;
    computer code for providing at least one additional second interface that displays the plurality of alternatives, as modified by user input;
    computer code for providing at least one third interface that displays relative value associated with each of the alternatives, and allows the user to make modifications; and
    computer code for receiving third information that includes public information, wherein the third information is received from a source separate from the receiving entity and the supplying business, and relates to a value of at least one aspect of the one or more products or services, for identifying a retrospective value creation for a plurality of customers, wherein the computer program product is operable such that the process that is related to decision-making is capable of being executed based on the first information, the second information, and the third information, such that the at least one third interface includes content that is a function of the first information, the second information, and the third information.

160. The computer program product as recited in claim 6, wherein the one or more attributes includes a plurality of the attributes, and the computer program product further comprising:
    computer code for providing at least one first interface that is adapted to receive input indicative of at least one price associated with the decision-making, wherein the at least one price is capable of being modified;
    computer code for providing at least one additional first interface that allows the user to input aspects associated with the decision-making, wherein the aspects are capable of being modified; and
    computer code for providing at least one second interface that displays a plurality of alternatives that include alternate choices, based, at least in part, on the at least one price and the aspects.

161. The computer program product as recited in claim 160, further comprising computer code for providing at least one third interface that displays value associated with each of the alternatives, and allows the user to make modifications.

162. The computer program product as recited in claim 160, further comprising computer code for receiving third information that includes public information, wherein the third information is received from a source separate from the receiving entity and the supplying business, and relates to a value of at least one aspect of the one or more products or services.

163. The computer program product as recited in claim 162, wherein the computer program product is operable such that the process that is related to decision-making is capable of being executed based on the first information, the second information, and the third information.

164. The computer program product as recited in claim 160, further comprising computer code for providing an ability to allow different people input data into a set of displays at different times, and from different places, in order to support the decision-making.

165. The computer program product as recited in claim 160, wherein the at least one first interface, the at least one additional first interface, and the at least one second interface, include web pages.

166. The computer program product as recited in claim 165, wherein at least one of the web pages includes a dynamic web page.

167. The computer program product as recited in claim 160, wherein the at least one first interface, the at least one additional first interface, and the at least one second interface, each is an interface object.

168. The computer program product as recited in claim 160, wherein the at least one first interface, the at least one additional first interface, and the at least one second interface, each is an interface element.

169. The computer program product as recited in claim 165, wherein at least one of the web pages includes a video.

170. The computer program product as recited in claim 162, wherein the third information is received from the receiving entity.

171. The computer program product as recited in claim 162, wherein the third information relates to at least one aspect of the one or more products or services.

172. The computer program product as recited in claim 171, wherein the at least one aspect of the one or more products or services includes the one or more attributes.

173. The computer program product as recited in claim 162, wherein the third information relates to the one or more attributes.

174. The computer program product as recited in claim 162, wherein the third information relates to a value of the one or more attributes.

175. The computer program product as recited in claim 162, wherein the third information measures the retrospective value creation for customers of the supplying business.

176. The computer program product as recited in claim 162, wherein the computer program product is operable such that the third information is utilized in association with a collaborative decision platform.

177. The computer program product as recited in claim 160, wherein the computer program product is operable such that the alternatives are displayed in a table.

178. The computer program product as recited in claim 177, wherein at least one aspect of input from the user via the least one first interface drives a column heading in the table with the alternatives for the column heading arranged thereneath.

179. The computer program product as recited in claim 160, further comprising computer code for modifying the alternatives.

180. The computer program product as recited in claim 160, further comprising computer code for selecting the alternatives.

181. The computer program product as recited in claim 180, wherein the alternatives includes choices.

182. The computer program product as recited in claim 161, wherein the at least one third interface is element of an analysis interface.

183. The computer program product as recited in claim 161, wherein the at least one third interface allows the user to modify a range of data.

184. The computer program product as recited in claim 161, further comprising computer code for providing at least one additional third interface that provides a decision sensitivity display.

185. The computer program product as recited in claim 161, further comprising computer code for providing at least one fourth interface that provides a potential feasible hybrid theme.

186. The computer program product as recited in claim 161, further comprising computer code for providing at least one additional third interface the content of which is a function of input provided using the at least one third interface.

187. The computer program product as recited in claim 160, wherein the at least one first interface allows the user to form a plurality of boundary conditions.

188. The computer program product as recited in claim 160, wherein the at least one first interface and the at least one additional first interface are elements of a framing interface.

189. The computer program product as recited in claim 160, wherein the alternatives are displayed in a table.

190. The computer program product as recited in claim 160, wherein the computer program product is operable such that animated icons are provided via the user interface.

191. The computer program product as recited in claim 160, further comprising computer for negotiating a delivery agreement.

192. The computer program product as recited in claim 6, wherein the one or more attributes includes an administrative cost.

193. The computer program product as recited in claim 6, wherein the computer program product is operable such that dynamic web pages are provided via the user interface.

194. The computer program product as recited in claim 160, further comprising computer code for hierarchical expansion of the plurality of the attributes.

195. The computer program product as recited in claim 160, wherein the input is received by allowing the user to input the at least one price.

196. The computer program product as recited in claim 160, wherein the at least one price includes a range of prices.

197. The computer program product as recited in claim 160, wherein the logic is associated with a plurality of modules.

198. The computer program product as recited in claim 197, wherein the plurality of modules include universal modules.

199. The computer program product as recited in claim 197, wherein the plurality of modules include at least one of a framing module, an alternatives module, an analysis module, and a connection module.

200. The computer program product as recited in claim 197, wherein the plurality of modules include a framing module.

201. The computer program product as recited in claim 197, wherein the plurality of modules include an alternatives module.

202. The computer program product as recited in claim 197, wherein the plurality of modules include an analysis module.

203. The computer program product as recited in claim 197, wherein the plurality of modules include a framing module, an alternatives module, an analysis module, and a connection module.

204. The computer program product as recited in claim 6, wherein the one or more attributes includes a plurality of the attributes, and the computer program product further comprising:
   computer code for providing at least one first interface that allows the receiving entity to enter a boundary condition associated with the decision-making, wherein the boundary condition is capable of being modified and involves price;
   computer code for providing at least one additional first interface that allows the user to provide input indicative of aspects associated with the decision-making, wherein the aspects are capable of being modified;
   computer code for providing at least one second interface that displays a plurality of alternatives that include alternate choices, based, at least in part, on the boundary condition and the aspects;
   computer code for providing at least one additional second interface that displays the plurality of alternatives, as modified by user input;
   computer code for providing at least one third interface that displays relative value associated with each of the alternatives, and allows the user to make modifications; and
   computer code for receiving third information that includes public information, wherein the third information is received from a source separate from the receiving entity and the supplying business, and relates to a value of at least one aspect of the one or more products or services, for identifying a retrospective value creation for a plurality of customers, wherein the computer program product is operable such that the process that is related to decision-making is capable of being executed based on the first information, the second information, and the third information, such that the at least one third interface includes content that is a function of the first information, the second information, and the third information;
   wherein the computer program product is operable to provide an ability to allow different people input data into a set of displays at different times, and from different places, in order to support the decision-making;
   wherein the at least one first interface, the at least one additional first interface, the at least one second interface, the at least one additional second interface, and the at least one third interface, each includes at least one web page; and
   wherein the at least one additional first interface includes content which is a function of input provided using the at least one first interface; and the at least one additional second interface includes content which is a function of input provided using the at least one second interface.

205. The computer program product as recited in claim 6, wherein the one or more attributes includes a plurality of the attributes, and the computer program product further comprising:
   computer code for providing at least one first interface that allows the receiving entity to indicate at least one price associated with the decision-making, wherein the at least one price is capable of being modified;
   computer code for providing at least one additional first interface that allows the user to input aspects associated with the decision-making, wherein the aspects are capable of being modified;
   computer code for providing at least one second interface that displays a plurality of alternatives that include alternate choices, based, at least in part, on the at least one price and the aspects;
   computer code for providing at least one additional second interface that displays the plurality of alternatives, as modified by user input;
   computer code for providing at least one third interface that displays value associated with each of the alternatives, and allows the user to make modifications; and
   computer code for receiving third information that includes public information, wherein the third information is received from a source separate from the receiving entity and the supplying business, and relates to a value of at least one aspect of the one or more products or services and measures a retrospective value creation for a plurality of customers, wherein the computer program product is operable such that the process that is related to decision-making is capable of being executed based on the first information, the second information, and the third information;
   wherein the computer program product is operable to provide an ability to allow different people input data into at least one display at different times, and from different places, in order to support the decision-making; and
   wherein the at least one first interface, the at least one additional first interface, the at least one second interface, and the at least one additional second interface each includes web pages.

206. The computer program product as recited in claim 205, wherein the computer program product is operable such that the third information is received from the receiving entity.

207. The computer program product as recited in claim 205, wherein the at least one aspect of the one or more products or services includes the one or more attributes.

208. The computer program product as recited in claim 205, wherein the third information relates to the one or more attributes.

209. The computer program product as recited in claim 205, wherein the third information relates to a value of the one or more attributes.

210. The computer program product as recited in claim 205, wherein the computer program product is operable such that the at least one third interface includes content that is a function of the first information, the second information, and the third information.

211. The computer program product as recited in claim 205, wherein the computer program product is operable such that the third information is utilized in association with a collaborative decision platform.

212. The computer program product as recited in claim 211, wherein the collaborative decision platform includes a plurality of modules including a framing module, an alternatives module, an analysis module, and a connection module.

213. The computer program product as recited in claim 205, wherein the computer program product is operable such that the alternatives are displayed in a table.

214. The computer program product as recited in claim 213, wherein the computer program product is operable such that at least one aspect of input from the user via the least one first interface drives a column heading in the table with the alternatives for the column heading arranged therebeneath.

215. The computer program product as recited in claim 205, further comprising computer code for modifying the alternatives.

216. The computer program product as recited in claim 205, further comprising computer code for selecting the alternatives.

217. The computer program product as recited in claim 205, wherein the at least one third interface is an element of an analysis interface.

218. The computer program product as recited in claim 205, wherein the computer program product is operable such that the at least one third interface allows the user to modify a range of data.

219. The computer program product as recited in claim 205, further comprising computer code for providing at least one additional third interface that provides a decision sensitivity display.

220. The computer program product as recited in claim 219, wherein the decision sensitivity display includes a decision sensitivity table.

221. The computer program product as recited in claim 219, wherein the decision sensitivity display includes a decision sensitivity chart.

222. The computer program product as recited in claim 219, wherein the computer program product is operable such that the decision sensitivity display shows at least one value associated with a first choice and at least one value associated with a second choice.

223. The computer program product as recited in claim 219, wherein the computer program product is operable such that the decision sensitivity display compares at least one value associated with a choice.

224. The computer program product as recited in claim 219, wherein the computer program product is operable such that the decision sensitivity display identifies sources of value.

225. The computer program product as recited in claim 219, wherein the computer program product is operable such that the decision sensitivity display identifies sources of value for each of a plurality of choices.

226. The computer program product as recited in claim 219, wherein the computer program product is operable such that the decision sensitivity display identifies at least one aspect associated with at least one choice.

227. The computer program product as recited in claim 226, wherein the at least one aspect is associated with value.

228. The computer program product as recited in claim 226, wherein the at least one choice is pre-defined.

229. The computer program product as recited in claim 226, wherein the at least one choice is user-defined.

230. The computer program product as recited in claim 226, wherein the computer program product is operable such that the at least one choice is capable of being provided a choice name.

231. The computer program product as recited in claim 226, wherein the computer program product is operable such that the at least one choice is capable of being defined by a plurality of selections.

232. The computer program product as recited in claim 226, wherein the computer program product is operable such that the at least one choice is capable of being defined by an amount of a purchase.

233. The computer program product as recited in claim 226, wherein the computer program product is operable such that the at least one choice is capable of being defined by a selection of a plurality of alternatives.

234. The computer program product as recited in claim 233, wherein the computer program product is operable such that the at least one choice is capable of being modified.

235. The computer program product as recited in claim 205, and further comprising computer code for providing at least one fourth interface that provides a potential feasible hybrid theme.

236. The computer program product as recited in claim 235, wherein the potential feasible hybrid theme includes a hybrid strategy.

237. The computer program product as recited in claim 236, wherein the computer program product is operable such that the hybrid strategy combines a plurality of alternative choices.

238. The computer program product as recited in claim 237, wherein at least one of the plurality alternative choices is pre-defined.

239. The computer program product as recited in claim 235, wherein the potential feasible hybrid theme is associated with at least one choice.

240. The computer program product as recited in claim 239, wherein the at least one choice is pre-defined.

241. The computer program product as recited in claim 239, wherein the at least one choice is user-defined.

242. The computer program product as recited in claim 241, wherein the computer program product is operable such that the at least one choice is capable of being provided a name.

243. The computer program product as recited in claim 241, wherein the computer program product is operable such that the at least one choice is capable of being defined by a selection of a plurality of alternatives.

244. The computer program product as recited in claim 241, wherein the computer program product is operable such that the at least one choice is capable of being modified.

245. A computer program product embodied on a tangible computer readable medium, comprising:
    computer code for facilitating decision-making, the computer code for facilitating associated with an application which is a real estate-related application, a medical-related application, a corporate-related application, a product supply-related application, a service supply-related application, or a financial-related application;
    computer code for retrieving first information from a memory;
    computer code for receiving second information from a user interface; and
    computer code for causing generation of at least one display based on the first information and the second information, the display facilitating the decision-making by including a decision sensitivity display embedded in a web page constructed utilizing a hypertext markup language;
    wherein the application is capable of being executed using a system capable of: (i) retrieving stored information; (ii) receiving user information; and (iii) processing the stored information and the user information for generating output of the processing; where one or more of (i)-(iii) is carried out utilizing, at least in part, one or more modules that is capable of being used to apply the one or more of (i)-(iii) differently.

246. The computer program product as recited in claim 205, further comprising computer code for providing at least one additional third interface content of which is a function of input provided using the at least one third interface.

247. The computer program product as recited in claim 205, wherein the computer program product is operable such that the at least one first interface allows the user to form a plurality of boundary conditions.

248. The computer program product as recited in claim 205, wherein the at least one first interface and the at least one additional first interface are elements of a framing interface.

249. The computer program product as recited in claim 205, wherein the computer program product is operable such that the alternatives are displayed in a table.

250. The computer program product as recited in claim 205, further comprising computer code for negotiating a delivery agreement.

251. The computer program product as recited in claim 205, wherein the computer program product is operable such that dynamic web pages are provided via the user interface.

252. The computer program product as recited in claim 205, further comprising computer code for hierarchical expansion of the plurality of the attributes.

253. The computer program product as recited in claim 6, wherein the system includes software.

254. The computer program product as recited in claim 6, wherein the system includes hardware.

255. The computer program product as recited in claim 6, wherein the receiving entity includes a business entity.

256. The computer program product as recited in claim 6, wherein the process that is related to decision-making includes a process that supports decision-making.

257. The computer program product as recited in claim 6, wherein the computer program product is operable such that the second information regarding one or more products or services is received in association with a single supplying business.

258. The computer program product as recited in claim 6, wherein the computer program product is operable such that the second information regarding one or more products or services is received from a plurality of supplying businesses.

259. The computer program product as recited in claim 258, wherein the computer program product is operable such that the first information and the second information are received at and processed by an intermediate entity that is separate from the supplying businesses and the receiving entity.

260. The computer program product as recited in claim 6, wherein the computer program product is operable such that real-time decision-making is supported.

261. The computer program product as recited in claim 6, wherein the computer program product is capable of delivering presentation information to the user in accordance with the logic utilizing the user interface.

262. The computer program product as recited in claim 6, wherein the process relates to customer relationship management.

263. The computer program product as recited in claim 6, and further comprising computer code for negotiating a purchase agreement.

264. The computer program product as recited in claim 6, and further comprising computer code for negotiating a delivery agreement.

265. The computer program product as recited in claim 6, wherein the first information is received from the receiving entity.

266. The computer program product as recited in claim 6, wherein at least a portion of the computer program product includes a plurality of objects associated with an object-oriented programming language.

267. The computer program product as recited in claim 266, wherein the objects include at least one object that is capable of being used to initialize the process.

268. The computer program product as recited in claim 266, wherein the at least one of the plurality of objects is capable of providing a framing functionality.

269. The computer program product as recited in claim 266, wherein the objects include at least one object that is capable of being used to develop decision related alternatives in the process.

270. The computer program product as recited in claim 266, wherein the at least one of the plurality of objects is capable of providing an alternatives functionality.

271. The computer program product as recited in claim 266, wherein the objects include at least one object that is capable of being used to analyze alternatives in the process.

272. The computer program product as recited in claim 266, wherein the at least one of the plurality of objects is capable of providing an analysis functionality.

273. The computer program product as recited in claim 266, wherein the objects include at least one object that is capable of being used to process decision-related alternatives to develop a solution.

274. The computer program product as recited in claim 266, wherein the at least one of the plurality of objects is capable of providing a connection functionality.

275. The computer program product as recited in claim 266, wherein the objects include:
a first object that is capable of being used to initialize the process,
a second object that is capable of being used to develop decision-related alternatives in the process,
a third object that is capable of being used to analyze the decision-related alternatives in the process, and
a fourth object that is capable of being used to process the decision-related alternatives to develop a solution.

276. The computer program product as recited in claim 266, wherein the objects communicate utilizing encapsulation that enforces data abstraction.

277. The computer program product as recited in claim 266, wherein the objects are implemented utilizing class libraries.

278. The computer program product as recited in claim 277, wherein the class libraries are capable of being utilized for generating the user interface.

279. The computer program product as recited in claim 266, wherein the objects are implemented utilizing subclassing and inheritance to extend or modify objects by deriving additional objects from classes.

280. A computer program product embodied on a tangible computer readable medium, comprising:
collaborative decision computer code for decision-making, the collaborative decision computer code for decision-making including an application which is a real estate-related application, a medical-related application, a corporate-related application, a product supply-related application, a service supply-related application, or a financial-related application;
computer code for retrieving first information from a memory;
computer code for receiving second information from a user interface;
computer code for generating at least one display based on a computation involving the first information and the second information, the display facilitating the decision-making by being capable of viewing utilizing a web browser and including at least one of a tornado diagram, a decision sensitivity display or a decision hierarchy display; and wherein the computer program product includes computer code having a plurality of objects associated with an object-oriented programming language.

281. The computer program product as recited in claim 280, wherein the decision-making involves a policy, and the decision sensitivity display shows an impact of at least one of a plurality of variables on results of the policy.

282. The computer program product as recited in claim 280, wherein the objects include at least one object that is capable of being used to initialize the computation.

283. The computer program product as recited in claim 280, wherein the at least one of the plurality of objects is capable of providing a framing functionality.

284. The computer program product as recited in claim 280, wherein the objects include at least one object that is capable of being used to develop decision related alternatives.

285. The computer program product as recited in claim 280, wherein the at least one of the plurality of objects is capable of providing an alternatives functionality.

286. The computer program product as recited in claim 280, wherein the objects include at least one object that is capable of being used to analyze alternatives.

287. The computer program product as recited in claim 280, wherein the at least one of the plurality of objects is capable of providing an analysis functionality.

288. The computer program product as recited in claim 280, wherein the objects include:
a first object that is capable of being used to develop decision-related alternatives,
a second object that is capable of being used to analyze the decision-related alternatives, and
a third object that is capable of being used to process the decision-related alternatives to develop a solution.

289. The computer program product as recited in claim 280, wherein the objects communicate utilizing encapsulation that enforces data abstraction.

290. The computer program product as recited in claim 280, wherein the objects are implemented utilizing class libraries.

291. The computer program product as recited in claim 290, wherein the class libraries are capable of being utilized for generating the display.

292. The computer program product as recited in claim 280, wherein the objects are implemented utilizing subclassing and inheritance to extend or modify objects by deriving additional objects from classes.

293. The computer program product as recited in claim 280, wherein the at least one display is implemented utilizing at least one dynamic web page.

294. The computer program product as recited in claim 280, wherein the decision-making is performed in real-time.

295. The computer program product as recited in claim 280, wherein the decision-making includes real-time decision-making.

296. The computer program product as recited in claim 280, wherein the application is capable of being executed using a collaborative decision-making platform capable of: (i) retrieving stored information; (ii) receiving user information; and (iii) processing the stored information and the user information for generating output of the processing; where one or more of (i)-(iii) is carried out utilizing, at least in part, one or more modules capable of applying the one or more of (i)-(iii) differently.

297. The computer program product as recited in claim 280, wherein the decision-making is facilitated utilizing a platform capable of supporting collaborative decision-making, and the display facilitates the collaborative decision-making by including the decision sensitivity display.

298. The computer program product as recited in claim 297, wherein the platform is web-enabled.

299. The computer program product as recited in claim 298, wherein the network is model-driven.

300. The computer program product as recited in claim 297, wherein the computer program product is industry-independent.

301. The computer program product as recited in claim 297, wherein the decision-making relates to which products or services are suitable for an entity.

302. The computer program product as recited in claim 297, wherein the decision-making relates to customer relationship management.

303. The computer program product as recited in claim 302, wherein the customer includes a business.

304. The computer program product as recited in claim 297, further comprising computer code for identifying a strategy.

305. The computer program product as recited in claim 297, further comprising computer code for assessing uncertainties for analysis purposes.

306. The computer program product as recited in claim 280, wherein the decision-making is facilitated utilizing platform means for supporting the decision-making in a collaborative manner.

307. The computer program product as recited in claim 280, wherein the decision-making is facilitated utilizing means for collaborative decision-making.

308. The computer program product as recited in claim 280, wherein the decision-making is facilitated utilizing a platform including module means for supporting collaborative decision-making.

309. The computer program product as recited in claim 280, wherein the decision-making is facilitated utilizing a collaborative platform including at least one module for supporting the decision-making in a manner that is, at least in part, universal when applied for different purposes.

310. The computer program product as recited in claim 280, wherein the decision-making includes collaborative decision-making that is facilitated utilizing a platform including at least one module for supporting the decision-making in a manner that is, at least in part, universal when applied differently by the platform.

311. The computer program product as recited in claim 297, wherein the decision sensitivity display shows at least one value associated with a first strategy and at least one value associated with a second strategy.

312. The computer program product as recited in claim 297, wherein the decision sensitivity display compares at least one value associated with a strategy.

313. The computer program product as recited in claim 297, wherein the decision sensitivity display identifies sources of value.

314. The computer program product as recited in claim 297, wherein the decision sensitivity display identifies sources of value for each of a plurality of strategies.

315. The computer program product as recited in claim 297, wherein the decision sensitivity display identifies at least one aspect associated with at least one strategy.

316. The computer program product as recited in claim 315, wherein the at least one aspect is associated with value.

317. The computer program product as recited in claim 315, wherein the at least one strategy is pre-defined.

318. The computer program product as recited in claim 315, wherein the at least one strategy is user-defined.

319. The computer program product as recited in claim 318, wherein the at least one strategy is capable of being provided a strategy name.

320. The computer program product as recited in claim 318, wherein the at least one strategy is capable of being defined by a plurality of selections.

321. The computer program product as recited in claim 318, wherein the at least one strategy is capable of being defined by an amount of stock purchase.

322. The computer program product as recited in claim 318, wherein the at least one strategy is capable of being defined by a selection of a plurality of alternatives.

323. The computer program product as recited in claim 318, wherein the at least one strategy is capable of being modified.

324. The computer program product as recited in claim 323, wherein a range associated with the at least one strategy is capable of being modified.

325. The computer program product as recited in claim 315, wherein the at least one strategy is a stock purchase strategy.

326. The computer program product as recited in claim 297, wherein the decision sensitivity display identifies at least one aspect associated with a plurality of strategies.

327. The computer program product as recited in claim 297, wherein the application is the financial-related application.

328. The computer program product as recited in claim 327, further comprising code for displaying a stock ticker.

329. The computer program product as recited in claim 297, wherein the decision sensitivity display shows at least one profit-related value associated with a first strategy and at least one profit-related value associated with a second strategy.

330. The computer program product as recited in claim 280, wherein the decision-making is facilitated utilizing a platform capable of supporting collaborative decision-making, and the display facilitates the collaborative decision-making by including the decision hierarchy display.

331. The computer program product as recited in claim 330, wherein the decision hierarchy display identifies decisions that are within a scope of a decision making process.

332. The computer program product as recited in claim 330, wherein the decision hierarchy display identifies at least one decision associated with at least one strategy.

333. The computer program product as recited in claim 332, wherein the at least one strategy is pre-defined.

334. The computer program product as recited in claim 332, wherein the at least one strategy is user-defined.

335. The computer program product as recited in claim 334, wherein the at least one strategy is capable of being provided a strategy name.

336. The computer program product as recited in claim 334, wherein the at least one strategy is capable of being defined by a plurality of selections.

337. The computer program product as recited in claim 334, wherein the at least one strategy is capable of being defined by an amount of stock purchase.

338. The computer program product as recited in claim 334, wherein the at least one strategy is capable of being defined by a selection of a plurality of alternatives.

339. The computer program product as recited in claim 334, wherein the at least one strategy is capable of being modified.

340. The computer program product as recited in claim 339, wherein a range associated with the at least one strategy is capable of being modified.

341. The computer program product as recited in claim 332, wherein the at least one strategy is a stock purchase strategy.

342. The computer program product as recited in claim 330, wherein the decision hierarchy display includes at least one of policies, decisions, or tactics.

343. The computer program product as recited in claim 330, wherein the decision hierarchy display includes at least two of: policies, decisions, and tactics.

344. The computer program product as recited in claim 330, wherein the decision hierarchy display includes: policies, decisions, and tactics.

345. The computer program product as recited in claim 280, wherein the computer code for generating includes computer code for generating a potential hybrid theme.

346. The computer program product as recited in claim 297, wherein the computer code for generating includes computer code for generating a potential feasible hybrid theme.

347. The computer program product as recited in claim 346, wherein the computer code for generating includes computer code for generating a plurality of the potential feasible hybrid themes.

348. The computer program product as recited in claim 346, wherein the potential feasible hybrid theme includes a hybrid strategy.

349. The computer program product as recited in claim 348, wherein the hybrid strategy combines a plurality of alternative strategies.

350. The computer program product as recited in claim 349, wherein at least one of the plurality alternative strategies is pre-defined.

351. The computer program product as recited in claim 346, wherein the potential feasible hybrid theme is associated with at least one strategy.

352. The computer program product as recited in claim 351, wherein the at least one strategy is pre-defined.

353. The computer program product as recited in claim 351, wherein the at least one strategy is user-defined.

354. The computer program product as recited in claim 353, wherein the at least one strategy is capable of being provided a strategy name.

355. The computer program product as recited in claim 353, wherein the at least one strategy is capable of being defined by a plurality of selections.

356. The computer program product as recited in claim 353, wherein the at least one strategy is capable of being defined by an amount of stock purchase.

357. The computer program product as recited in claim 353, wherein the at least one strategy is capable of being defined by a selection of a plurality of alternatives.

358. The computer program product as recited in claim 353, wherein the at least one strategy is capable of being modified.

359. The computer program product as recited in claim 358, wherein a range associated with the at least one strategy is capable of being modified.

360. The computer program product as recited in claim 351, wherein the at least one strategy is a stock purchase strategy.

361. The computer program product as recited in claim 297, wherein the decision sensitivity display is capable of showing at least one value associated with a first strategy and at least one value associated with a second strategy; the at least one first strategy including a pre-defined strategy and the at least one second strategy including a user-defined strategy;

the second strategy capable of being: provided a strategy name by a user, defined by a selection of a plurality of alternatives, and further modified.

362. The computer program product as recited in claim 361, wherein the computer code for generating includes computer code for generating a decision display, the decision display identifying at least one decision associated with the second strategy.

363. The computer program product as recited in claim 362, wherein the decision display includes the decision hierarchy display.

364. The computer program product as recited in claim 297, wherein the application is the real estate-related application.

365. The computer program product as recited in claim 297, wherein the application is the medical-related application.

366. The computer program product as recited in claim 297, wherein the application is the product supply-related application.

367. The computer program product as recited in claim 297, wherein the application is the service supply-related application.

368. The computer program product as recited in claim 297, wherein the application is the financial-related application.

369. The computer program product as recited in claim 297, further comprising computer code for allowing a user to modify the decision sensitivity display.

370. The computer program product as recited in claim 297, wherein the decision-making is related to a business-to-business transaction.

371. The computer program product as recited in claim 361, wherein the decision sensitivity display is capable of showing the at least one value associated with the first strategy simultaneously with the at least one value associated with the second strategy.

372. The computer program product as recited in claim 297, wherein the application is the product supply-related application and the product supply-related application relates to marketing at least one product.

373. The computer program product as recited in claim 297, wherein the application is the service supply-related application and the service supply-related application relates to marketing at least one service.

374. The computer program product as recited in claim 297, wherein the application is the corporate-related application and the corporate-related application relates to marketing.

375. The computer program product as recited in claim 297, wherein the memory includes at least one database.

376. The computer program product as recited in claim 297, wherein the memory includes at least one decision-relevant database.

377. The computer program product as recited in claim 297, wherein the memory includes a plurality of databases.

378. The computer program product as recited in claim 297, wherein the memory includes a plurality of databases coupled via at least one network.

379. The computer program product as recited in claim 280, wherein the decision-making is facilitated utilizing a platform capable of supporting collaborative decision-making, and the display facilitates the collaborative decision-making by including the decision hierarchy display, and the decision hierarchy display includes a table.

380. The computer program product as recited in claim 379, wherein each decision in the decision hierarchy display is represented by a column heading in the table.

381. The computer program product as recited in claim 380, wherein alternatives for each decision are arranged beneath the column heading.

382. The computer program product as recited in claim 280, wherein the decision-making is facilitated utilizing a platform capable of supporting collaborative decision-making, and the display facilitates the collaborative decision-making by including the decision hierarchy display, and content of the decision hierarchy display is based on the second information.

383. The computer program product as recited in claim 297, wherein the second information includes information relating to controllables.

384. The computer program product as recited in claim 297, wherein the second information includes information relating to uncertainties.

385. The computer program product as recited in claim 305, wherein the uncertainties include independent uncertainties.

386. The computer program product as recited in claim 305, wherein the uncertainties include uncertainties dependent on decisions.

387. The computer program product as recited in claim 305, wherein the uncertainties include at least one of a product sales volume change, a margin change, a cost change, or a margin change.

388. The computer program product as recited in claim 305, wherein include at least two of a product sales volume change, a margin change, a cost change, and a margin change.

389. The computer program product as recited in claim 305, wherein include at least three of a product sales volume change, a margin change, a cost change, and a margin change.

390. The computer program product as recited in claim 280, wherein the computer code for generating includes computer code for generating the decision hierarchy display utilizing a collaborative decision platform, the decision hierarchy display including information on target customers.

391. The computer program product as recited in claim 280, wherein the computer code for generating includes computer code for generating the decision hierarchy display utilizing a collaborative decision platform, the decision hierarchy display including information on at least one channel.

392. The computer program product as recited in claim 280, wherein the computer code for generating includes computer code for generating the decision hierarchy display utilizing a collaborative decision platform, the decision hierarchy display including information on a salesforce channel.

393. The computer program product as recited in claim 280, wherein the computer code for generating includes computer code for generating the decision hierarchy display utilizing a collaborative decision platform, the decision hierarchy display including information on a service channel.

394. The computer program product as recited in claim 297, wherein the second information includes information relating to information sources.

395. The computer program product as recited in claim 297, wherein the second information includes information relating to decision alternatives.

396. The computer program product as recited in claim 297, wherein the second information includes information relating to sources of value.

397. The computer program product as recited in claim 297, wherein the computer program product utilizes a structural relationship of decisions.

398. The computer program product as recited in claim 297, wherein the computer program product utilizes input from a spreadsheet.

399. The computer program product as recited in claim 297, wherein the computer program product utilizes at least one equation relating to at least one decision.

400. The computer program product as recited in claim 297, wherein the computer program product utilizes a plurality of equations relating to a plurality of decisions.

401. The computer program product as recited in claim 297, wherein the computer program product utilizes structural relationship of decisions, values, and uncertainties.

402. The computer program product as recited in claim 297, wherein the computer code for generating includes computer code for generating the decision hierarchy display utilizing a collaborative decision platform, the decision hierarchy display including a bar graph.

403. The computer program product as recited in claim 297, wherein the computer program product is capable of supporting an asynchronous decision-making process.

404. The computer program product as recited in claim 297, wherein the application utilizes policies that form boundary conditions for a decision.

405. The computer program product as recited in claim 297, wherein the application utilizes values that are important to a decision and uncertainties that potentially impact the values.

406. The computer program product as recited in claim 297, wherein the application interfaces the platform.

407. The computer program product as recited in claim 406, wherein the platform includes at least a portion of the computer code for the retrieving, the receiving, and the causing.

408. The computer program product as recited in claim 406, wherein the application is separate from the platform.

409. The computer program product as recited in claim 297, wherein the computer program product includes computer code having a plurality of universal modules associated with the object-oriented programming language.

410. The computer program product as recited in claim 305, wherein the computer program product is operable such that a range associated with the at least one strategy is capable of being modified.

411. The computer program product as recited in claim 245, wherein the facilitation is performed in real-time utilizing the one or more modules.

412. The computer program product as recited in claim 245, wherein the decision-making includes real-time decision-making.

413. The computer program product as recited in claim 245, wherein the first information is retrieved via a network.

414. The computer program product as recited in claim 413, wherein the network is the Internet.

415. The computer program product as recited in claim 245, wherein the second information is received via a network.

416. The computer program product as recited in claim 415, wherein the network is the Internet.

417. The computer program product as recited in claim 245, wherein the computer program product is industry-independent.

418. The computer program product as recited in claim 245, wherein the decision-making relates to which products or services are suitable for an entity.

419. The computer program product as recited in claim 245, wherein the decision-making relates to customer relationship management.

420. The computer program product as recited in claim 419, wherein the customer includes a business.

421. The computer program product as recited in claim 245, further comprising computer code for identifying a strategy.

422. The computer program product as recited in claim 245, further comprising computer code for assessing uncertainties for analysis purposes.

423. The computer program product as recited in claim 245, wherein the computer code for generating includes computer code for generating a potential feasible hybrid theme.

424. The computer program product as recited in claim 245, wherein the computer code for generating includes computer code for generating a decision hierarchy display.

425. The computer program product as recited in claim 245, wherein the computer code for generating includes computer code for generating the decision sensitivity display utilizing the one or more modules.

426. The computer program product as recited in claim 425, wherein the decision sensitivity display includes a decision sensitivity table.

427. The computer program product as recited in claim 425, wherein the decision sensitivity display includes a decision sensitivity chart.

428. The computer program product as recited in claim 425, wherein the decision sensitivity display shows at least one value associated with a first strategy and at least one value associated with a second strategy.

429. The computer program product as recited in claim 425, wherein the decision sensitivity display compares at least one value associated with a strategy.

430. The computer program product as recited in claim 425, wherein the decision sensitivity display identifies sources of value.

431. The computer program product as recited in claim 425, wherein the decision sensitivity display identifies sources of value for each of a plurality of strategies.

432. The computer program product as recited in claim 425, wherein the decision sensitivity display identifies at least one aspect associated with at least one strategy.

433. The computer program product as recited in claim 432, wherein the at least one aspect is associated with value.

434. The computer program product as recited in claim 432, wherein the at least one strategy is pre-defined.

435. The computer program product as recited in claim 432, wherein the at least one strategy is user-defined.

436. The computer program product as recited in claim 435, wherein the at least one strategy is capable of being provided a strategy name.

437. The computer program product as recited in claim 435, wherein the at least one strategy is capable of being defined by a plurality of selections.

438. The computer program product as recited in claim 435, wherein the at least one strategy is capable of being defined by an amount of stock purchase.

439. The computer program product as recited in claim 435, wherein the at least one strategy is capable of being defined by a selection of a plurality of alternatives.

440. The computer program product as recited in claim 435, wherein the at least one strategy is capable of being modified.

441. The computer program product as recited in claim 440, wherein a range associated with the at least one strategy is capable of being modified.

442. The computer program product as recited in claim 432, wherein the at least one strategy is a stock purchase strategy.

443. The computer program product as recited in claim 425, wherein the decision sensitivity display identifies at least one aspect associated with a plurality of strategies.

444. The computer program product as recited in claim 425, wherein the application is the financial-related application.

445. The computer program product as recited in claim 444, further comprising code for displaying a stock ticker.

446. The computer program product as recited in claim 425, wherein the decision sensitivity display shows at least one profit-related value associated with a first strategy and at least one profit-related value associated with a second strategy.

447. The computer program product as recited in claim 245, wherein the computer code for generating includes computer code for generating a decision hierarchy display utilizing the one or more modules.

448. The computer program product as recited in claim 447, wherein the decision hierarchy display identifies decisions that are within a scope of a decision making process.

449. The computer program product as recited in claim 447, wherein the decision hierarchy display identifies at least one decision associated with at least one strategy.

450. The computer program product as recited in claim 449, wherein the at least one strategy is pre-defined.

451. The computer program product as recited in claim 449, wherein the at least one strategy is user-defined.

452. The computer program product as recited in claim 451, wherein the at least one strategy is capable of being provided a strategy name.

453. The computer program product as recited in claim 451, wherein the at least one strategy is capable of being defined by a plurality of selections.

454. The computer program product as recited in claim 451, wherein the at least one strategy is capable of being defined by an amount of stock purchase.

455. The computer program product as recited in claim 451, wherein the at least one strategy is capable of being defined by a selection of a plurality of alternatives.

456. The computer program product as recited in claim 451, wherein the at least one strategy is capable of being modified.

457. The computer program product as recited in claim 456, wherein a range associated with the at least one strategy is capable of being modified.

458. The computer program product as recited in claim 449, wherein the at least one strategy is a stock purchase strategy.

459. The computer program product as recited in claim 447, wherein the decision hierarchy display includes at least one of policies, decisions, or tactics.

460. The computer program product as recited in claim 447, wherein the decision hierarchy display includes at least two of: policies, decisions, and tactics.

461. The computer program product as recited in claim 447, wherein the decision hierarchy display includes: policies, decisions, and tactics.

462. The computer program product as recited in claim 425, wherein the computer code for generating includes computer code for generating a potential hybrid theme.

463. The computer program product as recited in claim 245, wherein the computer code for generating includes computer code for generating a potential feasible hybrid theme utilizing the one or more modules.

464. The computer program product as recited in claim 463, wherein the computer code for generating includes computer code for generating a plurality of the potential feasible hybrid themes.

465. The computer program product as recited in claim 463, wherein the potential feasible hybrid theme includes a hybrid strategy.

466. The computer program product as recited in claim 465, wherein the hybrid strategy combines a plurality of alternative strategies.

467. The computer program product as recited in claim 466, wherein at least one of the plurality alternative strategies is pre-defined.

468. The computer program product as recited in claim 463, wherein the potential feasible hybrid theme is associated with at least one strategy.

469. The computer program product as recited in claim 468, wherein the at least one strategy is pre-defined.

470. The computer program product as recited in claim 468, wherein the at least one strategy is user-defined.

471. The computer program product as recited in claim 470, wherein the at least one strategy is capable of being provided a strategy name.

472. The computer program product as recited in claim 470, wherein the at least one strategy is capable of being defined by a plurality of selections.

473. The computer program product as recited in claim 470, wherein the at least one strategy is capable of being defined by an amount of stock purchase.

474. The computer program product as recited in claim 470, wherein the at least one strategy is capable of being defined by a selection of a plurality of alternatives.

475. The computer program product as recited in claim 470, wherein the at least one strategy is capable of being modified.

476. The computer program product as recited in claim 475, wherein a range associated with the at least one strategy is capable of being modified.

477. The computer program product as recited in claim 468, wherein the at least one strategy is a stock purchase strategy.

478. The computer program product as recited in claim 245, wherein the decision sensitivity display is capable of showing at least one value associated with a first strategy and at least one value associated with a second strategy; the at least one first strategy including a pre-defined financial-related strategy and the at least one second strategy including a user-defined financial-related strategy; the second strategy capable of being: provided a strategy name by a user, defined by a selection of a plurality of alternatives, and further modified.

479. The computer program product as recited in claim 478, wherein the computer code for generating includes computer code for generating a decision display including at least one of policies, decisions, or tactics, the decision display identifying the at least one of policies, decisions, or tactics associated with the second strategy.

480. The computer program product as recited in claim 478, wherein the computer code for generating includes computer code for generating a decision display including at least two of policies, decisions, and tactics, the decision display identifying the at least two of policies, decisions, and tactics associated with the second strategy.

481. The computer program product as recited in claim 478, wherein the computer code for generating includes computer code for generating a decision display including policies, decisions, and tactics, the decision display identifying the policies, decisions, and tactics associated with the second strategy.

482. The computer program product as recited in claim 245, wherein the application is the medical-related application.

483. The computer program product as recited in claim 245, wherein the application is the product supply-related application.

484. The computer program product as recited in claim 245, wherein the application is the service supply-related application.

485. The computer program product as recited in claim 245, wherein the application is the financial-related application.

486. The computer program product as recited in claim 245, further comprising computer code for allowing a user to modify the decision sensitivity display.

487. The computer program product as recited in claim 245, wherein the decision-making is related to a business-to-business transaction.

488. The computer program product as recited in claim 478, wherein the decision sensitivity display is capable of showing the at least one value associated with the first strategy simultaneously with the at least one value associated with the second strategy.

489. The computer program product as recited in claim 245, wherein the application is the product supply-related application and the product supply-related application relates to marketing at least one product.

490. The computer program product as recited in claim 245, wherein the application is the service supply-related application and the service supply-related application relates to marketing at least one service.

491. The computer program product as recited in claim 245, wherein the application is the corporate-related application and the corporate-related application relates to marketing.

492. The computer program product as recited in claim 245, wherein the memory includes at least one database.

493. The computer program product as recited in claim 245, wherein the memory includes at least one decision-relevant database.

494. The computer program product as recited in claim 245, wherein the memory includes a plurality of databases.

495. The computer program product as recited in claim 245, wherein the memory includes a plurality of databases coupled via at least one network.

496. The computer program product as recited in claim 245, wherein the computer code for generating includes computer code for generating a decision display including at least one of policies, decisions, or tactics; and the decision display includes a table.

497. The computer program product as recited in claim 496, wherein the at least one of policies, decisions, or tactics in the decision display is represented by a column heading in the table.

498. The computer program product as recited in claim 497, wherein alternatives for the at least one of policies, decisions, or tactics are arranged beneath the column heading.

499. The computer program product as recited in claim 245, wherein the computer code for generating includes computer code for generating a decision display including at least one of policies, decisions, or tactics, and content of the decision display is based on the second information.

500. The computer program product as recited in claim 499, wherein the second information includes information relating to controllables.

501. The computer program product as recited in claim 499, wherein the second information includes information relating to uncertainties.

502. The computer program product as recited in claim 501, wherein the uncertainties include independent uncertainties.

503. The computer program product as recited in claim 501, wherein the uncertainties include uncertainties dependent on decisions.

504. The computer program product as recited in claim 501, wherein the uncertainties include at least one of a product sales volume change, a margin change, a cost change, or a margin change.

505. The computer program product as recited in claim 501, wherein include at least two of a product sales volume change, a margin change, a cost change, and a margin change.

506. The computer program product as recited in claim 501, wherein include at least three of a product sales volume change, a margin change, a cost change, and a margin change.

507. The computer program product as recited in claim 245, further comprising computer code for generating a decision display including at least one of policies, decisions, or tactics, the decision display including information on target customers.

508. The computer program product as recited in claim 245, further comprising computer code for generating a decision display including at least one of policies, decisions, or tactics, the decision display including information on at least one channel.

509. The computer program product as recited in claim 245, further comprising computer code for generating a decision display including at least one of policies, decisions, or tactics, the decision display including information on a sales-force channel.

510. The computer program product as recited in claim 245, further comprising computer code for generating a decision display including at least one of policies, decisions, or tactics, the decision display including information on a service channel.

511. The computer program product as recited in claim 245, wherein the second information includes information relating to information sources.

512. The computer program product as recited in claim 245, wherein the second information includes information relating to decision alternatives.

513. The computer program product as recited in claim 245, wherein the second information includes information relating to sources of value.

514. The computer program product as recited in claim 245, wherein the computer program product utilizes a structural relationship of decisions.

515. The computer program product as recited in claim 245, wherein the computer program product utilizes input from a spreadsheet.

516. The computer program product as recited in claim 245, wherein the computer program product utilizes at least one equation relating to at least one decision.

517. The computer program product as recited in claim 245, wherein the computer program product utilizes a plurality of equations relating to a plurality of decisions.

518. The computer program product as recited in claim 245, wherein the computer program product utilizes structural relationship of decisions, values, and uncertainties.

519. The computer program product as recited in claim 245, further comprising computer code for generating a decision display including at least one of policies, decisions, or tactics, in connection with the decision sensitivity display.

520. The computer program product as recited in claim 519, wherein the computer program product is capable of supporting an asynchronous decision-making process.

521. The computer program product as recited in claim 519, wherein the application utilizes policies that form boundary conditions for a decision.

522. The computer program product as recited in claim 519, wherein the application utilizes values that are important to a decision and uncertainties that potentially impact the values.

523. The computer program product as recited in claim 519, wherein the application interfaces a platform.

524. The computer program product as recited in claim 523, wherein the platform includes at least a portion of the computer code for the retrieving, the receiving, and the causing.

525. The computer program product as recited in claim 523, wherein the application is separate from the platform.

526. The computer program product as recited in claim 245, wherein the computer program product includes computer code having a plurality of objects associated with an object-oriented programming language, in connection with the one or modules.

527. The computer program product as recited in claim 526, wherein the facilitating the decision-making involves a policy, and the decision sensitivity display shows an impact of at least one of a plurality of variables on results of the policy.

528. The computer program product as recited in claim 526, wherein the objects include at least one object that is capable of being used to initialize a computation, in connection with the one or modules.

529. The computer program product as recited in claim 526, wherein the at least one of the plurality of objects is capable of providing a framing functionality, in connection with the one or modules.

530. The computer program product as recited in claim 526, wherein the objects include at least one object that is capable of being used to develop decision-related alternatives, in connection with the one or modules.

531. The computer program product as recited in claim 526, wherein the at least one of the plurality of objects is capable of providing an alternatives functionality, in connection with the one or modules.

532. The computer program product as recited in claim 526, wherein the objects include at least one object that is capable of being used to analyze alternatives, in connection with the one or modules.

533. The computer program product as recited in claim 526, wherein the at least one of the plurality of objects is capable of providing an analysis functionality, in connection with the one or modules.

534. The computer program product as recited in claim 526, wherein the objects include one or more of the following in connection with the one or modules:
   a first object that is capable of being used to develop decision-related alternatives,
   a second object that is capable of being used to analyze the decision-related alternatives, and
   a third object that is capable of being used to process the decision-related alternatives to develop a solution.

535. The computer program product as recited in claim 526, wherein the objects communicate utilizing encapsulation that enforces data abstraction, in connection with the one or modules.

536. The computer program product as recited in claim 526, wherein the objects are implemented utilizing class libraries, in connection with the one or modules.

537. The computer program product as recited in claim 536, wherein the class libraries are capable of being utilized for generating the display, in connection with the one or modules.

538. The computer program product as recited in claim 526, wherein the objects are implemented utilizing subclassing and inheritance to extend or modify objects by deriving additional objects from classes, in connection with the one or modules.

539. The computer program product as recited in claim 526, wherein the at least one display is implemented utilizing at least one dynamic web page, in connection with the one or modules.

540. The computer program product as recited in claim 245, wherein the one or more of (i)-(iii) is carried out utilizing, at least in part, the one or more modules that is capable of being used to apply the one or more of (i)-(iii) to different business sectors.

541. The computer program product as recited in claim 245, wherein the computer program product is operable such that the one or more of (i)-(iii) is carried out utilizing, at least in part, the one or more modules that is capable of being used to apply the one or more of (i)-(iii) to different products.

542. The computer program product as recited in claim 245, wherein the one or more modules include a plurality of universal modules.

543. The computer program product as recited in claim 245, wherein the computer program product is operable such that all of (i)-(iii) are carried out utilizing, at least in part, the one or more modules that is capable of being used to apply all of (i)-(iii) differently.

544. The computer program product as recited in claim 245, wherein the computer program product is operable such that the one or more modules are re-usable.

545. The computer program product as recited in claim 245, wherein the computer program product is operable such that the one or more modules are accessible via a component integration architecture.

546. The computer program product as recited in claim 245, wherein the one or more modules include module means for applying similar functionality across multiple purposes.

547. The computer program product as recited in claim 245, wherein the display is accessible via a web browser.

548. The computer program product as recited in claim 245, wherein the one or more modules include a framing module, an alternatives module, an analysis module, and a connection module.

549. A computer program product embodied on a tangible computer readable medium, comprising:
   computer code for facilitating decision-making, the computer code for facilitating associated with an application which is a real estate-related application, a medical-related application, a corporate-related application, a product supply-related application, a service supply-related application, or a financial-related application;
   computer code for retrieving first information from a memory;
   computer code for receiving second information from a user interface; and computer code for causing generation of at least one display based on the first information and the second information, the display facilitating the decision-making by including at least one of a potential feasible hybrid theme, a decision sensitivity display, or a decision hierarchy display;

wherein the computer program product includes a collaborative decision platform capable of enabling real-time network-based collaboration between entities.

550. The computer program product as recited in claim 549, wherein the facilitation is performed in real-time.

551. The computer program product as recited in claim 549, wherein the decision-making includes real-time decision-making.

552. The computer program product as recited in claim 549, wherein the first information is retrieved via a network.

553. The computer program product as recited in claim 549, wherein the computer program product is operable such that the user interface receives different second information from different people at different times and from different places, such that contents of the at least one display is based on the second information from the different people.

554. The computer program product as recited in claim 549, wherein the second information is received via a network.

555. The computer program product as recited in claim 549, wherein the computer program product includes asynchronous computer code operable such that the user interface is capable of receiving the second information from different people at different times and from different places, such that contents of the at least one display is based on the second information from the different people; the asynchronous computer code further operable such that the user interface is capable of receiving modified second information from the different people, such that the contents of the at least one display is modified based on the modified second information from the different people.

556. The computer program product as recited in claim 555, wherein the modified second information modifies a problem definition.

557. The computer program product as recited in claim 549, wherein the decision-making relates to which products or services are suitable for an entity.

558. The computer program product as recited in claim 549, wherein at least a portion of the computer code is carried out using modules capable of interfacing with different applications adapted for applying the modules differently.

559. The computer program product as recited in claim 549, wherein at least a portion of the computer code is carried out using universal modules capable of interfacing with different applications adapted for applying the universal modules differently.

560. The computer program product as recited in claim 549, further comprising computer code for identifying a strategy.

561. The computer program product as recited in claim 549, further comprising computer code for assessing uncertainties for analysis purposes.

562. The computer program product as recited in claim 549, wherein the computer code for generating includes computer code for generating at least two of: the potential feasible hybrid theme, the decision sensitivity display, and the decision hierarchy display.

563. The computer program product as recited in claim 549, wherein the computer code for generating includes computer code for generating the potential feasible hybrid theme, the decision sensitivity display, and the decision hierarchy display.

564. The computer program product as recited in claim 549, wherein the computer code for generating includes computer code for generating the decision sensitivity display.

565. The computer program product as recited in claim 564, wherein the decision sensitivity display includes a decision sensitivity table.

566. The computer program product as recited in claim 564, wherein the decision sensitivity display includes a decision sensitivity chart.

567. The computer program product as recited in claim 564, wherein the decision sensitivity display shows at least one value associated with a first strategy and at least one value associated with a second strategy.

568. The computer program product as recited in claim 564, wherein the decision sensitivity display compares at least one value associated with a strategy.

569. The computer program product as recited in claim 564, wherein the decision sensitivity display identifies sources of value.

570. The computer program product as recited in claim 564, wherein the decision sensitivity display identifies sources of value for each of a plurality of strategies.

571. The computer program product as recited in claim 564, wherein the decision sensitivity display identifies at least one aspect associated with at least one strategy.

572. The computer program product as recited in claim 571, wherein the at least one aspect is associated with value.

573. The computer program product as recited in claim 571, wherein the at least one strategy is pre-defined.

574. The computer program product as recited in claim 571, wherein the at least one strategy is user-defined.

575. The computer program product as recited in claim 574, wherein the at least one strategy is capable of being provided a strategy name.

576. The computer program product as recited in claim 574, wherein the at least one strategy is capable of being defined by a plurality of selections.

577. The computer program product as recited in claim 574, wherein the at least one strategy is capable of being defined by an amount of stock purchase.

578. The computer program product as recited in claim 574, wherein the at least one strategy is capable of being defined by a selection of a plurality of alternatives.

579. The computer program product as recited in claim 574, wherein the at least one strategy is capable of being modified.

580. The computer program product as recited in claim 579, wherein a range associated with the at least one strategy is capable of being modified.

581. The computer program product as recited in claim 571, wherein the at least one strategy is a stock purchase strategy.

582. The computer program product as recited in claim 564, wherein the decision sensitivity display identifies at least one aspect associated with a plurality of strategies.

583. The computer program product as recited in claim 564, wherein the application is the financial-related application.

584. The computer program product as recited in claim 583, further comprising code for displaying a stock ticker.

585. The computer program product as recited in claim 564, wherein the decision sensitivity display shows at least one profit-related value associated with a first strategy and at least one profit-related value associated with a second strategy.

586. The computer program product as recited in claim 549, wherein the computer code for generating includes computer code for generating the decision hierarchy display.

587. The computer program product as recited in claim 586, wherein the decision hierarchy display identifies decisions that are within a scope of a decision making process.

588. The computer program product as recited in claim 586, wherein the decision hierarchy display identifies at least one decision associated with at least one strategy.

589. The computer program product as recited in claim 588, wherein the at least one strategy is pre-defined.

590. The computer program product as recited in claim 588, wherein the at least one strategy is user-defined.

591. The computer program product as recited in claim 590, wherein the at least one strategy is capable of being provided a strategy name.

592. The computer program product as recited in claim 590, wherein the at least one strategy is capable of being defined by a plurality of selections.

593. The computer program product as recited in claim 590, wherein the at least one strategy is capable of being defined by an amount of stock purchase.

594. The computer program product as recited in claim 590, wherein the at least one strategy is capable of being defined by a selection of a plurality of alternatives.

595. The computer program product as recited in claim 590, wherein the at least one strategy is capable of being modified.

596. The computer program product as recited in claim 595, wherein a range associated with the at least one strategy is capable of being modified.

597. The computer program product as recited in claim 588, wherein the at least one strategy is a stock purchase strategy.

598. The computer program product as recited in claim 586, wherein the decision hierarchy display includes at least one of policies, decisions, or tactics.

599. The computer program product as recited in claim 586, wherein the decision hierarchy display includes at least two of: policies, decisions, and tactics.

600. The computer program product as recited in claim 586, wherein the decision hierarchy display includes: policies, decisions, and tactics.

601. The computer program product as recited in claim 564, wherein the computer code for generating includes computer code for generating the potential hybrid theme.

602. The computer program product as recited in claim 549, wherein the computer code for generating includes computer code for generating the potential feasible hybrid theme.

603. The computer program product as recited in claim 602, wherein the computer code for generating includes computer code for generating a plurality of the potential feasible hybrid themes.

604. The computer program product as recited in claim 602, wherein the potential feasible hybrid theme includes a hybrid strategy.

605. The computer program product as recited in claim 604, wherein the hybrid strategy combines a plurality of alternative strategies.

606. The computer program product as recited in claim 605, wherein at least one of the plurality alternative strategies is pre-defined.

607. The computer program product as recited in claim 602, wherein the potential feasible hybrid theme is associated with at least one strategy.

608. The computer program product as recited in claim 607, wherein the at least one strategy is pre-defined.

609. The computer program product as recited in claim 607, wherein the at least one strategy is user-defined.

610. The computer program product as recited in claim 609, wherein the at least one strategy is capable of being provided a strategy name.

611. The computer program product as recited in claim 609, wherein the at least one strategy is capable of being defined by a plurality of selections.

612. The computer program product as recited in claim 609, wherein the at least one strategy is capable of being defined by an amount of stock purchase.

613. The computer program product as recited in claim 609, wherein the at least one strategy is capable of being defined by a selection of a plurality of alternatives.

614. The computer program product as recited in claim 609, wherein the at least one strategy is capable of being modified.

615. The computer program product as recited in claim 614, wherein a range associated with the at least one strategy is capable of being modified.

616. The computer program product as recited in claim 607, wherein the at least one strategy is a stock purchase strategy.

617. The computer program product as recited in claim 549, wherein the computer code for generating includes computer code for generating the decision sensitivity display; the decision sensitivity display capable of showing at least one value associated with a first strategy and at least one value associated with a second strategy; the at least one first strategy including a pre-defined stock-related strategy and the at least one second strategy including a user-defined stock-related strategy; the second strategy capable of being: provided a strategy name by a user, defined by a selection of a plurality of alternatives, and further modified.

618. The computer program product as recited in claim 617, wherein the computer code for generating includes computer code for generating the decision hierarchy display, the decision hierarchy display identifying at least one decision associated with the second strategy.

619. The computer program product as recited in claim 549, wherein the application is the corporate-related application.

620. The computer program product as recited in claim 549, wherein the application is the real estate-related application.

621. The computer program product as recited in claim 549, wherein the application is the medical-related application.

622. The computer program product as recited in claim 549, wherein the application is the product supply-related application.

623. The computer program product as recited in claim 549, wherein the application is the service supply-related application.

624. The computer program product as recited in claim 549, wherein the application is the financial-related application.

625. The computer program product as recited in claim 549, further comprising computer code for allowing a user to modify at least one of a tornado diagram, the decision sensitivity display, the decision hierarchy display, an influence diagram, and the potential feasible hybrid theme.

626. The computer program product as recited in claim 549, wherein the decision-making is related to a business-to-business transaction.

627. The computer program product as recited in claim 617, wherein the decision sensitivity display is capable of showing the at least one value associated with the first strategy simultaneously with the at least one value associated with the second strategy.

628. The computer program product as recited in claim 549, wherein the application is the product supply-related application and the product supply-related application relates to marketing at least one product.

629. The computer program product as recited in claim 549, wherein the application is the service supply-related application and the service supply-related application relates to marketing at least one service.

630. The computer program product as recited in claim 549, wherein the application is the corporate-related application and the corporate-related application relates to marketing.

631. The computer program product as recited in claim 549, wherein the memory includes at least one database.

632. The computer program product as recited in claim 549, wherein the memory includes at least one decision-relevant database.

633. The computer program product as recited in claim 549, wherein the memory includes a plurality of databases.

634. The computer program product as recited in claim 549, wherein the memory includes a plurality of databases coupled via at least one network.

635. The computer program product as recited in claim 549, wherein the computer code for generating includes computer code for generating the decision hierarchy display, and the decision hierarchy display includes a table.

636. The computer program product as recited in claim 635, wherein each decision in the decision hierarchy display is represented by a column heading in the table.

637. The computer program product as recited in claim 636, wherein alternatives for each decision are arranged beneath the column heading.

638. The computer program product as recited in claim 549, wherein the computer code for generating includes computer code for generating the decision hierarchy display, and content of the decision hierarchy display is based on the second information.

639. The computer program product as recited in claim 549, wherein the second information includes information relating to controllables.

640. The computer program product as recited in claim 549, wherein the second information includes information relating to uncertainties.

641. The computer program product as recited in claim 561, wherein the uncertainties include independent uncertainties.

642. The computer program product as recited in claim 561, wherein the uncertainties include uncertainties dependent on decisions.

643. The computer program product as recited in claim 561, wherein the uncertainties include at least one of a product sales volume change, a margin change, a cost change, or a margin change.

644. The computer program product as recited in claim 561, wherein include at least two of a product sales volume change, a margin change, a cost change, and a margin change.

645. The computer program product as recited in claim 561, wherein include at least three of a product sales volume change, a margin change, a cost change, and a margin change.

646. The computer program product as recited in claim 549, wherein the computer code for generating includes computer code for generating the decision hierarchy display, the decision hierarchy display including information on target customers.

647. The computer program product as recited in claim 549, wherein the computer code for generating includes computer code for generating the decision hierarchy display, the decision hierarchy display including information on at least one channel.

648. The computer program product as recited in claim 549, wherein the computer code for generating includes computer code for generating the decision hierarchy display, the decision hierarchy display including information on a salesforce channel.

649. The computer program product as recited in claim 549, wherein the computer code for generating includes computer code for generating the decision hierarchy display, the decision hierarchy display including information on a service channel.

650. The computer program product as recited in claim 549, wherein the second information includes information relating to information sources.

651. The computer program product as recited in claim 549, wherein the second information includes information relating to decision alternatives.

652. The computer program product as recited in claim 549, wherein the second information includes information relating to sources of value.

653. The computer program product as recited in claim 549, wherein the computer program product utilizes a structural relationship of decisions.

654. The computer program product as recited in claim 549, wherein the computer program product utilizes input from a spreadsheet.

655. The computer program product as recited in claim 549, wherein the computer program product utilizes at least one equation relating to at least one decision.

656. The computer program product as recited in claim 549, wherein the computer program product utilizes a plurality of equations relating to a plurality of decisions.

657. The computer program product as recited in claim 549, wherein the computer program product utilizes structural relationship of decisions, values, and uncertainties.

658. The computer program product as recited in claim 549, wherein the collaborative decision platform includes the computer code for facilitating, the computer code for retrieving, the computer code for receiving, and the computer code for causing.

659. The computer program product as recited in claim 549, wherein the computer program product is capable of supporting an asynchronous decision-making process.

660. The computer program product as recited in claim 549, wherein the application utilizes policies that form boundary conditions for a decision.

661. The computer program product as recited in claim 549, wherein the application utilizes values that are important to a decision and uncertainties that potentially impact the values.

662. The computer program product as recited in claim 549, wherein the application interfaces a platform.

663. The computer program product as recited in claim 662, wherein the platform includes at least a portion of the computer code for the retrieving, the receiving, and the causing.

664. The computer program product as recited in claim 662, wherein the application is separate from the platform.

665. The computer program product as recited in claim 549, wherein the computer program product includes computer code having a plurality of objects associated with an object-oriented programming language.

666. The computer program product as recited in claim 665, wherein the facilitating the decision-making involves a policy, and the decision sensitivity display shows an impact of at least one of a plurality of variables on results of the policy.

667. The computer program product as recited in claim 665, wherein the objects include at least one object that is capable of being used to initialize a computation.

668. The computer program product as recited in claim 665, wherein the at least one of the plurality of objects is capable of providing a framing functionality.

669. The computer program product as recited in claim 665, wherein the objects include at least one object that is capable of being used to develop decision-related alternatives.

670. The computer program product as recited in claim 665, wherein the at least one of the plurality of objects is capable of providing an alternatives functionality.

671. The computer program product as recited in claim 665, wherein the objects include at least one object that is capable of being used to analyze alternatives.

672. The computer program product as recited in claim 665, wherein the at least one of the plurality of objects is capable of providing an analysis functionality.

673. The computer program product as recited in claim 665, wherein the objects include:
- a first object that is capable of being used to develop decision-related alternatives,
- a second object that is capable of being used to analyze the decision-related alternatives, and
- a third object that is capable of being used to process the decision-related alternatives to develop a solution.

674. The computer program product as recited in claim 665, wherein the objects communicate utilizing encapsulation that enforces data abstraction.

675. The computer program product as recited in claim 665, wherein the objects are implemented utilizing class libraries.

676. The computer program product as recited in claim 675, wherein the class libraries are capable of being utilized for generating the display.

677. The computer program product as recited in claim 665, wherein the objects are implemented utilizing subclassing and inheritance to extend or modify objects by deriving additional objects from classes.

678. The computer program product as recited in claim 665, wherein the at least one display is implemented utilizing at least one dynamic web page.

679. The computer program product as recited in claim 549, further comprising computer code for providing at least one first interface that allows the user to form at least one boundary condition associated with the decision-making.

680. The computer program product as recited in claim 679, wherein the at least one first interface that allows the user to form at least one boundary condition associated with the decision-making allows the user to form a plurality of boundary conditions.

681. The computer program product as recited in claim 549, further comprising computer code for providing at least one first interface that allows the user to input at least one tactic associated with the decision-making.

682. The computer program product as recited in claim 549, further comprising computer code for providing at least one first interface that allows the user to input at least one policy associated with the decision-making.

683. The computer program product as recited in claim 549, wherein the at least one first interface allows the user to enter at least one decision relating to the decision-making.

684. The computer program product as recited in claim 682, wherein the at least one first interface allows the user to enter a plurality of decisions relating to the decision-making.

685. The computer program product as recited in claim 549, wherein the at least one first interface allows the user to enter at least one tactic relating to the decision-making.

686. The computer program product as recited in claim 549, further comprising computer code for providing at least one first interface that allows the user to form at least one boundary condition associated with the decision-making utilizing a menu.

687. The computer program product as recited in claim 686, further comprising computer code for providing at least one additional first interface that allows the user to form at least one additional boundary condition associated with the decision-making.

688. The computer program product as recited in claim 549, further comprising computer code for providing at least one first interface that allows the user to input important values associated with the decision-making.

689. The computer program product as recited in claim 688, further comprising computer code for providing at least one additional first interface that allows the user to input additional important values associated with the decision-making.

690. The computer program product as recited in claim 688, wherein the computer program product is operable such that the at least one first interface and the at least one additional first interface work in parallel in connection with at least one common display.

691. The computer program product as recited in claim 688, wherein the computer program product is operable such that the important values and the additional important values are capable of being modified.

692. The computer program product as recited in claim 549, further comprising computer code for providing at least one first interface that allows the user to form at least one boundary condition associated with the decision-making, and allows the user to provide input associated with important aspects associated with the decision-making.

693. The computer program product as recited in claim 692, wherein the computer program product is operable such that the at least one boundary condition and the important aspects are capable of being modified.

694. The computer program product as recited in claim 692, wherein the at least one first interface is an element of a framing interface.

695. The computer program product as recited in claim 692, further comprising computer code for providing at least one additional first interface a content of which is a function of input provided using the at least one first interface.

696. The computer program product as recited in claim 692, further comprising computer code for providing at least one additional first interface that allows the user to form at least one additional boundary condition associated with the decision-making, and allows the user to provide input associated with additional important aspects associated with the decision-making.

697. The computer program product as recited in claim 692, further comprising computer code for providing at least one second interface that displays a plurality of alternatives.

698. The computer program product as recited in claim 697, wherein the alternatives include alternate choices.

699. The computer program product as recited in claim 697, wherein the alternatives are displayed in a table.

700. The computer program product as recited in claim 699, wherein at least one aspect of input received from the user via the least one first interface drives a column heading in the table with the alternatives for the column heading arranged therebeneath.

701. The computer program product as recited in claim 697, further comprising computer code for confirming at least one of the alternatives.

702. The computer program product as recited in claim 697, further comprising computer code for modifying the alternatives.

703. The computer program product as recited in claim 697, further comprising computer code for providing at least one additional second interface that displays the plurality of alternatives, as modified by user input.

704. The computer program product as recited in claim 697, further comprising computer code for providing at least one additional second interface a content of which is a function of input provided using the at least one second interface.

705. The computer program product as recited in claim 697, further comprising computer code for providing at least one third interface that displays sources of value in each of the alternatives.

706. The computer program product as recited in claim 697, further comprising computer code for providing at least one third interface that allows the user to modify input information.

707. The computer program product as recited in claim 705, wherein the at least one third interface is an element of an analysis interface.

708. The computer program product as recited in claim 706, wherein the at least one third interface allows the user to modify a range of data.

709. The computer program product as recited in claim 706, further comprising computer code for providing at least one additional third interface that provides the decision sensitivity display.

710. The computer program product as recited in claim 706, further comprising computer code for providing at least one additional third interface a content of which is a function of input provided using the at least one third interface.

711. The computer program product as recited in claim 549, further comprising computer code for receiving third information that includes public information.

712. The computer program product as recited in claim 711, wherein the computer program product is operable such that the third information is received from a source separate from a receiving entity and a supplying business utilizing the collaborative decision platform.

713. The computer program product as recited in claim 711, wherein the computer program product is operable such that the third information is utilized as a function of user input.

714. The computer program product as recited in claim 712, wherein the computer program product is operable such that the third information is received from the receiving entity.

715. The computer program product as recited in claim 711, wherein the third information relates to one or more products or services.

716. The computer program product as recited in claim 715, wherein the third information relates to a value of at least one aspect of the one or more products or services.

717. The computer program product as recited in claim 716, wherein the at least one aspect of the one or more products or services includes the one or more attributes.

718. The computer program product as recited in claim 715, wherein the third information relates to one or more attributes associated with the one or more products or services.

719. The computer program product as recited in claim 715, wherein the third information relates to a value of one or more attributes associated with the one or more products or services.

720. The computer program product as recited in claim 711, wherein the computer program product is operable such that the third information measures a retrospective value creation for customers.

721. The computer program product as recited in claim 711, wherein the computer program product is operable such that the third information is utilized in association with the collaborative decision platform.

722. The computer program product as recited in claim 712, further comprising computer code for allowing the receiving entity to provide insight in association with the source.

723. The computer program product as recited in claim 712, further comprising computer code for allowing the receiving entity to provide insight in association with the source, in order to reduce risk associated with the decision-making.

724. The computer program product as recited in claim 712, further comprising computer code for allowing the receiving entity to effect a modification in association with the third information of the source.

725. The computer program product as recited in claim 712, further comprising computer code for allowing the receiving entity to provide a confirmation in association with the source.

726. The computer program product as recited in claim 712, further comprising computer code for allowing the user to provide insight in association with the source.

727. The computer program product as recited in claim 712, further comprising computer code for allowing the user to provide insight in association with the source, in order to reduce risk associated with the decision-making.

728. The computer program product as recited in claim 712, further comprising computer code for allowing the user to modify the third information of the source.

729. The computer program product as recited in claim 712, further comprising computer code for allowing the user to provide a confirmation in association with the source.

730. The computer program product as recited in claim 712, further comprising computer code for providing source information that specifies the source.

731. The computer program product as recited in claim 712, further comprising computer code for providing source information that identifies the source.

732. The computer program product as recited in claim 731, wherein the source information includes a directory.

733. The computer program product as recited in claim 731, wherein the source information includes at least one person's name.

734. The computer program product as recited in claim 549, wherein the collaborative decision platform allows input from at least three entities that impacts the at least one display.

735. The computer program product as recited in claim 549, wherein the collaborative decision platform involves collaboration of at least three entities.

736. The computer program product as recited in claim 549, wherein the collaborative decision platform involves collaboration of at least two entities via the Internet.

737. The computer program product as recited in claim 6, wherein the logic is part of one or more modules.

738. The computer program product as recited in claim 6, wherein the logic is carried out by one or more universal modules.

739. The computer program product as recited in claim 6, wherein the computer program product is operable such that the one or more of (i)-(iii) is carried out utilizing, at least in part, logic capable of accomplishing the one or more of (i)-(iii) for one or more purposes, by applying the one or more of (i)-(iii) to different products.

740. The computer program product as recited in claim 6, wherein the computer program product is operable such that the one or more of (i)-(iii) is carried out utilizing, at least in part, logic capable of accomplishing the one or more of (i)-(iii) for one or more purposes, by applying the one or more of (i)-(iii) to products associated with different businesses.

741. The computer program product as recited in claim 6, wherein the computer program product is operable such that the one or more of (i)-(iii) is carried out utilizing, at least in part, logic capable of accomplishing the one or more of (i)-(iii) for one or more purposes, by applying the one or more of (i)-(iii) to products associated with different business sectors.

742. A computer program product embodied on a tangible computer readable medium, comprising:
  computer code for collaborative decision-making related to customer relationship management, the computer code for collaborative decision-making associated with an application which is a real estate-related application, a medical-related application, a corporate-related application, a product supply-related application, a service supply-related application, or a financial-related application;
  computer code for retrieving first information from a memory;
  computer code for receiving second information from at least one user interface; and
  computer code for causing generation of at least one display based on the first information and the second information, the display facilitating the collaborative decision-making by including at least one of a potential feasible hybrid theme, a decision sensitivity display, or a decision hierarchy display.

743. The computer program product as recited in claim 742, wherein the computer program product is operable such that the collaborative decision-making is carried out utilizing a system that is capable of carrying out the collaborative decision-making in connection with different decisions, and the at least one user interface is adapted for receiving the second information from different people at different times and from different places, such that the at least one display is based on the second information from the different people.

744. The computer program product as recited in claim 743, wherein the application is capable of being executed using the system and the system is capable of: (i) retrieving stored information; (ii) receiving user information; and (iii) processing the stored information and the user information for generating output of the processing; where one or more of (i)-(iii) is carried out in association with, at least in part, one or more modules that is operable such that the one or more of (i)-(iii) are capable of being purposed differently.

745. The computer program product as recited in claim 744, wherein the computer program product is operable such that the one or more of (i)-(iii) are capable of being purposed differently, by applying the one or more of (i)-(iii) to different products.

746. The computer program product as recited in claim 744, wherein the computer program product is operable such that the one or more of (i)-(iii) are capable of being purposed differently, by applying the one or more of (i)-(iii) to products associated with different businesses.

747. The computer program product as recited in claim 744, wherein the computer program product is operable such that the one or more of (i)-(iii) are capable of being purposed differently, by applying the one or more of (i)-(iii) to products associated with different business sectors.

748. The computer program product as recited in claim 744, wherein the computer program product includes computer code having a plurality of objects associated with an object-oriented programming language.

749. The computer program product as recited in claim 744, wherein the at least one user interface is implemented utilizing dynamic web pages.

750. The computer program product as recited in claim 742, wherein the collaborative decision-making is facilitated utilizing platform means for supporting the collaborative decision-making in a collaborative manner.

751. The computer program product as recited in claim 742, wherein the collaborative decision-making is facilitated utilizing means for collaborative decision-making.

752. The computer program product as recited in claim 742, wherein the collaborative decision-making is facilitated utilizing a platform including module means for supporting collaborative decision-making.

753. The computer program product as recited in claim 742, wherein the collaborative decision-making is facilitated utilizing a collaborative platform including at least one module for supporting the collaborative decision-making in a manner that is, at least in part, universal when applied for different purposes.

754. The computer program product as recited in claim 742, wherein the collaborative decision-making includes collaborative decision-making that is facilitated utilizing a platform including at least one module for supporting the decision-making in a manner that is, at least in part, universal when applied differently by the platform.

755. The computer program product as recited in claim 742, wherein at least a portion of the computer code is carried out using modules capable of interfacing with different applications adapted for applying the modules differently.

756. The computer program product as recited in claim 742, wherein at least a portion of the computer code is carried out using universal modules capable of interfacing with different applications adapted for applying the universal modules differently.

757. The computer program product as recited in claim 742, wherein the computer program product includes an asynchronous framework operable such that the at least one user interface is capable of asynchronously receiving the second information from different people, such that contents of the at least one display is based on the second information from the different people.

758. The computer program product as recited in claim 742, wherein the computer program product includes an asynchronous framework operable such that the at least one user interface is capable of asynchronously receiving the second information from different people, such that contents of the at least one display is based on the second information from the different people; the asynchronous framework further operable to iteratively repeat a framing process.

759. The computer program product as recited in claim 742, wherein the computer program product includes an asynchronous framework operable such that the at least one user interface is capable of asynchronously receiving the second information from different people, such that contents of the at least one display is based on the second information from the different people; the asynchronous framework further operable such that the at least one user interface is capable of asynchronously receiving modified second information from the different people, such that the contents of the at least one display is modified based on the modified second information from the different people.

760. A system, comprising:
collaborative decision means for facilitating decision-making in association with an application which is a real estate-related application, a medical-related application, a corporate-related application, a product supply-related application, a service supply-related application, or a financial-related application;
means for retrieving first information from a memory; and
means for receiving second information via a web page constructed utilizing a hypertext markup language;
wherein the system is operable to cause generation of at least one display based on the first information and the second information, the display facilitating the decision-making by including at least one of a potential feasible hybrid theme, a decision sensitivity display, or a decision hierarchy display.

* * * * *